US012802121B2

(12) United States Patent
Woollard et al.

(10) Patent No.: US 12,802,121 B2
(45) Date of Patent: Nov. 17, 2026

(54) SYSTEMS AND METHODS FOR ASSOCIATING ANONYMOUSLY TRACKED SHOPPERS TO ACCOUNTS IN AN AUTONOMOUS SHOPPING STORE

(71) Applicant: Standard Cognition, Corp., San Francisco, CA (US)

(72) Inventors: David Woollard, San Francisco, CA (US); Jordan Fisher, San Francisco, CA (US); Mattia Santachiara, San Francisco, CA (US)

(73) Assignee: Standard Cognition, Corp., San Francisco, CA (US)

( * ) Notice: Subject to any disclaimer, the term of this patent is extended or adjusted under 35 U.S.C. 154(b) by 128 days.

(21) Appl. No.: 18/398,026

(22) Filed: Dec. 27, 2023

(65) Prior Publication Data

US 2024/0212027 A1 Jun. 27, 2024

Related U.S. Application Data

(60) Provisional application No. 63/544,779, filed on Oct. 18, 2023, provisional application No. 63/532,277, (Continued)

(51) Int. Cl.
*G06Q 30/0601* (2023.01)
*G06V 20/52* (2022.01)

(52) U.S. Cl.
CPC ..... *G06Q 30/0639* (2013.01); *G06Q 30/0633* (2013.01); *G06V 20/52* (2022.01)

(58) Field of Classification Search
CPC . G06Q 30/0639; G06Q 30/0633; G06V 20/52
(Continued)

(56) References Cited

U.S. PATENT DOCUMENTS 1,037,779 A 9/1912 Kusebauch
4,746,830 A 5/1988 Holland
(Continued)

FOREIGN PATENT DOCUMENTS

CA 2497795 A1 8/2006
CN 104850846 A 8/2015
(Continued)

OTHER PUBLICATIONS

U.S. Appl. No. 15/847,796, filed Dec. 19, 2017, U.S. Pat. No. 10,055,853, Aug. 21, 2018.
(Continued)

*Primary Examiner* — Oluseye Iwarere
(74) *Attorney, Agent, or Firm* — Haynes Beffel & Wolfeld LLP; Andrew L. Dunlap; Hannah W. Powell

(57) ABSTRACT

The technology disclosed teaches a system and methods for tracking subjects in an area of real space, as well as tracking subjects in a plurality of areas of real space. The technology disclosed can also track subjects in two or more separate tracking spaces that are within a previously designated region but have separate sets of sensors and cameras. The disclosed system and methods can track groups of subjects in two or more separate tracking spaces that are within a previously designated region. For the purposes of tracking subjects, a subject persistence processing engine compares the newly located (or newly identified) subjects in the current identification interval with preceding identification intervals. This can be applied to an autonomous shopping environment, enabling shoppers to seamlessly make shopping transactions across multiple stores or locations within the previously designated region and allowing for sharing of shopping data across the multiple stores or locations.

19 Claims, 89 Drawing Sheets
(36 of 89 Drawing Sheet(s) Filed in Color)

Related U.S. Application Data filed on Aug. 11, 2023, provisional application No. 63/435,770, filed on Dec. 28, 2022, provisional application No. 63/435,532, filed on Dec. 27, 2022.

(58) Field of Classification Search
USPC ........................................................ 705/26
See application file for complete search history.

(56) References Cited

U.S. PATENT DOCUMENTS

| | | | |
|---|---|---|---|
| 5,734,722 A | 3/1998 | Halpern | |
| 5,745,036 A | 4/1998 | Clare | |
| 6,154,559 A | 11/2000 | Beardsley | |
| 6,236,736 B1 | 5/2001 | Crabtree et al. | |
| 6,561,417 B1 | 5/2003 | Gadd | |
| 6,584,375 B2 | 6/2003 | Bancroft et al. | |
| 6,768,102 B1 | 7/2004 | Skoll | |
| 7,050,624 B2 | 5/2006 | Dialameh et al. | |
| 7,050,652 B2 | 5/2006 | Stanek | |
| 7,240,027 B2 | 7/2007 | McConnell et al. | |
| 7,693,757 B2 | 4/2010 | Zimmerman | |
| 7,742,623 B1 | 6/2010 | Moon et al. | |
| 8,009,863 B1 | 8/2011 | Sharma et al. | |
| 8,098,888 B1 | 1/2012 | Mummareddy et al. | |
| 8,219,438 B1 | 7/2012 | Moon et al. | |
| 8,261,256 B1 | 9/2012 | Adler et al. | |
| 8,279,325 B2 | 10/2012 | Pitts et al. | |
| 8,452,868 B2 | 5/2013 | Shafer et al. | |
| 8,577,705 B1 | 11/2013 | Baboo et al. | |
| 8,624,725 B1 | 1/2014 | MacGregor | |
| 8,749,630 B2 | 6/2014 | Alahi et al. | |
| 8,897,741 B2 | 11/2014 | Johnson | |
| 9,033,229 B2 | 5/2015 | Matsuhisa et al. | |
| 9,036,028 B2 | 5/2015 | Buehler | |
| 9,058,523 B2 | 6/2015 | Merkel et al. | |
| 9,124,778 B1 | 9/2015 | Crabtree | |
| 9,147,174 B2 | 9/2015 | Glickman et al. | |
| 9,171,442 B2 | 10/2015 | Clements | |
| 9,256,807 B1 | 2/2016 | Shlens et al. | |
| 9,262,681 B1 | 2/2016 | Mishra | |
| 9,269,012 B2 | 2/2016 | Fotland | |
| 9,269,093 B2 | 2/2016 | Lee et al. | |
| 9,294,873 B1 | 3/2016 | MacGregor | |
| 9,390,032 B1 | 7/2016 | Baldwin | |
| 9,449,233 B2 | 9/2016 | Taylor | |
| 9,460,524 B1 | 10/2016 | Curlander et al. | |
| 9,483,704 B2 | 11/2016 | Schwartz | |
| 9,489,623 B1 | 11/2016 | Sinyavskiy et al. | |
| 9,494,532 B2 | 11/2016 | Xie et al. | |
| 9,536,167 B2 | 1/2017 | Schwartz | |
| 9,536,177 B2 | 1/2017 | Chalasani et al. | |
| 9,582,891 B2 | 2/2017 | Geiger et al. | |
| 9,595,127 B2 | 3/2017 | Champion et al. | |
| 9,652,751 B2 | 5/2017 | Aaron et al. | |
| 9,693,333 B2 | 6/2017 | Alles et al. | |
| 9,811,754 B2 | 11/2017 | Schwartz | |
| 9,846,810 B2 | 12/2017 | Partis | |
| 9,881,221 B2 | 1/2018 | Bala et al. | |
| 9,886,827 B2 | 2/2018 | Schoner | |
| 9,911,290 B1 | 3/2018 | Zalewski et al. | |
| 10,026,116 B2 | 7/2018 | Zohar et al. | |
| 10,055,853 B1 | 8/2018 | Fisher et al. | |
| 10,083,453 B2 | 9/2018 | Campbell | |
| 10,127,438 B1 * | 11/2018 | Fisher | G06V 20/52 |
| 10,133,933 B1 * | 11/2018 | Fisher | G06V 20/41 |
| 10,163,031 B2 | 12/2018 | Shaw | |
| 10,165,194 B1 | 12/2018 | Baldwin | |
| 10,169,677 B1 | 1/2019 | Ren et al. | |
| 10,175,340 B1 | 1/2019 | Abari et al. | |
| 10,176,452 B2 | 1/2019 | Rizzolo et al. | |
| 10,192,408 B2 | 1/2019 | Schoner | |
| 10,202,135 B2 | 2/2019 | Mian et al. | |
| 10,210,603 B2 | 2/2019 | Venable et al. | |
| 10,210,737 B2 | 2/2019 | Zhao | |
| 10,217,120 B1 | 2/2019 | Shin et al. | |
| 10,242,393 B1 | 3/2019 | Kumar et al. | |
| 10,257,708 B1 | 4/2019 | Kamkar et al. | |
| 10,262,331 B1 | 4/2019 | Sharma et al. | |
| 10,282,720 B1 | 5/2019 | Buibas et al. | |
| 10,282,852 B1 | 5/2019 | Buibas et al. | |
| 10,318,917 B1 | 6/2019 | Goldstein et al. | |
| 10,332,089 B1 | 6/2019 | Asmi et al. | |
| 10,354,262 B1 | 7/2019 | Hershey et al. | |
| 10,373,322 B1 | 8/2019 | Buibas et al. | |
| 10,387,896 B1 | 8/2019 | Hershey et al. | |
| 10,389,944 B2 | 8/2019 | Ozluturk | |
| 10,438,164 B1 | 10/2019 | Xiong et al. | |
| 10,438,277 B1 | 10/2019 | Jiang et al. | |
| 10,445,694 B2 * | 10/2019 | Fisher | G06T 7/70 |
| 10,474,877 B2 | 11/2019 | Huang et al. | |
| 10,474,988 B2 * | 11/2019 | Fisher | G06Q 10/087 |
| 10,474,991 B2 | 11/2019 | Fisher et al. | |
| 10,474,992 B2 * | 11/2019 | Fisher | G06Q 10/087 |
| 10,474,993 B2 * | 11/2019 | Fisher | G06T 7/194 |
| 10,515,518 B2 | 12/2019 | Cantley et al. | |
| 10,529,137 B1 | 1/2020 | Black et al. | |
| 10,535,146 B1 | 1/2020 | Buibas et al. | |
| 10,580,099 B2 | 3/2020 | Branscomb et al. | |
| 10,650,545 B2 * | 5/2020 | Fisher | H04N 23/60 |
| 10,699,537 B1 | 6/2020 | Schoner | |
| 10,776,926 B2 | 9/2020 | Shrivastava | |
| 10,805,556 B1 | 10/2020 | Sorgi et al. | |
| 10,810,539 B1 | 10/2020 | Mohanty et al. | |
| 10,846,996 B2 | 11/2020 | Schoner | |
| 10,853,942 B1 | 12/2020 | Boyd et al. | |
| 10,853,965 B2 | 12/2020 | Fisher et al. | |
| 10,929,829 B1 | 2/2021 | Hazelwood et al. | |
| 10,943,128 B2 * | 3/2021 | Zucker | G06Q 20/12 |
| 11,049,063 B2 | 6/2021 | Ali et al. | |
| 11,063,931 B2 | 7/2021 | Johri | |
| 11,132,810 B2 | 9/2021 | Kume et al. | |
| 11,195,146 B2 * | 12/2021 | Fisher | H04N 17/002 |
| 11,200,692 B2 * | 12/2021 | Fisher | H04L 63/0853 |
| 11,232,575 B2 * | 1/2022 | Fisher | G06V 10/764 |
| 11,232,687 B2 * | 1/2022 | Fisher | G06T 13/80 |
| 11,250,376 B2 | 2/2022 | Fisher et al. | |
| 11,270,260 B2 * | 3/2022 | Fisher | G06N 3/045 |
| 11,301,684 B1 | 4/2022 | Kumar et al. | |
| 11,303,853 B2 | 4/2022 | Kallakuri et al. | |
| 11,354,683 B1 | 6/2022 | Shin et al. | |
| 11,361,468 B2 * | 6/2022 | Kallakuri | G06N 3/0895 |
| 11,526,893 B2 | 12/2022 | Poole | |
| 11,538,186 B2 * | 12/2022 | Fisher | G06N 3/045 |
| 11,544,866 B2 * | 1/2023 | Fisher | G06F 16/53 |
| 11,810,317 B2 * | 11/2023 | Fisher | H04L 63/0853 |
| 11,948,313 B2 * | 4/2024 | Fisher | G06N 3/045 |
| 12,026,665 B2 * | 7/2024 | Fisher | H04N 23/90 |
| 12,079,769 B2 * | 9/2024 | Kallakuri | G06N 3/0895 |
| 12,288,294 B2 * | 4/2025 | Singh | G06T 17/10 |
| 2001/0049690 A1 | 12/2001 | McConnell et al. | |
| 2003/0078849 A1 | 4/2003 | Snyder | |
| 2003/0107649 A1 | 6/2003 | Flickner et al. | |
| 2003/0154141 A1 | 8/2003 | Capazario et al. | |
| 2004/0099736 A1 | 5/2004 | Neumark | |
| 2004/0131254 A1 | 7/2004 | Liang et al. | |
| 2005/0177446 A1 | 8/2005 | Hoblit | |
| 2005/0201612 A1 | 9/2005 | Park et al. | |
| 2006/0132491 A1 | 6/2006 | Riach et al. | |
| 2006/0195370 A1 | 8/2006 | Howarth | |
| 2006/0279630 A1 | 12/2006 | Aggarwal et al. | |
| 2007/0021863 A1 | 1/2007 | Mountz et al. | |
| 2007/0021864 A1 | 1/2007 | Mountz et al. | |
| 2007/0182718 A1 | 8/2007 | Schoener et al. | |
| 2007/0188318 A1 | 8/2007 | Cole et al. | |
| 2007/0282665 A1 | 12/2007 | Buehler et al. | |
| 2008/0001918 A1 | 1/2008 | Hsu et al. | |
| 2008/0101652 A1 | 5/2008 | Zhao et al. | |
| 2008/0159634 A1 | 7/2008 | Sharma et al. | |
| 2008/0170776 A1 | 7/2008 | Albertson et al. | |
| 2008/0181507 A1 | 7/2008 | Gope et al. | |
| 2008/0208698 A1 | 8/2008 | Olson et al. | |
| 2008/0211915 A1 | 9/2008 | McCubbrey | |
| 2008/0243614 A1 | 10/2008 | Tu et al. | |
| 2008/0246613 A1 | 10/2008 | Linstrom et al. | |

(56) References Cited

U.S. PATENT DOCUMENTS

| | | | |
|---|---|---|---|
| 2009/0041297 | A1 | 2/2009 | Zhang et al. |
| 2009/0057068 | A1 | 3/2009 | Lin et al. |
| 2009/0083815 | A1 | 3/2009 | McMaster et al. |
| 2009/0217315 | A1 | 8/2009 | Malik et al. |
| 2009/0222313 | A1 | 9/2009 | Kannan et al. |
| 2009/0268028 | A1 | 10/2009 | Ikumi et al. |
| 2009/0307226 | A1 | 12/2009 | Koster et al. |
| 2010/0021009 | A1 | 1/2010 | Yao |
| 2010/0103104 | A1 | 4/2010 | Son et al. |
| 2010/0138281 | A1 | 6/2010 | Zhang et al. |
| 2010/0208941 | A1 | 8/2010 | Broaddus et al. |
| 2010/0217678 | A1 | 8/2010 | Goncalves |
| 2010/0283860 | A1 | 11/2010 | Nader |
| 2011/0141011 | A1 | 6/2011 | Lashina et al. |
| 2011/0209042 | A1 | 8/2011 | Porter |
| 2011/0228976 | A1 | 9/2011 | Fitzgibbon et al. |
| 2011/0317012 | A1 | 12/2011 | Hammadou |
| 2011/0317016 | A1 | 12/2011 | Saeki et al. |
| 2011/0317871 | A1 | 12/2011 | Tossell et al. |
| 2011/0320322 | A1 | 12/2011 | Roslak et al. |
| 2012/0119879 | A1 | 5/2012 | Estes et al. |
| 2012/0137256 | A1 | 5/2012 | Lalancette et al. |
| 2012/0154604 | A1 | 6/2012 | Chen et al. |
| 2012/0159290 | A1 | 6/2012 | Pulsipher et al. |
| 2012/0206337 | A1 | 8/2012 | Hildreth et al. |
| 2012/0209749 | A1 | 8/2012 | Hammad et al. |
| 2012/0245974 | A1 | 9/2012 | Bonner et al. |
| 2012/0271712 | A1 | 10/2012 | Katzin et al. |
| 2012/0275686 | A1 | 11/2012 | Wilson et al. |
| 2012/0290401 | A1 | 11/2012 | Neven |
| 2013/0011007 | A1 | 1/2013 | Muriello et al. |
| 2013/0011049 | A1 | 1/2013 | Kimura |
| 2013/0060708 | A1 | 3/2013 | Oskolkov et al. |
| 2013/0076898 | A1 | 3/2013 | Philippe et al. |
| 2013/0103608 | A1 | 4/2013 | Scipioni et al. |
| 2013/0142384 | A1 | 6/2013 | Ofek |
| 2013/0156260 | A1 | 6/2013 | Craig |
| 2013/0169822 | A1 | 7/2013 | Zhu et al. |
| 2013/0182114 | A1 | 7/2013 | Zhang et al. |
| 2013/0201339 | A1 | 8/2013 | Venkatesh |
| 2013/0235206 | A1 | 9/2013 | Smith et al. |
| 2013/0266181 | A1 | 10/2013 | Brewer et al. |
| 2013/0325673 | A1 | 12/2013 | Abdic et al. |
| 2013/0337789 | A1 | 12/2013 | Johnson |
| 2014/0089673 | A1 | 3/2014 | Luna |
| 2014/0168477 | A1 | 6/2014 | David |
| 2014/0172476 | A1 | 6/2014 | Goulart |
| 2014/0188648 | A1 | 7/2014 | Argue et al. |
| 2014/0207615 | A1 | 7/2014 | Li et al. |
| 2014/0214608 | A1 | 7/2014 | Pedley et al. |
| 2014/0219550 | A1 | 8/2014 | Popa et al. |
| 2014/0220888 | A1 | 8/2014 | Shimshoni |
| 2014/0222501 | A1 | 8/2014 | Hirakawa et al. |
| 2014/0282162 | A1 | 9/2014 | Fein et al. |
| 2014/0285660 | A1 | 9/2014 | Jamtgaard et al. |
| 2014/0289009 | A1 | 9/2014 | Campbell |
| 2014/0300736 | A1 | 10/2014 | Reitinger et al. |
| 2014/0304123 | A1 | 10/2014 | Schwartz |
| 2014/0347479 | A1 | 11/2014 | Givon |
| 2014/0363059 | A1 | 12/2014 | Hurewitz |
| 2015/0002675 | A1 | 1/2015 | Kundu et al. |
| 2015/0009323 | A1 | 1/2015 | Lei |
| 2015/0012396 | A1 | 1/2015 | Puerini et al. |
| 2015/0017972 | A1 | 1/2015 | Osann, Jr. |
| 2015/0019391 | A1 | 1/2015 | Kumar et al. |
| 2015/0026010 | A1 | 1/2015 | Ellison |
| 2015/0026646 | A1 | 1/2015 | Ahn et al. |
| 2015/0029339 | A1 | 1/2015 | Kobres et al. |
| 2015/0039458 | A1 | 2/2015 | Reid |
| 2015/0049914 | A1 | 2/2015 | Alves |
| 2015/0085111 | A1 | 3/2015 | Lavery |
| 2015/0124107 | A1 | 5/2015 | Muriello et al. |
| 2015/0181634 | A1 | 6/2015 | Cheng |
| 2015/0193761 | A1 | 7/2015 | Svetal |
| 2015/0206188 | A1 | 7/2015 | Tanigawa et al. |
| 2015/0208043 | A1 | 7/2015 | Lee et al. |
| 2015/0213391 | A1 | 7/2015 | Hasan |
| 2015/0221094 | A1 | 8/2015 | Marcheselli et al. |
| 2015/0222861 | A1 | 8/2015 | Fujii et al. |
| 2015/0262116 | A1 | 9/2015 | Katircioglu et al. |
| 2015/0269740 | A1 | 9/2015 | Mazurenko et al. |
| 2015/0294397 | A1 | 10/2015 | Croy et al. |
| 2015/0302593 | A1 | 10/2015 | Mazurenko et al. |
| 2015/0310459 | A1 | 10/2015 | Bernal et al. |
| 2015/0327794 | A1 | 11/2015 | Rahman et al. |
| 2015/0332312 | A1 | 11/2015 | Cosman |
| 2015/0341599 | A1 | 11/2015 | Carey |
| 2015/0356610 | A1 | 12/2015 | Ponoth |
| 2015/0363868 | A1 | 12/2015 | Kleinhandler et al. |
| 2015/0379366 | A1 | 12/2015 | Nomura et al. |
| 2016/0034027 | A1 | 2/2016 | Sheng |
| 2016/0055499 | A1 | 2/2016 | Hawkins et al. |
| 2016/0078904 | A1 | 3/2016 | Yamaji |
| 2016/0095511 | A1 | 4/2016 | Taguchi et al. |
| 2016/0105923 | A1 | 4/2016 | Chen et al. |
| 2016/0110760 | A1 | 4/2016 | Herring et al. |
| 2016/0125245 | A1 | 5/2016 | Saitwal et al. |
| 2016/0125504 | A1 | 5/2016 | Narayanan |
| 2016/0127297 | A1 | 5/2016 | Irmak et al. |
| 2016/0155011 | A1 | 6/2016 | Sulc et al. |
| 2016/0162715 | A1 | 6/2016 | Luk et al. |
| 2016/0171707 | A1 | 6/2016 | Schwartz |
| 2016/0188962 | A1 | 6/2016 | Taguchi |
| 2016/0189286 | A1 | 6/2016 | Zohar et al. |
| 2016/0203525 | A1 | 7/2016 | Hara et al. |
| 2016/0217157 | A1 | 7/2016 | Shih et al. |
| 2016/0217417 | A1 | 7/2016 | Ma et al. |
| 2016/0232677 | A1 | 8/2016 | Liao et al. |
| 2016/0255078 | A1 | 9/2016 | Zhang et al. |
| 2016/0258763 | A1 | 9/2016 | High |
| 2016/0259994 | A1 | 9/2016 | Ravindran et al. |
| 2016/0358145 | A1 | 12/2016 | Montgomery |
| 2016/0371726 | A1 | 12/2016 | Yamaji et al. |
| 2016/0381328 | A1 | 12/2016 | Zhao |
| 2017/0011260 | A1 | 1/2017 | Mihara et al. |
| 2017/0024806 | A1 | 1/2017 | High et al. |
| 2017/0026354 | A1 | 1/2017 | Reece et al. |
| 2017/0032193 | A1 | 2/2017 | Yang |
| 2017/0068861 | A1 | 3/2017 | Miller et al. |
| 2017/0076454 | A1 | 3/2017 | Yano et al. |
| 2017/0104979 | A1 | 4/2017 | Shaw et al. |
| 2017/0116473 | A1 | 4/2017 | Sashida et al. |
| 2017/0124096 | A1 | 5/2017 | Hsi et al. |
| 2017/0132492 | A1 | 5/2017 | Xie et al. |
| 2017/0148005 | A1 | 5/2017 | Murn |
| 2017/0154212 | A1 | 6/2017 | Feris et al. |
| 2017/0161555 | A1 | 6/2017 | Kumar et al. |
| 2017/0168586 | A1 | 6/2017 | Sinha et al. |
| 2017/0169440 | A1 | 6/2017 | Dey et al. |
| 2017/0178226 | A1 | 6/2017 | Graham et al. |
| 2017/0193397 | A1 | 7/2017 | Kottha et al. |
| 2017/0193434 | A1 | 7/2017 | Shah et al. |
| 2017/0205337 | A1 | 7/2017 | Akhtman et al. |
| 2017/0206664 | A1 | 7/2017 | Shen |
| 2017/0206669 | A1 | 7/2017 | Saleemi et al. |
| 2017/0212586 | A1 | 7/2017 | Lopez |
| 2017/0249339 | A1 | 8/2017 | Lester |
| 2017/0249549 | A1 | 8/2017 | Bai |
| 2017/0255990 | A1 | 9/2017 | Ramamurthy et al. |
| 2017/0278255 | A1 | 9/2017 | Shingu et al. |
| 2017/0308911 | A1 | 10/2017 | Barham et al. |
| 2017/0309136 | A1 | 10/2017 | Schoner |
| 2017/0323376 | A1 | 11/2017 | Glaser et al. |
| 2018/0003315 | A1 | 1/2018 | Reed |
| 2018/0012072 | A1 | 1/2018 | Glaser et al. |
| 2018/0012080 | A1 | 1/2018 | Glaser et al. |
| 2018/0014382 | A1 | 1/2018 | Glaser et al. |
| 2018/0025175 | A1 | 1/2018 | Kato |
| 2018/0032799 | A1 | 2/2018 | Marcheselli et al. |
| 2018/0033015 | A1 | 2/2018 | Opalka et al. |
| 2018/0033151 | A1 | 2/2018 | Matsumoto et al. |
| 2018/0068431 | A1 | 3/2018 | Takeda et al. |
| 2018/0070056 | A1 | 3/2018 | DeAngelis et al. |
| 2018/0088900 | A1 | 3/2018 | Glaser et al. |

(56) References Cited

U.S. PATENT DOCUMENTS

2018/0108001 A1 4/2018 Taylor
2018/0108195 A1 4/2018 Bashkin
2018/0137480 A1 5/2018 Houghton, IV et al.
2018/0150788 A1 5/2018 Vepakomma et al.
2018/0165728 A1 6/2018 McDonald et al.
2018/0165733 A1 6/2018 Kundu et al.
2018/0181995 A1 6/2018 Burry et al.
2018/0189600 A1 7/2018 Astrom et al.
2018/0217223 A1 8/2018 Kumar et al.
2018/0225625 A1 8/2018 DiFatta et al.
2018/0232796 A1 8/2018 Glaser et al.
2018/0240180 A1 8/2018 Glaser et al.
2018/0260877 A1* 9/2018 Li ..................... G06Q 30/0633
2018/0276480 A1 9/2018 Peterson et al.
2018/0293706 A1 10/2018 Viswanathan et al.
2018/0295424 A1 10/2018 Taylor et al.
2018/0322616 A1 11/2018 Guigues
2018/0329762 A1 11/2018 Li et al.
2018/0332235 A1 11/2018 Glaser
2018/0332236 A1 11/2018 Glaser et al.
2018/0343417 A1 11/2018 Davey
2018/0365481 A1 12/2018 Tolbert et al.
2018/0365755 A1 12/2018 Bekbolatov et al.
2018/0373928 A1 12/2018 Glaser et al.
2018/0374076 A1 12/2018 Wheeler
2019/0005479 A1 1/2019 Glaser et al.
2019/0019309 A1 1/2019 Herrli et al.
2019/0034735 A1 1/2019 Cuban et al.
2019/0043003 A1* 2/2019 Fisher .................. G06V 10/764
2019/0057435 A1 2/2019 Chomley et al.
2019/0147709 A1 5/2019 Schoner
2019/0156273 A1* 5/2019 Fisher .................. G06N 3/0464
2019/0156274 A1* 5/2019 Fisher .................. G06Q 10/087
2019/0156275 A1 5/2019 Fisher et al.
2019/0156276 A1* 5/2019 Fisher .................. G06N 3/0464
2019/0156277 A1* 5/2019 Fisher .................. G06V 40/107
2019/0156403 A1 5/2019 Yankovich et al.
2019/0156506 A1* 5/2019 Fisher .................... H04N 23/60
2019/0158813 A1 5/2019 Rowell et al.
2019/0180272 A1 6/2019 Douglas
2019/0188876 A1 6/2019 Song et al.
2019/0205905 A1 7/2019 Raghunathan
2019/0244386 A1 8/2019 Fisher et al.
2019/0244500 A1* 8/2019 Fisher .............. G08B 13/19682
2019/0251340 A1 8/2019 Brown et al.
2019/0311625 A1 10/2019 Anvari
2019/0331273 A1 10/2019 Vos et al.
2019/0347611 A1 11/2019 Fisher et al.
2019/0377957 A1 12/2019 Johnston et al.
2019/0378205 A1 12/2019 Glaser et al.
2019/0392318 A1 12/2019 Ghafoor et al.
2020/0019921 A1 1/2020 Buibas et al.
2020/0020113 A1 1/2020 Buibas et al.
2020/0025931 A1 1/2020 Liang et al.
2020/0034988 A1 1/2020 Zhou
2020/0074165 A1 3/2020 Ghafoor et al.
2020/0074393 A1* 3/2020 Fisher ...................... G06N 3/09
2020/0074394 A1* 3/2020 Fisher ...................... G06N 3/09
2020/0074432 A1* 3/2020 Valdman .................. G07G 5/00
2020/0118400 A1 4/2020 Zalewski et al.
2020/0125824 A1 4/2020 Mabyalaht et al.
2020/0134588 A1 4/2020 Nelms et al.
2020/0151692 A1 5/2020 Gao et al.
2020/0184230 A1 6/2020 Liu et al.
2020/0184442 A1 6/2020 Gu et al.
2020/0184444 A1 6/2020 Gu et al.
2020/0184447 A1 6/2020 Gu et al.
2020/0193507 A1 6/2020 Glaser et al.
2020/0202177 A1 6/2020 Buibas et al.
2020/0234463 A1* 7/2020 Fisher .................. G06V 40/107
2020/0250736 A1* 8/2020 Howard ................. G06V 20/10
2020/0258241 A1 8/2020 Liu et al.
2020/0293992 A1 9/2020 Bogolea et al.
2020/0294079 A1 9/2020 Saha
2020/0334834 A1 10/2020 Fisher
2020/0334835 A1 10/2020 Buibas et al.
2020/0349548 A1 11/2020 Mangle
2020/0380701 A1 12/2020 Buibas et al.
2020/0410713 A1 12/2020 Auer et al.
2021/0019811 A1* 1/2021 Kassaei .............. G06Q 30/0635
2021/0049772 A1 2/2021 Buibas et al.
2021/0049785 A1* 2/2021 Fisher ................... G06F 18/217
2021/0067744 A1 3/2021 Buibas et al.
2021/0073901 A1 3/2021 Yankovich et al.
2021/0125355 A1 4/2021 Mirza et al.
2021/0158430 A1 5/2021 Buibas et al.
2021/0182922 A1 6/2021 Zheng et al.
2021/0191519 A1 6/2021 Zhao et al.
2021/0201253 A1* 7/2021 Fisher .................... H04N 23/60
2021/0272086 A1 9/2021 Buibas et al.
2021/0279475 A1 9/2021 Tusch et al.
2021/0295081 A1 9/2021 Berry et al.
2021/0319420 A1* 10/2021 Yu .......................... G06V 20/52
2021/0350568 A1* 11/2021 Fisher .................... H04N 23/90
2021/0407131 A1 12/2021 Kallakuri et al.
2022/0130055 A1* 4/2022 Fisher ..................... G06T 7/248
2022/0130220 A1* 4/2022 Fisher .................... G06V 20/52
2022/0156827 A1 5/2022 Glaser et al.
2022/0188760 A1* 6/2022 Fisher .................. H04N 17/002
2022/0198550 A1* 6/2022 Meidar .................. G06Q 20/20
2022/0230216 A1 7/2022 Buibas
2022/0262069 A1* 8/2022 Singh ...................... G06T 17/10
2022/0270295 A1* 8/2022 Kallakuri .................. G06T 7/80
2023/0083881 A1 3/2023 Chen et al.
2023/0140693 A1 5/2023 Fisher et al.
2023/0162398 A1 5/2023 Varekamp et al.
2024/0193497 A1* 6/2024 Morales Saiki ..... G06V 40/178
2024/0320622 A1* 9/2024 Fisher .................... G06V 20/52

FOREIGN PATENT DOCUMENTS

CN 105069413 A 11/2015
CN 105701519 A 6/2016
CN 104778690 B 6/2017
CN 108055390 A 5/2018
EP 1574986 B1 7/2008
EP 2555162 A1 2/2013
EP 3002710 A1 4/2016
EP 3474183 A1 4/2019
EP 3474184 A1 4/2019
GB 2560387 A 9/2018
GB 2566762 A 3/2019
JP H11175730 A 7/1999
JP 2004171240 A 6/2004
JP 2004171241 A 6/2004
JP 2004348618 A 12/2004
JP 2006126926 A 5/2006
JP 2008176504 A 7/2008
JP 2009055139 A 3/2009
JP 2009265922 A 11/2009
JP 2010002997 A 1/2010
JP 2011209966 A 10/2011
JP 2011253344 A 12/2011
JP 2012123667 A 6/2012
JP 2012147083 A 8/2012
JP 2013196199 A 9/2013
JP 2014089626 A 5/2014
JP 2015011649 A 1/2015
JP 2015149559 A 8/2015
JP 2016144049 A 8/2016
JP 2016532932 A 10/2016
JP 2016206782 A 12/2016
JP 2017059945 A 3/2017
JP 2017062776 A 3/2017
JP 2017157216 A 9/2017
JP 2018099317 A 6/2018
KR 1020180032400 A 3/2018
KR 1020190093733 A 8/2019
KR 102223570 B1 3/2021
SE 1751401 A1 6/2018
TW 201228380 A 7/2012
TW 201445474 A 12/2014
TW 201504964 A 2/2015
TW 201725545 A 7/2017

(56) References Cited

FOREIGN PATENT DOCUMENTS

| | | | |
|---|---|---|---|
| TW | 201911119 | A | 3/2019 |
| WO | 0021021 | A1 | 4/2000 |
| WO | 0243352 | A2 | 5/2002 |
| WO | 02059836 | A3 | 5/2003 |
| WO | 2008029159 | A1 | 3/2008 |
| WO | 2009027839 | A2 | 3/2009 |
| WO | 2012067646 | A1 | 5/2012 |
| WO | 2013033442 | A1 | 3/2013 |
| WO | 2013041444 | A1 | 3/2013 |
| WO | 2013043590 | A1 | 3/2013 |
| WO | 2013103912 | A1 | 7/2013 |
| WO | 2014133779 | A1 | 9/2014 |
| WO | 2014209724 | A1 | 12/2014 |
| WO | 2015017796 | A2 | 2/2015 |
| WO | 2015033577 | A1 | 3/2015 |
| WO | 2015040661 | A1 | 3/2015 |
| WO | 2015133699 | A1 | 9/2015 |
| WO | 2015173869 | A1 | 11/2015 |
| WO | 2016136144 | A1 | 9/2016 |
| WO | 2016166508 | A1 | 10/2016 |
| WO | 2017015390 | A1 | 1/2017 |
| WO | 2017151241 | A2 | 9/2017 |
| WO | 2017163909 | A1 | 9/2017 |
| WO | 2017196822 | A1 | 11/2017 |
| WO | 2018013438 | A1 | 1/2018 |
| WO | 2018013439 | A1 | 1/2018 |
| WO | 2018148613 | A1 | 8/2018 |
| WO | 2018162929 | A1 | 9/2018 |
| WO | 2018209156 | A1 | 11/2018 |
| WO | 2018237210 | A1 | 12/2018 |
| WO | 2019032304 | A1 | 2/2019 |
| WO | 2019032305 | A2 | 2/2019 |
| WO | 2019032306 | A1 | 2/2019 |
| WO | 2019032307 | A1 | 2/2019 |
| WO | 2020023795 | | 1/2020 |
| WO | 2020023796 | | 1/2020 |
| WO | 2020023798 | | 1/2020 |
| WO | 2020023799 | | 1/2020 |
| WO | 2020023801 | | 1/2020 |
| WO | 2020023926 | | 1/2020 |
| WO | 2020023930 | | 1/2020 |
| WO | 2020047555 | A1 | 3/2020 |
| WO | 2020214775 | A1 | 10/2020 |
| WO | 2020225562 | A1 | 11/2020 |

OTHER PUBLICATIONS

U.S. Appl. No. 15/907,112, filed Feb. 27, 2018, U.S. Pat. No. 10,133,933, Nov. 20, 2018.
U.S. Appl. No. 15/945,466, filed Apr. 4, 2018, U.S. Pat. No. 10,127,438, Nov. 13, 2018.
U.S. Appl. No. 15/945,473, filed Apr. 4, 2018, U.S. Pat. No. 10,474,988, Nov. 12, 2019.
U.S. Appl. No. 16/255,573, filed Jan. 23, 2019, U.S. Pat. No. 10,650,545, May 12, 2020.
U.S. Appl. No. 17/358,864, filed Jun. 25, 2021, U.S. Pat. No. 11,303,853, Apr. 12, 2022.
U.S. Appl. No. 17/357,867, filed Jun. 24, 2021, U.S. Pat. No. 11,361,468, Jun. 14, 2022.
U.S. Appl. No. 17/733,680, filed Apr. 29, 2022, US 20220262069 A1, Aug. 18, 2022.
U.S. Appl. No. 17/988,650, filed Nov. 16, 2022, US 20230088414 A1, Mar. 23, 2023.
PCT/US2018/043933, Jul. 26, 2018, WO 2019032304 A1, Feb. 14, 2019.
PCT/US2018/043934, Jul. 26, 2018, WO 2019032305 A2, Feb. 14, 2019.
PCT/US2018/043937, Jul. 26, 2018, WO 2019032306 A1, Feb. 14, 2019.
PCT/US2018/043939, Jul. 26, 2018, WO 2019032307 A1, Feb. 14, 2019.
PCT/US2019/043526, Jul. 25, 2019, WO 2020023801 A1, Jan. 30, 2020.
PCT/US2021/039225, Jun. 25, 2021, WO 2021263190 A1, Dec. 30, 2021.
EP 18843486.4—Response to Communication pursuant to Article 94(3) filed Sep. 6, 2022, 18 pages.
JP 2020-507520—First Office Action with translation dated Jul. 26, 2022, 11 pages.
JP 2020-507520—Notice of Allowance with translation dated Oct. 25, 2022, 6 pages.
JP 2020-507520—Response to First Office Action with translation dated Oct. 13, 2022, 22 pages.
Keulian, "Naraffar, the First Staffless Convenience Store," "Stephane Keulian: Your fix of retail insights Blog" Retrieved on May 5, 2017. 3 pages. Retrieved from the internet [URL: <http://stephanekeulian.com/en/naraffar-first-staffees-convenience-store/> ].
Lin et al., Energy-Accuracy Trade-off for Continuous Mobile Device Location, MobiSys' 10, Jun. 15-18, 2010, San Francisco,California, 13 pages.
CA 3111279—First Office Action dated Sep. 7, 2022, 4 pages.
Prindle, This Automated Store in Sweden Doesn't have Any Human Employees—Only a Smartphone App, Digital Trends, dated Feb. 29, 2016, 6 pages. Retrieved on Feb. 23, 2022. Retrieved from the internet [URL: <https://www.digitaltrends.com/cool-tech/sweden-app-enabled-automated-store/> ].
EDYN Company, Oakland, CA, Retrieved from the internt [URL: <https://edyn.com/> ]. Retrieved on May 5, 2017. 12 pages.
JP 2021-504402—First Office Action with translation, dated Oct. 25, 2022, 6 pages.
Annavajhala, Ravi "Cashierless Stores Are Getting A Mind Of Their Own "Forbes Article Sep. 29, 2022 pp. 1-5 (Year: 2022).
TW 108126626—First Office Action dated Mar. 22, 2022, 21 pages.
EP 19856354.6—Extended European Search Report, dated Apr. 8, 2022, 9 pages.
Amazon, "Amazon Go Frequently Asked Questions", 4 pages. Retrieved on Feb. 23, 2022. Retrieved from the internet [URL: <https://www.amazon.com/b?node=16008589011> ].
CA 3112512—First Office Action dated Sep. 28, 2022, 6 pages.
JP 2021-504467—First Office Action with translation dated Oct. 25, 2022, 6 pages.
EP 19840760.3—Rules 161(1) and 162 Communication, dated Apr. 12, 2021, 3 pages.
EP 19840760.3—Response to Rules 161(1) and 162 Communication dated Apr. 12, 2021, filed Sep. 23, 2021, 9 pages.
EP 19840760.3—Extended European Search Report dated Mar. 3, 2022, 8 pages.
EP 19840760.3—Response to Extended European Search Report filed Sep. 15, 2022, 14 pages.
PCT/US2019/043526—International Preliminary Report on Patentability dated Feb. 4, 2021, 6 pages.
PCT/US2019/043526—International Search Report and Written Opinion dated Nov. 18, 2019, 9 pages.
PCT/US2019/043770—International Preliminary Report on Patentability dated Feb. 4, 2021, 9 pages.
PCT/US2019/043775—International Preliminary Report on Patentability dated Feb. 4, 2021, 7 pages.
PCT/US2019/049388—International Preliminary Report on Patentability dated Mar. 11, 2021, 7 pages.
PCT/US2020/028454—International Preliminary Report on Patentability dated Oct. 28, 2021, 9 pages.
PCT/US2021/031173—International Search Report and Written Opinion dated Aug. 20, 2021, 9 pages.
PCT/US2021/039225—International Search Report and Written Opinion dated Oct. 19, 2021, 9 pages.
TW 107126341—Office Action dated Dec. 14, 2021, 2 pages.
TW 107126341—Partial English Translation of Office Action and Search Report dated Dec. 14, 2021, 5 pages.
TW 107126341—Search Report dated Dec. 14, 2021, 1 pages.
Li et al., "DeepI2P: Image-to-Point Cloud Registration via Deep Classification", CVPR, 2021, pp. 15960-15969.
Cao et al, "Leveraging Convolutional Pose Machines for Fast and Accurate Head Pose Estimation", 2018 IEEE/RSJ International Conference On Intelligent Robots and Systems (IROS), IEEE, Oct.

(56) References Cited

OTHER PUBLICATIONS 1, 2018 (Oct. 1, 2018), pp. 1089-1094, XP033491495, DOI: 10.1109/IROS.2018.8594223 [retrieved on Dec. 27, 2018].
He et al. "Deep Residual Learning for Image Recognition," (published at https://arxiv.org/abs/1512.03385), Dec. 10, 2015, 12 pages.
Prokaj et al., "Inferring tracklets for multi-object tracking," Computer Vision and Pattern Recognition Workshops OCVPRW), 2011 IEEE Computer Society Conference on IEEE, Jun. 20, 2011, pp. 37-44.
Mohedano et al., "Robust 3D people tracking and positioning system in a semi-overlapped multi-camera environment," 15th IEEE International Conference on Image Processing: ICIP 2008; San Diego, CA, USA, Oct. 12-15, 2008, pp. 2656-2659.
Simonyan et al. "Very Deep Convolutional Networks for Large-Scale Image Recognition" (published at https://arxiv.org/abs/1409.1556), Apr. 10, 2015, 14 pages.
Zheng et al., "Joint Discriminative and Generative Learning for Person Re-Identification," Proceedings of the IEEE/CVF Conference on Computer Vision and Pattern Recognition (CVPR), Jun. 16-20, 2019, pp. 2138-2147.
EP 18844509.2—Rules 161(2) and 162 Communication, dated Mar. 17, 2020, 3 pages.
EP 18844509.2—Response to Rules 161(2) and 162 Communication, filed Sep. 3, 2020, 11 pages.
Lee et al., Monitoring Activities from Activities from multiple video streams: Establishing a common coordinate frame, IEEE Transactions on Pattern Analysis and Machine Intelligence, IEEE Computer Society, vol. 22, No. 8, dated Aug. 1, 2000, pp. 758-767, 10 pages.
Hofmann et al., Hypergraphs for Joint Multi-view Reconstruction and Multi-object Tracking, 2017, IEEE Conference on Computer Vision and Pattern Recognition, IEEE Computer Society, dated Jun. 23, 2013, pp. 3650-3657, 8 pages.
EP 18844509.2—Communication pursuant to Article 94(3), dated May 20, 2022, 6 pages.
JP 2020-507669—First Office Action with translation, dated Aug. 2, 2022, 13 pages.
Germann et al., "Space-Time Body Pose Estimation in Uncontrolled Environments," 2011 International Conference on 3D Imaging, Modeling, Processing, Visualization and Transmission, May 2011, pp. 244-251.
Iqbal et al., "PoseTrack: Joint Multi-Person Pose Estimation and Tracking," Proceedings of the IEEE Conference on Computer Vision and Pattern Recognition (CVPR), Jul. 26, 2017, 12 pages.
JP 2020-507669—Response to First Office Action with translation, filed Oct. 27, 2022, 22 pages.
JP 2020-507669—Notice of Allowance with translation, dated Jan. 24, 2023, 5 pages.
EP 18844509.2—Response to Communication pursuant to Article 94(3), filed Sep. 13, 2022, 17 pages.
PCT/US2018/043934—International Search Report and Written Opinion, dated Feb. 1, 2019, 15 pages.
PCT/US2018/043934—International Preliminary Report on Patentability, dated Feb. 20, 2020, 12 pages.
JP 2020-507550—Office Action with translation dated Aug. 16, 2022, 6 pages.
JP 2020-507550—Response to Office Action with translation dated Nov. 2, 2022, 18 pages.
JP 2020-507550—Notice of Allowance with translation dated Jan. 5, 2023, 5 pages.
EP-18844384.0—Communication pursuant to Article 94(3) EPC dated Apr. 21, 2022, 7 pages.
Cai et al., "An Ego-Vision System for Hand Grasp Analysis", IEEE Transactions on Human-Machine Systems, IEEE, Piscataway, NJ, USA, vol. 47, No. 4, Aug. 1, 2017, pp. 525-535.
EP-18844384.0—Response to Communication pursuant to Article 94(3) EPC dated Aug. 17, 2022, 13 pages.
EP-18844384.0—Communication pursuant to Article 94(3) EPC dated Aug. 7, 2023, 8 pages.
Liu et al., "Customer Behavior Recognition in Retail Store from Surveillance Camera", 2015 IEEE International Symposium on Multimedia (ISM), IEEE, Dec. 14, 2015, pp. 154-159.
Popa et. al, "Analysis of shopping behavior based on surveillance system", Systems Man and Cybernetics (SMC), 2010 IEEE International Conference on IEEE, Piscataway, NJ, USA, Oct. 10, 2010 (Oct. 10, 2010), pp. 2512-2519.
JP 2020-507521—First Office Action with translation dated Aug. 2, 2022, 9 pages.
Abstract Translation Only* Shigeyuki Odashima et al., "Object Movement Management System via Integration of Stable Image Changes in Multiple Viewpoints", Journal of the Robotics Society of Japan, 2011, vol. 29, Issue 9, pp. 837-848.
JP 2020-507521—Response to First Office Action with translation filed Oct. 31, 2022, 22pages.
JP 2020-507521—Notice of Allowance with translation dated Nov. 15, 2022, 5 pages.
EP 18843163.9—Communication pursuant to Article 94(3) EPC dated Apr. 21, 2022, 10 pages.
EP 18843163.9—Response to Communication pursuant to Article 94(3) EPC dated Aug. 17, 2022, 23 pages.
EP 18843163.9—Communication pursuant to Article 94(3) EPC dated Aug. 7, 2023, 7 pages.
TW 107126341—Notice of Allowance dated Apr. 27, 2022, 3 pages.
TW 107126341—First Office Action Response Filed Feb. 24, 2022, 142 pages.
EP 18843486.4—Communication pursuant to Article 94(3) dated May 19, 2022, 6 pages.
Zhang "A Flexible New Technique for Camera Calibration," IEEE Transactions on Pattern Analysis and Machine Intelligence, vol. 22, No. 11, Nov. 2000, 22pages.
Longuet-Higgens, "A computer algorithm for reconstructing a scene from two projections," Nature 293, Sep. 10, 1981, pp. 133-135.
Harville, "Stereo person tracking with adaptive plan-view templates of height and occupancy statistics," Image and Vision Computing, vol. 22, Issue 2, Feb. 1, 2004, pp. 127-142.
Huang, et al. "Driver's view and vehicle surround estimation using omnidirectional video stream," IEEE IV2003 Intelligent Vehicles Symposium. Proceedings (Cat. No.03TH8683), Jun. 9-11, 2003, pp. 444-449.
Rossi et al., "Tracking and Counting Moving People," IEEE Int'l Conf. on Image Processing, ICIP-94, Nov. 13-16, 1994, 5 pages.
Vincze, "Robust tracking of ellipses at frame rate," Pattern Recognition, vol. 34, Issue 2, Feb. 2001, pp. 487-498.
Black et al., "Multi View Image Surveillance and Tracking," IEEE Proceedings of the Workshop on Motion and Video Computing, 2002, pp. 1-6.
Grinciunaite et al. "Human Pose Estimation in Space and Time Using 3D CNN," ECCV Workshop on Brave new ideas for motion representations in videos, Oct. 2016, 7 pages.
He et al. "Identity mappings in deep residual networks" (published at https://arxiv.org/pdf/1603.05027.pdf), Jul. 25, 2016, 15 pages.
PCT/US2018/043933—International Search Report and Written Opinion dated Nov. 7, 2018, 12 pages.
Toshev et al. "DeepPose: Human Pose Estimation via Deep Neural Networks," IEEE Conf. on Computer Vision and Pattern Recognition, Aug. 2014, 8 pages.
Jayabalan, et al., "Dynamic Action Recognition: A convolutional neural network model for temporally organized joint location data," Cornell University, Computer Science, Dec. 20, 2016, 11 pages.
Yusoff et al. "Optimal Camera Placement for 3D Environment," ICSECS 2011: Software Engineering and Computer Systems, Jun. 27-29, 2011, 448-459.
Erdem et al. "Automated camera layout to satisfy task-specific and floor plan-specific coverage requirements," Computer Vision and Image Undertanding 103, Aug. 1, 2006, 156-169.
Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.
EP 18843486.4—Extended European Search Report dated Dec. 8, 2020, 8 pages.

(56) References Cited

OTHER PUBLICATIONS

EP 18844509.2—Extended European Search Report dated Dec. 8, 2020, 8 pages.
PCT/US2019/043523—International Search Report and Written Opinion dated Nov. 20, 2019, 18 pages.
PCT/US2019/043770—International Search Report and Written Opinion dated Nov. 13, 2019, 13 pages.
PCT/US2019/043775—International Search Report and Written Opinion dated Nov. 13, 2019, 10 pages.
PCT/US2019/049388—International Search Report and Wirtten Opinion dated Dec. 20, 2019, 11 pages.
PCT/US2020/028454—International Search Report and Written Opinion dated Jul. 27, 2020, 12 pages.
Symons, "Data Fusion Methods for Netted Sensors with Limited Communication Bandwidth", QinetiQ Ltd and University College London, 2004.
PCT/US2018/043934—International Search Report and Written Opinion dated Feb. 1, 2019, 13 pages.
Redmon et al., "You Only Look Once: Unified, Real-Time Object Detection," University of Washington, Allen Institute tor Aly, Facebook AI Research, May 9, 2016, 10 pages.
Redmon et al., YOL09000: Better, Faster, Stronger, (available at https://arxiv.org/pdf/1612.08242.pdf), Dec. 25, 2016, 9 pages.
Wei et al., "Convolutional Pose Machine", Proceedings of the IEEE conference on Computer Vision and Pattern Recognition, Jun. 27, 2016, pp. 4724-4732.
Baek, "Aging and Soiling Simulators for Improved Banknote Classification and Validation", Graduate School, Yonsei University Department of Electrical and Electronic Engineering, pp. 1-9 Aug. 4, 2018 [retrieved on Sep. 6, 2021]. Retrieved from <URL: http://www.riss.kr/search/detail/DetailView.do?p_mat_type=be54d9b8bc7cdb09&control_no=0fd91aa4dcd3617affe0bdc3ef48d419>.
Ceballos, Scikit-Leam Decision Trees Explained, https://towardsdatascience.com/scikit-leam-decision-trees-explained-803f3812290d, Feb. 22, 2019, 13 pages.
DeTone et al, SuperPoint: Self-Supervised Interest Point Detection and Description, Apr. 19, 2018, arXiv:1712.07629v4 [cs.CV] Apr. 19, 2018, 13 pages.
EP 18709743.1—Office Action dated Mar. 11, 2021, 5 pages.
EP 18843163.9—Extended European Search Report dated Nov. 27, 2020, 8 pages.
EP 20791434.2—Communication pursuant to Rules 161(2) and 162 EPC dated Nov. 25, 2021, 3 pages.
EP-18844384.0—European Extended Search Report dated Dec. 2, 2020, 7 pages.
Feng et al., "2D3D-MatchNet: Learning to Match Keypoints Across 2D Image and 3D Point Cloud," 2019 International Conference on Robotics and Automation (ICRA). IEEE, 2019, May 20, 2019, pp. 4790-4796.
GB 1703914.0—Office Action dated Jul. 14, 2021, 5 pages.
GB 1703914.0—Search Report dated Jan. 18, 2018, 1 pages.
Gkioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.
PCT/GB2020/051120—International Search Report and Written Opinion dated Jul. 27, 2020, 12 pages.
PCT/US2018/043934—International Preliminary Report on Patentability dated Febraury 20, 2020, 12 pages.
PCT/US2018/043937—International Preliminary Report on Patentability dated Feb. 20, 2020, 14 pages.
PCT/US2018/043937—International Search Report and Written Opinion dated Oct. 31, 2018, 17 pages.
PCT/US2018/043939—International Preliminary Report on Patentability dated Feb. 20, 2020, 14 pages.
PCT/US2018/043939—International Search Report and Written Opinion dated Jan. 2, 2019, 17 pages.
PCT/US2019-043520—International Preliminary Report and Written Opinion dated Feb. 4, 2021, 7 pages.
PCT/US2019-043520—International Search Report and Written Opinion dated May 8, 2020, 10 pages.
PCT/US2019/043519—International Preliminary Report on Patentability dated Feb. 4, 2021, 7 pages.
PCT/US2019/043519—International Search Report and Written Opinion dated Oct. 31, 2019, 10 pages.
PCT/US2019/043522—International Search Report and Written Opinion dated Nov. 15, 2019, 11 pages.
PCT/US2019/043523—International Preliminary Report on Patentability dated Feb. 4, 2021, 15 pages.

* cited by examiner

```
Joint = {
            (x, y) position of joint,
            joint number (one of 19 possibilities, e.g., 1 = left-ankle, 2 = right-ankle),
            confidence number (describing how confident CNN is in its prediction),
            unique integer-ID for the joint
      }
```

Joints data structure 310

FIG. 3A

```
Subject = {    Key     = frame_number
               Value = { Key     = camera_id
                         Value = Assigned joints to subject
                                  [
                                       [x of joint1, y of joint1, z of joint1],
                                       [x of joint2, y of joint2, z of joint2],

                                       ...................
                                       ...................
                                       [x of joint18, y of joint18, z of joint18],
                                  ]
                         }
          }
```

Subject Data Structure 320

FIG. 3B

Multi-camera Environment in An Area of Real Space (e.g., Shopping Store)

Multi-camera Environment in An Area of Real Space (e.g., Shopping Store)

Multi-camera Environment in An Area of Real Space (e.g., Shopping Store)

Multi-camera Environment in An Area of Real Space (e.g., Shopping Store)

Camera Placement in An Area of Real Space (e.g., Shopping Store)

2711

2721

2821

2811

Camera Coverage for Shelves

Camera Coverage for Shelves

Camera Coverage for Area of Real Space (e.g., Shopping Store)

Camera Coverage for Area of Real Space (e.g., Shopping Store)

3211

3213

3215

3221

3223

3225

3231

3233

3235

Main data flow

```
Log of Items =    {   Key    = Identifier (store_Id / shelf_id / subject_id)
                      Value = { Key    = SKU
                                Value  = integer (quantity) + frame number
                              }
                  }
```

Inventory/Log Data Structure 3720

FIG. 37

Process Operations for Generating One or More Masks per Camera

SYSTEMS AND METHODS FOR ASSOCIATING ANONYMOUSLY TRACKED SHOPPERS TO ACCOUNTS IN AN AUTONOMOUS SHOPPING STORE

PRIORITY APPLICATIONS

This application claims the benefit of and priority to U.S. Provisional Patent Application No. 63/435,770, titled "SYSTEM AND METHODS FOR ASSOCIATING ANONYMOUSLY TRACKED SHOPPERS TO ACCOUNTS IN AN AUTONOMOUS SHOPPING STORE", filed 28 Dec. 2022; U.S. Provisional Patent Application No. 63/532,277, titled "AGE VERIFICATION AND ULTRA-WIDEBAND COMMUNICATION IN A CASHIER-LESS SHOPPING ENVIRONMENT", filed 11 Aug. 2023; U.S. Provisional Patent Application No. 63/435,532, titled "AUTOMATIC GENERATION OF CAMERA MASKS FOR CAMERAS IN A CASHIER-LESS SHOPPING ENVIRONMENT", filed 27 Dec. 2022; and U.S. Provisional Patent Application No. 63/544,779, titled "SYSTEM AND METHODS FOR ZONED MONITORING IN AN AUTONOMOUS SHOPPING STORE", filed 18 Oct. 2023, which are incorporated by reference herein in their entirety.

BACKGROUND

Field

The technology disclosed relates to systems and methods that track subjects in an area of real space more specifically, the technology disclosed provides systems and methods to track subjects in across multiple tracking spaces and match subjects to their user accounts.

Description of Related Art

A difficult problem in image processing arises when images of subjects from cameras are used to identify and track subjects in an area of real space such as a shopping store. The system needs to keep track of subjects in the area of real space for the duration of subject's presence. The subjects can leave the area of real space without communicating with the system. In some cases, two or more than two shopping stores (or shopping areas) are located close to each other and the shopper may shop in these stores one by one. For example, the shopper may fill fuel in her vehicle (e.g., a first shopping store) and then walk to a convenience store (e.g., a second shopping store) adjacent to the fuel station to purchase items from the convenience store. As two separate sets of cameras are tracking subjects in the fuel station and the convenience store, it is difficult to match the subjects in one tracking space (e.g., the first shopping store) to subjects in a second tracking space (e.g., the second shopping store) which is adjacent to (but separate from based on some boundary) the first tracking space. As multiple subjects may be present in both areas of real space, it is challenging to correctly track and match every subject across multiple areas of real space (e.g., one area of real space inside a store and another area of real space outside the store, such as an outdoor shopping area or a fuel pump). As new subjects are detected in one area of real space, the system needs to determine whether this is a new subject detected in the area of real space or this is the same subject who was present in another (adjacent) area of real space before entering this area of real space. It is desirable to provide a system that cannot only track subjects in one area of real space but automatically detect and match subjects in multiple areas of real space.

In some cases, subjects can move quickly through a relatively small area of real space and may take items from shelves in inventory display structures placed in the area of real space. For example, subjects can move past inventory display structures in an area of real space within an airport terminal while moving towards a jet bridge to board an aircraft. As the subjects are tracked anonymously, it is desirable to automatically determine a payment method associated with the anonymously tracked subject without using their biometric information.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A shows an example data structure for storing joints information of subjects.

FIG. 3B is an example data structure for storing a subject including the information of associated joints.

FIG. 37 is an example data structure including locations of inventory caches for storing inventory items.

DETAILED DESCRIPTION

The following description is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

System Overview

A system and various implementations of the subject technology are described with reference to FIGS. 1-22. The system and processes are described with reference to FIG. 1, an architectural level schematic of a system in accordance with an implementation. Because FIG. 1 is an architectural diagram, certain details are omitted to improve the clarity of the description.

Figure 1:
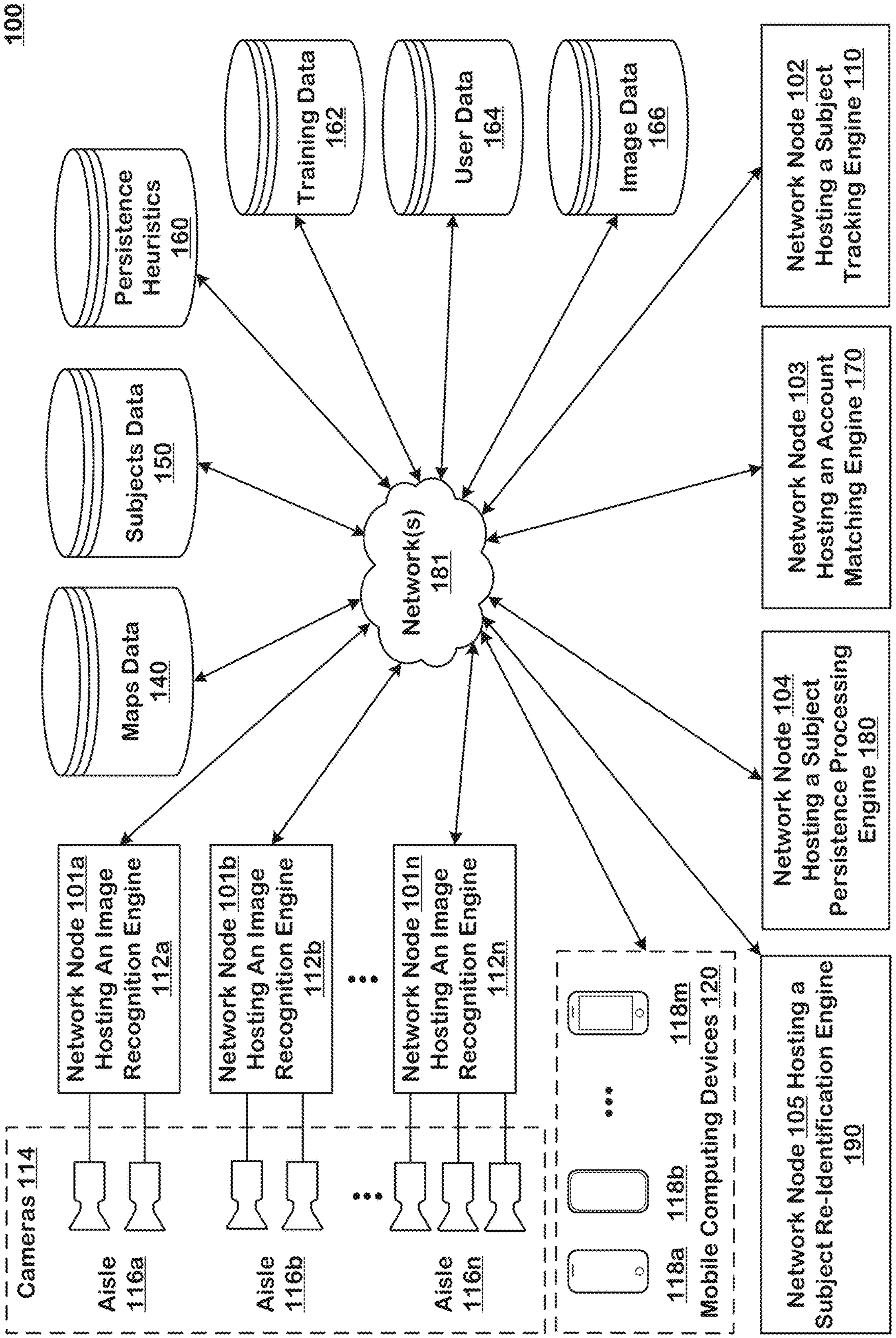
FIG. 1 illustrates an architectural level schematic of a system in which a subject re-identification engine detects and corrects errors in tracking of subjects in an area of real space.

The description of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes 101*a*, 101*b*, and 101*n* hosting image recognition engines 112*a*, 112*b*, and 112*n*, a network node 102 hosting a subject tracking engine 110, a network node 103 hosting an account matching engine 170, a network node 104 hosting a subject persistence processing engine 180 and a network node 105 hosting a subject re-identification engine 190. The network nodes 101*a*, 101*b*, 101*n*, 102, 103, 104 and/or 105 can include or have access to memory supporting tracking of subjects, subject re-identification, subject persistence, and matching (wherein matching is used synonymously with associating; e.g., matching a tracked subject to a user account or reidentifying a subject with a previously identified subject by matching a first subject and a second subject) anonymously tracked subjects to their user accounts. The system 100 includes mobile computing devices 118*a*. 118*b*, 118*m* (collectively referred as mobile computing devices 120). The system 100 further includes, in this example, a maps database 140, a subjects database 150, a persistence heuristics database 160, a training database 162, a user account database 164, an image database 166, and a communication network or networks 181. Each of the maps database 140, the subjects database 150, the persistence heuristics database 160, the training database 162, the user account database 164 and the image database 166 can be stored in the memory that is accessible to the network nodes 101*a*, 101*b*, 101*n*, 102, 103, 104 and/or 105. The network nodes 101*a*, 101*b*, 101*n*. 102, 103, 104 and/or 105 can host only one image recognition engine, or several image recognition engines.

The implementation described here uses cameras 114 in the visible range which can generate for example RGB color output images. In other implementations, different kinds of sensors are used to produce sequences of images. Examples of such sensors include, ultrasound sensors, thermal sensors, and/or Lidar, etc., which are used to produce sequences of images, point clouds, distances to subjects and inventory items and/or inventory display structures, etc. in the real space. The image recognition engines 112*a*, 112*b*, and 112*n* can also function as sensor fusion engines 112*a*. 112*b*, and 112*n* to further provide non-image data such as point clouds or distances, etc. In one implementation, sensors can be used in addition to the cameras 114. Multiple sensors can be synchronized in time with each other, so that frames are captured by the sensors at the same time, or close in time, and at the same frame capture rate (or different rates). All of the implementations described herein can include sensors other than or in addition to the cameras 114.

As used herein, a network node (e.g., network nodes 101*a*, 101*b*, 101*n*, 102, 103, 104 and/or 105) is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system and/or a local system. More than one virtual device configured as a network node can be implemented using a single physical device.

The databases 140, 150, 160, 162, 164 and 166 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 1, the databases 140, 150, 160, 162, 164 and 166 can be considered to be a single database. The system can include other databases such as a shopping cart database storing logs of items or shopping carts of shoppers in the area of real space, an items database storing data related to items (identified by unique SKUs) in a shopping store. The system can also include a calibration database storing various camera models with respective intrinsic and extrinsic calibration parameters for respective shopping stores or areas of real space.

For the sake of clarity, only three network nodes 101*a*. 101*b* and 101*n* hosting image recognition engines 112*a*. 112*b*, and 112*n* are shown in the system 100. However, any number of network nodes hosting image recognition engines can be connected to the subject tracking engine 110 through the network(s) 181. Similarly, the image recognition engines 112*a*, 112*b*, and 112*n*, the subject tracking engine 110, the account matching engine 170, the subject persistence processing engine 180, the subject re-identification engine 190 and/or other processing engines described herein can execute various operations using more than one network node in a distributed architecture.

The interconnection of the elements of system 100 will now be described. Network(s) 181 couples the network nodes 101*a*, 101*b*, and 101*n*, respectively, hosting image recognition engines 112*a*, 112*b*, and 112*n*, the network node 104 hosting the subject persistence processing engine 180, the network node 102 hosting the subject tracking engine 110, the network node 103 hosting the account matching engine 170, the network node 105 hosting the subject re-identification engine 190, the maps database 140, the subjects database 150, the persistence heuristics database 160, the training database 162, the user database 164, the image database 166 and the mobile computing devices 120. Cameras 114 are connected to the subject tracking engine 110, the account matching engine 170, the subject persistence processing engine 180, and the subject re-identification engine 190 through network nodes hosting image recognition engines 112*a*, 112*b*, and 112*n*. In one implementation, the cameras 114 are installed in a shopping store, such that sets of cameras 114 (two or more) with overlapping fields of view are positioned to capture images of an area of real space in the store. Two cameras 114 can be arranged over a first aisle within the store, two cameras 114 can be arranged over a second aisle in the store, and three cameras 114 can be arranged over a third aisle in the store. Cameras 114 can be installed over open spaces, aisles, and near exits and entrances to the shopping store. In such an implementation, the cameras 114 can be configured with the goal that customers moving in the shopping store are present in the field of view of two or more cameras 114 at any moment in time. Examples of entrances and exits to the shopping store or the area of real space also include doors to restrooms, elevators or other designated unmonitored areas in the shopping store where subjects are not tracked.

Cameras 114 can be synchronized in time with each other, so that images are captured at the image capture cycles at the same time, or close in time, and at the same image capture rate (or a different capture rate). The cameras 114 can send respective continuous streams of images at a predetermined rate to network nodes 101*a*. 101*b*, and 101*n* hosting image recognition engines 112*a*, 112*b* and 112*n*. Images captured in all the cameras 114 covering an area of real space at the same time, or close in time, are synchronized in the sense that the synchronized images can be identified in processing engines 112*a*. 112*b*, 112*n*, 110, 170, 180 and/or 190 as representing different views of subjects having fixed positions in the real space. For example, in one implementation, the cameras 114 send image frames at the rates of 30 frames per second (fps) to respective network nodes 101*a*, 101*b* and 101*n* hosting image recognition engines 112*a*, 112*b* and 112*n*. Each frame has a timestamp, identity of the camera (abbreviated as "camera_id"), and a frame identity (abbreviated as "frame_id") along with the image data. As described above other implementations of the technology disclosed can use different types of sensors such as image sensors, ultrasound sensors, thermal sensors, and/or Lidar, etc. Images can be captured by sensors at frame rates greater than 30 frames per second, such as 40 frames per second, 60 frames per second or even at higher image capturing rates.

In one implementation, the images are captured at a higher frame rate when an inventory event such as a put or a take of an item is detected in the field of view of a camera 114. Images can also be captured at higher image capturing rates when other types of events are detected in the area of real space such as when entry or exit of a subject from the area of real space is detected or when two subjects are positioned close to each other, etc. In such an implementation, when no inventory event is detected in the field of view of a camera 114, the images are captured at a lower frame rate.

In one implementation, the system 100 includes logic to increase or decrease the image capture frame rates of different cameras 114 as required. For example, cameras 114 can capture images at a higher frame rate in regions of the area of real space where more subjects are positioned or in congested parts of the area of real space. A higher image capture frame rate of approximately 30 frames per second to 60 frames per second or more can be used by cameras 114 in regions of high subject traffic and activity. In another implementation, the system 100 includes logic to set selected cameras 114 in the area of real space to sleep mode when there are no subjects in their respective fields of view for a pre-determined period of time. For example, if there are no subjects in the field of view of a camera 114 for at least five minutes, the camera will be set to sleep mode. The camera 114 wakes up when a signal is provided indicating that a subject is moving towards the location in the area of real space within the field of view of the camera. In yet another implementation, the cameras at the entrances/exits of the area of real space can be set in sleep mode when no subject is detected in their respective field of views for a predetermined period of time.

Additionally, the image capture rate of a camera can be reduced (e.g., to 10 frames per second) when no subject is detected in the field of view of the camera. The image capture rate can be increased (e.g., to 30 frames per second) when a subject is detected in the field of view of the camera. If multiple subjects are detected in the field of view of the camera (e.g., five or more subjects), the image capture rate can be further increased (e.g., to 60 frames per second). It is to be understood that examples of image capture rates presented above are for illustrative purposes and other frame capture rates less than 10 frames per second or greater than 60 frames per second can be used without impacting the operations of the system 100.

Cameras 114 are connected to respective image recognition engines 112*a*, 112*b* and 112*n*. For example, in FIG. 1, the two cameras installed over the aisle 116*a* are connected to the network node 101*a* hosting an image recognition engine 112*a*. Likewise, the two cameras installed over aisle 116*b* are connected to the network node 101*b* hosting an image recognition engine 112*b*. Each image recognition engine 112*a*-112*n* hosted in a network node or nodes 101*a*-101*n*, separately processes the image frames received from one camera each in the illustrated example. In an implementation of a subject tracking system described herein, the cameras 114 can be installed overhead and/or at other locations, so that in combination the fields of view of the cameras encompass an area of real space in which the tracking is to be performed, such as in a shopping store.

In one implementation, each image recognition engine 112*a*, 112*b* and 112*n* is implemented as a deep learning algorithm such as a convolutional neural network (abbreviated CNN). In such an implementation, the CNN is trained using the training database 162. In an implementation described herein, image recognition of subjects in the area of real space is based on identifying and grouping features of the subjects such as joints, recognizable in the images, where the groups of joints (e.g., a constellation) can be attributed to an individual subject. For this joints-based analysis, the training database 162 has a large collection of images for each of the different types of joints for subjects. In the example implementation of a shopping store, the subjects are the customers moving in the aisles between the shelves. In an example implementation, during training of the CNN, the system 100 is referred to as a "training system." After training the CNN using the training database, the CNN is switched to production mode to process images of customers in the shopping store in real time.

In an example implementation, during production, the system 100 is referred to as a runtime system (also referred to as an inference system). The CNN in each image recognition engine produces arrays of joints data structures for images in its respective stream of images. In an implementation as described herein, an array of joints data structures is produced for each processed image, so that each image recognition engine 112*a*. 112*b*, and 112*n* produces an output stream of arrays of joints data structures. These arrays of joints data structures from cameras having overlapping fields of view are further processed to form groups of joints, and to identify such groups of joints as subjects. The subjects can be tracked by the system using a tracking identifier referred to as "tracking_id" or "track_ID" during their presence in the area of real space. The tracked subjects can be saved in the subjects database 150. As the subjects move around in the area of real space, the subject tracking engine 110 keeps track of movement of each subject by assigning track_IDs to subjects in each time interval (or identification interval). The subject tracking engine 110 identifies subjects in a current time interval and matches (or associates) a subject from the previous time interval with a subject identified in the current time interval. In various implementations, a match may be an exact match, a similar match (e.g., using a predetermined threshold value or range of values for a similarity metric), or a best match out of a plurality of potential matches. The track_ID of the subject from the previous time interval is then assigned to the subject identified in the current time interval. Sometimes, the track_IDs are incorrectly assigned to one or more subjects in the current time interval due to incorrect matching of subjects across time intervals. The subject re-identification engine 190 includes logic to detect the errors in assignment of track_IDs to subjects. The subject re-identification engine 190 can then re-identify subjects that correctly match across the time intervals and assign correct track_IDs to subjects. Further details of the subject tracking engine 110, the subject persistence processing engine 180 and subject re-identification engine 190 are presented below.

The technology disclosed can also track subjects in two or more separate tracking spaces that are within a previously designated region (e.g., two or more tracking spaces with a fueling station and convenience store combination; an airport; a train station; a transportation hub; a sports arena; a shopping mall; etc.) but have separate sets of sensors and cameras (e.g., separate sets of sensors within the same previously designated region). The cameras or sensors in one tracking space may not have overlapping fields of view with cameras or sensors in the other tracking space. The technology disclosed can use re-identification feature vectors (as described in U.S. patent application Ser. No. 17/988,650, entitled, "Machine Learning-Based Re-Identification of Shoppers in a Cashier-less Store for Autonomous Checkout," filed on 16 Nov. 2022, which is fully incorporated into this application by reference) and other parameters to match the subject in one tracking space to subjects who have recently exited the other tracking space. Examples of such other parameters include (i) speed and/or orientation of a subject (as well as the speed/orientation of a cluster of subjects moving as a group through the tracked space) including the vectors (speed and orientation) at the boundary between camera views in separately tracked spaces, (ii) physical attributes such as neck heights (or neck joint height) or length of femur, gate and/or other unique physical movement, (iii) additional electromagnetic signals emanating from the subject's mobile computing device (or any other device attached to, held by or associated with the subject) and (iv) the reported distances between the subject's mobile computing device, etc., and sensors with known positions in either of the tracked spaces, etc. The technology disclosed can thus provide a continuity of tracking subjects across multiple predefined regions that include multiple and/or separate tracking spaces. This enables the technology disclosed to determine useful behavioral analytics that can help in improvement of product offerings by a shopping store. As the tracking of subjects extends beyond a single shopping store to multiple shopping stores, the technology disclosed enables improvement in design of shopping complexes or shopping areas with multiple shopping stores. Furthermore, this enables a single financial transaction to take place for purchases (e.g., takes) from multiple shopping stores within the previously designated region. As noted above, the technology disclosed is applicable to a variety of environments in which multiple subject tracking spaces are located in the previously designated region, such as a shopping complex or a shopping mall or in a fuel station where a convenience store located besides the fuel station, etc.

In one implementation, the technology disclosed can track groups of subjects in two or more separate tracking spaces that are within a previously designated region. For example, if two subjects are detected as they enter a second tracking space, the technology disclosed can match the group of two subjects with a group of two subjects who have recently exited a first tracking space in a pre-determined time interval such as within the last three minutes, five minutes, ten minutes, etc. In some cases, it is easier to match the groups across two subspaces as both groups have subjects with specific heights or other physical features such as a group in which a child is accompanying an adult. In such cases it is more likely that the same group has entered the second tracking subspace which recently exited the first tracking subspace within a previously designated region. The advantage of tracking groups of subjects is that a single shopping cart can be generated for the group even if multiple subjects in the group separately take items from shelves. They may combine their items in one basket or shopping cart during their shopping trip and in some cases they may put their items in the same basket before leaving the shopping store. In some cases, the subjects in the group may never put their items in the same basket during their shopping trip. In such cases, the technology disclosed can send a notification to mobile devices of subjects to confirm whether they are shopping in a group or as an individual. Based on the response from the subjects, the technology disclosed may either combine their respective items in one shopping cart or keep them in separate shopping carts. The technology disclosed can collect additional signals to determine whether to include items taken by subjects in a group to a single shopping cart. For example, the technology disclosed can collect audio signals via sensors placed in the area of real space to determine which subjects are communicating with each other. The technology disclosed may not store the audio conversations of subjects to protect their privacy but only use the audio signals to detect the subjects that are communicating with each other to determine whether they are part of a group. The technology disclosed can use speed or velocity of subjects that enter the store together or during a pre-determined period of time to determine whether they are shopping together in a group. The speed or velocity of subjects entering the second tracking space can be matched to speed or velocity of subjects existing the first tracking space to determine if the subjects belong to a same group. The technology disclosed can also request explicit confirmation from subjects to indicate whether they belong to the same group. For example, the subjects, upon receiving a notification from the technology disclosed on their cell phones, may wave their hands at the same time or touch an interactive display placed near the entrance or stand together in a designated place, etc. to indicate that they belong to the same group. The technology disclosed can identify groups or individuals based off of certain information emanating from electronic devices (e.g., electromagnetic waves, etc.) or from information collected from wearable devices (e.g., heartbeat information, etc.).

Subject Tracking Engine

The subject tracking engine 110, hosted on the network node 102 receives, in this example, continuous streams of arrays of joints data structures for the subjects from image recognition engines 112*a*, 112*b* and 112*n* and can retrieve and store information from and to a subjects database 150 (also referred to as a subject tracking database). The subject tracking engine 110 processes the arrays of joints data structures identified from the sequences of images received from the cameras at image capture cycles. It then translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is used to locate subjects in the area of real space during identification intervals. One image in each of the plurality of sequences of images, produced by the cameras, is captured in each image capture cycle.

The subject tracking engine 110 uses logic to determine groups or sets of candidate joints having coordinates in real space as subjects in the real space. For the purposes of analogy, each set of candidate points is like a constellation of candidate joints at each point in time. In one implementation, these constellations of joints are generated per identification interval as representing a located subject. Subjects are located during an identification interval using the constellation of joints. The constellations of candidate joints can move over time. A time sequence analysis of the output of the subject tracking engine 110 over a period of time, such as over multiple temporally ordered identification intervals (or time intervals), identifies movements of subjects in the area of real space. The system can store the subject data including unique identifiers, joints and their locations in the real space in the subject database 150.

In an example implementation, the logic to identify sets of candidate joints (i.e., constellations) as representing a located subject comprises heuristic functions is based on physical relationships amongst joints of subjects in real space. These heuristic functions are used to locate sets of candidate joints as subjects. The sets of candidate joints comprise individual candidate joints that have relationships according to the heuristic parameters with other individual candidate joints and subsets of candidate joints in a given set that has been located, or can be located, as an individual subject.

Located subjects in one identification interval can be matched with located subjects in other identification intervals based on location and timing data that can be retrieved from and stored in the subjects database 150. Located subjects matched this way are referred to herein as tracked subjects, and their location can be tracked in the system as they move about the area of real space across identification intervals. In the system, a list of tracked subjects from each identification interval over some time window can be maintained, including for example by assigning a unique tracking identifier to members of a list of located subjects for each identification interval, or otherwise. Located subjects in a current identification interval are processed to determine whether they correspond to tracked subjects from one or more previous identification intervals. If they are matched, then the location of the tracked subject is updated to the location of the current identification interval. Located subjects not matched with tracked subjects from previous intervals are further processed to determine whether they represent newly arrived subjects, or subjects that had been tracked before, but have been missing from an earlier identification interval.

Tracking all subjects in the area of real space is important for operations in a cashier-less store. For example, if one or more subjects in the area of real space are missed and not tracked by the subject tracking engine 110, it can lead to incorrect logging of items taken by the subject, causing errors in generation of an item log (e.g., shopping list or shopping cart data) for this subject. The technology disclosed can implement a subject persistence engine 180 to find any missing subjects in the area of real space.

Another issue in tracking of subjects is incorrect assignment of track_IDs to subjects caused by swapping of tracking identifiers (track_IDs) amongst tracked subjects. This can happen more often in crowded spaces and places with high frequency of entries and exits of subjects in the area of real space. The subject-reidentification engine 190 includes logic to detect errors when tracking identifiers are swapped and/or incorrectly assigned to one or more subjects. The subject re-identification engine can correct the tracking errors by matching the subjects across time intervals across multiple cameras 114. The subject re-identification engine 190 performs the matching of subjects using feature vectors (or re-identification feature vectors) generated by one or more trained machine learning models. Therefore, the subject re-identification engine 190 processes image frames captured by cameras which is separate from the processing of image frames by the subject tracking engine 110 to match subjects across time intervals. The technology disclosed provides a robust mechanism to correct any tracking errors and incorrect assignment of tracking identifiers to tracked subjects in the area of real space. Details of both subject persistence and subject re-identification technologies are presented below. Note that any one of these technologies can be deployed independently in a cashier-less shopping store. Both subject persistence and subject re-identification technologies can be used simultaneously as well to address the issues related to missing subjects and swapped tracking identifiers.

Subject Persistence Processing Engine

For the purposes of tracking subjects, the subject persistence processing engine 180 compares the newly located (or newly identified) subjects in the current identification interval with one or more preceding identification intervals. The system includes logic to determine if the newly located subject is a missing tracked subject previously tracked in an earlier identification interval and stored in the subjects database but who was not matched with a located subject in an immediately preceding identification interval. If the newly located subject in the current identification interval is matched to the missing tracked subject located in the earlier identification interval, the system updates the missing tracked subject in the subject database 150 using the candidate located subject located from the current identification interval.

In one implementation, in which the subject is represented as a constellation of joints as discussed above, the positions of the joints of the missing tracked subject are updated in the database with the positions of the corresponding joints of the candidate located subject located from the current identification interval. In this implementation, the system stores information for tracked subject in the subjects database 150. This can include information such as the identification intervals in which the tracked subject is located. Additionally, the system can also store, for a tracked subject, the identification intervals in which the tracked subject is not located. In another implementation, the system can store missing tracked subjects in a missing subjects database, or tag tracked subjects as missing, along with additional information such as the identification interval in which the tracked subject went missing and last known location of the missing tracked subject in the area of real space. In some implementations, the subject status as tracked and located, can be stored per identification interval.

The subject persistence processing engine 180 can process a variety of subject persistence scenarios. For example, a situation in which more than one candidate located subjects are located in the current identification interval but not matched with tracked subjects, or a situation when a located subject moves to a designated unmonitored location in the area of real space but reappears after some time and is located near the designated unmonitored location in the current identification interval. The designated unmonitored location in the area of real space can be a restroom, for example. The technology can use persistence heuristics to perform the above analysis. In one implementation, the subject persistence heuristics are stored in the persistence heuristics database 160.

Subject Re-Identification Engine

The subject re-identification engine 190 can detect a variety of errors related to incorrect assignments of track_IDs to subjects. The subject tracking engine 110 tracks subjects represented as constellation of joints. Errors can occur when tracked subjects are closely positioned in the area of real space. One subject may fully or partially occlude one or more other subjects. The subject tracking engine 110 can assign incorrect track_IDs to subjects over a period of time. For example, track_ID "X" assigned to a first subject in a first time interval can be assigned to a second subject in a second time interval. A time interval can be a period of time such as from a few milliseconds to a few seconds. There can be other time intervals between the first time interval and the second time interval. Any image frame captured during any time interval can be used for analysis and processing. A time interval can also represent one image frame at a particular time stamp. If the errors related to incorrect assignment of track_IDs are not detected and fixed, the subject tracking can result in generation of incorrect item logs associated with subjects, resulting in incorrect billing of items taken by subjects. The subject re-identification engine detects errors in assignment of track_IDs to subjects over multiple time intervals in a time duration during which the subject is present in the area of real space, e.g., a shopping store, a sports arena, an airport terminal, a gas station, etc.

The subject re-identification engine 190 can receive image frames from cameras 114 with overlapping fields of view. The subject re-identification engine 190 can include logic to pre-process the image frames received from the cameras 114. The pre-processing can include placing bounding boxes around at least a portion of the subject identified in the image. The bounding box logic attempts to include the entire pose of the subject within the boundary of the bounding box e.g., from the head to the feet of the subject and including left and right hands. However, in some cases, a complete pose of a subject may not be available in an image frame due to occlusion, location of the camera (e.g., the field of view of the camera) etc. In such instance, a bounding box can be placed around a partial pose of the subject. In some cases, a previous images frame or a next image frame in a sequence of image frames from a camera can be selected for cropping out images of subjects in bounding boxes. Examples of poses of subjects that can be captured in bounding boxes include a front pose, a side pose, a back pose, etc.

The cropped out images of subjects can be provided to a trained machine learning model to generate re-identification feature vectors. The re-identification feature vector encodes visual features of the subject's appearance. The technology disclosed can use a variety of machine learning models. ResNet (He et al. CVPR 2016 available at <<arxiv.org/abs/1512.03385>>) and VGG (Simonyan et al. 2015 available at <<arxiv.org/abs/1409.1556>>) are examples of convolutional neural networks (CNNs) that can be used to identify and classify objects. In one implementation, ResNet-50 architecture of ResNet Model (available at <<github.com/layumi/Person_reID_baseline_pytorch>>) is used to encode visual features of subjects. The model can be trained using open source training data or custom training data. In one implementation, the training data is generated using scenes (or videos) recorded in a shopping store. The scenes comprise different scenarios with a variety of complexity. For example, different scenes are generated using one person, three persons, five persons, ten persons, and twenty five persons, etc. Image frames are extracted from the scenes and labeled with tracking errors to generate ground truth data for training of the machine learning model. The training data set can include videos or sequences of image frames (or other types of information described herein) captured by cameras (or other sensors described herein) in the area of real space. The labels of the training examples can be subject tracking identifiers per image frame (or other segment of data) for the subjects detected in respective image frames. In one implementation, the training examples can include tracking errors (e.g., swap error, single swap error, split error, enter-exit swap error, etc.) detected per image frame. In this case, the labels of the training examples can include errors detected in respective image frames. The training dataset can be used to train the subject re-identification engine.

The subject re-identification engine 190 includes logic to match re-identification feature vectors for a subject in a second time interval with re-identification feature vectors of subjects in a first time interval to determine if the tracking identifier is correctly assigned to the subject in the second time interval. The matching includes calculating a similarity score between respective re-identification feature vectors. Different similarity measures can be applied to calculate the similarity score. For example, in one case the subject re-identification engine 190 calculates a cosine similarity score between two re-identification feature vectors. Higher values of cosine similarity scores indicate a higher probability that the two re-identification feature vectors represent a same subject in two different time intervals. The similarity score can be compared with a pre-defined threshold for matching the subject in the second time interval with the subject in the first time interval. In one implementation, the similarity score values range from negative 1.0 to positive 1.0 [−1.0, 1.0]. The threshold values can be set at 0.5 or higher than 0.5. Different values of the threshold can be used in production or inference. The threshold values can dynamically change in dependence upon time of day, locations of camera, density (e.g., number) of subjects within the store, etc. In one implementation, the threshold values range from 0.35 to 0.5. A specific value of the threshold can be selected for a specific production use case based on tradeoffs between model performance parameters such as precision and recall for detecting errors in subject tracking. Precision and recall values can be used to determine performance of a machine learning model. Precision parameters (values) indicate proportions of errors that are correctly detected as errors. A precision value of 0.8 indicates that when a model or a classifier detects an error, it correctly detects the error 80 percent of the time. Recall on the other hand indicates the proportion of all errors that are correctly detected by the model. For example, a recall value of 0.1 indicates that the model detects 10 percent of all errors in the training data. As threshold values are increased, the subject re-identification engine 190 can detect more tracking errors but such errors can include false positive detections. When threshold values are reduced fewer tracking errors are detected by the subject re-identification engine 190. Therefore, higher values of threshold result in better recall results and lower threshold values result in better precision results. Threshold values are selected to strike a balance between the two performance parameters. Other ranges of threshold values that can be used include, 0.25 to 0.6 or 0.15 to 0.7.

In the example of a shopping store the customers (also referred to as subjects above) move in the aisles and in open spaces. The customers take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf.

In one implementation, the image analysis is anonymous, i.e., a unique tracking identifier assigned to a subject created through joints analysis does not identify personal identification details (such as names, email addresses, mailing addresses, credit card numbers, bank account numbers, driver's license number, etc.) of any specific subject in the real space. The data stored in the subjects database 150 does not include any personal identification information. The operations of the subject persistence processing engine 180 and the subject tracking engine 110 do not use any personal identification including biometric information associated with the subjects.

In one implementation, the tracked subjects are identified by linking them to respective "user accounts" containing for example preferred payment method provided by the subject. When linked to a user account, a tracked subject is characterized herein as an identified subject. Track subjects are linked with items picked up on the store, and linked with a user account, for example, and upon exiting the store, an invoice can be generated and delivered to the identified subject, or a financial transaction executed online to charge the identified subject using the payment method associated to their accounts. The identified subjects can be uniquely identified, for example, by unique account identifiers or subject identifiers, etc. In the example of a cashier-less store, as the customer completes shopping by taking items from the shelves, the system processes payment of items bought by the customer.

In some implementations, the shopping store inventory comprises items with age restrictions, such as items that a subject must legally be over eighteen years old to purchase (e.g., certain over-the-counter medications or lottery tickets) or over twenty-one years old to purchase (e.g., alcohol or tobacco products). In one implementation, these age-restricted products are located within a display or store area that is not accessible to the subject without assistance from an employee or customer service representative (CSR) to perform age verification through a documentation review, such as checking the driver's license of the subject. In another implementation, an age-restricted product may be accessible for the subject to pick up, but an interaction of the subject with the age-restricted product triggers a flag in the system 100, communicated to both the subject via the client application on the shopper mobile device and a CSR, or other trusted source or authority figure, via the client application on a store device. The flag indicates that the subject is attempting to take an age-restricted item and must request assistance from a CSR for age verification through documentation review to proceed. In the event that the documentation review is not performed, checkout will not be allowed and further consequences may follow.

In yet another implementation, the subject account may be associated with a token or attribute indicating that the subject has previously performed an age verification process, authorizing the subject to check out an age-restricted item without a manual review by a CSR. Following successful completion of age verification, the subject may be prompted to provide an authentication factor, such as an inherence factor (e.g., facial recognition or fingerprint scan), in order to self-authenticate prior to authorization for an age-restricted purchase. Age verification may be required a single time or multiple times. If age verification is repeated multiple times for security and integrity, it may be routinely repeated at regular intervals, intermittently repeated for random shopper interactions, or repeated in response to a suspicious interaction event. In certain implementations, a subject may be suspended from using autonomous age verification services if a pre-defined quantity threshold of failed or fraudulent age verification events have occurred. Many implementations comprise a combination of components within the above-described implemented security features to re-verify and monitor autonomous age verification purposes.

In some implementations, the system 100 further includes a zone monitoring logic configured to segment one or more regions within the shopping store into respective zones for zone monitoring or to perform the zone monitoring. Zone monitoring, in contrast to tracking the entire area of space, enables a more cost- and bandwidth-efficient option for tracking as well as the ability for more relevant, fine-grained data collection and analytics. Tracking zones that can be monitored, for example, may be hot food or "grab and go" areas, cash drawers, tobacco cases behind the register, and beer coolers. Retailers such as fuel stations may experience a high volume of sales related to certain items during certain times of the day, such as hot food items during early morning hours. Zone monitoring can be implemented to track inventory of items before, during, and after high volume sales periods. Another problem that can arise is the difficulty of monitoring the actions of both shoppers and employees to identify theft during high volume rush periods, leading to shrinkage. By tracking a specific zone, store operators receive more detailed and accurate information about inventory movement rates, patterns, stock levels, and potential theft interactions.

Some implementations apply a camera mask generator to the tracking zones. Certain tracking zones may be masked at low volume traffic times or unmasked at high volume tracking times in order to allocate data collection and data processing resources efficiently.

The system includes the account matching engine 170 (hosted on the network node 103) to process signals received from mobile computing devices 120 (carried by the subjects) to match the identified subjects with user accounts. The account matching can be performed by identifying locations of mobile devices executing client applications in the area of real space (e.g., the shopping store) and matching locations of mobile devices with locations of subjects, without use of personal identifying biometric information from the images. The location matching of mobile devices and subjects can use ultra-wideband communication in certain implementations.

In some implementations, the subject tracking engine 110 performs subject tracking in more than one tracking zone. For example, a shopper may fill fuel in her vehicle (e.g., a first shopping store) and then walk to a convenience store (e.g., a second shopping store) adjacent to the fuel station to purchase items from the convenience store. As two separate sets of cameras (e.g., tracking zones leveraging zone monitoring) are tracking subjects in the fuel station and the convenience store, it is difficult to match the subjects in one tracking zone (e.g., the first shopping store) to subjects in a second tracking zone (e.g., the second shopping store) which is adjacent to, but separate from, the first tracking zone based on zone tracking configuration. As multiple subjects may be presented in both areas of real space, it is challenging to correctly track and match every subject across multiple areas of real space (e.g., one area of real space inside a store and another area of real space outside the store, such as an outdoor shopping area or a fuel pump). As new subjects are detected in one tracking zone, the system may need to determine whether this is a new subject detected in the tracking zone or if this is the same subject who was present in another adjacent tracking zone before entering this tracking zone.

The subject tracking engine 110 can be used to track actions that are not defined by the picking up or putting down of a product, such as the visual inspection of a product for a pre-defined threshold period of time or touching a product without picking it up (e.g., spinning the product around to examine a nutrition label on the back of the package), or a product-independent action like the opening of a cash drawer or other equipment and objects within the tracking zone.

The actual communication path to the network node 102 hosting the subject tracking engine 110, the network node 103 hosting the account matching engine 170, the network node 104 hosting the subject persistence processing engine 180 and the network node 105 hosting the subject re-identification engine 190, through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™. Apache Spark™. Apache Kafka™, Apache Flink™, Truviso™, Amazon Elasticsearch Service™. Amazon Web Services™ (AWS), IBM Info-Sphere™, Borealis™, and Yahoo! S4™.

Camera Arrangement

The cameras 114 are arranged to track subjects (or entities) in a three dimensional (abbreviated as 3D) real space. In the example implementation of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2A:
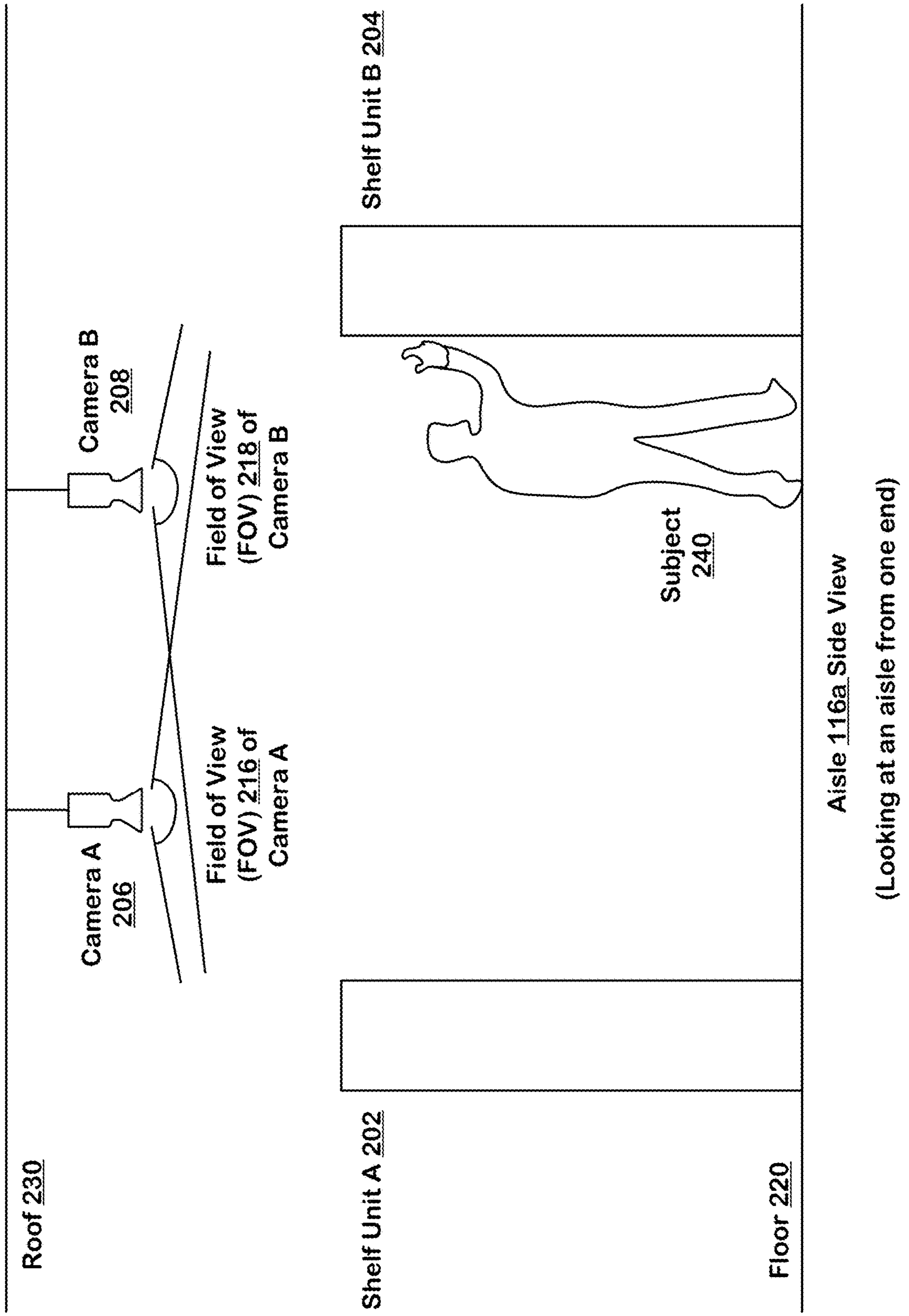
FIG. 2A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 2A shows an arrangement of shelf unit A 202 and shelf unit B 204, forming an aisle 116*a*, viewed from one end of the aisle 116*a*. Two cameras, camera A 206 and camera B 208 are positioned over the aisle 116*a* at a predetermined distance from a roof 230 and a floor 220 of the shopping store above the inventory display structures, such as shelf units A 202 and shelf unit B 204. The cameras 114 comprise cameras disposed over and having fields of view encompassing respective parts of the inventory display structures and floor area in the real space. For example, the field of view 216 of camera A 206 and field of view 218 of camera B 208 overlap as shown in FIG. 2A. The locations of subjects are represented by their positions in three dimensions of the area of real space. In one implementation, the subjects are represented as a constellation of joints in real space. In this implementation, the positions of the joints in the constellation of joints are used to determine the location of a subject in the area of real space. The cameras 114 can be any of Pan-Tilt-Zoom cameras, 360-degree cameras, and/or combinations thereof that can be installed in the real space.

In the example implementation of the shopping store, the real space can include the entire floor 220 in the shopping store. Cameras 114 are placed and oriented such that areas of the floor 220 and shelves can be seen by at least two cameras. The cameras 114 also cover floor space in front of the shelves 202 and 204. Camera angles are selected to have both steep perspective, straight down, and angled perspectives that give more full body images of the customers. In one example implementation, the cameras 114 are configured at an eight (8) foot height or higher throughout the shopping store. In one implementation, the area of real space includes one or more designated unmonitored locations such as restrooms.

Entrances and exits for the area of real space, which act as sources and sinks of subjects in the subject tracking engine, are stored in the maps database. Also, designated unmonitored locations are not in the field of view of cameras 114, which can represent areas in which tracked subjects may enter, but must return into the area being tracked after some time, such as a restroom. The locations of the designated unmonitored locations are stored in the maps database 140. The locations can include the positions in the real space defining a boundary of the designated unmonitored location and can also include location of one or more entrances or exits to the designated unmonitored location. Examples of entrances and exits to the shopping store or the area of real space also include doors to restrooms, elevators or other designated unmonitored areas in the shopping store where subjects are not tracked.

In another implementation, the system 100 further includes logic to employ an improved camera coverage plan that further includes a number, a placement, and a pose of cameras 114 that are arranged to track puts and takes of items by subjects in a three-dimensional real space. The logic can receive an initial camera coverage plan including a three-dimensional map of a three-dimensional real space. The logic can also receive an initial number and initial pose of a plurality of cameras 114 and a camera model including characteristics of the cameras 114. The camera characteristics can be defined in extrinsic and intrinsic calibration parameters. The system can begin with the initial camera coverage plan received and iteratively apply a machine learning process to an objective function of quantity and poses of cameras subject to a set of constraints. The machine learning process can include a mixed integer programming algorithm. The machine learning process can also include a gradient descent algorithm. Other types of machine learning processes may also be used by the system 100.

The logic configured to improve the camera coverage plan can be applied to the placement or positioning of mobile robots or mobile sensing devices equipped with sensors with the task of covering a three-dimensional area of real space given certain constraints. Additionally, the improvement process for the camera coverage plan may include computation of the position and orientation of robots or sensors. With a different sensor modality, the system 100 can be used with cameras 114 with Pan-Tilt-Zoom capabilities. By adding different zoom, pan, and tilt values to the search space, the improvement of the camera coverage plan can include a search for optimal positions, orientations, and zoom values for each camera 114 given certain constraints. In certain implementations, the system 100 can be configured to handle dynamic environments where sensor re-configuration is required as the sensors would be able to re-configure themselves to cope with new environmental physical constraints.

The system 100 obtains from the initial camera coverage plan as received an improved camera coverage plan using one or more of: (i) a changed quantity of cameras 114 and (ii) one or more changed camera poses. The improved camera coverage plan can have an improved camera coverage score and can concurrently use a same or reduced number of cameras 114 than the initial camera coverage plan (or the camera coverage plan in a previous iteration). An installer can use the improved camera coverage plan to arrange the cameras 114 to track puts and takes of items by subjects in the three-dimensional real space. The improved coverage plans meeting or exceeding constraints can be used for tracking movement of subjects, put events, take events, and touch events of subjects in the area of real space.

Some implementations of the system 100 further include a camera mask generator (not illustrated within FIG. 1). The camera mask generator can include logic to generate masks to black out one or more portions of images captured by a camera (or a sensor) such that pixels in images corresponding to any sensitive structure or location in the area of real space are not available to the image processing pipeline including the various image processing engines such as the subject tracking engine 110, the account matching engine 170, the subject persistence processing engine 180, and the subject re-identification engine 190 through network nodes hosting image recognition engines 112*a*, 112*b*, and 112*n*. The camera mask generator can be implemented as a tool providing a user interface with appropriate selection options to generate masks for cameras installed in the area of real space.

The camera masking generator can mask out portions of images by automatically or manually detecting structures or locations in the area of real space that can potentially contain personal information or other sensitive data related to subjects. For example, the portion of an image in which an ATM is displayed can be masked out because pixels in this portion of the image can contain subjects' personal identification number (PIN) or other data related to financial transactions such as bank account numbers, debit card numbers, credit card numbers, and so on. Portions of images captured by the camera can be masked for performance improvement as well. For example, portions of the image not required for subject tracking and/or detection of inventory events (i.e., puts and takes) may be "masked out". This can reduce the size of image data to be sent out to a server, such as a cloud-based server, for image processing and storage. The masked-out image data may be stored for a pre-defined number of days or months for compliance, auditing, and/or other review requirements. Alternatively, the system and cameras can be configured to simply not record data that is in a masked-out region (i.e., the camera will not record or store information that is in a region in a viewable area of space that is automatically or manually identified as a masked-out region). The locations of the area of real space that are masked out from images of a camera can be dynamically selected for a particular time of the day, day of the week, or based on a logic implemented in the camera mask generator.

In one implementation, at least one or more of a map of the area of real space, a planogram, and a floor plan of the area including positions in three-dimensions and functions or purpose of various regions of the area of real space (or of various structures in the area of real space) can be provided as input to the camera mask generator. The camera mask generator can implement a trained machine learning model to detect various regions of the area of real space and label sensitive regions for masking. A trained machine learning model can also classify different regions in the area of real space as high, medium, or low sensitive areas. Different masking strategies can be applied for regions with different levels of sensitivity. For example, pixels corresponding to highly sensitive areas (such as ATMs) can be permanently masked so that image data cannot be retrieved again. For regions or locations with medium or low sensitivity levels, the image pixels can be masked out for downstream processing for subject tracking and event detection (such as the detection of puts and takes) but the original image data without the masking may be ephemerally stored for a pre-determined period of time.

Three Dimensional Scene Generation

Figure 2B:
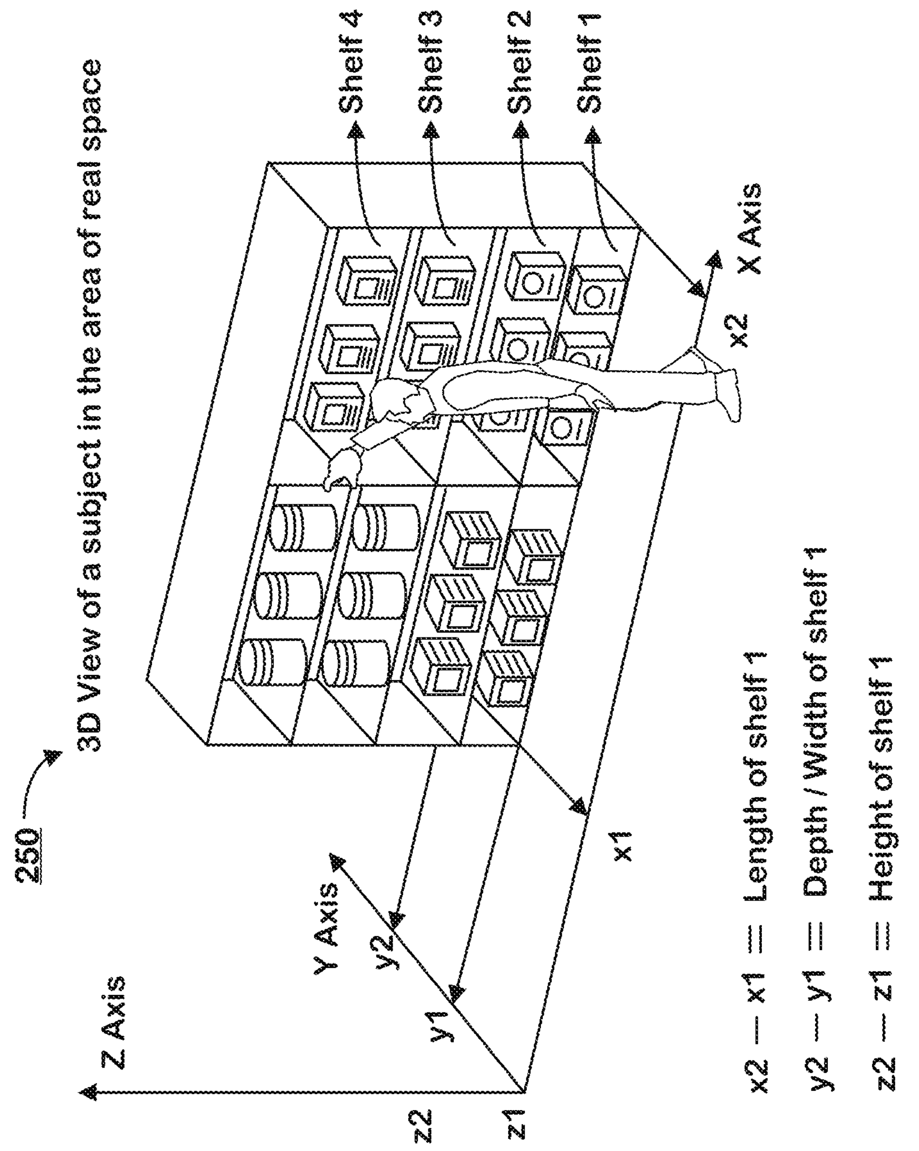
FIG. 2B is a perspective view, illustrating a subject taking an item from a shelf in the inventory display structure in the area of real space.

In FIG. 2A, a subject 240 is standing by an inventory display structure shelf unit B 204, with one hand positioned close to a shelf (not visible) in the shelf unit B 204. FIG. 2B is a perspective view of the shelf unit B 204 with four shelves, shelf 1, shelf 2, shelf 3, and shelf 4 positioned at different levels from the floor. The inventory items are stocked on the shelves.

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints in the area of real space. This section presents a description of the process to generate 3D coordinates of joints. The process is also referred to as 3D scene generation.

Before using the system 100 in training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11. November 2000.

In external calibration, the external camera parameters are calibrated in order to generate mapping parameters for translating the 2D image data into 3D coordinates in real space. In one implementation, one subject (also referred to as a multi-joint subject), such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112*a*, 112*b*, and 112*n* for the purposes of the external calibration. The image recognition engines identify the position of a joint as (x, y) coordinates, such as row and column numbers, of pixels in the 2D image space of respective cameras 114. In one implementation, a joint is one of 19 different types of joints of the subject. As the subject moves through the fields of view of different cameras, the subject tracking engine 110 receives (x, y) coordinates of each of the 19 different types of joints of the subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one implementation, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a subject is used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures, which are data structures that include information about physiological and other types of joints of a subject) of different image recognition engines 112*a*, 112*b* and 112*n*, processing images of cameras 114 with overlapping fields of view. The results of the internal and external camera calibration are stored in a calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space.

In an implementation of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [[x, x, x], [x, x, x], [x, x, x]],
    distortion_coefficients: [x, x, x, x, x, x, x, x]
  },
}
```

The camera recalibration method can be applied to 360 degree or high field of view cameras. The radial distortion parameters described above can model the (barrel) distortion of a 360 degree camera. The intrinsic and extrinsic calibration process described here can be applied to the 360 degree cameras. However, the camera model using these intrinsic calibration parameters (data elements of K and distortion coefficients) can be different.

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
  1: {
    2: {
      F: [x, x, x], [x, x, x], [x, x, x]],
        E: [x, x, x], [x, x, x], [x, x, x]],
      P: [[x, x, x, x], [x, x, x, x], [x, x, x, x]],
      R: [x, x, x], [x, x, x], [x, x, x]],
      t: [x, x, x],
      homography_floor_coefficients: [x, x, x, x, x, x, x, x]
    }
  },
  .......
}
```

Two Dimensional and Three Dimensional Maps

An inventory location, such as a shelf, in a shopping store can be identified by a unique identifier in a map database (e.g., shelf_id). Similarly, a shopping store can also be identified by a unique identifier (e.g., store_id) in a map database. The two dimensional (2D) and three dimensional (3D) maps database 140 identifies inventory locations in the area of real space along the respective coordinates. For example, in a 2D map, the locations in the maps define two dimensional regions on the plane formed perpendicular to the floor 220 i.e., XZ plane as shown in FIG. 2B. The map defines an area for inventory locations where inventory items are positioned. In FIG. 3, a 2D location of the shelf unit shows an arca formed by four coordinate positions (x1, y1), (x1, y2), (x2, y2), and (x2, y1). These coordinate positions define a 2D region on the floor 220 where the shelf is located. Similar 2D areas are defined for all inventory display structure locations, entrances, exits, and designated unmonitored locations in the shopping store. This information is stored in the maps database 140.

In a 3D map, the locations in the map define three dimensional regions in the 3D real space defined by X. Y, and Z coordinates. The map defines a volume for inventory locations where inventory items are positioned. In FIG. 2B, a 3D view 250 of shelf 1 in the shelf unit shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the maps database 140. The coordinate positions along the three axes can be used to calculate length, depth and height of the inventory locations as shown in FIG. 2B.

In one implementation, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations, entrances, exits and designated unmonitored locations in the shopping store.

The items in a shopping store are arranged in some implementations according to a planogram which identifies the inventory locations (such as shelves) on which a particular item is planned to be placed. For example, as shown in an illustration 250 in FIG. 2B, a left half portion of shelf 3 and shelf 4 are designated for an item (which is stocked in the form of cans).

Joints Data Structure

The image recognition engines 112*a*-112*n* receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one implementation, the image recognition engines 112*a*-112*n* identify one of the 19 possible joints of a subject at each element of the image, usable to identify subjects in the area who may be moving in the area of real space, standing and looking at an inventory item, or taking and putting inventory items. The possible joints can be grouped in two categories: foot joints and non-foot joints. The 19th type of joint classification is for all non-joint features of the subject (i.e. elements of the image not classified as a joint). In other implementations, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

- Foot Joints:
  - Ankle joint (left and right)
- Non-foot Joints:
  - Neck
  - Nose
  - Eyes (left and right)
  - Ears (left and right)
  - Shoulders (left and right)
  - Elbows (left and right)
  - Wrists (left and right)
  - Hip (left and right)
  - Knees (left and right)
- Not a joint An array of joints data structures for a particular image classifies elements of the particular image by joint type, time of the particular image, and the coordinates of the elements in the particular image. In one implementation, the image recognition engines 112*a*-112*n* are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 310 as shown in FIG. 3A is used to store the information of each joint. The joints data structure 310 identifies x and y positions of the element in the particular image in the 2D image space of the camera from which the image is received. A joint number identifies the type of joint identified. For example, in one implementation, the values range from 1 to 19. A value of 1 indicates that the joint is a left ankle, a value of 2 indicates the joint is a right ankle and so on. The type of joint is selected using the confidence array for that element in the output matrix of CNN. For example, in one implementation, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one implementation, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Using a Data Structure Including Joint Information

The tracking engine 110 is configured to receive arrays of joints data structures generated by the image recognition engines 112*a*-112*n* corresponding to images in sequences of images from cameras having overlapping fields of view. The arrays of joints data structures per image are sent by image recognition engines 112*a*-112*n* to the tracking engine 110 via the network(s) 181. The tracking engine 110 translates the coordinates of the elements in the arrays of joints data structures from 2D image space corresponding to images in different sequences into candidate joints having coordinates in the 3D real space. A location in the real space is covered by the field of views of two or more cameras. The tracking engine 110 comprises logic to determine sets of candidate joints having coordinates in real space (constellations of joints) as located subjects in the real space. In one implementation, the tracking engine 110 accumulates arrays of joints data structures from the image recognition engines for all the cameras at a given moment in time and stores this information as a dictionary in a subject database, to be used for identifying a constellation of candidate joints corresponding to located subjects. The dictionary can be arranged in the form of key-value pairs, where keys are camera ids and values are arrays of joints data structures from the camera. In such an implementation, this dictionary is used in heuristics-based analysis to determine candidate joints and for assignment of joints to located subjects. In such an implementation, a high-level input, processing and output of the tracking engine 110 is illustrated in table 1. Details of the logic applied by the subject tracking engine 110 to create subjects by combining candidate joints and track movement of subjects in the area of real space are presented in U.S. patent application Ser. No. 15/847,796, entitled, "Subject Identification and Tracking Using Image Recognition Engine," filed on 19 Dec. 2017, now issued as U.S. Pat. No. 10,055,853, which is fully incorporated into this application by reference.

TABLE 1

Inputs, processing and outputs from subject tracking engine 110 in an example implementation.

| Inputs | Processing | Output |
|---|---|---|
| Arrays of joints data structures per image and for each joints data structure Unique ID Confidence number Joint number 2D (x, y) position in image space | Create joints dictionary Reproject joint positions in the fields of view of cameras with overlapping fields of view to candidate joints | List of located subjects located in the real space at a moment in time corresponding to an identification interval 1. |

Subject Data Structure

The subject tracking engine 110 uses heuristics to connect joints identified by the image recognition engines 112*a*-112*n* to locate subjects in the area of real space. In doing so, the subject tracking engine 110, at each identification interval, creates new located subjects for tracking in the area of real space and updates the locations of existing tracked subjects matched to located subjects by updating their respective joint locations. The subject tracking engine 110 can use triangulation techniques to project the locations of joints from 2D image space coordinates (x, y) to 3D real space coordinates (x, y, z). FIG. 3B shows the subject data structure 320 used to store the subject. The subject data structure 320 stores the subject related data as a key-value dictionary. The key is a "frame_id" and the value is another key-value dictionary where key is the camera_id and value is a list of 18 joints (of the subject) with their locations in the real space. The subject data is stored in the subjects database 150. A subject is assigned a unique identifier that is used to access the subject's data in the subject database.

In one implementation, the system identifies joints of a subject and creates a skeleton (or constellation) of the subject. The skeleton is projected into the real space indicating the position and orientation of the subject in the real space. This is also referred to as "pose estimation" in the field of machine vision. In one implementation, the system displays orientations and positions of subjects in the real space on a graphical user interface (GUI). In one implementation, the subject identification and image analysis are anonymous, i.e., a unique identifier assigned to a subject created through joints analysis does not identify personal identification information of the subject as described above.

For this implementation, the joints constellation of a subject, produced by time sequence analysis of the joints data structures, can be used to locate the hand of the subject. For example, the location of a wrist joint alone, or a location based on a projection of a combination of a wrist joint with an elbow joint, can be used to identify the location of hand of a subject.

In some implementations, the subject tracking engine 110 can be calibrated to only track certain individuals as subjects, such as tracking shoppers without tracking employees or vice versa.

For example, in one implementation, the system is configured to track employee actions in order to monitor interactions that necessarily involve a staff member, such as age-restricted products, products that are kept behind the cash register or in locked cases, and/or typical employee actions such as clocking in and out, opening the cash drawer, or restocking inventory. Tracking of these actions may be beneficial for monitoring stocking patterns, mitigating shrinkage, tracking employee productivity, or planning staff schedules. Tracking of employees without tracking shoppers can be advantageous for the aforementioned employee monitoring tasks, because this enables more efficient data collection and analysis, results in the curation of more specific tracking data (and hence, frees up computational power for a more detailed analysis, if desired), and reduces off-target noise in the input data processed by machine learning models, which can improve the accuracy of the output generated by a machine learning model.

In another example implementation, the subject tracking engine 110 is configured to track shoppers as subjects without tracking the actions of employees. For example, the goal of tracking may be to track shoppers as they move between two separate tracking spaces, such as a convenience store that is adjacent to a fueling station. By reducing the volume of data to be collected, processed, and stored, excluding employees from subject tracking processes is a form of noise reduction. Tracking multiple adjacent, discontinuous tracking zones is more computationally intensive than tracking one zone. Moreover, multiple discontinuous tracking zones such as a convenience store and a gas station are more computationally intensive than multiple tracking zones within the convenience store itself due to the significant differences in the respective areas of three-dimensional space. Accordingly, one way to improve the efficiency and/or accuracy of subject tracking in separate, adjacent tracking zones is to narrow the focus of the subject tracking engine 110. This approach can be combined with a camera mask generation strategy in certain implementations.

Subject Persistence Analysis

The joints analysis performed by the subject tracking engine 110 in an identification interval identifies constellation of joints. The identification interval can correspond to one image capture cycle or can include multiple image capture cycles. The constellation of joints located in an identification interval can belong to new subjects who have entered the area of real space in the current identification interval or can represent updated locations of the previously tracked subjects in earlier identification intervals. Sometimes, a subject located and tracked in an earlier identification interval can be missing in an intermediate identification interval before the current identification interval. This can happen for a variety of reasons, including, due to the subject moving to a designated unmonitored location in the area of real space or due to an error in subject tracking. In one example, this is due to a subject moving from a tracking zone into an unmonitored zone then back into a tracking zone. In another example, this is due to the subject passing through a masked region of the area of real space.

When a located subject is identified in the current identification interval, the technology disclosed performs the subject persistence analysis before tracking the located subject as a new subject and assigning it a new unique identifier. The system matches located subjects from the current identification interval with tracked subjects from an immediately preceding identification interval. Located subjects that are matched with tracked subjects can be tagged as the matching tracked subject. Located subjects that are not matched with tracked subjects are subjected to additional processing. For example, the system determines if a tracked subject in one or more earlier identification intervals is missing (i.e. not matched to a located subject) in the immediately preceding identification interval. Such a missing tracked subject can be evaluated as a potential match for the unmatched located subject (candidate subject) in the current identification interval.

For example, the system can include logic that processes the set of tracked subjects in the subject database 150 to detect a missing tracked subject present in the database. The missing tracked subject is not located in a first preceding identification interval but is tracked in a second preceding identification interval. The first preceding identification interval follows the second preceding identification interval. The system includes logic to locate a candidate located subject located from the current identification interval which follows the first preceding identification interval. The current identification interval can also be referred to as the third identification interval.

The technology disclosed matches the candidate located subject located from the current identification interval to the missing tracked subject located in the second preceding identification interval. If the missing tracked subject matches the candidate located subject, the missing tracked subject is updated in the database using the location of the candidate subject, and marked as no longer missing. This enables persistence of subjects in the area of real space even when a tracked subject is missed and not located in an identification interval.

It is understood that variations of subject persistence analysis are possible. For example, the system can match newly located candidate subject in the current identification interval to a missing tracked subject who is not located and tracked by the system for more than one intermediate identification intervals before the current identification interval.

The following sections present three example scenarios in which subject persistence analysis can be performed in an area of real space.

Single New Subject Persistence Analysis

The first example includes performing subject persistence over three identification intervals to match a missing tracked subject located in the second preceding identification interval to a candidate located subject located from the current (or third) identification interval. The system detects a condition in which a number of located subjects in the current set does not match the number of located subjects from a first preceding identification interval in the plurality of previous intervals. Upon detection of the condition, the system compares at least one of the located subjects in the current set with the set of located subjects from a second preceding identification interval in the plurality of previous identification intervals, that precedes the first preceding identification interval. The following example uses three identification intervals to illustrate this scenario. However, the process can be applied to more than three identification intervals.

Figure 4A:
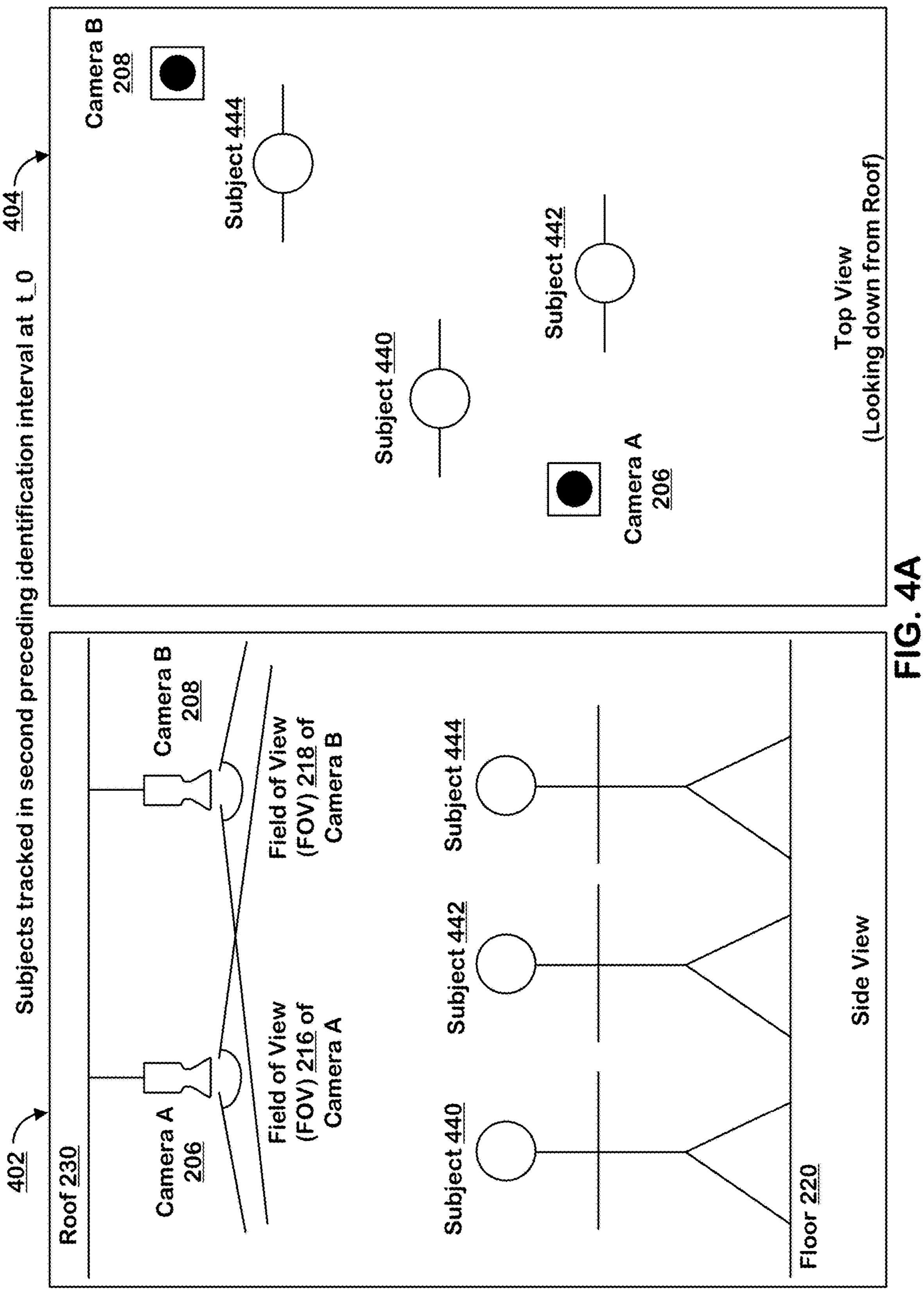
FIG. 4A shows tracked subjects in an area of real space in a second preceding identification interval.
Figure 4B:
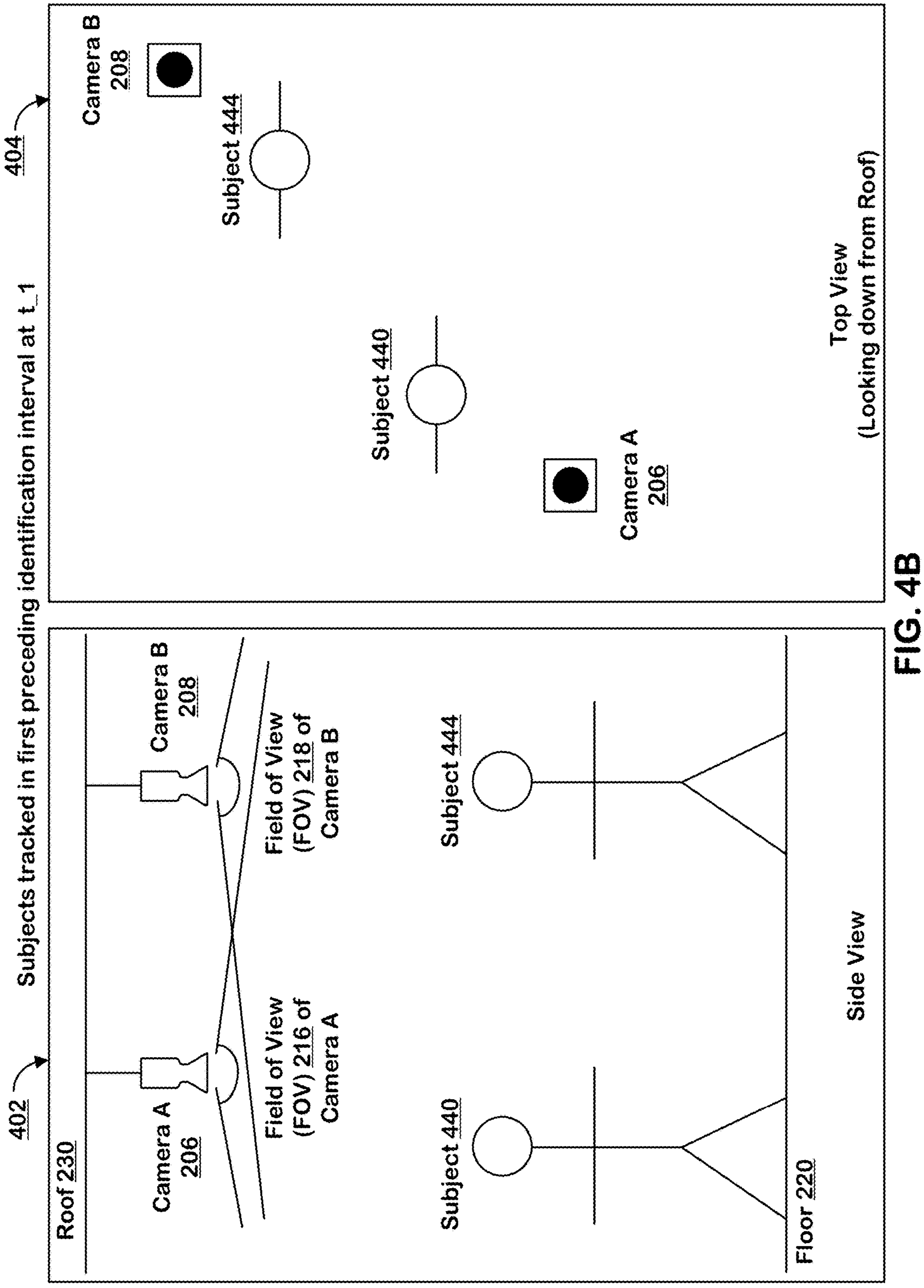
FIG. 4B shows tracked subjects in an area of real space in a first preceding identification interval in which one tracked subject located in the second preceding identification interval is missing.

FIG. 4A presents a side view 402 of an area of real space in which three subjects 440, 442 and 444 are tracked in a second preceding identification interval at time t_0. The subjects are stored in the database with their respective unique tracking identifiers and location information. The positions of the three subjects in a top view 404 (looking down from roof) is also shown in a top view 404. As described above, the positions of the subjects in the area of real space is identified by their respective subject data structures 320. The subject data structures include locations of joints in three dimensions (x, y, z) of the area of real space. In another implementation, the positions of the joints or other feature of the subjects are represented in the two dimensional (abbreviated 2D) image space (x, y). The subject 442 who is tracked in the second preceding identification interval is missing in a first preceding identification interval at time t_1 as shown in FIG. 4B. Both side view (402) and top view (404) show subjects 440 and 444 tracked in the first preceding identification intervals. A candidate subject 442A is located in a current identification interval at time t_2 as shown FIG. 4C. The candidate located subject is visible in the side view 402 and the top view 404.

The technology disclosed performs the subject persistence analysis to determine if the candidate located subject 442A is a new subject who entered the area of real space during the current identification interval or if the candidate located subject 442A is the missing tracked subject 442 who was tracked in the second preceding identification interval but is missing in the first preceding identification interval.

Figure 5:
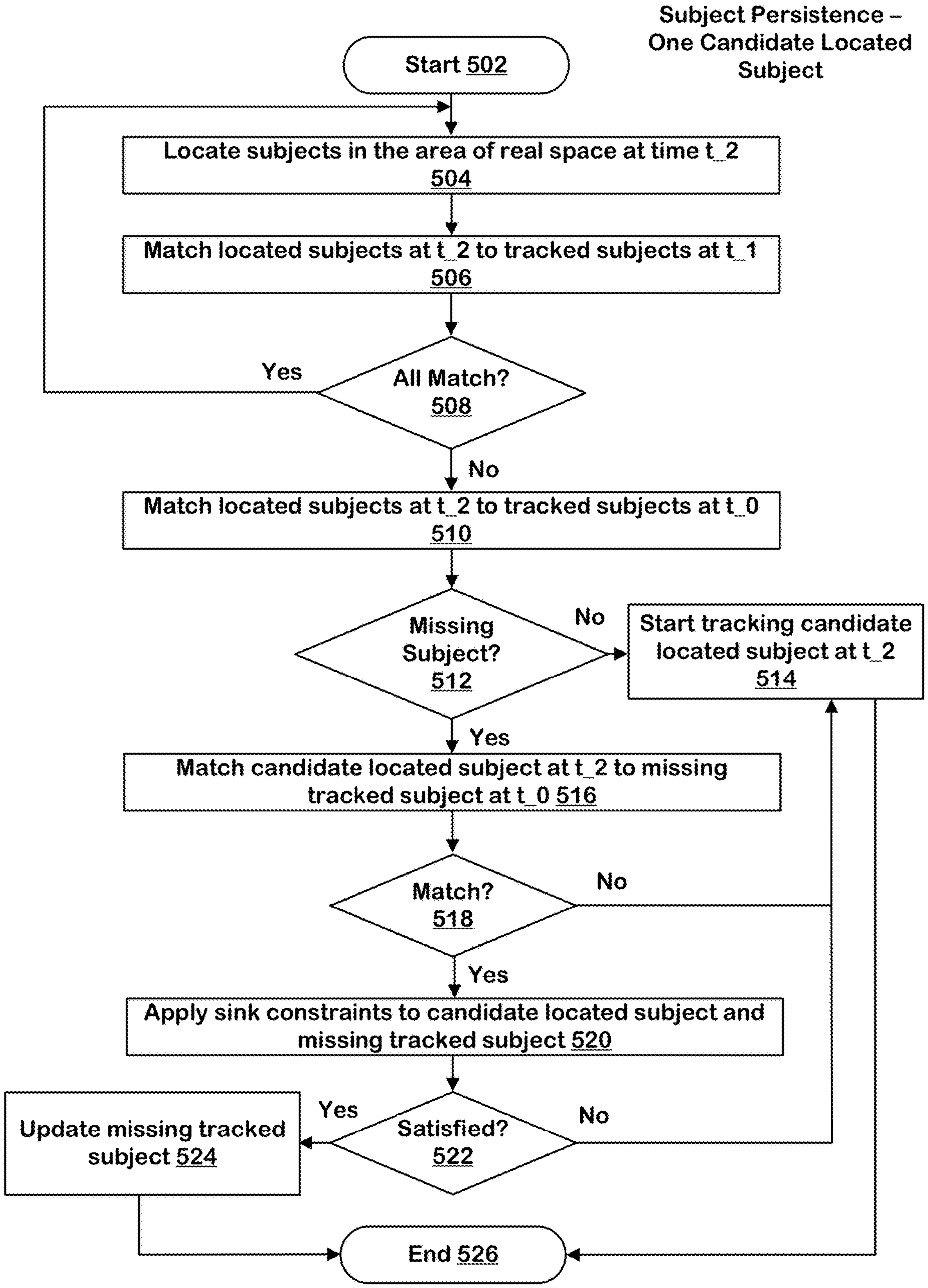
FIG. 5 is an example flow chart for matching a candidate located subject to a missing tracked subject.

FIG. 5 presents a flowchart with example operations to perform the subject persistence for one candidate located subject located from the current identification interval. The process starts at operation 502. The system locates subjects in the current identification cycle at time t_2. In one implementation, the system uses joints analysis as described above to locate subjects as constellation of joints. In another implementation, the system can use other features of the subjects such as facial features independently or in combination with joints to locate subjects in the area of real space.

At operation 506, the process matches the subjects located in the current identification interval at t_2 to tracked subjects located in the first preceding identification interval at time t_1. In one implementation, the process uses the logic applied by the subject tracking engine 110 to create subjects by combining candidate joints and track movement of subjects in the area of real space as presented in U.S. patent application Ser. No. 15/847,796, entitled, "Subject Identification and Tracking Using Image Recognition Engine," filed on 19 Dec. 2017, now issued as U.S. Pat. No. 10,055,853, which is fully incorporated into this application by reference. At operation 508, the system determines if all subjects located in the current identification interval match to the tracked subjects in the first preceding identification interval. If all subjects match then the system repeats operations 504 and 506 for a next identification interval. In one implementation, in this step, the system detect a condition in which a number of located subjects in the current set does not match the number of located subjects from a first preceding identification interval in the plurality of previous intervals. If the condition is true (operation 508), then the system compares at least one of the located subjects in the current set with the set of tracked subjects from a second preceding identification interval in the plurality of previous identification intervals, that precedes the first preceding identification interval.

If a candidate located subject located from the current identification interval does not match to any tracked subject in the first preceding identification interval, the technology disclosed determines if there is a missing tracked subject who was located and tracked in the second preceding identification interval but was missing in the first preceding identification interval following the second preceding identification interval. If the system identifies a missing tracked subject who is tracked in the second preceding identification interval but is missing in the first preceding identification interval, the process continues at operation 516. Otherwise, if the system does not identify a missing tracked subject in the second preceding identification interval, the system starts tracking the candidate located subject located from the current identification interval by assigning this subject a new tracking identifier. This is the case when all tracked subjects in the first preceding identification interval match corresponding tracked subjects in the second preceding identification interval.

Figure 4C:
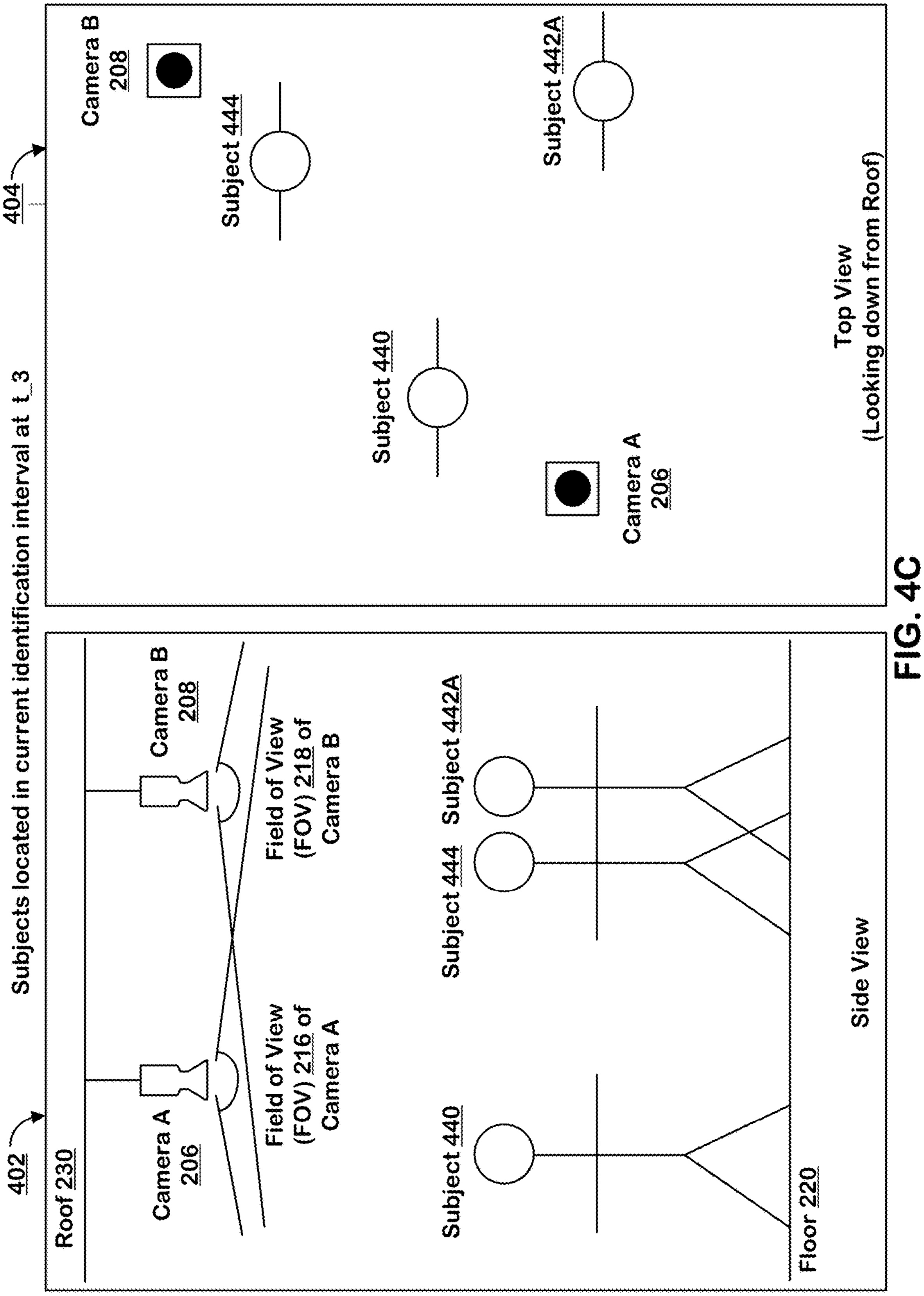
FIG. 4C shows subjects located in an area of real space in a current identification interval in which a candidate subject is located.

In the example presented in FIGS. 4A to 4C, the subject 442A (shown in FIG. 4C) is the candidate located subject located from the current identification interval and the subject 442 (shown in FIG. 4A) is the missing tracked subject. If the system determines that there is no missing tracked subject at operation 512, the candidate located subject 442A is assigned a unique tracking identifier and the system starts tracking the subject during the current identification interval.

The process to match the missing tracked subject and the candidate located subject is described in the following steps of the process flow. In operation 516, the system applies a time constraint heuristic before matching the location of the candidate located subject located from the current identification interval to the location of the missing tracked subject in the second preceding identification interval. The system calculates for example a difference in a timestamp of location of the candidate located subject and a timestamp of location of the missing tracked subject. The timestamps can be identifiers of the identification intervals, or can be specific timestamps within an identification interval that includes a plurality of image capture cycles. The timestamp, for example, can be represented as t_2 for the candidate subject located from the current identification interval, and t_0 for the missing tracked subject located in the second preceding identification interval. If an identification interval matches an image capture cycle of the cameras, the timestamps can match the time at which the images are captured in the image capture cycles. The difference between the timestamps i.e., t_2−t_0 is compared with a timing threshold. In one example, the timing threshold is 10 seconds. It is understood that other values of timing threshold greater or less than 10 seconds can be used. The timestamps of detection of joints of the subjects at image capture cycles can also be used for calculation of this time difference. If the difference in timestamps is less than the timing threshold then the system matches locations of the candidate located subject and the missing tracked subject.

The system calculates a distance between a location of the candidate located subject (p_2) and a location of the missing tracked subject (p_0) in the area of real space, i.e., (p_2−p_1). In one implementation using joints analysis as described above, the distance is calculated using locations of joints in the constellations of joints of the candidate located subject and the missing tracked subject. The distance can be calculated as a Euclidean distance between two points representing the corresponding joints in the respective constellations of joints. The Euclidean distance can be calculated both in the 3D real space and the 2D image space. The Euclidean distance represents the distance the subject has moved from an initial position in the second preceding identification interval to a new position in the current identification interval. This distance is then compared with a distance threshold. If the distance is less than the distance threshold then the candidate located subject is matched to the missing tracked subject. An example of the distance threshold distance is 1 meter. Other values for the distance threshold, greater than 1 meter or less than 1 meter can be used. If the difference between the timestamps of the location of the candidate located subject and the missing tracked subject is greater than the timing threshold or the distance between the candidate located subject and the missing tracked subject is greater than the distance threshold (operation 518), the system start does not match the candidate subject to the missing tracked subject, and can identify it as a new located subject at operation 514. Otherwise, the process to link the candidate located subject and the missing tracked subject continues at operation 520.

At operation 520, before linking the candidate located subject located from the current identification interval to the missing tracked subject located in the second preceding identification interval, the system applies "sink" constraints. Sink constraints can include calculating distances between locations of the candidate located subject and of the missing tracked subject to locations in the area of real space that can provide sources and sinks of subjects, such as entrances or exits from the area of the real space. In one implementation, the distance calculation uses a boundary location of the entrance or exit region. The distance of the candidate located subject to the location i.e., d(p_2-sink) and the distance of the missing tracked subject to the location i.e., d(p_0-sink) are compared with a distance threshold. If either of these distances is less than the distance threshold, (step 522) and the system can start tracking candidate located subject at step 514. An example of distance threshold at operation 520 is 1 meter, in other implementations, distance threshold values greater than 1 meter or less than 1 meter can be used. In one implementation, the threshold depends on the length (or time duration) of the identification intervals and the distance a subject can move in that time duration. If the sink constraints are satisfied, i.e., both the candidate located subject and the missing tracked subject are positioned farther from entrance and exits by more than the distance threshold, the system can update the missing tracked subject in the database using the candidate located subject located from the current identification interval (operation 524). The process ends at operation 526.

Multiple New Subjects Persistence Analysis

Figure 6A:
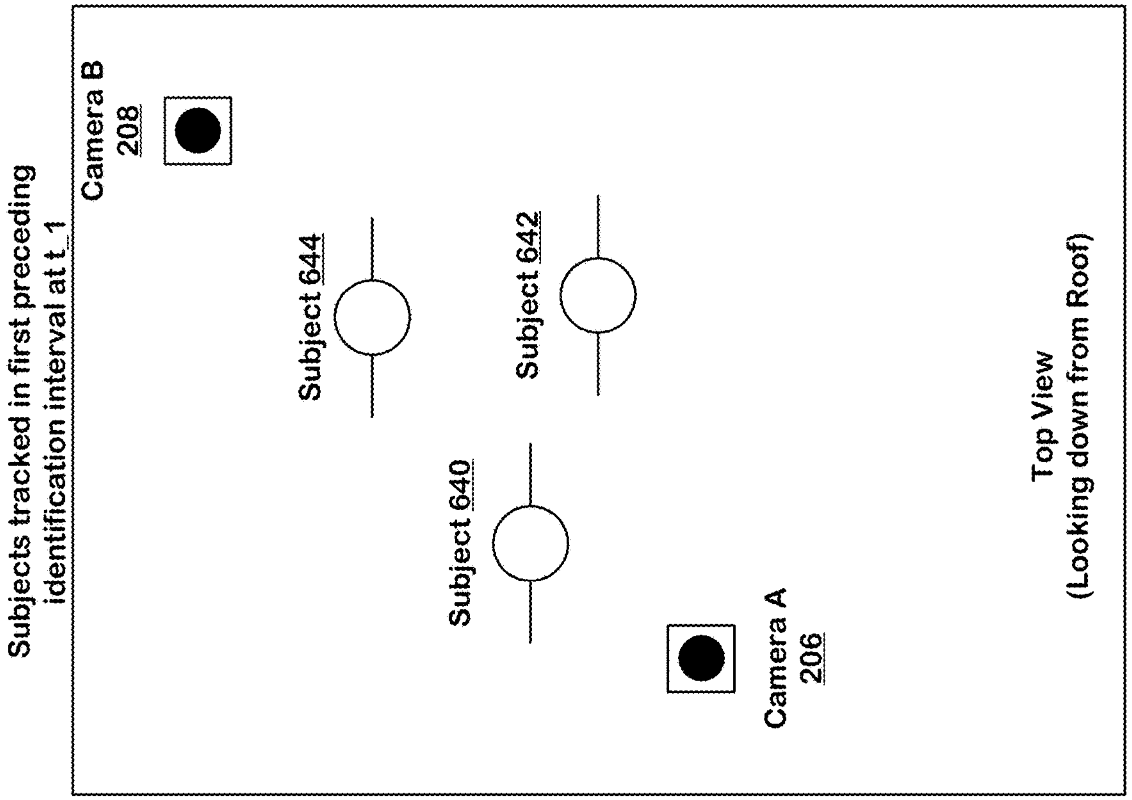
FIG. 6A shows tracked subjects in the area of real space located in a first preceding identification interval.
Figure 6B:
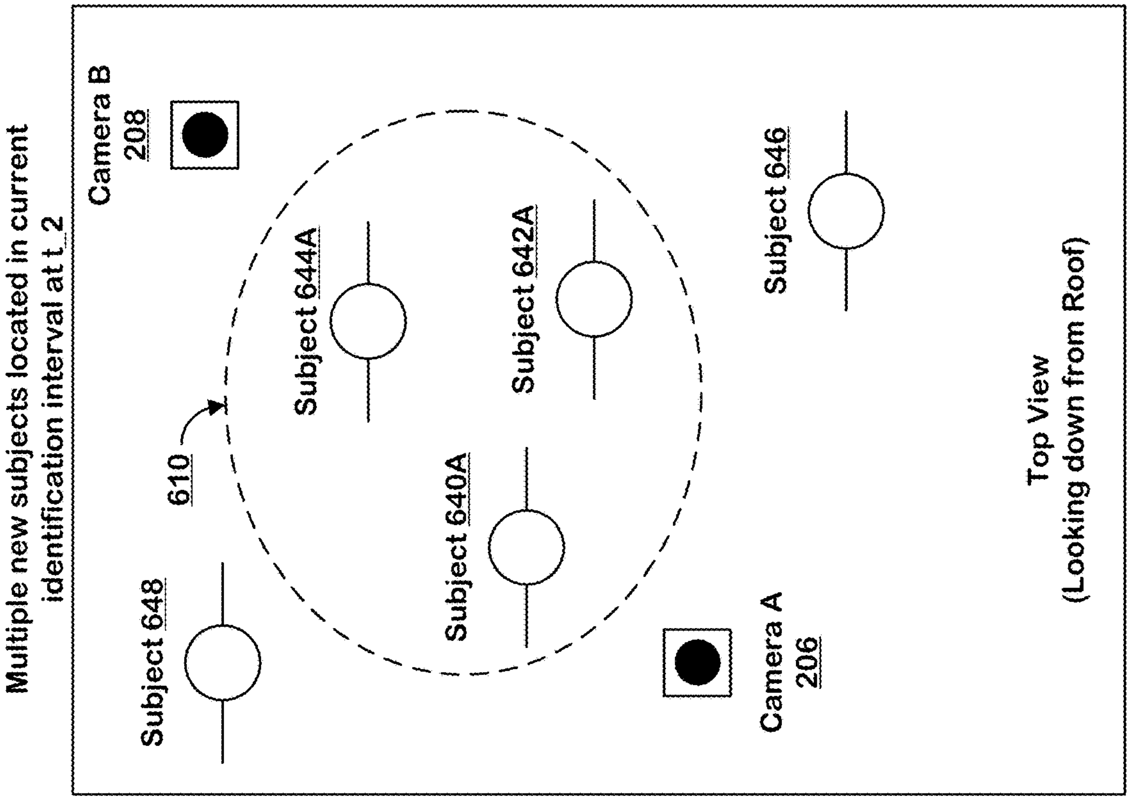
FIG. 6B shows subjects located in the area of real space in a current identification interval with more than one located subject not matched with tracked subjects located in a first preceding identification interval.

The second example scenario for performing subject persistence analysis using the technology disclosed is presented in FIGS. 6A and 6B. This example considers the scenario in which the set of tracked subjects from a first preceding identification interval includes N members, and the set of located subjects from the current identification interval includes N members plus one or more candidate located subjects. The system can employ logic to make the process of linking N members of the set of located subjects from the current identification interval to N members of the set of tracked subjects from the first preceding identification interval, more efficient. This improvement in efficiency can be achieved by prioritizing members of the set of located subjects from the current identification interval to identify a set of N located subjects to link to the set of N tracked subjects from the first preceding identification interval using relative locations of the located subjects. In one implementation, the prioritization of the members of the set of located subjects from the current identification interval to identify the set of N located subjects can include calculating distance between pairs of located subjects from the current identification interval. The system then identifies the set of N located subjects by comparing the calculated distance with a distance second threshold such as 1 meter. Located members satisfying the distance threshold can be evaluated for matching with tracked member for the preceding identification interval with higher priority than those that do not meet the distance threshold.

The example presented in FIGS. 6A and 6B illustrates this scenario by tracking three subjects 640, 642 and 644 in the first preceding identification interval at t_1 as shown in FIG. 6A. The three tracked subjects 640, 642, and 644 are stored in the subject database 150 with their unique tracking identifiers. Five subjects 640A, 642A, 644A, 646 and 648 are located in the current identification interval at t_2 as shown in FIG. 6B. The set of subjects located in the current identification interval has more than one member subjects not tracked in the first preceding identification interval. The system compares the set of tracked subjects present in the database that are tracked in preceding identification intervals to detect the condition that more than one subjects not tracked in preceding identification intervals are located in the current identification interval.

The system prioritizes the set of subjects (N plus more than one candidate located subjects) located from the current identification interval to determine a set S of located subjects in the current identification interval. In one implementation, the cardinality of the set S is equal to the cardinality of the set N of tracked subjects in preceding identification interval. In other implementations, the cardinality of the set S can be less than the set N of tracked subjects in preceding identification intervals. In one implementation, the membership of set S is determined such that the three dimensional or two dimensional Euclidean distance between any two members in the set S is less than a distance threshold. An example of the distance threshold is 1 meter. In FIG. 6B, a circle 610 identifies the set S of located subjects in the current identification interval which includes subjects 640A, 642A, and 644A. In this example, the cardinality of the set S equals the cardinality of the set N of tracked subjects in the preceding identification interval.

The system includes logic that matches a member of the set S of located subjects in the current identification interval to members of the set N of tracked subjects in the first preceding identification interval. If a member of the set S matches a member of the set N of tracked subjects, the system links the matched located subjects to the matched tracked subjects and updates the tracked subject in the database using the matched located subject. In one implementation, members of the set S of located subjects are matched to members of the set N of tracked subjects in the first preceding identification interval using positions of joints in their respective constellation of joints. The distance between positions of joints of members of the set S of located subjects and the set N of tracked subjects are compared with the second threshold (e.g., 1 meter). If there is a unique match for each member of the set S of located subjects in the current identification interval to a tracked subject in the first preceding identification interval then the system updates the tracked subject in the database using the matched member of the set S of located subjects. Before linking the tracked subject to the located subject in the current identification interval, the system can apply sink constraints as discussed above to the matched located and tracked subjects to determine that they are away from the exits and entrances to the area of real space by more than a third threshold distance.

Figure 7:
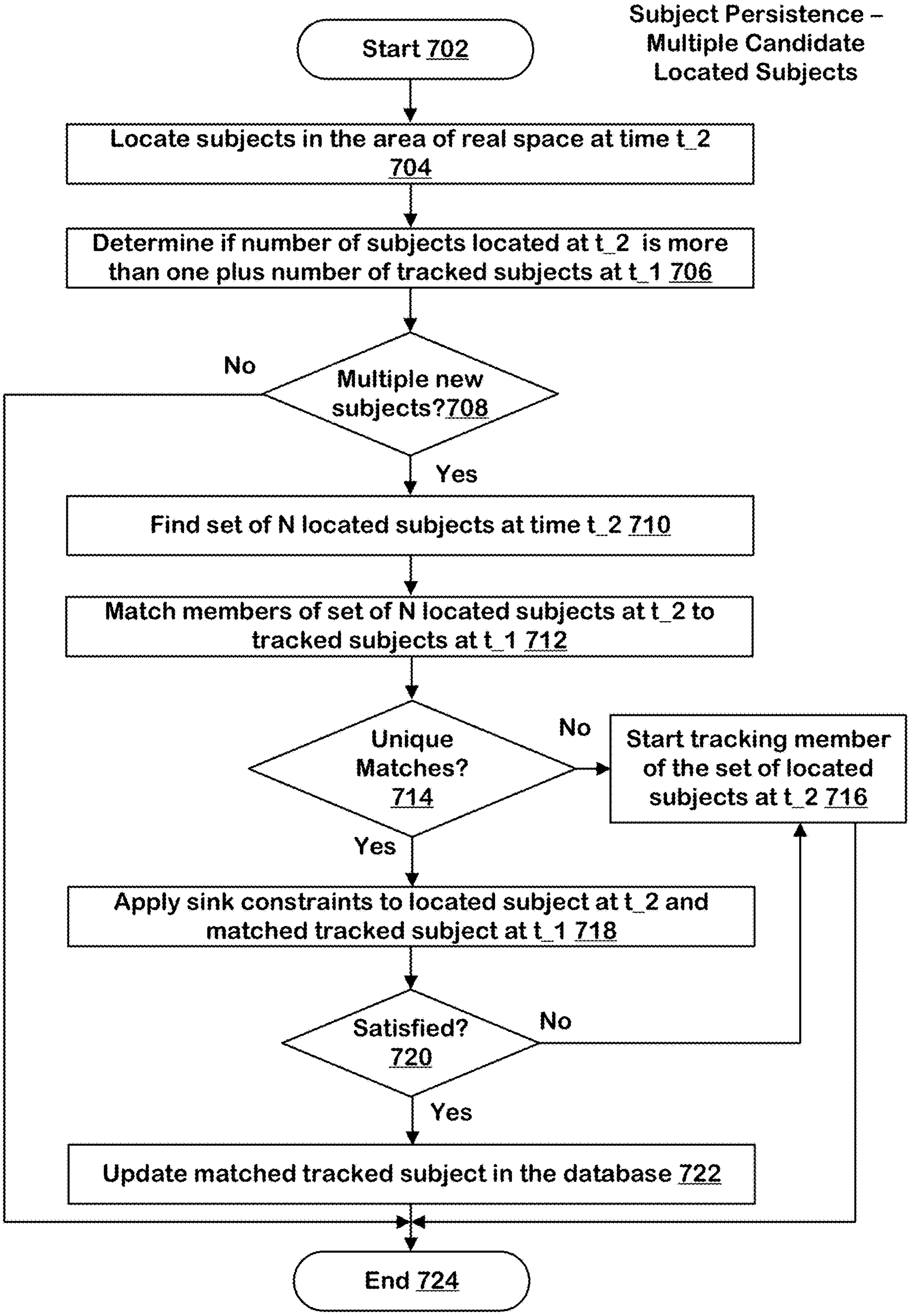
FIG. 7 is an example flow chart illustrating operations for matching subjects located in the current identification interval to tracked subjects in the first preceding identification interval when more than one located subjects in the current identification interval are not matched with any tracked subject in the first preceding identification interval.

FIG. 7 presents a process flowchart to perform subject persistence in the above described scenario. The process starts at operation 702. The system locates subjects in the area of real space in the current identification interval at operation 704. The number of located subjects in the current identification interval is compared to the number of tracked subjects in the first preceding identification interval at operation 706. For example, consider the example illustration in FIG. 6B indicating five subjects located in the current identification interval. Suppose there were three subjects tracked in the first preceding identification interval. By comparing the number of located subjects in the current identification interval to the number of tracked subjects in the first preceding identification interval, the system determines that more than one candidate subjects are located in the current identification interval (operation 708). In one implementation, the system compares the number of located subjects in the current identification interval to the number of tracked subjects in preceding identification interval to determine that more than one candidate subjects are located in the current identification interval at operation 706. In other words, the number of located subjects in the current identification interval is more than one plus the number of tracked subjects in the preceding identification interval. If there is only one additional member in the current identification interval, then the technique presented above in FIG. 5 can be applied. If there is only one additional member in the current identification interval and that member is positioned close to a designated unmonitored location in the area of real space (such as a restroom) then the technique presented below in FIG. 9 can be used.

The system identifies a set S of located subjects in the current identification interval (step 710) as explained in the following example. Consider $M_2$ subjects are located in the current identification interval at time $t_2$, whereas the subjects $M_2$ are indexed as 0, 1, 2, . . . , $M\_2-1$ and $M_0$ subjects are tracked in the first preceding identification interval at time $t_1$, indexed as 0, 1, 2, . . . , $M\_0-1$. Further, suppose that locations of the located subjects in the current identification interval are represented as p_{2, i} for i=0, 1, 2, $M\_2-1$ and locations of the tracked subjects in the first preceding identification interval are represented as q_{0, i} for i=0, 1, 2, . . . , M_0-1. At the step 710, a set S of located subjects in the current identification interval is determined such that for any two subjects p_{2, i} and p_{2, j} the distance d (p_{2, i}, p_{2, j}) is less than a second threshold, e.g., 1 meter. The distance can be calculated in the 3D real space or 2D image space using locations of joints in the constellation of joints of respective subjects. It is understood that other values of the distance threshold greater than or less than 1 meter can be used.

The members of the set S of located subjects are then matched to tracked subjects in the first preceding identification interval at operation 712. The location of each located subjects p_{2, i} member of the set S is matched to locations of tracked subjects q_{0, j} in the first preceding identification interval to determine the distance d (p_{2, i}, q_{0, j}). If the distance "d" is less than a second threshold, such as 1 meter, and one member p_{2, i} in the set S of located subjects matches to only one tracked subject q_{0, j} using the above threshold, then the system determines that there is a match between the located subject and tracked subject located in the preceding identification interval (operation 714).

If a member of the set S of located subjects does not match to a tracked subject in the above process step, the located subject can be assigned a new tracking identifier at operation 716. The system can then start tracking the located subject in the current identification interval. The subject is stored in the subject database with a unique tracking identifier.

When a member of the set S of located subjects in the current identification interval is matched to a tracked subject in the first preceding identification interval, the system determines that no other member of the set S of located subjects matches that tracked subject. For a member p_{2, i} of the set S of located subjects that uniquely matches to a tracked subject q_{0, j}, the sink constraints are applied at operation 718. The sink constraints determine if the member of the set S of located subjects or the tracked subject are closer to an entrance to or exit from the area of real space by a third threshold distance as described in operation 520 in the flowchart in FIG. 5. If the sink constraint is satisfied (operation 720) for the member of the set S of the located subjects and the tracked subject (i.e., both the member of the set S of located subjects and the tracked subject are farther from the sink than the third threshold), the tracked subject q_{0, j in the first preceding identification interval is updated in the database using the member p_{2, i} of the set S of located subjects (operation 722). The process ends at operation 724.

Subject Persistence Analysis for Designated Unmonitored Location

Figure 8A:
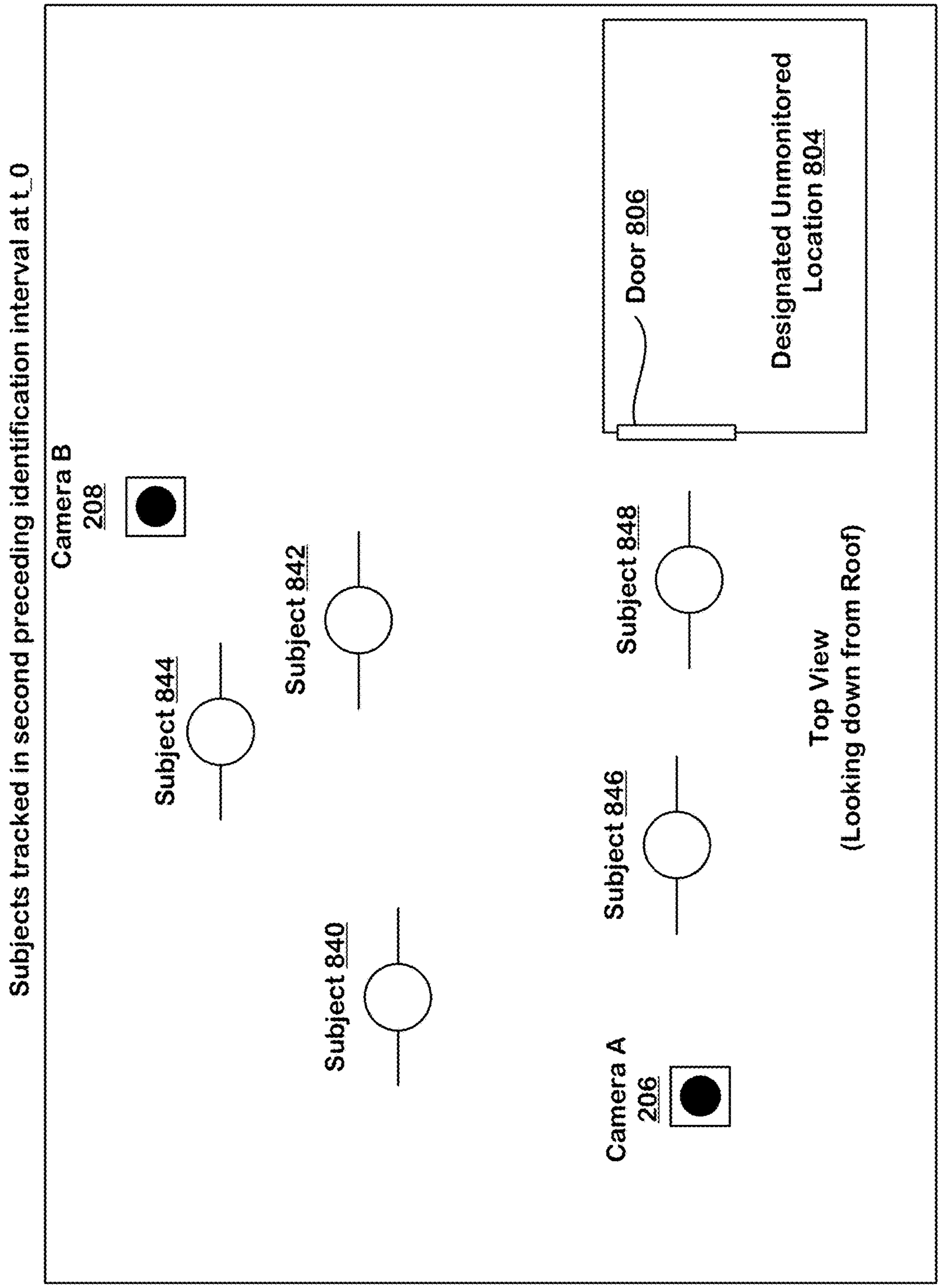
FIG. 8A shows an area of real space with a designated unmonitored location and a tracked subject located in a second preceding identification interval, positioned close to the designated unmonitored location.
Figure 8B:
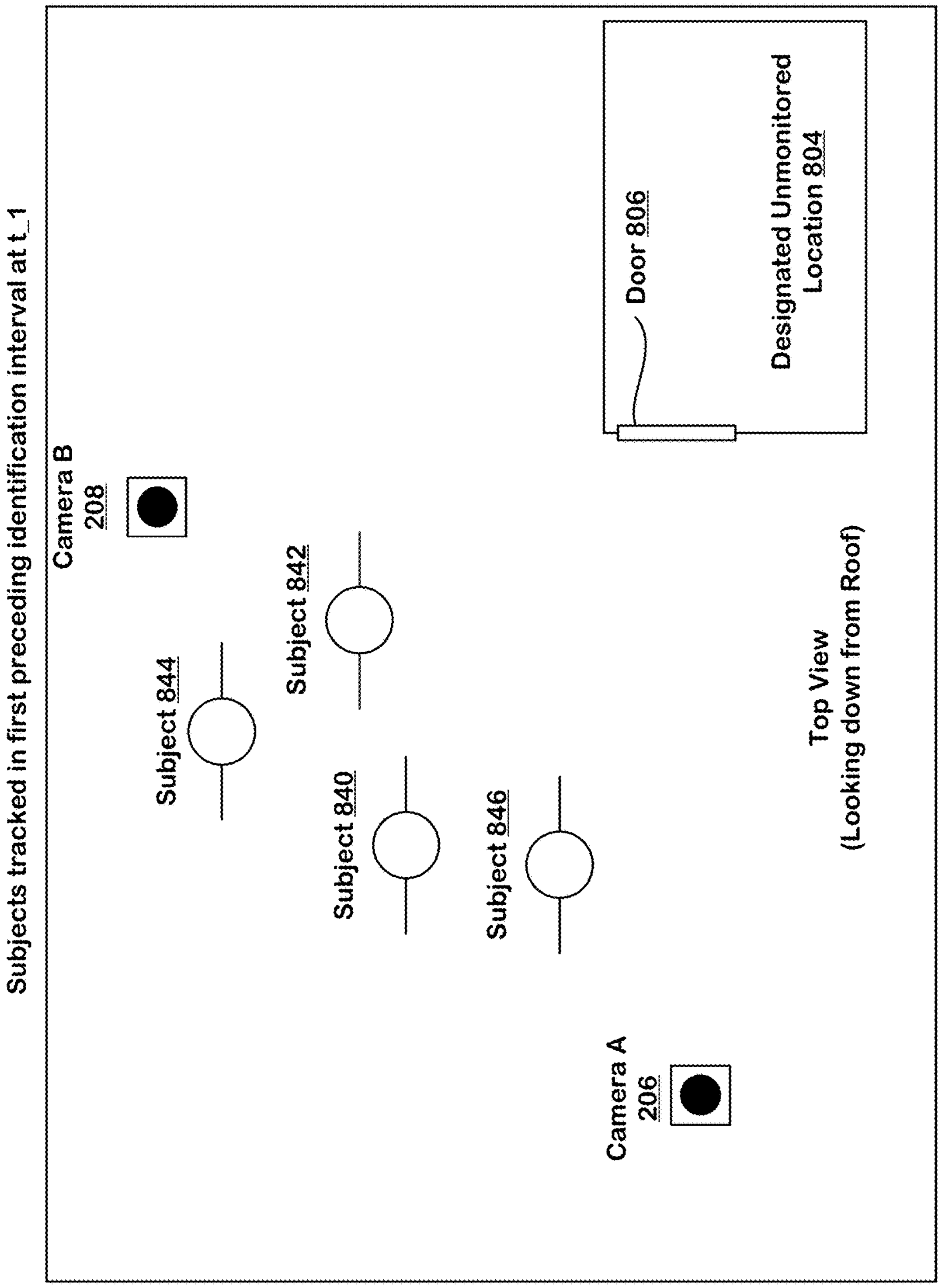
FIG. 8B shows the area of real space with tracked subjects located in a first preceding identification interval and the tracked subject of FIG. 8A positioned close to the designated unmonitored location missing in the first preceding identification interval.
Figure 8C:
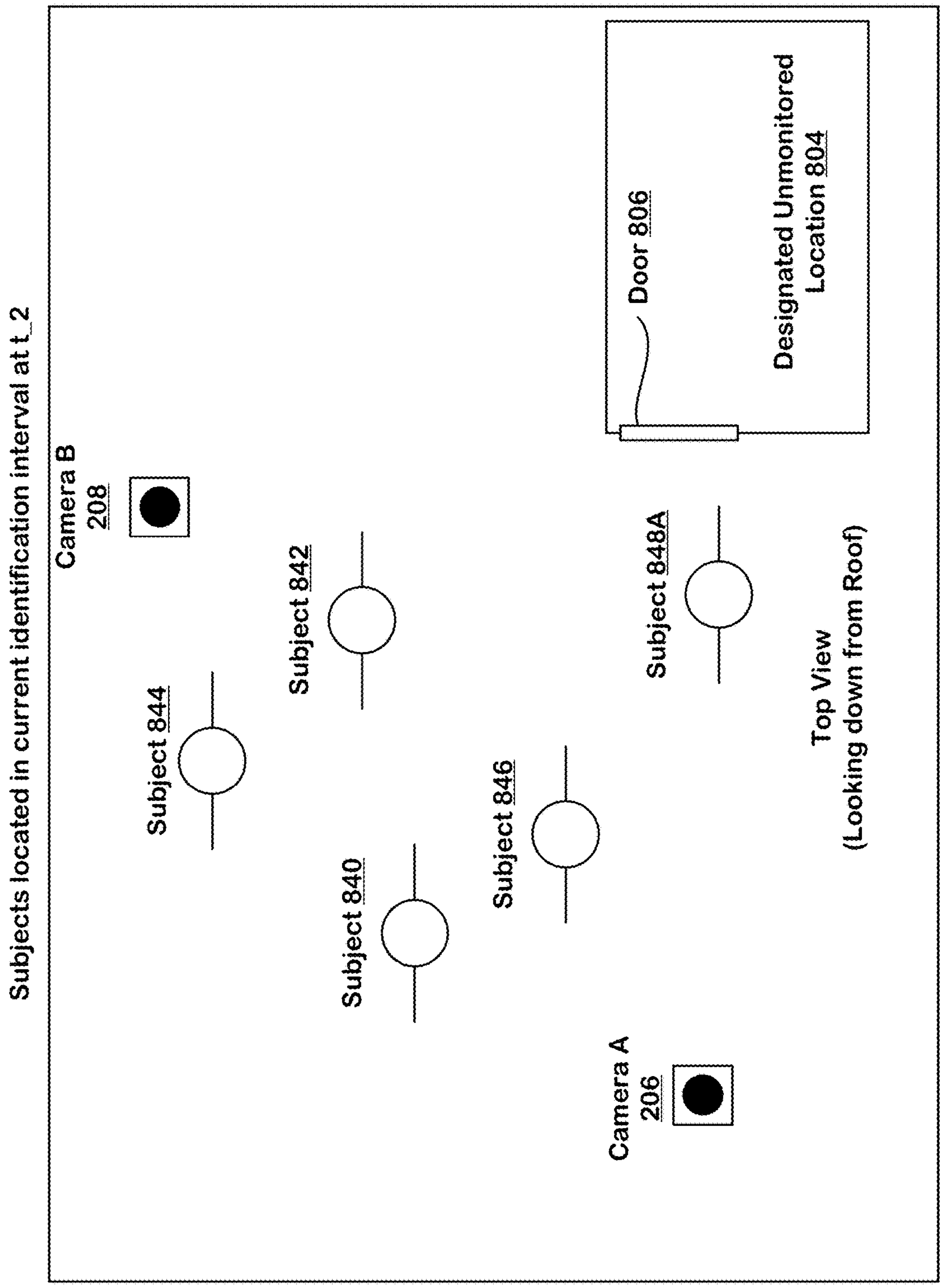
FIG. 8C shows subjects located in the current identification interval in the area of real space including a candidate located subject positioned close to the designated unmonitored location.

A third example scenario for performing subject persistence analysis using the technology disclosed is presented in FIGS. 8A to 8C. This example illustrates subject persistence when a subject moves to a designated unmonitored location, such as a restroom, in the area of real space. The subject is then not tracked in the following one or more identification intervals during which the subject is present in the designated unmonitored location. The system again locates the missing tracked subject during a following identification interval in which the subject moves out of the designated unmonitored location and is positioned in the field of view of one or more cameras 114.

FIG. 8A illustrates a top view (looking downwards) of an area of real space that includes a designated unmonitored location 804 such as a restroom. The designated unmonitored location 804 is not in the field of view of cameras 114. Subjects can enter or leave the designated unmonitored location through a door 806. There are five subjects 840, 842, 844, 846, and 848 in the set of tracked subjects in a second preceding identification interval at time t_0 as shown in FIG. 8A. In a first preceding identification interval at time t_1, there are four tracked subjects 840, 842, 844, and 846 in the set of tracked subjects as shown in FIG. 8B. The tracked subject 848 in the second preceding identification interval is missing in the first preceding identification interval. The location of the missing tracked subject 848 is close to the designated unmonitored location in the second preceding identification interval before the first preceding identification interval in which the subject 848 is missing.

FIG. 8C shows a candidate located subject 848A positioned near the designated unmonitored location 804 in a current identification interval at time t_2 after the first preceding identification interval at time t_1. Before starting to track the candidate located subject 848A in the current identification interval, the technology disclosed performs the subject persistence analysis to link the candidate located subject 848A to the missing tracked subject 848. The missing tracked subject 848 was located in the second preceding identification interval but was not located in the first preceding identification interval following the second preceding identification interval. Before the candidate located subject is matched to the missing tracked subject, the technology disclosed can determine that no subject (other than the missing tracked subject 848) was present close to the designated unmonitored location in the second preceding identification interval and no other subject (other than the missing tracked subject 848) entered the designated unmonitored location in the first preceding identification interval.

The system matches the locations of all tracked subjects in the second preceding identification interval to the location of designated unmonitored location to determine that only the missing tracked subject 848 is positioned close to the unmonitored location in the second preceding identification interval. In one implementation, a distance is calculated between locations of the tracked subjects in the second preceding identification interval and a point (in 3D real space or 2D image space) on the door 806. The system determines which tracked subjects are close to the designated unmonitored location 804 by comparing their respective distances to the designated unmonitored location with a third threshold. An example value of the third threshold distance is 1 meter. If missing tracked subject 848 is the only subject close to the door 806 in the second preceding identification interval and the candidate subject 848A is the only candidate located subject located from the current identification interval who is positioned close to the designated unmonitored location, then the system links the missing tracked subject 848 to the candidate located subject 848A. The system updated the missing tracked subject 848 in the database using the candidate located subject 848A in the current identification interval and continues tracking the subject 848 in the current identification interval.

In some implementations, the designated unmonitored location, such as a restroom or an ATM, is unmonitored as a result of masking those areas via a camera mask generator, while in other implementations, the designated unmonitored location is a blind spot resulting from camera placement. In certain implementations, a customer may elect to place cameras in certain tracking zones within the area of real space without setting up tracking throughout the entire store. For example, a convenience store may have zone monitoring set up for a walk-in cooler area ("beer cave") and the checkout counter, but no other regions of the store. As a subject moves from the beer cave into the general unmonitored space of the store, then in the tracking zone of the checkout counter in order to purchase products they obtained within the beer cave, subject persistence analysis is useful to ensure that each product a shopper takes off the shelf within the beer cave is correspondingly tracked as being placed onto the counter for payment as the shopper checks out.

Figure 9:
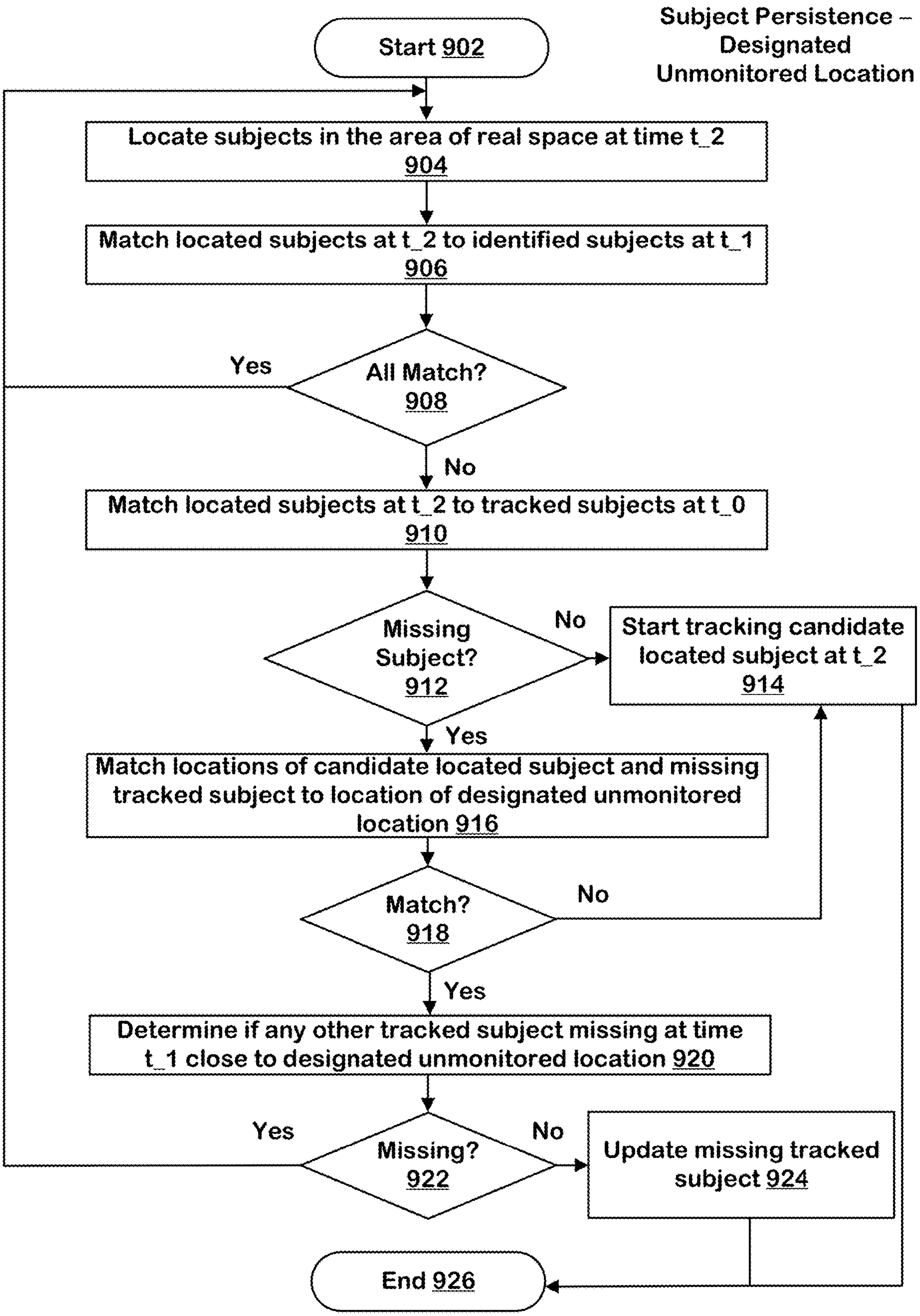
FIG. 9 is an example flow chart presenting operations to match the candidate located subject close to the designated unmonitored location to a missing tracked subject.

FIG. 9 is a flowchart presenting operations to link a candidate located subject located from the current identification interval to a missing tracked subject in the second preceding identification interval if both the candidate located subject and the missing tracked subject are positioned close to the designated unmonitored location in respective identification intervals. The process starts at operation 902. Operations 904, 906, 908, 910, and 912 perform similar operations as described for operations 504, 506, 508, 510, and 512 respectively. At operation 916, the distances of the tracked subjects in the second preceding identification interval and the located subjects in the current identification interval to a designated unmonitored location are calculated. Suppose there are M_0 subjects in the set of tracked subjects in the second preceding identification interval and the tracked subjects are indexed as 0, 1, 2, . . . , k−1. The locations of the tracked subjects are given as p_0, p_1, p_2, . . . , p_{k−1}, respectively. The system calculates distances of the tracked subjects to location of the designated unmonitored location as d(p_i, B) where B is the location of the designated unmonitored location in the three dimensional real space or two dimensional image space.

The distances of the tracked subjects to the designated unmonitored location are compared with a distance threshold such as 1 meter. If only one tracked subject in the second preceding identification interval is positioned closer to the designated unmonitored location than the third threshold, a similar distance calculation between locations of subjects located in the current identification interval and location of the designated unmonitored location is performed. If only one subject located in the current identification interval is positioned closer to the unmonitored designated location, then the condition at operation 918 becomes true. Otherwise, the system can assign a new tracking identifier to the candidate located subject located from the current identification interval and starts tracking the subject (operation 914).

As part of linking the missing tracked subject located in the second preceding identification interval to the candidate located subject located from the current identification interval, additional constraints can be checked at operation 920. It is determined that no other tracked subjects from the second preceding identification interval and the first preceding identification intervals who were located closer to the designated unmonitored location than the distance threshold (other than the missing tracked subject at operation 910) are missing in the current identification interval. This is to avoid incorrect matching of the candidate located subject to the missing tracked subject. If only one tracking subject positioned close to the designated unmonitored location in the second preceding identification interval is not tracked in the first preceding identification interval and only one candidate subject is located close to the designated unmonitored location in the current identification interval, then the system checks the following constraint. The system determines that no other tracked subject entered the designated unmonitored location (operation 922) by performing operations 904 to 912. If no other tracked subject entered the designated unmonitored location in the second preceding identification interval and the first preceding identification interval then the system links the missing tracked subject located in the second preceding identification interval using the candidate located subject located from the current identification interval (operation 924). The system then continues tracking the missing tracked subject in the current identification interval using the location of the candidate located subject. The process ends at operation 926.

Network Configuration

Figure 10:
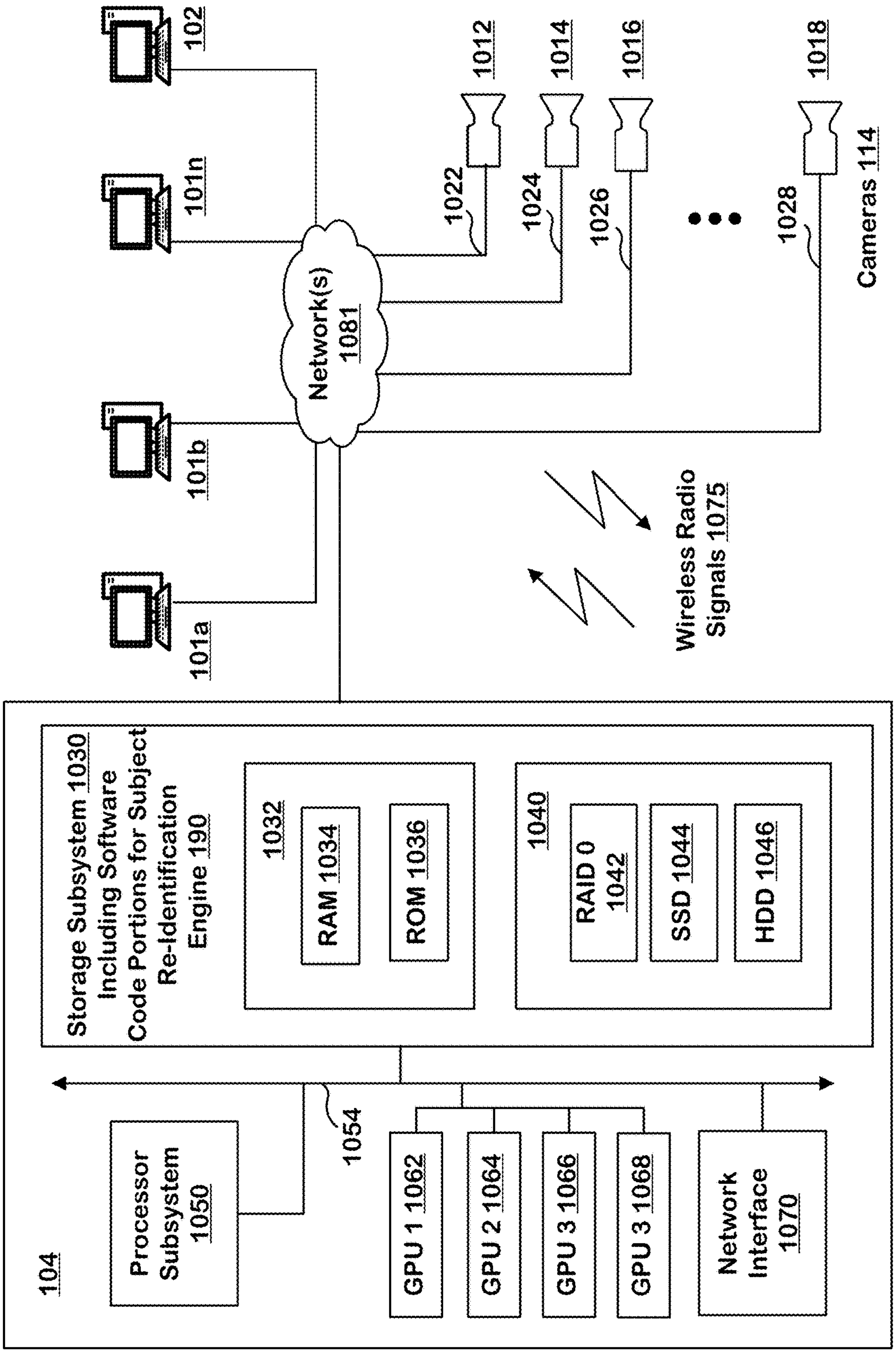
FIG. 10 is a camera and computer hardware arrangement configured for hosting the subject persistence processing engine of FIG. 1.

FIG. 10 presents architecture of a network hosting the subject re-identification engine 190 which is hosted on the network node 105. The system includes a plurality of network nodes 101*a*, 101*b*, 101*n*, and 102 in the illustrated implementation. In such an implementation, the network nodes are also referred to as processing platforms. Processing platforms (network nodes) 101*a*, 101*b*, 101*n*, 102, 103, 104, and 105 and cameras 1012, 1014, 1016, . . . , 1018 are connected to network(s) 1081.

FIG. 10 shows a plurality of cameras 1012, 1014, 1016, . . . , 1018 connected to the network(s). A large number of cameras can be deployed in particular systems. In one implementation, the cameras 1012 to 1018 are connected to the network(s) 1081 using Ethernet-based connectors 1022, 1024, 1026, and 1028, respectively. In such an implementation, the Ethernet-based connectors have a data transfer speed of 1 gigabit per second, also referred to as Gigabit Ethernet. It is understood that in other implementations, cameras 114 are connected to the network using other types of network connections which can have a faster or slower data transfer rate than Gigabit Ethernet. Also, in alternative implementations, a set of cameras can be connected directly to each processing platform, and the processing platforms can be coupled to a network.

Storage subsystem 1030 stores the basic programming and data constructs that provide the functionality of certain implementations of the technology disclosed. For example, the various modules implementing the functionality of the subject re-identification engine 190 may be stored in storage subsystem 1030. The storage subsystem 1030 is an example of a computer readable memory comprising a non-transitory data storage medium, having computer instructions stored in the memory executable by a computer to perform all or any combination of the data processing and image processing functions described herein including logic to detect tracking errors and logic to re-identify subjects with incorrect track_IDs, logic to link subjects in an area of real space with a user account, to determine locations of tracked subjects represented in the images, match the tracked subjects with user accounts by identifying locations of mobile computing devices executing client applications in the area of real space by processes as described herein. In other examples, the computer instructions can be stored in other types of memory, including portable memory, that comprise a non-transitory data storage medium or media, readable by a computer.

These software modules are generally executed by a processor subsystem 1050. A host memory subsystem 1032 typically includes a number of memories including a main random access memory (RAM) 1034 for storage of instructions and data during program execution and a read-only memory (ROM) 1036 in which fixed instructions are stored. In one implementation, the RAM 1034 is used as a buffer for storing re-identification vectors generated by the subject re-identification engine 190.

A file storage subsystem 1040 provides persistent storage for program and data files. In an example implementation, the storage subsystem 1040 includes four 120 Gigabyte (GB) solid state disks (SSD) in a RAID 0 (redundant array of independent disks) arrangement identified by a numeral 1042. In the example implementation, maps data in the maps database 140, subjects data in the subjects database 150, heuristics in the persistence heuristics database 160, training data in the training database 162, account data in the user database 164 and image/video data in the image database 166 which is not in RAM, is stored in RAID 0. In the example implementation, the hard disk drive (HDD) 1046 is slower in access speed than the RAID 0 1042 storage. The solid state disk (SSD) 1044 contains the operating system and related files for the subject re-identification engine 190.

In an example configuration, four cameras 1012, 1014, 1016, 1018, are connected to the processing platform (network node) 103. Each camera has a dedicated graphics processing unit GPU 1 1062, GPU 2 1064, GPU 3 1066, and GPU 4 1068, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1050, the storage subsystem 1030 and the GPUs 1062, 1064, and 1066 communicate using the bus subsystem 1054.

A network interface subsystem 1070 is connected to the bus subsystem 1054 forming part of the processing platform (network node) 104. Network interface subsystem 1070 provides an interface to outside networks, including an interface to corresponding interface devices in other computer systems. The network interface subsystem 1070 allows the processing platform to communicate over the network either by using cables (or wires) or wirelessly. The wireless radio signals 1075 emitted by the mobile computing devices 120 in the area of real space are received (via the wireless access points) by the network interface subsystem 1070 for processing by the account matching engine 170. A number of peripheral devices such as user interface output devices and user interface input devices are also connected to the bus subsystem 1054 forming part of the processing platform (network node) 104. These subsystems and devices are intentionally not shown in FIG. 10 to improve the clarity of the description. Although bus subsystem 1054 is shown schematically as a single bus, alternative implementations of the bus subsystem may use multiple busses.

In one implementation, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300–∞, a field of view field of view with a ⅓" sensor of 98.2°–23.8°. The cameras 114 can be any of Pan-Tilt-Zoom cameras, 360-degree cameras, and/or combinations thereof that can be installed in the real space.

Subject Identification Analysis

The following description provides examples of algorithms for identifying tracked subjects by matching them to their respective user accounts. As described above, the technology disclosed links located subjects in the current identification interval to tracked subjects in preceding identification intervals by performing subject persistence analysis. In the case of a cashier-less store the subjects move in the aisles and open spaces of the store and take items from shelves. The technology disclosed associates the items taken by tracked subjects to their respective shopping cart or log data structures. The technology disclosed uses one of the following check-in techniques to identify tracked subjects and match them to their respective user accounts. The user accounts have information such as preferred payment method for the identified subject. The technology disclosed can automatically charge the preferred payment method in the user account in response to identified subject leaving the shopping store. In one implementation, the technology disclosed compares located subjects in current identification interval to tracked subjects in previous identification intervals in addition to comparing located subjects in current identification interval to identified (or checked in) subjects (linked to user accounts) in previous identification intervals. In another implementation, the technology disclosed compares located subjects in current identification interval to tracked subjects in previous intervals in alternative to comparing located subjects in current identification interval to identified (or tracked and checked-in) subjects (linked to user accounts) in previous identification intervals.

Figure 11:
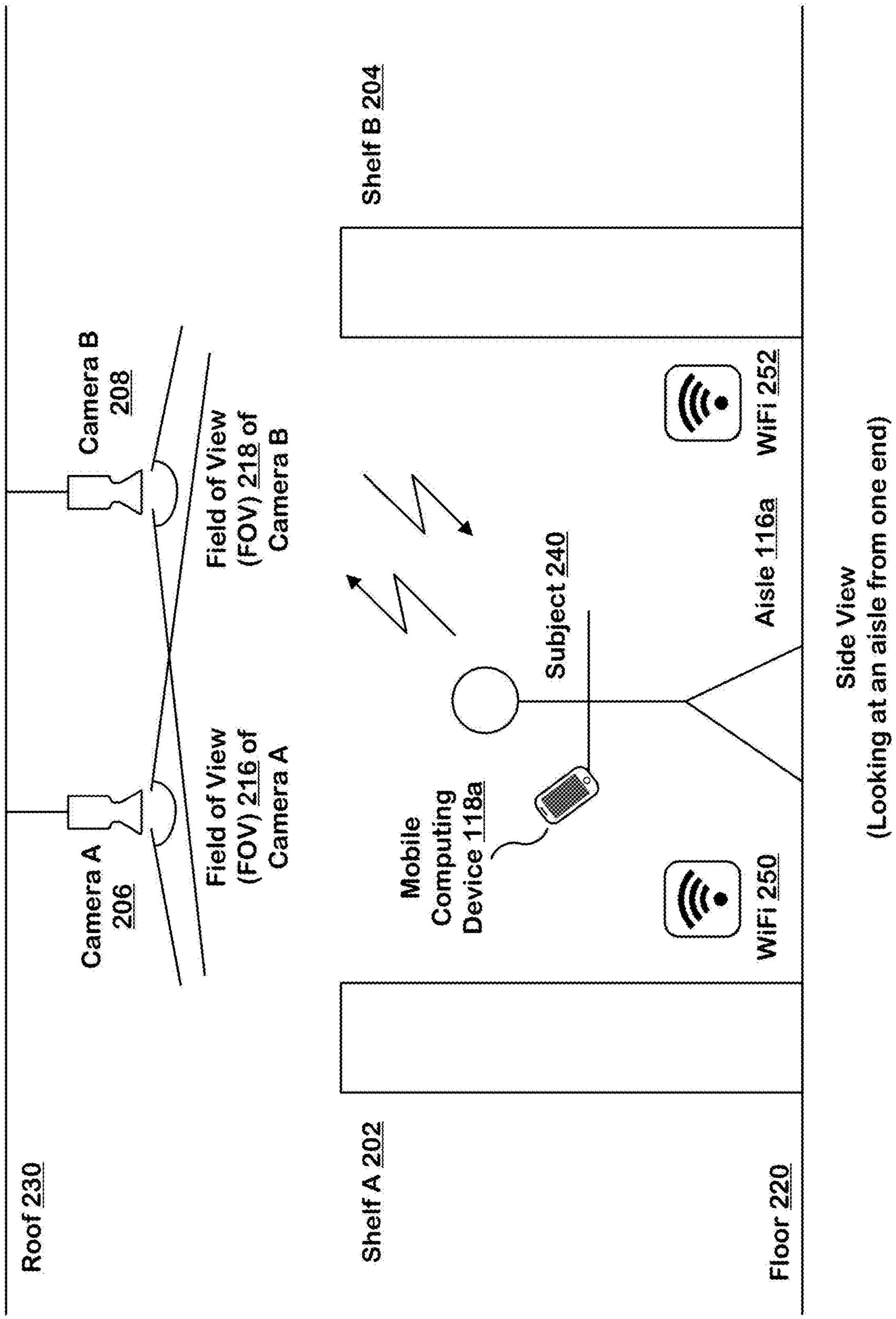
FIG. 11 is a side view of an aisle in a shopping store illustrating a subject with a mobile computing device and a camera arrangement.

In a shopping store, the shelves and other inventory display structures can be arranged in a variety of manners, such as along the walls of the shopping store, or in rows forming aisles or a combination of the two arrangements. FIG. 11 shows an arrangement of shelves, forming an aisle 116*a*, viewed from one end of the aisle 116*a*. Two cameras, camera A 206 and camera B 208 are positioned over the aisle 116*a* at a predetermined distance from a roof 230 and a floor 220 of the shopping store above the inventory display structures, such as shelves. The cameras 114 comprise cameras disposed over and having fields of view encompassing respective parts of the inventory display structures and floor area in the real space. The coordinates in real space of members of a set of candidate joints, located as a subject, identify locations of the subject in the floor area. In FIG. 11, the subject 240 is holding the mobile computing device 118*a* and standing on the floor 220 in the aisle 116*a*. The mobile computing device can send and receive signals through the wireless network(s) 181. In one example, the mobile computing devices 120 communicate through a wireless network using for example a Wi-Fi protocol, or other wireless protocols like Bluetooth, ultra-wideband, and ZigBee, through wireless access points (WAP) 250 and 252.

In the example implementation of the shopping store, the real space can include all of the floor 220 in the shopping store from which inventory can be accessed. Cameras 114 are placed and oriented such that areas of the floor 220 and shelves can be seen by at least two cameras. The cameras 114 also cover at least part of the shelves 202 and 204 and floor space in front of the shelves 202 and 204. Camera angles are selected to have both steep perspective, straight down, and angled perspectives that give more full body images of the customers. In one example implementation, the cameras 114 are configured at an eight (8) foot height or higher throughout the shopping store.

In FIG. 11, the cameras 206 and 208 have overlapping fields of view, covering the space between a shelf A 202 and a shelf B 204 with overlapping fields of view 216 and 218, respectively. A location in the real space is represented as a (x, y, z) point of the real space coordinate system. “x” and “y” represent positions on a two-dimensional (2D) plane which can be the floor 220 of the shopping store. The value “z” is the height of the point above the 2D plane at floor 220 in one configuration.

Figure 12:
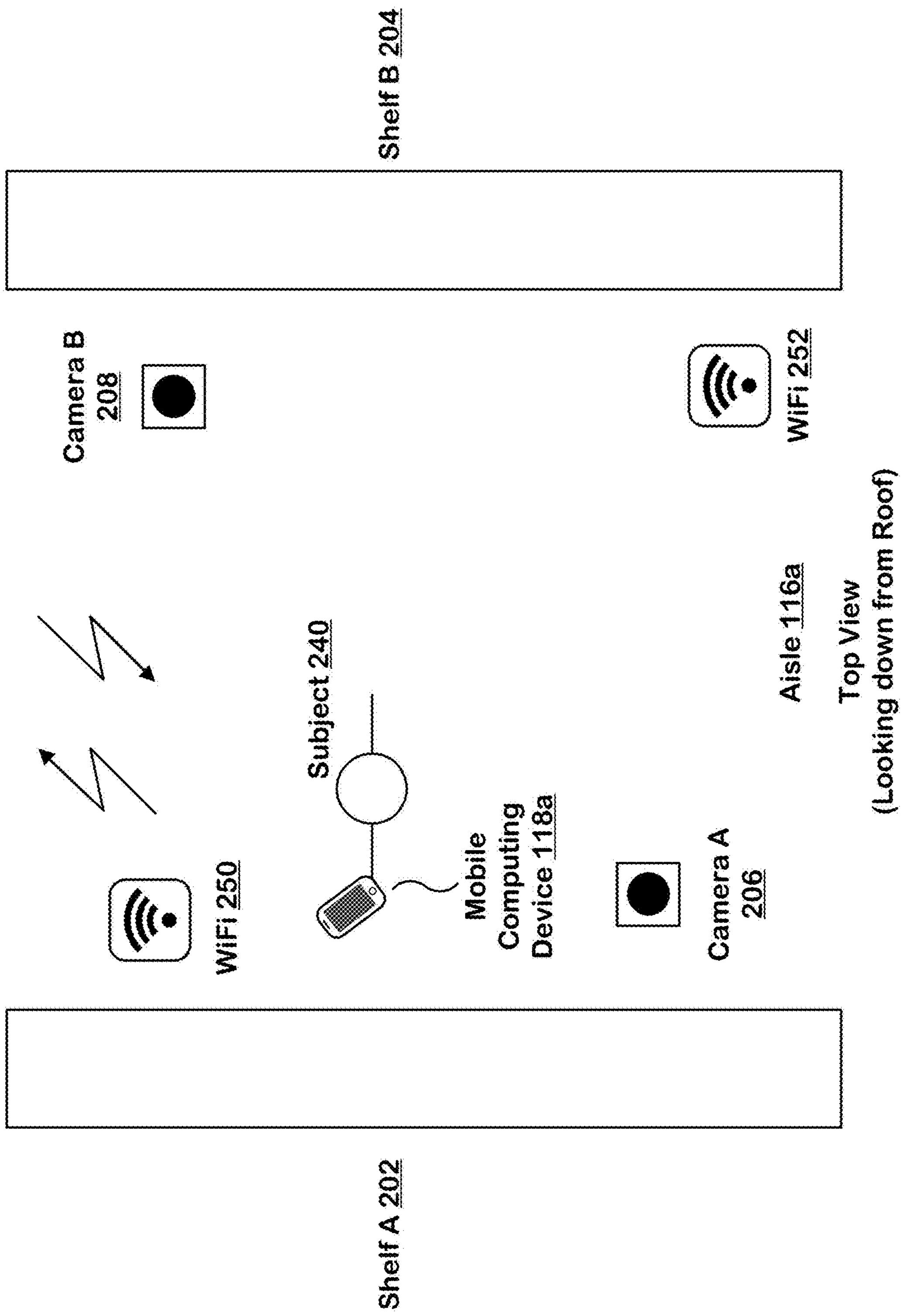
FIG. 12 is a top view of the aisle of FIG. 11 in a shopping store illustrating the subject with the mobile computing device and the camera arrangement.

FIG. 12 illustrates the aisle 116*a* viewed from the top of FIG. 11, further showing an example arrangement of the positions of cameras 206 and 208 over the aisle 116*a*. The cameras 206 and 208 are positioned closer to opposite ends of the aisle 116*a*. The camera A 206 is positioned at a predetermined distance from the shelf A 202 and the camera B 208 is positioned at a predetermined distance from the shelf B 204. In another implementation, in which more than two cameras are positioned over an aisle, the cameras are positioned at equal distances from each other. In such an implementation, two cameras are positioned close to the opposite ends and a third camera is positioned in the middle of the aisle. It is understood that a number of different camera arrangements are possible.

Account Matching Engine

The account matching engine 170 includes logic to identify tracked subjects by matching them with their respective user accounts by identifying locations of mobile devices (carried by the tracked subjects) that are executing client applications in the area of real space. In one implementation, the account matching engine 170 uses multiple techniques, independently or in combination, to match the tracked subjects with the user accounts. The system can be implemented without maintaining biometric identifying information about users, so that biometric information about account holders is not exposed to security and privacy concerns raised by distribution of such information.

In one implementation, a customer (or a subject) logs in to the system using a client application executing on a personal mobile computing device upon entering the shopping store, identifying an authentic user account to be associated with the client application on the mobile device. The system then sends a “semaphore” image selected from the set of unassigned semaphore images in the image database 166 to the client application executing on the mobile device. The semaphore image is unique to the client application in the shopping store as the same image is not freed for use with another client application in the store until the system has matched the user account to a tracked subject. After that matching, the semaphore image becomes available for use again. The client application causes the mobile device to display the semaphore image, which display of the semaphore image is a signal emitted by the mobile device to be detected by the system. The account matching engine 170 uses the image recognition engines 112*a*, 112*b*, and 112*n* or a separate image recognition engine (not shown in FIG. 1) to recognize the semaphore image and determine the location of the mobile computing device displaying the semaphore in the shopping store. The account matching engine 170 matches the location of the mobile computing device to a location of a tracked subject. The account matching engine 170 then links the tracked subject (stored in the subject database 150) to the user account (stored in the user account database 164 or the user database 164) linked to the client application for the duration in which the subject is present in the shopping store. No biometric identifying information is used for identifying the subject by matching the tracking subject with the user account, and none is stored in support of this process. That is, there is no information in the sequences of images used to compare with stored biometric information for the purposes of matching the tracked subjects with user accounts in support of this process.

In other implementations, the account matching engine 170 uses other signals in the alternative or in combination from the mobile computing devices 120 to link the tracked subjects to user accounts. Examples of such signals include a service location signal identifying the position of the mobile computing device in the area of the real space, speed and orientation of the mobile computing device obtained from the accelerometer and compass of the mobile computing device, etc.

In some implementations, though implementations are provided that do not maintain any biometric information about account holders, the system can use biometric information to assist matching a not-yet-linked tracked subject to a user account. For example, in one implementation, the system stores "hair color" of the customer in his or her user account record. During the matching process, the system might use for example hair color of subjects as an additional input to disambiguate and match the tracked subject to a user account. If the user has red colored hair and there is only one subject with red colored hair in the area of real space or in close proximity of the mobile computing device, then the system might select the subject with red hair color to match the user account. The details of account matching engine are presented in U.S. patent application Ser. No. 16/255,573, entitled, "Systems and Methods to Check-in Shoppers in a Cashier-less Store," filed on 23 Jan. 2019, now issued as U.S. Pat. No. 10,650,545, which is fully incorporated into this application by reference.

The flowcharts in FIGS. 13 to 16C present operations of four techniques usable alone or in combination by the account matching engine 170.

Semaphore Images

Figure 13:
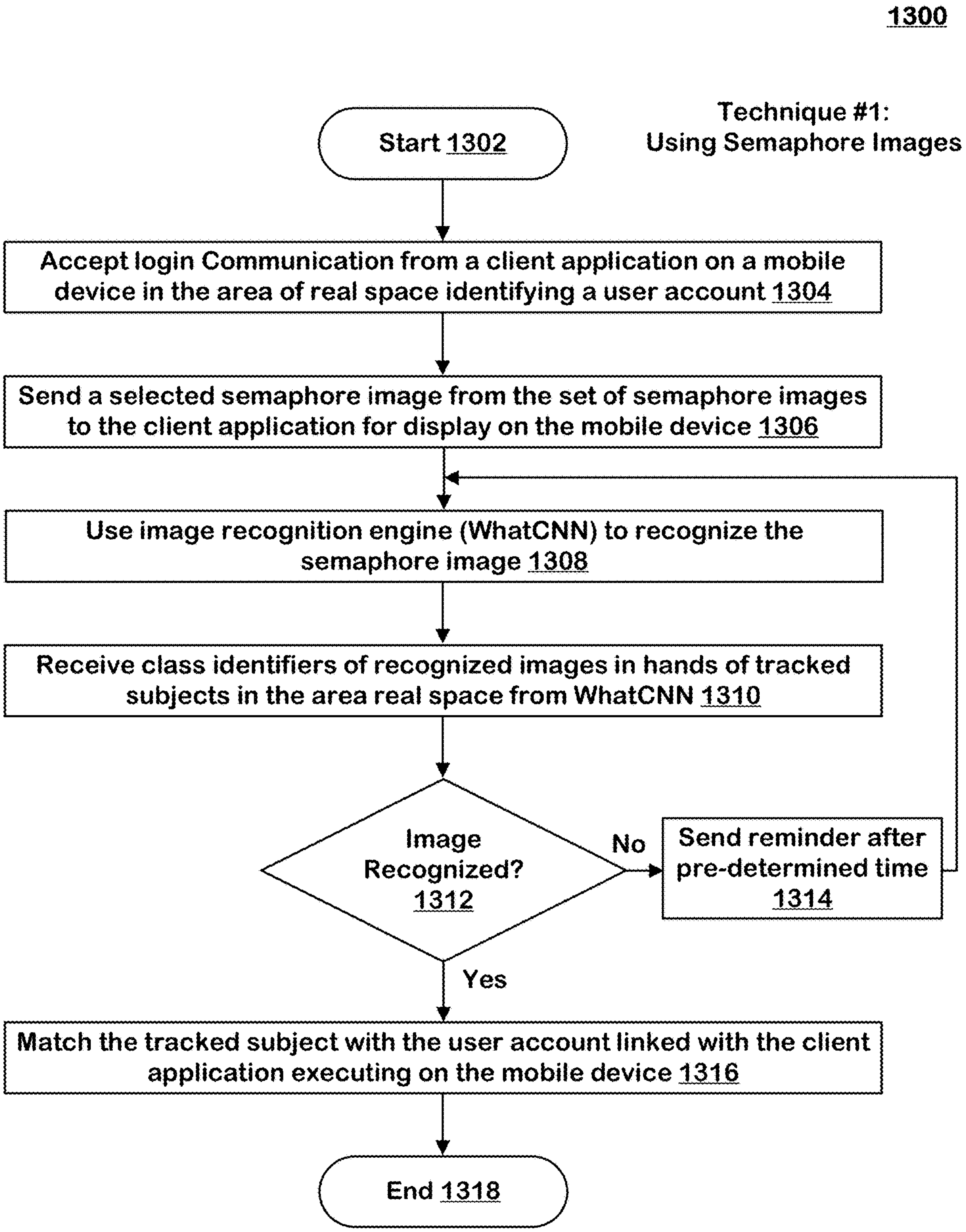
FIG. 13 is a flowchart showing operations for identifying a subject by matching the tracked subject to a user account using a semaphore image displayed on a mobile computing device.

FIG. 13 is a flowchart 1300 presenting operations for a first technique to identify subject by matching tracked subjects in the area of real space with their respective user accounts. In the example of a shopping store, the subjects are customers (or shoppers) moving in the store in aisles between shelves and other open spaces. The process starts at operation 1302. As a subject enters the area of real space, the subject opens a client application on a mobile computing device and attempts to login. The system verifies the user credentials at operation 1304 (for example, by querying the user account database 164) and accepts login communication from the client application to associate an authenticated user account with the mobile computing device. The system determines that the user account of the client application is not yet linked to a tracked subject. The system sends a semaphore image to the client application for display on the mobile computing device at operation 1306. Examples of semaphore images include various shapes of solid colors such as a red rectangle or a pink elephant, etc. A variety of images can be used as semaphores, preferably suited for high confidence recognition by the image recognition engine. Each semaphore image can have a unique identifier. The processing system includes logic to accept login communications from a client application on a mobile device identifying a user account before matching the user account to a tracked subject in the area of real space, and after accepting login communications sends a selected semaphore image from the set of semaphore images to the client application on the mobile device.

In one implementation, the system selects an available semaphore image from the image database 160 for sending to the client application. After sending the semaphore image to the client application, the system changes a status of the semaphore image in the image database 166 as "assigned" so that this image is not assigned to any other client application. The status of the image remains as "assigned" until the process to match the tracked subject to the mobile computing device is complete. After matching is complete, the status can be changed to "available." This allows for rotating use of a small set of semaphores in a given system, simplifying the image recognition problem.

The client application receives the semaphore image and displays it on the mobile computing device. In one implementation, the client application also increases the brightness of the display to increase the image visibility. The image is captured by one or more cameras 114 and sent to an image processing engine, referred to as WhatCNN. The system uses WhatCNN at operation 1308 to recognize the semaphore images displayed on the mobile computing device. In one implementation, WhatCNN is a convolutional neural network trained to process the specified bounding boxes in the images to generate a classification of hands of the tracked subjects. One trained WhatCNN processes image frames from one camera. In the example implementation of the shopping store, for each hand joint in each image frame, the WhatCNN identifies whether the hand joint is empty. The WhatCNN also identifies a semaphore image identifier (in the image database 166) or an SKU (stock keeping unit) number of the inventory item in the hand joint, a confidence value indicating the item in the hand joint is a non-SKU item (i.e., it does not belong to the shopping store inventory) and a context of the hand joint location in the image frame.

As mentioned above, two or more cameras with overlapping fields of view capture images of subjects in real space. Joints of a single subject can appear in image frames of multiple cameras in a respective image channel. A WhatCNN model per camera identifies semaphore images (displayed on mobile computing devices) in hands (represented by hand joints) of subjects. A coordination logic combines the outputs of WhatCNN models into a consolidated data structure listing identifiers of semaphore images in left hand (referred to as left_hand_classid) and right hand (right_hand_classid) of tracked subjects (operation 1310). The system stores this information in a dictionary mapping tracking_id to left_hand_classid and right_hand_classid along with a timestamp, including locations of the joints in real space. The details of WhatCNN are presented in U.S. patent application Ser. No. 15/907,112, entitled. "Item Put and Take Detection Using Image Recognition." filed on 27 Feb. 2018, now issued as U.S. Pat. No. 10,133,933 which is fully incorporated into this application by reference.

At step 1312, the system checks if the semaphore image sent to the client application is recognized by the WhatCNN by iterating the output of the WhatCNN models for both hands of all tracked subjects. If the semaphore image is not recognized, the system sends a reminder at operation 1314 to the client application to display the semaphore image on the mobile computing device and repeats operations 1308 to 1312. Otherwise, if the semaphore image is recognized by WhatCNN, the system matches a user_account (from the user account database 164) associated with the client application to tracking_id (from the subject database 150) of the tracked subject holding the mobile computing device (operation 1316). In one implementation, the system maintains this mapping (tracking_id-user_account) until the subject is present in the area of real space. In one implementation, the system assigns a unique subject identifier (e.g., referred to by subject_id) to the identified subject and stores a mapping of the subject identifier to the tuple tracking_id-user_account. The process ends at operation 1318.

Service Location

Figure 14:
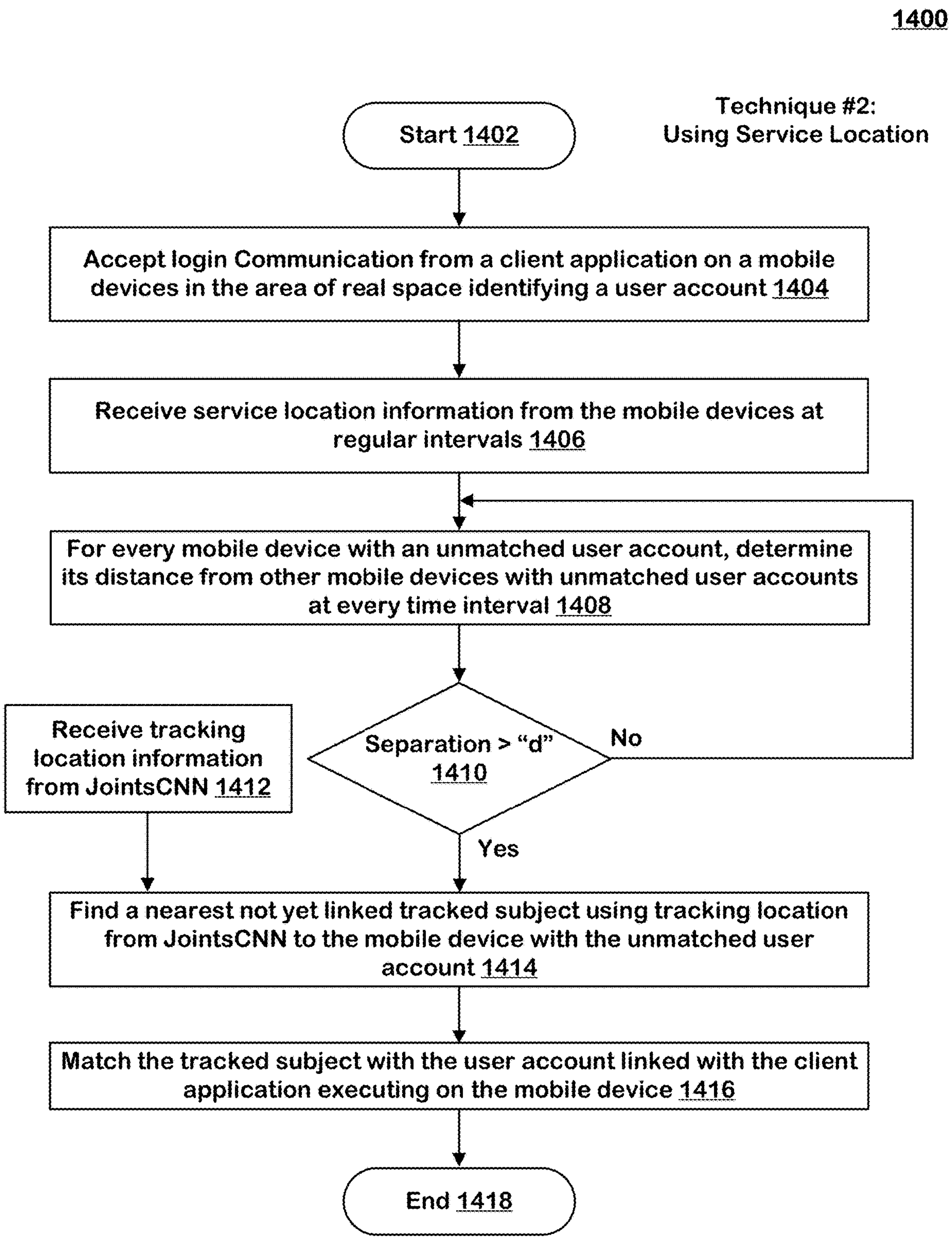
FIG. 14 is a flowchart showing operations for identifying a subject by matching a tracked subject to a user account using service location of a mobile computing device.

The flowchart 1400 in FIG. 14 presents operations for a second technique for identifying subjects by matching tracked subjects with user accounts. This technique uses radio signals emitted by the mobile devices indicating location of the mobile devices. The process starts at operation 1402, the system accepts login communication from a client application on a mobile computing device as described above in operation 1404 to link an authenticated user account to the mobile computing device. At operation 1406, the system receives service location information from the mobile devices in the area of real space at regular intervals. In one implementation, latitude and longitude coordinates of the mobile computing device emitted from a global positioning system (GPS) receiver of the mobile computing device are used by the system to determine the location. In one implementation, the service location of the mobile computing device obtained from GPS coordinates has an accuracy between 1 to 3 meters. In another implementation, the service location of a mobile computing device obtained from GPS coordinates has an accuracy between 1 to 5 meters.

Other techniques can be used in combination with the above technique or independently to determine the service location of the mobile computing device. Examples of such techniques include using signal strengths from different wireless access points (WAP) such as 250 and 252 shown in FIGS. 11 and 12 as an indication of how far the mobile computing device is from respective access points. The system then uses known locations of wireless access points (WAP) 250 and 252 to triangulate and determine the position of the mobile computing device in the area of real space. Other types of signals (such as Bluetooth, ultra-wideband, and ZigBee) emitted by the mobile computing devices can also be used to determine a service location of the mobile computing device.

Many implementations of the technology disclosed include further configuring the system to identify the location of a subject using ultra-wideband (UWB) communication. The usage of UWB-based techniques for matching identified subjects with subject accounts can rely on UWB signals emitted by, for example, the mobile devices indicating the service location. In one example implementation, the UWB-based location tracking process includes the system accepting login communication from a client application on a mobile computing device to link an authenticated subject account to the mobile computing device, followed by the system receiving service location information from the mobile computer device in the area of real space at regular intervals. The latitude and longitude coordinates of the mobile computing device emitted from a global positioning system (GPS) receiver of the mobile computing device can also be used in combination with the UWB signals emitted by the mobile computing device to determine the location of the mobile computing device. Other techniques (e.g., Bluetooth, 5G, and ZigBee) can also be used in combination with the UWB-based technique, or independently, to determine the service location of the mobile computing device.

UWB communication protocol is an IEEE 802.15.4a/z standard technology optimized for secure microlocation-based applications. UWB enabled distance and location can be calculated on a centimeter-scale by measuring the time it takes radio signals to travel between devices. Additionally, the wide bandwidth of UWB further enables robust and an immune resistance to various alternative forms of signal interference and UWB protocols are capable of supporting a large number of connected devices. Hence, the implementation of an UWB-based technique for matching identified subjects with subject accounts can be advantageous for tracking a plurality of subject devices within a crowded space or separate, adjacent spaces. In particular, tracking of a subject that is located near the boundary separating two adjacent tracking spaces (e.g., the entrance region of a convenience store located directly next to a fueling station) can be performed with higher accuracy when employing UWB-based location tracking, particularly when the area is crowded by many subjects.

UWB communication protocols are based upon the time-of-flight (ToF) computed for signals used to calculate the distance between devices. UWB has high time resolution and low latency, enabling the use of real-time location tracking, further increasing the accuracy with which the system can track a subject moving from one tracking zone to another. Unlike other radio signal technologies, UWB does not use amplitude or frequency modulation to encode the information that signals carry; rather, UWB uses short sequences of narrow pulses (e.g., via binary phase-shift keying (BPSK) and/or burst position modulation (BPM)) to encode data. Techniques such as BPSK and/or BPM enable UWB-based location tracking methods to calculate precise distance estimates in enclosed environments in which multipath reflections are widespread. In practice, this allows UWB to be robust to environments comprising multiple physical barriers or partitions. For areas of real space that are divided into tracking areas corresponding to physical barriers, such as separate aisles, an outdoor fueling station separate from an enclosed convenience store, or an isolated walk-in cooler, it is advantageous to use a location tracking method that does not lose accuracy as a result of these physical barriers.

It is to be understood that the technology disclosed can leverage a plurality of UWB protocols, including (but not limited to) two-way ranging with one or multiple anchors, time-difference of arrival computation, reverse time-difference of arrival computation, phase difference of arrival, and so on.

The system monitors the service locations of mobile devices with client applications that are not yet linked to a tracked subject at operation 1408 at regular intervals such as every second. At operation 1408, the system determines the distance of a mobile computing device with an unmatched user account from all other mobile computing devices with unmatched user accounts. The system compares this distance with a pre-determined threshold distance "d" such as 3 meters. If the mobile computing device is away from all other mobile devices with unmatched user accounts by at least "d" distance (operation 1410), the system determines a nearest not yet linked subject to the mobile computing device (operation 1414). The location of the tracked subject is obtained from the output of the JointsCNN at operation 1412. In one implementation the location of the subject obtained from the JointsCNN is more accurate than the service location of the mobile computing device. At operation 1416, the system performs the same process as described above in flowchart 1300 to match the tracking_id of the tracked subject with the user_account of the client application. The process ends at operation 1418.

No biometric identifying information is used for matching the tracked subject with the user account, and none is stored in support of this process. That is, there is no information in the sequences of images used to compare with stored biometric information for the purposes of matching the tracked subjects with user account in support of this process. Thus, this logic to match the tracked subjects with user accounts operates without use of personal identifying biometric information associated with the user accounts.

Speed and Orientation

Figure 15:
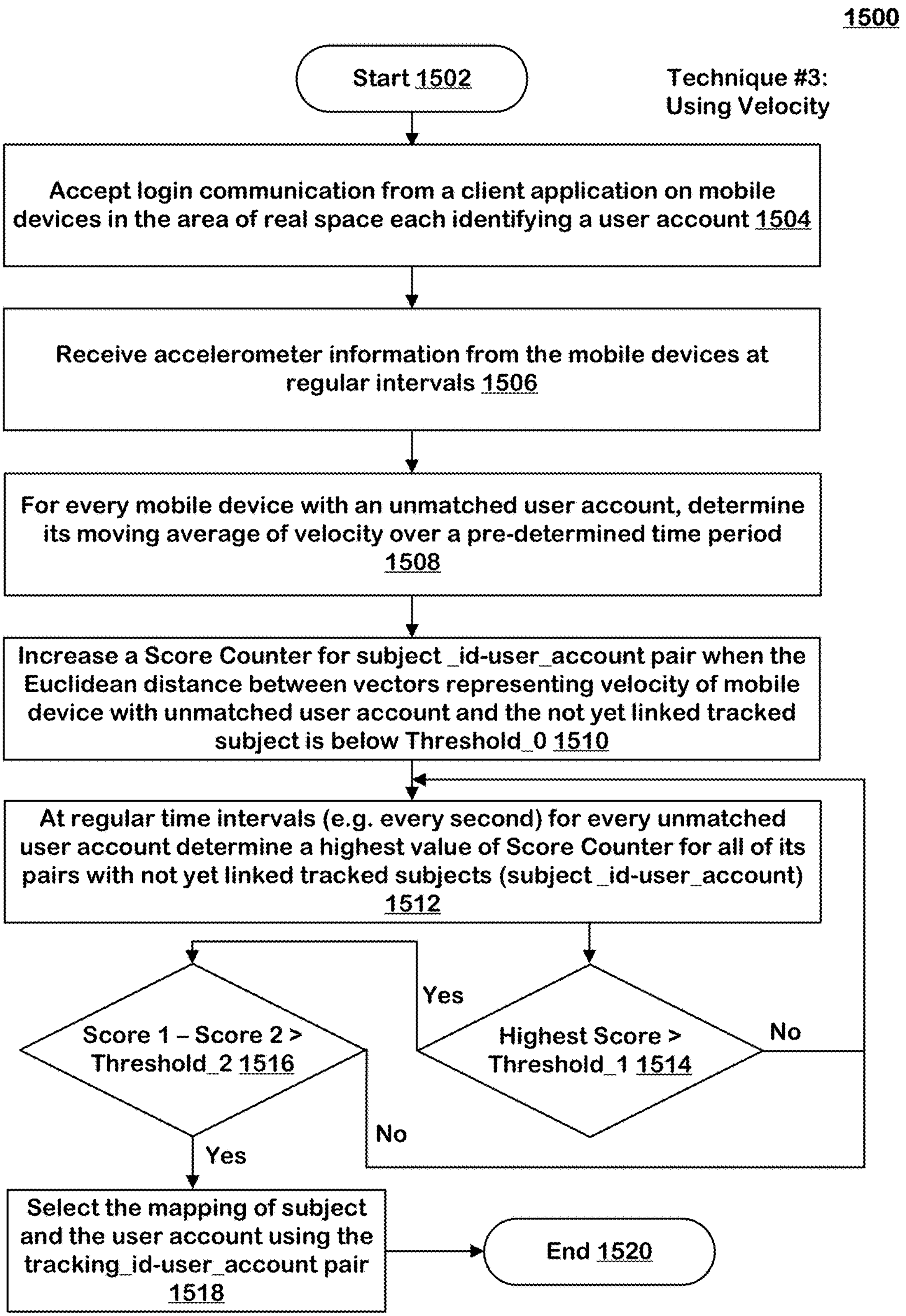
FIG. 15 is a flowchart showing operations for identifying a subject by matching a tracked subject to a user account using velocity of subjects and a mobile computing device.

The flowchart 1500 in FIG. 15 presents operations for a third technique to identify subject by matching tracked subjects with user accounts. This technique uses signals emitted by an accelerometer of the mobile computing devices to match tracked subjects with client applications. The process starts at operation 1502. The process starts at operation 1504 to accept login communication from the client application as described above in the first and second techniques. At operation 1506, the system receives signals emitted from the mobile computing devices carrying data from accelerometers on the mobile computing devices in the area of real space, which can be sent at regular intervals. At operation 1508, the system calculates an average velocity of all mobile computing devices with unmatched user accounts.

The accelerometers provide acceleration of mobile computing devices along the three axes (x, y, z). In one implementation, the velocity is calculated by taking the accelerations values at small time intervals (e.g., at every 10 milliseconds) to calculate the current velocity at time "t" i.e., $v_t=v_0+a_t$, where $v_0$ is initial velocity. In one implementation, the $v_0$ is initialized as "0" and subsequently, for every time t+1, $v_t$ becomes $v_0$. The velocities along the three axes are then combined to determine an overall velocity of the mobile computing device at time "t." Finally at operation 1508, the system calculates moving averages of velocities of all mobile computing devices over a larger period of time such as 3 seconds which is long enough for the walking gait of an average person, or over longer periods of time.

At operation 1510, the system calculates Euclidean distance (also referred to as L2 norm) between velocities of all pairs of mobile computing devices with unmatched client applications to not yet linked tracked subjects. The velocities of subjects are derived from changes in positions of their joints with respect to time, obtained from joints analysis and stored in respective subject data structures 320 with timestamps. In one implementation, a location of center of mass of each subject is determined using the joints analysis. The velocity, or other derivative, of the center of mass location data of the subject is used for comparison with velocities of mobile computing devices. For each tracking_id-user_account pair, if the value of the Euclidean distance between their respective velocities is less than a threshold_0, a score_counter for the tracking_id-user_account pair is incremented. The above process is performed at regular time intervals, thus updating the score_counter for each tracking_id-user_account pair.

At regular time intervals (e.g., every one second), the system compares the score_counter values for pairs of every unmatched user account with every not yet linked tracked subject (operation 1512). If the highest score is greater than threshold_1 (operation 1514), the system calculates the difference between the highest score and the second highest score (for pair of same user account with a different subject) at operation 1516. If the difference is greater than threshold_2, the system selects the mapping of user_account to the tracked subject at operation 1518 and follows the same process as described above in operation 1516. The process ends at operation 1520.

In another implementation, when JointsCNN recognizes a hand holding a mobile computing device, the velocity of the hand (of the tracked subject) holding the mobile computing device is used in above process instead of using the velocity of the center of mass of the subject. This improves performance of the matching algorithm. To determine values of the thresholds (threshold_0, threshold_1, threshold_2), the system uses training data with labels assigned to the images. During training, various combinations of the threshold values are used and the output of the algorithm is matched with ground truth labels of images to determine its performance. The values of thresholds that result in best overall assignment accuracy are selected for use in production (or inference).

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Network Ensemble

Figure 16A:
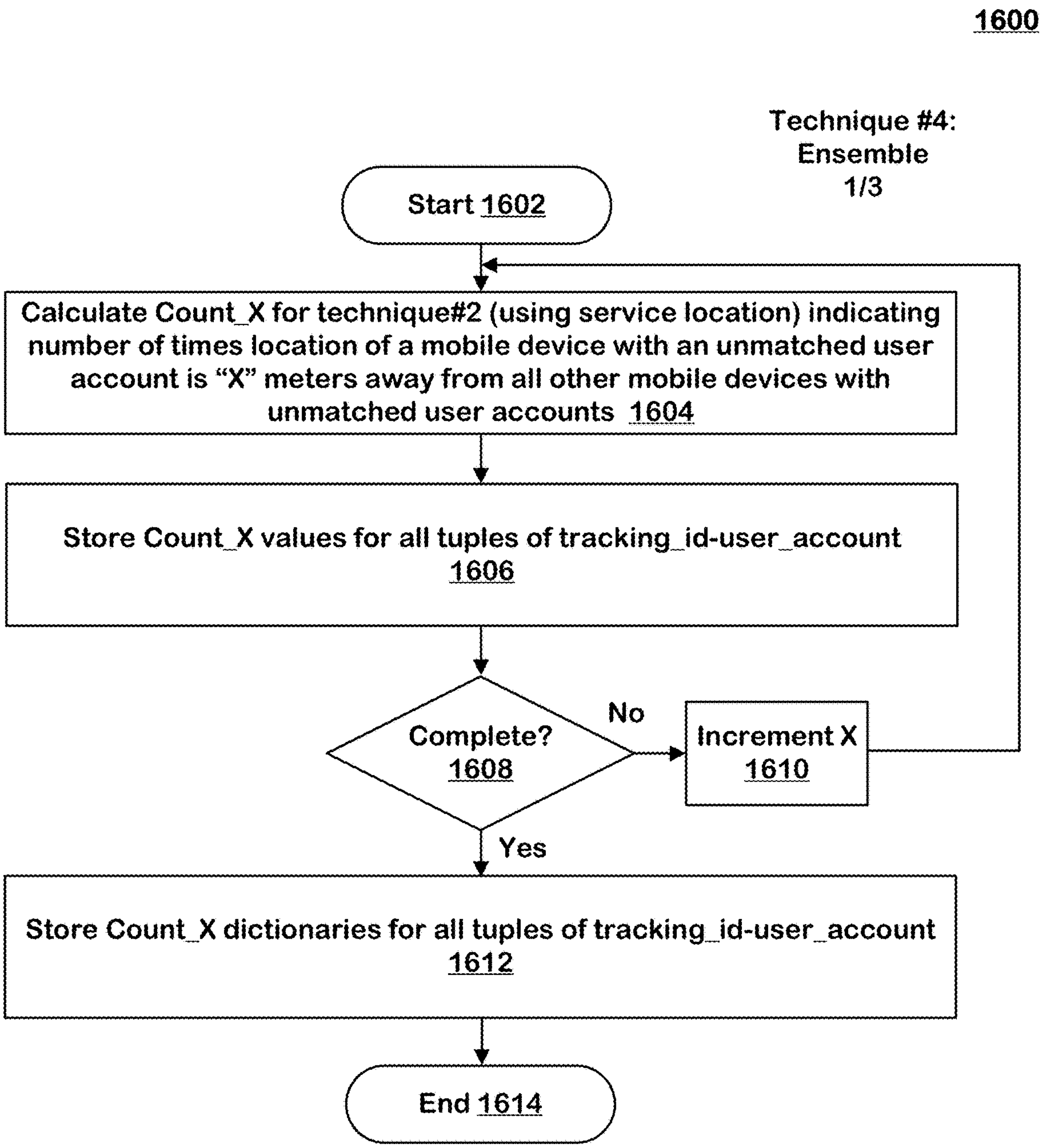
FIG. 16A is a flowchart showing a first part of operations for matching a tracked subject to a user account using a network ensemble.
Figure 16B:
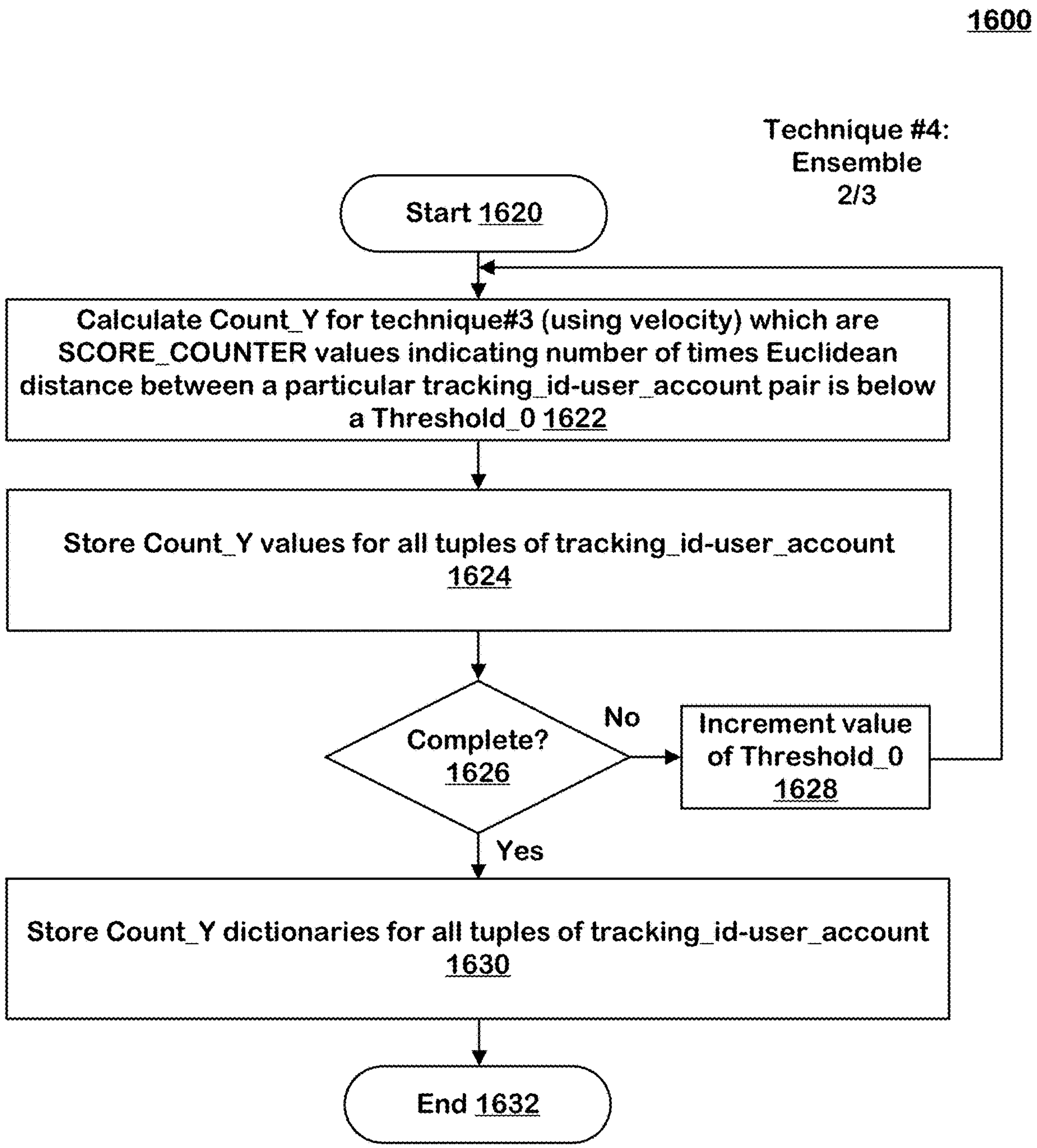
FIG. 16B is a flowchart showing a second part of operations for matching a tracked subject to a user account using a network ensemble.
Figure 16C:
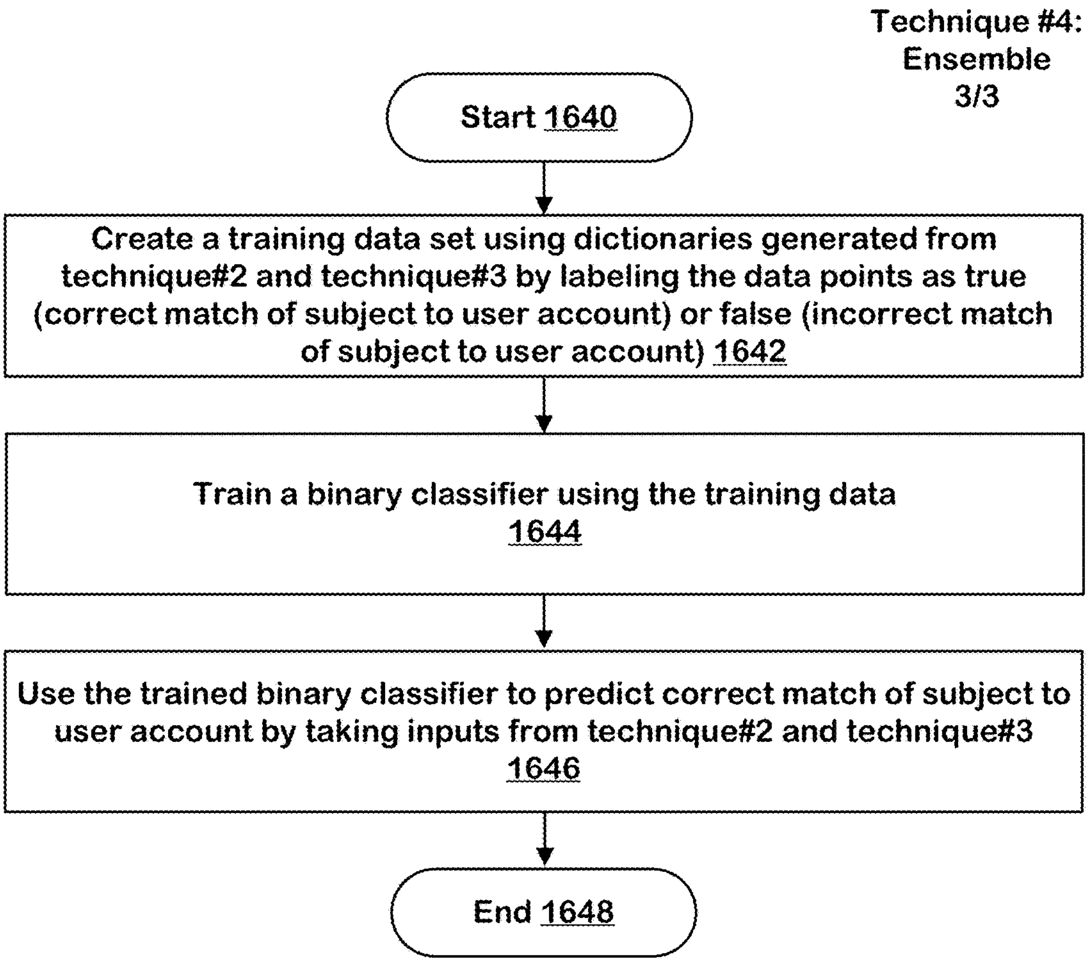
FIG. 16C is a flowchart showing a third part of operations for matching a tracked subject to a user account using a network ensemble.

A network ensemble is a learning paradigm where many networks are jointly used to solve a problem. Ensembles typically improve the prediction accuracy obtained from a single classifier by a factor that validates the effort and cost associated with learning multiple models. In the fourth technique to match user accounts to not yet linked tracked subjects, the second and third techniques presented above are jointly used in an ensemble (or network ensemble). To use the two techniques in an ensemble, relevant features are extracted from application of the two techniques. FIGS. 16A-16C present operations (in a flowchart 1600) for extracting features, training the ensemble and using the trained ensemble to predict match of a user account to a not yet linked tracked subject.

FIG. 16A presents the operations for generating features using the second technique that uses service location of mobile computing devices. The process starts at operation 1602. At operation 1604, a Count_X, for the second technique is calculated indicating a number of times a service location of a mobile computing device with an unmatched user account is X meters away from all other mobile computing devices with unmatched user accounts. At operation 1606, Count_X values of all tuples of tracking_id-user_account pairs is stored by the system for use by the ensemble. In one implementation, multiple values of X are used e.g., 1 m. 2 m, 3 m, 4 m, 5 m (operations 1608 and 1610). For each value of X, the count is stored as a dictionary that maps tuples of tracking_id-user_account to count score, which is an integer. In the example where 5 values of X are used, five such dictionaries are created at operation 1612. The process ends at operation 1614.

FIG. 16B presents the operations for generating features using the third technique that uses velocities of mobile computing devices. The process starts at operation 1620. At operation 1622, a Count_Y, for the third technique is determined which is equal to score_counter values indicating number of times Euclidean distance between a particular tracking_id-user_account pair is below a threshold_0. At operation 1624, Count_Y values of all tuples of tracking_id-user_account pairs is stored by the system for use by the ensemble. In one implementation, multiple values of threshold_0 are used e.g., five different values (operations 1626 and 1628). For each value of threshold_0, the Count_Y is stored as a dictionary that maps tuples of tracking_id-user_account to count score, which is an integer. In the example where 5 values of threshold are used, five such dictionaries are created at operation 1630. The process ends at operation 1632.

The features from the second and third techniques are then used to create a labeled training data set and used to train the network ensemble. To collect such a data set, multiple subjects (shoppers) walk in an area of real space such as a shopping store. The images of these subject are collected using cameras 114 at regular time intervals. Human labelers review the images and assign correct identifiers (tracking_id and user_account) to the images in the training data. The process is described in a flowchart 1600 presented in FIG. 16C. The process starts at operation 1640. At operation 1642, features in the form of Count_X and Count_Y dictionaries obtained from second and third techniques are compared with corresponding true labels assigned by the human labelers on the images to identify correct matches (true) and incorrect matches (false) of tracking_id and user_account.

As there are only two categories of outcome for each mapping of tracking_id and user_account: true or false, a binary classifier is trained using this training data set (operation 1644). Commonly used methods for binary classification include decision trees, random forest, neural networks, gradient boost, support vector machines, etc. A trained binary classifier is used to categorize new probabilistic observations as true or false. The trained binary classifier is used in production (or inference) by giving as input Count_X and Count_Y dictionaries for tracking_id-user_account tuples. The trained binary classifier classifies each tuple as true or false at operation 1646. The process ends at operation 1648.

If there is an unmatched mobile computing device in the area of real space after application of the above four techniques, the system sends a notification to the mobile computing device to open the client application. If the user accepts the notification, the client application will display a semaphore image as described in the first technique. The system will then follow the steps in the first technique to check-in the shopper (match tracking_id to user_account). If the customer does not respond to the notification, the system will send a notification to an employee in the shopping store indicating the location of the unmatched customer. The employee can then walk to the customer, ask him to open the client application on his mobile computing device to check-in to the system using a semaphore image.

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Architecture

Figure 17:
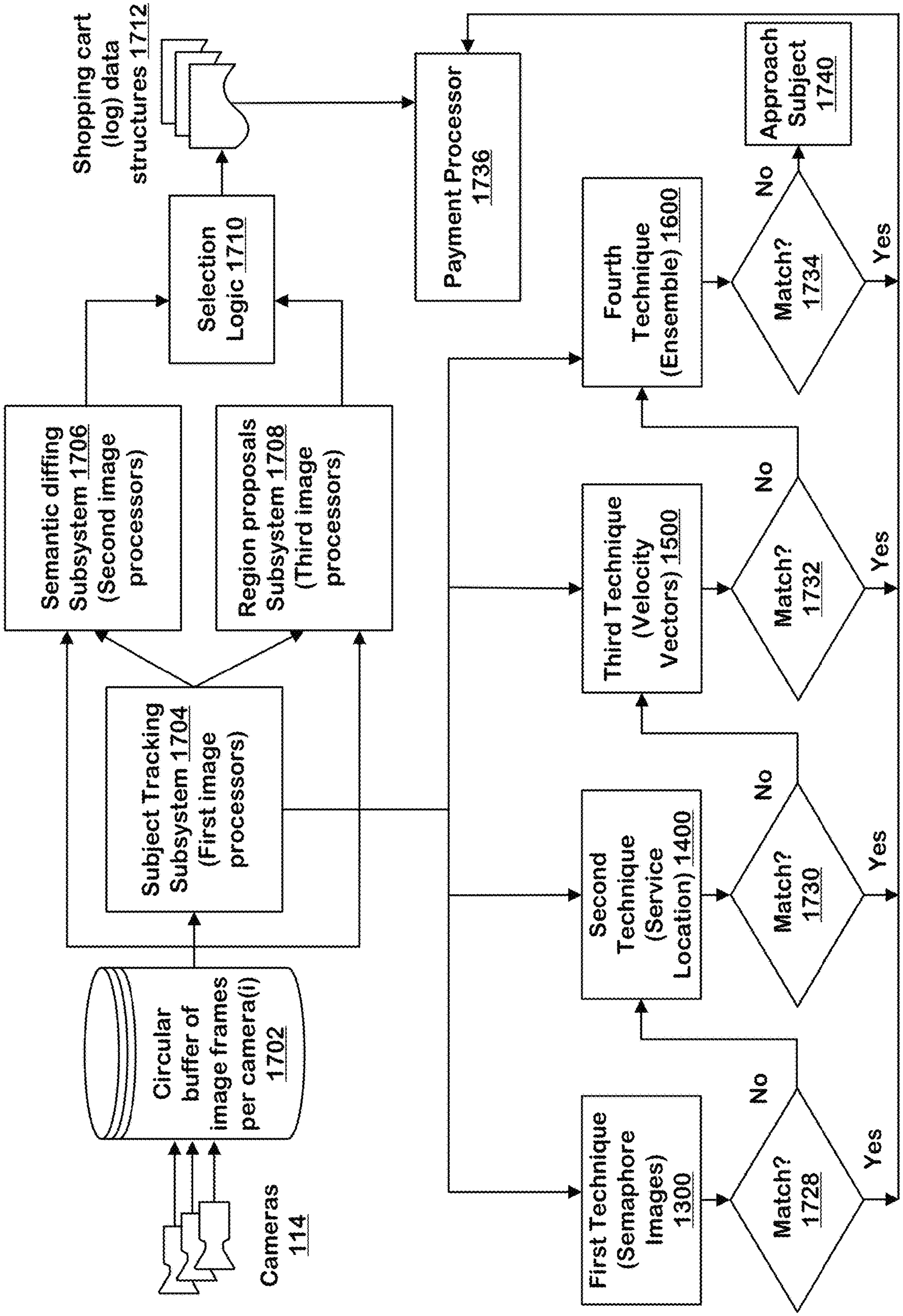
FIG. 17 is an example architecture in which the four techniques presented in FIGS. 13 to 16C are applied in an area of real space to reliably match a tracked subject to a user account.

An example architecture of a system in which the four techniques presented above are applied to identify subjects by matching a user_account to a not yet linked tracked subject in an area of real space is presented in FIG. 17. Because FIG. 17 is an architectural diagram, certain details are omitted to improve the clarity of description. The system presented in FIG. 17 receives image frames from a plurality of cameras 114. As described above, in one implementation, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space. The images are stored in a circular buffer of image frames per camera 1702.

A "subject tracking" subsystem 1704 (also referred to as first image processors) processes image frames received from cameras 114 to locate and track subjects in the real space. The first image processors include subject image recognition engines such as the JointsCNN above.

A "semantic diffing" subsystem 1706 (also referred to as second image processors) includes background image recognition engines, which receive corresponding sequences of images from the plurality of cameras and recognize semantically significant differences in the background (i.e. inventory display structures like shelves) as they relate to puts and takes of inventory items, for example, over time in the images from each camera. The second image processors receive output of the subject tracking subsystem 1704 and image frames from cameras 114 as input. Details of "semantic diffing" subsystem are presented in U.S. patent application Ser. No. 15/945,466, entitled, "Predicting Inventory Events using Semantic Diffing." filed on 4 Apr. 2018, now issued as U.S. Pat. No. 10,127,438, and U.S. patent application Ser. No. 15/945,473, entitled, "Predicting Inventory Events using Foreground/Background Processing," filed on 4 Apr. 2018, now issued as U.S. Pat. No. 10,474,988, both of which are fully incorporated into this application by reference. The second image processors process identified background changes to make a first set of detections of takes of inventory items by tracked subjects and of puts of inventory items on inventory display structures by tracked subjects. The first set of detections are also referred to as background detections of puts and takes of inventory items. In the example of a shopping store, the first detections identify inventory items taken from the shelves or put on the shelves by customers or employees of the store. The semantic diffing subsystem includes the logic to associate identified background changes with tracked subjects.

A "region proposals" subsystem 1708 (also referred to as third image processors) includes foreground image recognition engines, receives corresponding sequences of images from the plurality of cameras 114, and recognizes semantically significant objects in the foreground (i.e. shoppers, their hands and inventory items) as they relate to puts and takes of inventory items, for example, over time in the images from each camera. The region proposals subsystem 1708 also receives output of the subject tracking subsystem 1704. The third image processors process sequences of images from cameras 114 to identify and classify foreground changes represented in the images in the corresponding sequences of images. The third image processors process identified foreground changes to make a second set of detections of takes of inventory items by tracked subjects and of puts of inventory items on inventory display structures by tracked subjects. The second set of detections are also referred to as foreground detection of puts and takes of inventory items. In the example of a shopping store, the second set of detections identifies takes of inventory items and puts of inventory items on inventory display structures by customers and employees of the store. The details of a region proposal subsystem are presented in U.S. patent application Ser. No. 15/907,112, entitled, "Item Put and Take Detection Using Image Recognition," filed on 27 Feb. 2018, now issued as U.S. Pat. No. 10,133,933, which is fully incorporated into this application by reference.

The system described in FIG. 17 includes a selection logic 1710 to process the first and second sets of detections to generate log data structures including lists of inventory items for tracked subjects. For a take or put in the real space, the selection logic 1710 selects the output from either the semantic diffing subsystem 1706 or the region proposals subsystem 1708. In one implementation, the selection logic 1710 uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 1712 (also referred to as a shopping cart data structure) including a list of inventory items (and their quantities) associated with tracked subjects.

To process a payment for the items in the log data structure 1712, the system in FIG. 17 applies the four techniques for matching the tracked subject (associated with the log data) to a user_account which includes a payment method such as credit card or bank account information. In one implementation, the four techniques are applied sequentially as shown in the figure. If the operations in flowchart 1300 for the first technique produces a match between the subject and the user account then this information is used by a payment processor 1736 to charge the customer for the inventory items in the log data structure. Otherwise (operation 1728), the operations presented in flowchart 1400 for the second technique are followed and the user account is used by the payment processor 1736. If the second technique is unable to match the user account with a subject (1730) then the operations presented in flowchart 1500 for the third technique are followed. If the third technique is unable to match the user account with a subject (1732) then the operations in flowchart 1600 for the fourth technique are followed to match the user account with a subject.

If the fourth technique is unable to match the user account with a subject (1734), the system sends a notification to the mobile computing device to open the client application and follow the operations presented in the flowchart 1300 for the first technique. If the customer does not respond to the notification, the system will send a notification to an employee in the shopping store indicating the location of the unmatched customer. The employee can then walk to the customer, ask him to open the client application on his mobile computing device to check-in to the system using a semaphore image (step 1740). It is understood that in other implementations of the architecture presented in FIG. 17, fewer than four techniques can be used to match the user accounts to not yet linked tracked subjects.

Subject Re-Identification Process

Figure 18:
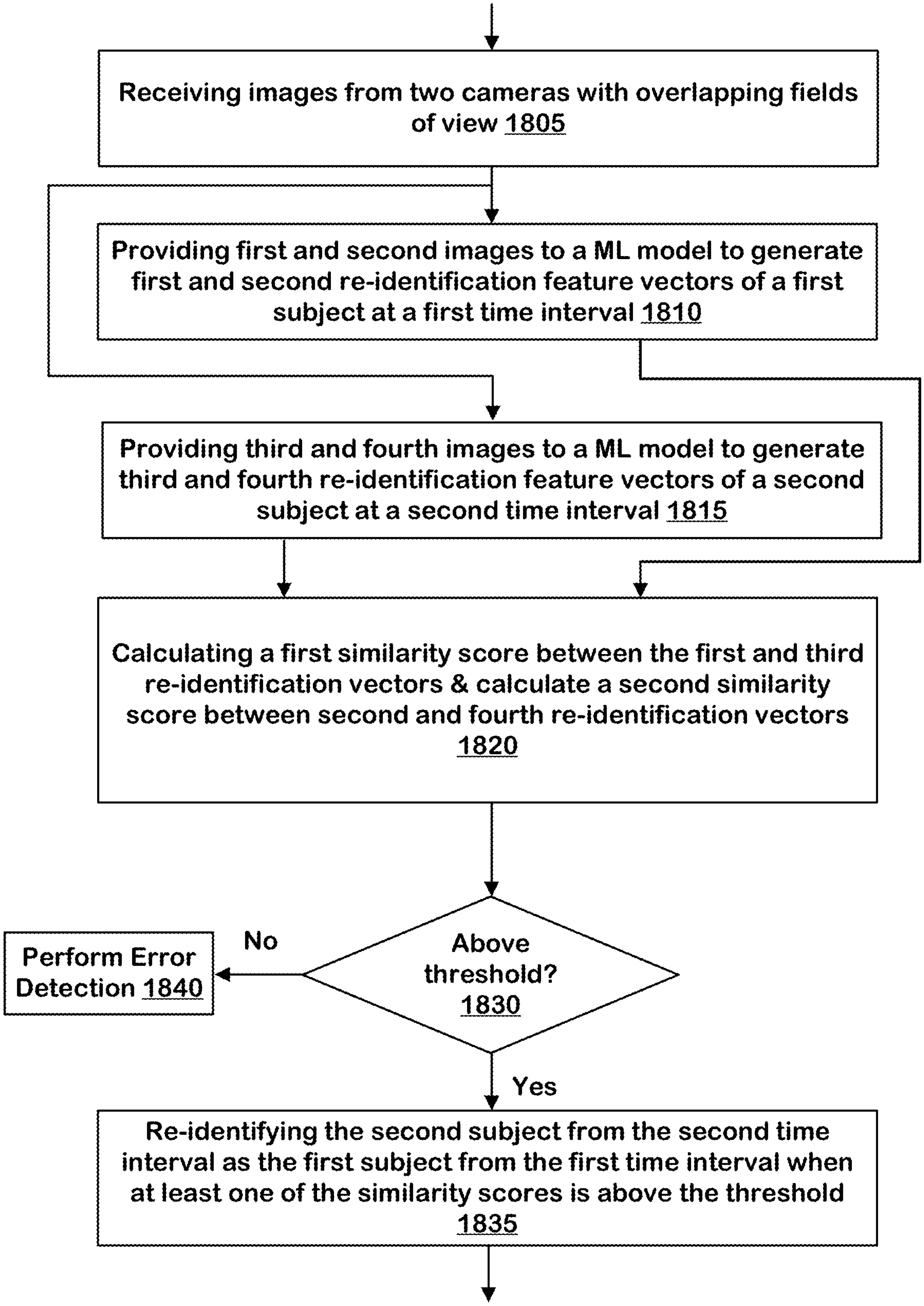
FIG. 18 is a flowchart presenting operations for calculating similarity scores for re-identifying a subject.

FIG. 18 presents a flowchart including operations to re-identify a subject in a second time interval by calculating similarity scores. The operations can be implemented by the network node 105 hosting the subject re-identification engine 190. The process starts at operation 1805 at which the network node 105 receives first and second sequences of images of corresponding fields of view in the area of real space. Two or more cameras 114 or sensors can be used to collect images of the area of real space. The cameras 114 can have overlapping fields of view.

The subject re-identification engine 190 includes logic to generate first and second re-identification feature vectors of a first subject identified from a first time interval (operation 1810). The first and second reidentification feature vectors are generated respectively from the first and second images of the subject captured respectively from first and second cameras with overlapping fields of view at the first time interval. If more cameras or sensors are used to capture the images of the subject, then more re-identification feature vectors are generated accordingly. The technology disclosed includes logic to provide the images of the subjects at the first time interval to a trained machine learning model to generate re-identification feature vectors.

The subject re-identification engine 190 includes logic to generate third and fourth re-identification feature vectors of a second subject identified from a second time interval (operation 1815). The third and fourth reidentification feature vectors are generated respectively from the third and fourth images of the subject captured respectively from the first and second cameras with overlapping fields of view at the second time interval. If more cameras or sensors are used to capture the images of the subject, then more re-identification feature vectors are generated accordingly. The technology disclosed includes logic to provide the images of the subjects at the second time interval to a trained machine learning model to generate re-identification feature vectors.

In one implementation, the technology disclosed includes logic to detect a pose of a subject in the image captured by a camera. The pose identified from the image can be one of a front pose, a side pose, and/or a back pose etc. The technology disclosed includes logic to place a bounding box around at least a portion of the pose of the identified subject in the image to provide a cropped out image which can be given as input to the machine learning model.

First and second similarity scores are then calculated between the first and the third re-identification feature vectors and the second and the fourth re-identification feature vectors, respectively (operation 1820). The technology disclosed can use different types of measures to represent the similarity between respective re-identification vectors. In one implementation, the technology disclosed can use a cosine similarity measure for representing the first similarity score and the second similarity score. Other types of similarity scores or similarity distance measures can be used such as Euclidean distance, etc.

The first and second similarity scores are compared to a threshold (operation 1830). The second subject from the second time interval is re-identified as the first subject from the first time interval when at least one of the first similarity score and the second similarity score is above a pre-defined threshold. A higher value of a similarity score between two re-identification feature vectors indicates the re-identification feature vectors are similar to each other. This means that there is a high probability that the two re-identification feature vectors represent the same subject from two different time intervals.

A similarity score higher than the threshold indicates that the second subject identified in the second time interval is the same as the first subject identified in the first time interval (operation 1835). The subject re-identification engine 190 can then re-identify the second subject as the first subject and assign the unique identifier and other attributes of the first subject to the subject that was previously identified as the second subject, but is actually the first subject. In one implementation, an average of the first similarity score and the second similarity score is calculated at operation step 1835. The subject re-identification engine 190 re-identifies the second subject identified from the second time interval as the first subject identified from the first time interval when the average similarity score is above the pre-defined threshold. If there are more than two cameras (e.g., X number of cameras), then there can be X number of similarity scores. An average of all of the X number of similarity scores can be used to determine whether or not the threshold is satisfied.

More than one subject can be present within the field of view of the at least two cameras in the area of real space in any given time interval, e.g., up to ten or more subjects can be present within the field of view of at least two cameras in any given time interval. Consider that a third subject is present in the images captured by the at least two cameras in the first time interval. The subject re-identification engine 190 can generate fifth and sixth re-identification feature vectors of the third subject identified from the first time interval by performing operations including providing the fifth and sixth images of the third subject from the respective first and second sequences of images and as obtained from the first time interval, to the trained machine learning model to produce respective fifth and sixth re-identification feature vectors. The subject re-identification engine 190 can match the second subject identified from the second time interval with the first subject and the third subject identified from the first time interval by calculating (i) a third similarity score between the between the fifth and the third re-identification feature vectors and (ii) a fourth similarity score between the sixth and the fourth re-identification feature vectors. The subject re-identification engine 190 can re-identify the second subject identified from the second time interval as the first subject identified from the first time interval when the third similarity score and the fourth similarity score are below the pre-defined threshold and when at least one of the first similarity score and the second similarity score is above the pre-defined threshold.

When all similarity scores calculated in operation 1820 are below the threshold, the technology disclosed includes logic to detect one or more tracking errors in tracking subjects across a plurality of time intervals (operation 1840). Further details of the tracking errors are provided in the following section.

Error Detection in Subject Tracking

The technology disclosed can detect a variety of errors in tracking subjects across a plurality of time intervals in the area of real space. The subject tracking engine 110 includes logic to track subjects in the area of real space and assign unique tracking identifiers to the subjects in the area of real space for tracking purpose. In some cases, the tracking system can assign incorrect tracking identifiers to subjects in a time interval, i.e., the tracking identifiers can be incorrectly swapped between subjects. The technology disclosed can detect such tracking errors when the similarity score is below the threshold, indicating a potential error in tracking of the subjects. Further, when multiple cameras with overlapping fields of view are used to capture images of a subject, the subject re-identification engine 190 calculates similarity score between re-identification feature vectors corresponding to images from a same camera over two or more time intervals. When multiple similarity scores (based on multiple cameras) are below the threshold, there is a higher probability or chance of an error in tracking of subjects.

In some implementations, the subject re-identification engine 190 can be optimized for error detection using training data examples including masked regions. For example, for a particular time interval during which a subject passes through a region within the area of real space, variations of the time interval data can be generated in which different subregions of the region within the area of real space are masked such that the subject is temporarily not visible to the cameras. Masks may be generated within one camera, some cameras, or all cameras that monitor the region of the area of real space. Training a model with generated masked training data and corresponding unmasked training data is useful in improving the pattern recognition efficacy of the model, even with "gaps" within the data (e.g., a subject leaving a tracking zone and later re-entering the same tracking zone or entering a different tracking zone).

The technology disclosed can detect a variety of errors in tracking of subjects in the area of real space. Some examples of tracking errors that can be detected by the subject re-identification engine 190 are presented below.

Single Swap Error

In a single swap error, a subject from a first time interval is incorrectly matched to another subject in the second time interval. This error can occur when the subject tracking engine 110 incorrectly assigns the tracking identifier (track_ID_X) of the first subject from the first time interval to a second subject in the second time interval. In the single swap error in tracking of subjects, both the first and the second subjects are present in the first and the second time intervals. In some cases, the opposite swap can also occur at the same time. For example, in the opposite swap, the tracking identifier of the second subject (track_ID_Y) is assigned to the first subject in the second time interval. The technology disclosed can detect single swap error in tracking of subjects in the area of real space. Once the error has been identified, it can then be fixed and correct tracking identifiers can be assigned to respective subjects.

Split Error

In a split error in tracking of subjects, a first subject's tracking identifier from a first time interval (track_ID_X) is incorrectly changed to a new tracking identifier (track_ID_Z) in the second time interval. The new tracking identifier (track_ID_Z) was not being tracked by the subject tracking engine 110 in the first time interval, while the old tracking identifier (track_ID_X) is not being tracked by the subject tracking engine 110 in the second time interval. There is no new subject in the second time interval but the tracking system incorrectly generates a new tracking identifier (track_ID_Z) in the second time interval and assigns it to the first subject in the second time interval assuming that the first subject is a new subject detected for the first time in the area of real space in the second time interval.

Enter-Exit Swap Error

Another type of swap error can occur near the entry/exit areas of the area of real space. This is referred to as an enter-exit swap error in which a subject assigned a tracking identifier (track_ID_X) leaves the area of real space in a second time interval. The subject tracking engine 110 incorrectly assigns the same tracking identifier (track_ID_X) to a new subject who enters the area of real space in the second time interval. For example, suppose the subject tracking engine 110 is tracking a first subject in the area of real space and the first subject is present in the area of real space in the first time interval. In a subsequent time interval such as a second time interval, the first subject has exited the area of real space and a second subject has entered the area of real space. The enter-exit swap error can occur when the second subject who has entered the real space in the second time interval is matched to the first subject from the first time interval and assigned the tracking identifier (track_ID_X) of the first subject. The first subject, however, has left the area of real space in the second time interval. The second subject is a new subject who entered the area of real space in the second time interval and was not present in the area of real space in the first time interval. The technology disclosed can detect enter-exit-swap error and thus correct the error in tracking of subjects. Further details of how the subject re-identification engine 190 identifies the tracking error and corrects these errors are presented in the following section. Note that the enter/exit areas can also include areas near doors to restrooms, elevators or other designated unmonitored areas in the shopping store where subjects are not tracked.

Error Detection Process

Figure 19A:
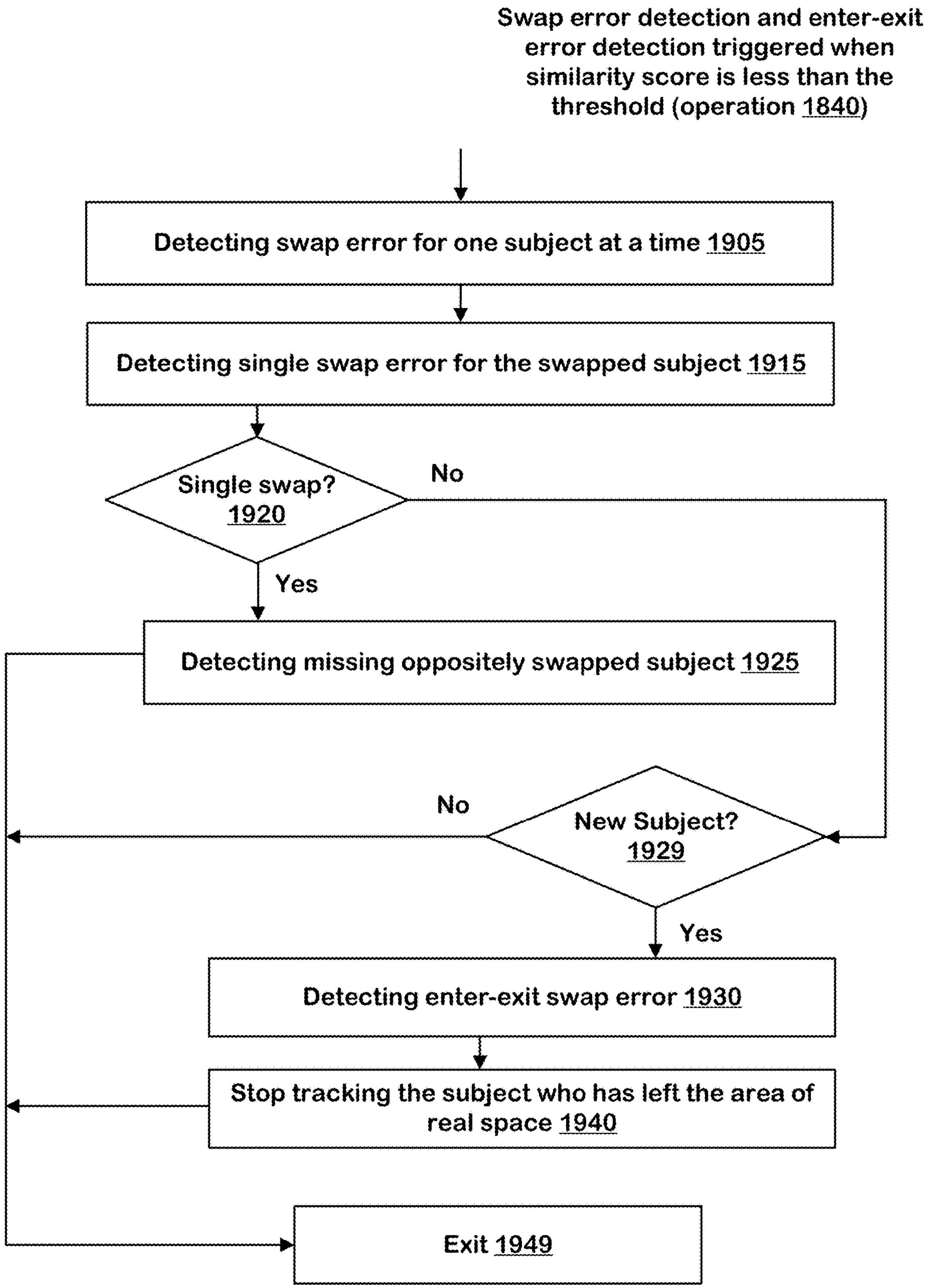
FIG. 19A is a flowchart presenting operations for detecting swap errors and enter-exit errors in tracking of subjects and re-identifying subjects with errors in tracking.

FIG. 19A presents a flowchart illustrating detailed operations for subject tracking error detection. The operations are performed by the technology disclosed to detect various types of errors in tracking of subjects in the area of real space. As shown in flowchart in FIG. 18, the error detection logic for swap errors and enter-exit errors is triggered when the similarity score is below a threshold, e.g., not above the threshold (operation 1840). The flowchart in FIG. 19A presents further details of how these errors in tracking of subjects are detected and resolved by the technology disclosed. The subject tracking engine 110 tracks the subjects as they enter the area of real space. The subject tracking engine 110 assigns tracking identifiers to tracked subjects. Errors can occur in tracking of subjects. Some examples of errors are presented above. The re-identification engine 190 includes logic to detect an error when one or more similarity scores fall below a pre-defined threshold. In one implementation, the error detection logic is triggered when an average similarity score is below a threshold.

Specifically, the error detection process in FIG. 19A presents operations (or sub-operations) that are carried out within the high-level error detection operation 1840 illustrated in FIG. 18. The technology disclosed performs operations 1905 through 1940 to detect swap or enter-exit types of errors in subject tracking. If a swap or an enter-exit type error is detected, the technology disclosed then performs logic to correct the detected subject tracking error.

Figure 19B:
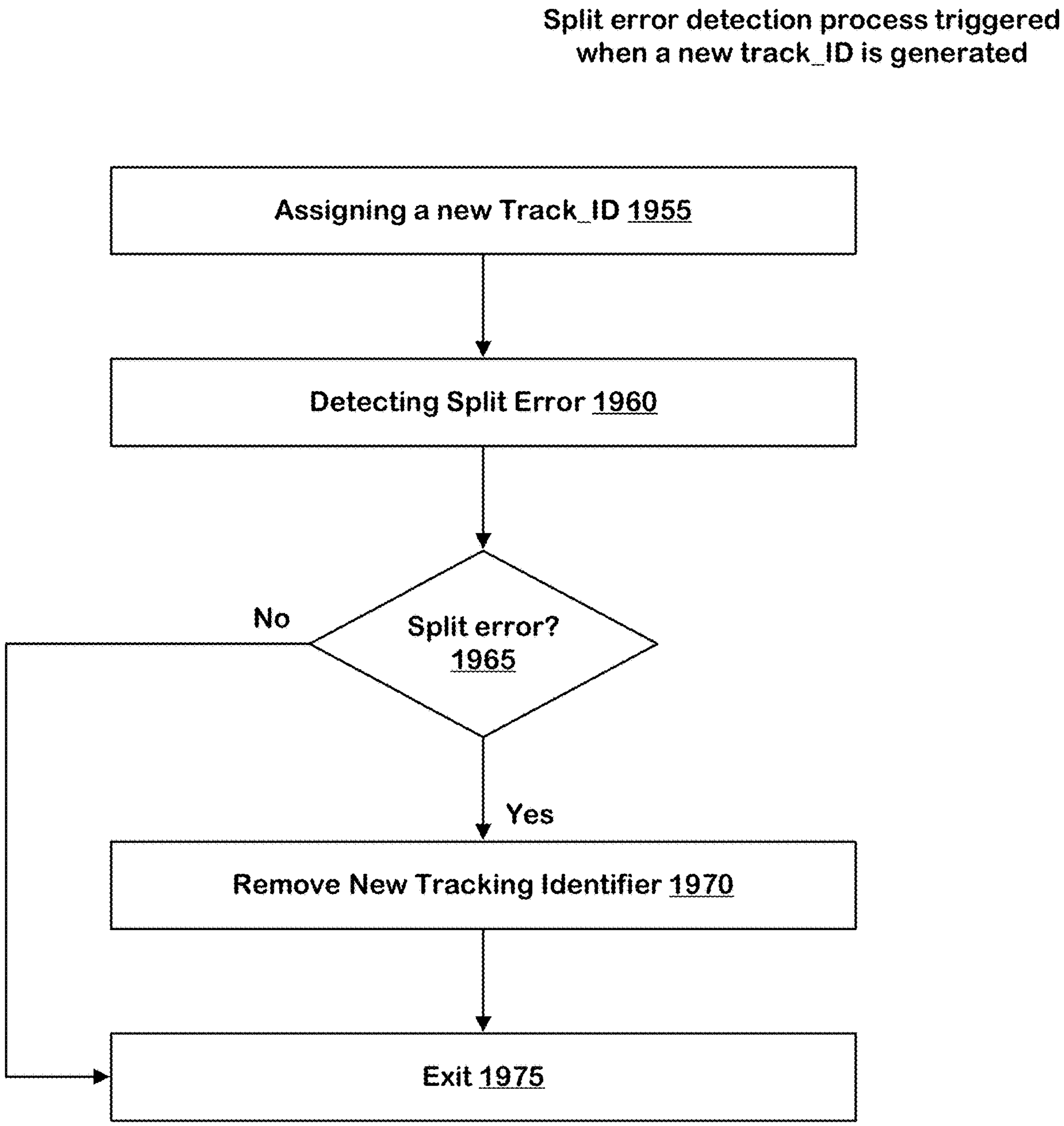
FIG. 19B is a flowchart presenting operations for detecting split errors in tracking of subjects and re-identifying subjects with errors in tracking.

For example, the process flowchart in FIG. 19A presents operations for detecting and correcting (1) swap errors and (2) enter-exit errors. A third type of error in subject tracking is referred to as (3) split errors. The process flowchart in FIG. 19B presents operation for detecting and correcting split type errors. The details of operations in the flowchart in FIG. 19A are presented below.

The operation 1905 in the flowchart in FIG. 19A, includes logic to detect a swap error for a subject in the area of real space. The swap detection can be performed one-by-one for all subjects in the area of real space. The subject tracking engine assigns tracking identifiers to all subjects in the area of real space during all time intervals or at all image frames at which the tracking is performed. The swap error occurs when an incorrect tracking identifier (track_ID) is assigned to a subject. The technology disclosed includes logic to compare the image of each subject in an image frame in a current time interval (or current image cycle) from each camera at any given time interval to all subjects identified in an image captured by the same camera in a previous time interval. The comparison is performed as described in operation steps in FIG. 18, i.e., by producing re-identification feature vectors and calculating similarity scores. An average of similarity scores can be calculated for all similarity scores per camera. If the average similarity score is below a threshold, a swap can be predicted which means that the subject tracking engine 110 has assigned an incorrect track_ID to the subject in the current time interval (or at the current time stamp). The subject re-identification engine 190 generates a set of output data for the swap detected in the current time interval. The output data can include a time stamp for the image frame for which the swap is detected. The output data can also include the time stamp of the previous image frame with which the current frame was compared. The previous image frame can be in one of the earlier time intervals than the current time interval. The output data can include the tracking identifier (track_ID) in the current time interval which is incorrectly assigned to a subject.

The duration of a time interval can be set as a fraction of a second such as one thirtieth (1/30) of a second to a few seconds such as three seconds or more. An image frame can be selected from a time interval at any time stamp. For example, a first, a middle, or a last image frame in a time interval can be selected for evaluation. More than one image frame can also be selected from a time interval. An average of the image frames (such as by taking average of respective pixel intensity values) selected in a time interval can be used for further processing in re-identification of subjects and error detection. In other implementations, comparisons of images from more than one time intervals can be performed for re-identification of subjects and error detection. In the examples presented here, comparisons of single image frames are used in each time interval for re-identification of subjects and detection of tracking errors.

The re-identification engine 190 includes logic to perform the single swap error detection after a swap is detected (operation 1915). Suppose a track_ID with a value "Y" is incorrectly assigned to a subject as detected in operation 1905 at the current time interval or say time interval "t2". The re-identification detection engine 190 compares the feature re-identification vector of the subject with track_ID "Y" at the time interval t2 with feature re-identification vectors of all subjects in a previous time interval "t1". The comparison may not include the subject with a track_ID "Y" in the previous time interval t1 as the system has detected a swap in operation 1905. Similarity scores between feature re-identification vectors of all subjects (all track IDs) in the time interval t1 are then calculated with the feature re-identification vector of the subject with the track_ID "Y" in the current time interval t2. If there are multiple cameras capturing the images of the subjects then the similarity scores for all track IDs in the time interval t1 are calculated with the feature re-identification vector of the subject with track_ID "Y" per camera. In one implementation, the comparisons are performed per camera and similarity scores are calculated per camera. Average similarity scores for each track_ID in all tracks_IDs in the time interval "t1" per camera can be calculated and compared with a threshold. Suppose a subject with a track identifier or track_ID "X" (in time interval "t1") has a highest average similarity score with the subject with the track identifier or track_ID "Y" in time interval "t2". The re-identification engine 190 then matches the subject with the track_ID "X" from time interval t1 with the subject with track_ID "Y" from the time interval t2 and this subject's track_ID is updated to track_ID "X". Therefore, the technology disclosed is able to correct the error in tracking of subjects over multiple time intervals in the area of real space. In one implementation, the operations 1905 and 1915 can be combined into one operation step. If similarity score of no subject in the previous time interval "t1" is greater than the threshold, then the single swap error is not detected (no in operation 1920). This means that no previously existing subject in the previous time interval "t1" matches with the subject in the current time interval "t2". i.e., a new subject has entered the area of real space in the second time interval "t2" and is assigned the track_ID of the existing subject in the previous time interval "t1". Further details of the operations in the "no" branch of operation 1920 are presented after the description of the operations in the "yes" branch of operation 1920 below.

When a single swap of a tracking identifier is detected (yes in operation 1920), the re-identification engine 190 includes logic to detect a subject in time interval "t2" that may not have been assigned any tracking identifier i.e., an oppositely swapped subject that is missing a tracking identifier in time interval "t2" (operation 1925). For example, the subject (say "subject 1") at time interval "t2" is incorrectly assigned track_ID "Y". Referring back to operation 1915, the logic can identify another track_ID "X" which is the correct tracking identifier for this subject. Therefore, the logic of operation 1915 can assign track_ID "X" to subject 1 as opposed to track_ID "Y". It can also happen, in some cases, that track_ID "X" from the first time interval is incorrectly assigned to another subject in the second time interval "t2". In some cases, it can happen that track_ID "X" is not assigned to any subject in the second time interval. Operation 1925 includes logic to detect this scenario and assign a correct tracking identifier to the second subject (say "subject 2") in the second time interval who is missing a tracking identifier.

Table 1 below provides further details of the example in which an oppositely swapped subject is missing a tracking identifier in the second time interval "t2". The correct tracking identifiers of subject 1 and subject 2 are presented in the first column of the table below, which includes the subjects and their tracking identifiers for the first time interval "t1". The correct tracking identifier of subject 1 is track_ID "X" and the correct identifier of subject 2 is "track_ID "Y". In the second time interval "t2" a single swap error results in an assignment of track_ID "Y" to subject 1 as shown in the second column of Table 1 below, which includes the subjects and their tracking identifiers (or lack thereof) for the second time interval "t2". However, it can be seen in the second column that subject 2 (or a subject that we believe to be subject 2) is not assigned any tracking identifier. Therefore, subject 2 is the oppositely swapped subject with a missing tracking identifier (because track_ID "Y" has been swapped away from subject 2). Operation 1925 includes logic to detect this oppositely swapped subject with a missing tracking identifier and assign a correct identifier to this subject. The logic includes determining that a subject is missing a tracking identifier and then assigning a correct tracking identifier for the subject (e.g., subject 2). Specifically, the logic determines that (i) a subject (e.g., subject 1) from the first time interval appears to have a different tracking identifier in the second time interval, (ii) a subject (e.g., subject 2) believed to be from the first time interval does not have a tracking identifier in the second time interval and (iii) there is no subject associated with a previously assigned tracking identifier (e.g., track_ID "X") that has (potentially) left the area of real space. Once these determinations are made, the logic at operation 1925 assigns track_ID "Y" to subject 2 that was missing a tracking identifier using the identification (matching) techniques described herein. The third column of the table below shows correct assignment of tracking identifiers to subjects after operations 1915 and 1925 are completed. Note that the correct assignment of track_ID "X" to subject 1 is performed by the logic in operation 1915 for single swap detection. The logic in operation 1925 correctly assigns track_ID "Y" to subject 2 that was missing the tracking identifier in the second time interval. Hence, the technology disclosed can correctly detect and assign tracking identifiers to an oppositely swapped subject that is not automatically assigned a tracking identifier by the subject tracking engine 110.

TABLE 1

Example of an Oppositely Swapped Subject Missing an Identifier

| Interval t1 | Interval t2 | Re-identification (correction) for Interval t2 |
|---|---|---|
| Subject 1<br>→ track_ID "X"<br>Subject 2<br>→track_ID "Y" | Subject 1<br>→ track_ID "Y"<br>Subject 2<br>→No track_ID | Subject 1<br>→ track_ID "X"<br>Subject 2<br>→track_ID "Y" |

The above-described logic supports three-way (3-way) or high frequency swaps of subjects. For example, in a three-way swap, a subject with track_ID "A" from time interval "t1" is assigned a track_ID "B" in the time interval "t2", a subject with track_ID "B" from time interval "t1" is assigned a track_ID "C" in the time interval "t2" and the subject with track_ID "C" from time interval "t1" is assigned a track_ID "A" in the time interval "t2". Three-way swaps can occur when a large number of subjects are present or moving in the field of view of one or more cameras. High-frequency swaps of track identifiers can also occur in crowded spaces. In high-frequency swaps, the track identifiers of subjects can be swapped multiple times over a plurality of time intervals. The technology disclosed can re-identify the subjects and assign correct track identifiers to the subjects in high-frequency swaps.

If a single swap of a tracking identifier is not detected (no in operation 1920), then technology disclosed includes logic to determine whether a new subject has entered the area of real space in the second time interval (operation 1929). The technology disclosed includes logic to match subjects in the second time interval with subjects in the first time interval and when a subject in the second time interval does not match to any subject in the first time interval this can indicate that a new subject has entered the area of real space in the second time interval. In one implementation, the logic implemented in operations 1920 and 1929 can be combined in a single operation.

If a new subject is found in the second time interval that does not match any previously tracked subject in the area of real space (yes in operation 1929) then the technology disclosed performs an operation to detect an enter-exit swap error (operation 1930). If no new subject is found in the second time interval (no in operation 1929) then the error detection process ends (operation 1949). Table 2 below presents a simplified example of detecting and correcting an enter-exit swap error (operation 1930). The first column of the table presents subjects and their respective tracking identifiers in a first time interval "t1". The second column of the table presents subjects and their respective tracking identifiers in a second time interval "t2". There are two subjects being tracked in the first time interval including subject 1 with a tracking identifier "X" and a subject 2 with a tracking identifier "Y". The first row of Table 2 shows that a same tracking identifier i.e., track_ID "X" is correctly assigned to subject 1 in the first and the second time intervals. The second row of Table 2 shows that subject 2 with a tracking identifier track_ID "Y" in time interval "t2" has left the area of real space in time interval "t2". The third row in Table 2 presents a new subject "subject 3" who is detected in time interval "t2" for the first time by the subject tracking engine 110. However, this new subject is assigned track_ID "Y" which was previously assigned to subject 2 in time interval "t1". In some cases, no tracking identifier may yet be assigned to the new subject as the subject tracking system has just detected the newly entered subject in the area of real space. The enter-exit swap error detection logic can detect the enter-exit swap error and assign correct tracking identifier to the newly entered subject in both cases, i.e., with or without a tracking identifier being assigned to the new subject 3 in the second time interval or time interval "t2".

TABLE 2

Example of an Enter-Exit Swap Error in Subject Tracking

| Interval t1 | Interval t2 | Re-identification (correction) for Interval t2 |
|---|---|---|
| Subject 1 → track_ID "X" | Subject 1 → track_ID "X" | Subject 1 → track_ID "X" |
| Subject 2 → track_ID "Y" | Subject 2 left the area of real space | Stop tracking Subject 2 |
| | Subject 3 → track_ID "Y" New subject detected in "t2" for the first time | Subject 3→ track_ID "Z" New tracking identifier assigned to Subject 3 |

When the subjects in the current time interval or time interval "t2" are matched to subjects in the previous time interval "t1", no subject from the previous time interval "t1" matches the subject with a track_ID "Y" in the time interval "t2". This can indicate that the subject assigned track_ID "Y" in time interval "t2" is a new subject who was not present in the previous time interval. In one implementation, the re-identification engine 190 can attempt to match the subject with track_ID "Y" in time interval "t2" with subjects in a plurality of previous time intervals such as two, three or five previous time intervals. When no subject in one or more previous time intervals matches the subject with track_ID "Y" in time interval "t2", the tracking error is classified as an enter-exit error. In this case, a new tracking identifier such as track_ID "Z" is assigned to subject 3 as shown in the third column of Table 2. This subject (i.e., subject 3) was previously assigned track_ID "Y" in time interval "t2" as shown in the second column of Table 2. Subject 3 has entered the area of real space in time interval "t2". The subject tracking engine 110 then starts tracking this subject in the following time intervals with correct tracking identifier (track_ID "Z").

The subject (subject 2) who was assigned tracking identifier "Y" in a previous time interval "t1" may have left the area of real space during time interval "t2" as shown in the second column of the second row of Table 2. The re-identification engine can attempt to match the subject with tracking identifier "Y" in the previous time interval to all subjects in the current time interval "t2". If there is no match, then it means that the subject with tracking identifier "Y" has left the area of real space and subject tracking engine 110 can then mark the subject accordingly in subject database and the user database. The subject tracking engine 110 can then stop tracking this subject as shown in the third column of the second row of Table 2 (operation 1940), then the error detection process ends (operation 1949). This information can then be used by the technology disclosed to generate an items log (or a receipt) for the subject. This receipt may then be sent to the subject via an email, an SMS message or via an app on a mobile computing device associated with the subject.

FIG. 19B presents process flowchart for detecting and correcting split error detection. The process in FIG. 19B starts when a new tracking identifier (or track_ID) is generated and assigned to a subject in a current time interval e.g., time interval "t2" (operation 1955). The technology disclosed implements logic to detect whether a new subject has entered the area of real space or the new tracking identifier is incorrectly generated due to a split type error in subject tracking. If a split type error is detected, the technology disclosed implements the logic to correct the split error in subject tracking. Further details of the operations in flowchart in FIG. 19B are presented below.

When a new tracking identifier is generated and assigned to a subject in the current time interval (operation 1955), the re-identification engine 190 includes logic to detect a split error in tracking of subjects in the area of real space (operation 1960). In the split error, the subject with tracking identifier "Y" in the previous time interval or time interval "t1" is assigned a new tracking identifier "Z" in the current time interval or time interval "t2". The new tracking identifier "Z" was not being tracked in the previous time interval. The old tracking identifier "Y" is not being tracked in the current time interval.

Table 3 below presents a simplified example to illustrate a split error. The first column of the table presents subjects and their respective tracking identifiers in a first time interval "t1". There are two subjects being tracked in the first time interval including subject 1 with a tracking identifier "X" and a subject 2 with a tracking identifier "Y". In the second time interval "t2", the subject tracking engine incorrectly assigns a new tracking identifier "Z" to subject 2, assuming that subject 2 is a new subject who has entered the area of real space in time interval "t2". Tracking identifier "Y" is not assigned to any subject in the second time interval "t2". The technology disclosed matches the subjects in the second time interval with subjects in the first time interval and determines that subject 2 with tracking identifier "Z" in the second time interval matches subject 2 in the first time interval with a tracking identifier "Y". In one implementation, the technology disclosed matches the subjects in the second time interval "t2" to only those subjects in time interval "t1" who exited the area of real space in the first time interval. For example, in Table 3, the subject with track_ID "Y" exited in time interval "t1" (or is incorrectly marked as exited in time interval "t1" by the subject tracking engine 110). Therefore, the subjects in the second time interval are matched to only the subject with track_ID "Y" in the first time interval. This logic can improve the processing efficiency of the subject re-identification engine 190. When a split error is detected (yes branch of operation 1965), the re-identification logic corrects the tracking identifier of subject 2 by assigning track_ID "Y" to subject 2 in the second time interval as shown in the third column of Table 3 and removes track_ID "Z" as no new subject has entered the area of real space (operation 1970). When no split error is detected (no branch of operation 1965), the error detection process ends (operation 1975).

TABLE 3

Example of a Split Error in Subject Tracking

| Interval t1 | Interval t2 | Re-identification (correction) for Interval t2 |
| --- | --- | --- |
| Subject 1 → track_ID "X" | Subject 1 → track_ID "X" | Subject 1 → track_ID "X" |
| Subject 2 → track_ID "Y" | Subject 2 → track_ID "Z" New ID generated in "t2" | Subject 2 → track_ID "Y" track_ID "Z" removed |

Matching Subjects to their Accounts Across Multiple Areas in a Previously Designated Region As discussed above, the technology disclosed has the ability to track subjects across multiple areas (e.g., multiple shopping stores, areas, etc.) within a previously designated region (e.g., an airport, shopping mall, etc.). This allows a subject to seamlessly make shopping transactions (e.g., puts and/or takes) across multiple stores, areas, locations, etc., within the previously designated region and allows the cashier-less system to perform a single financial transaction for the multiple shopping transactions and to share shopping data across the multiple stores, areas, locations, etc. Specifical examples are provided below that describe matching subjects as they move and make shopping transactions (e.g., puts and/or takes) across multiple stores, areas, locations, etc., within the same previously designated region.

Matching Subjects to their Accounts in an Airport Terminal

Figure 20:
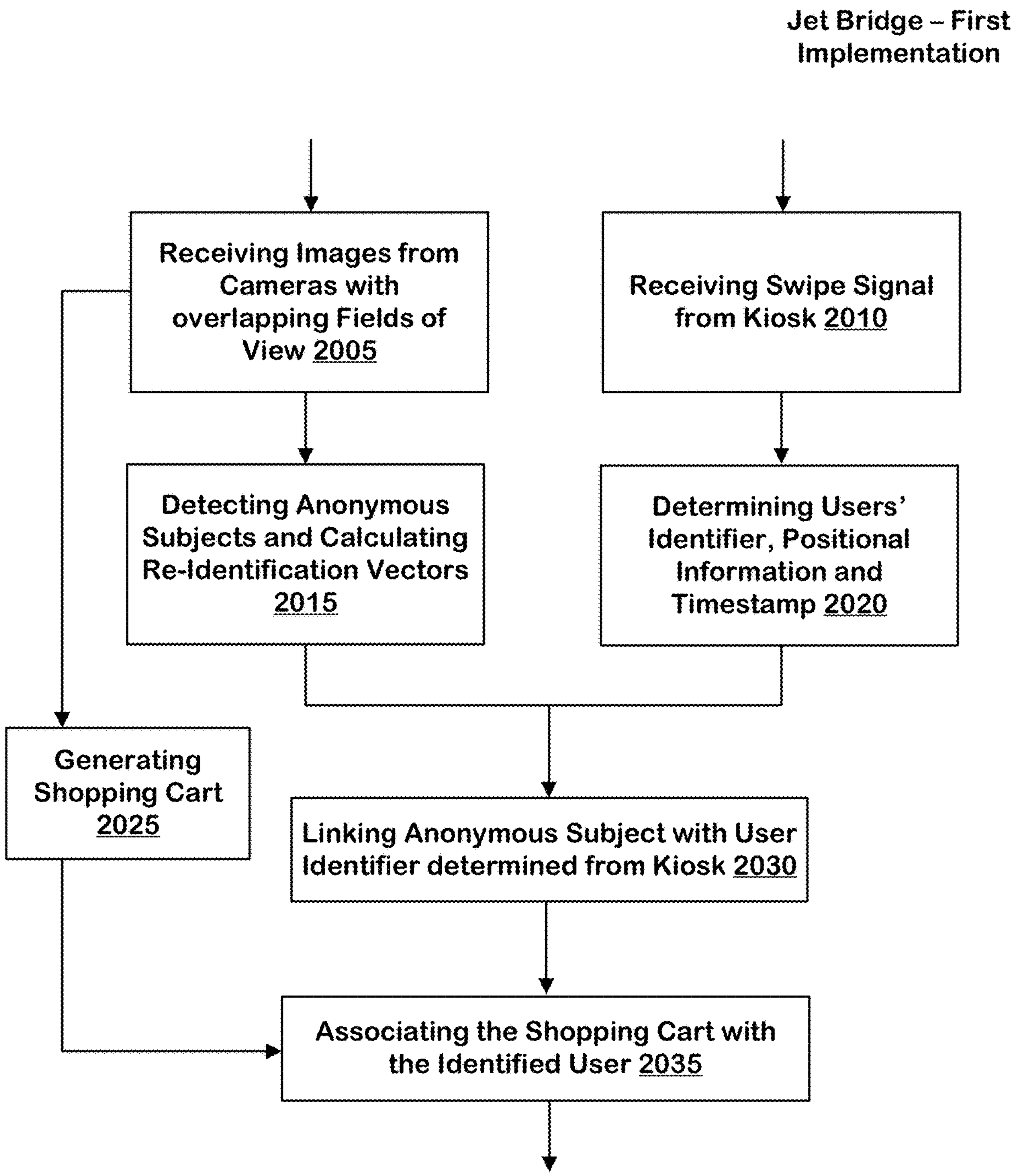
FIG. 20 is a flowchart for associating anonymously tracked subjects to their user accounts in an airport terminal.
Figure 21:
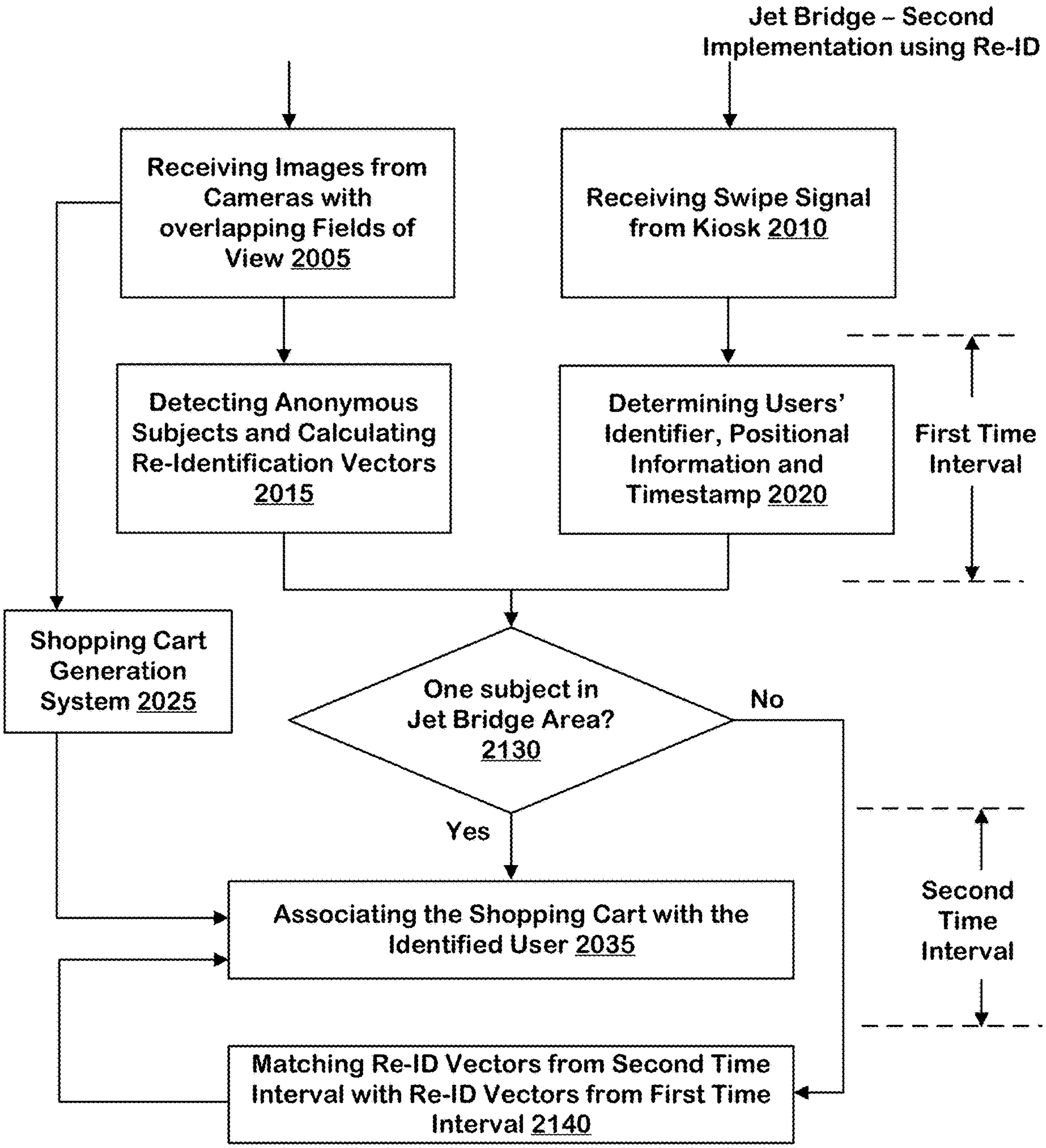
FIG. 21 is flowchart for associating anonymously tracked subjects to their user accounts in an airport terminal using re-identification feature vectors.

FIGS. 20 and 21 present two implementations of the technology disclosed in which anonymously tracked subjects are matched to their respective user accounts when they take inventory items placed in inventory display structures positioned in an area of real space between a boarding pass scanner and a jet bridge in an airport terminal or when they put inventory items from one inventory display structure to another inventory display structure positioned in the area of real space between the boarding pass scanner and the jet bridge in the airport terminal. It is understood that similar operations can be performed to match anonymously tracked subjects to their user accounts in other environments (e.g., previously designated regions) such as in a movie theater, a sports arena or a sports stadium, a golf course, a country club, a library, a railway station, a metro station, in a university or a college food court, etc.

The interactions of subjects within such environments can be described as a journey, wherein a journey may include one or more areas of real space, one or more shopping carts associated with the same subject, and/or one or more payment transactions. A series of illustrative examples will briefly be described prior to the discussion turning to more detailed example implementations with reference to FIGS. 20 and 21. It is understood that the example implementations provided are for purely educational purposes to aid in the description of the technology disclosed, and are not to be considered limiting to the scope as otherwise stated herein. In some implementations, a journey is a travel journey in a literal sense by means of a train, bus, or airport.

For example, a subject may be traveling by plane from a Location A to a Location D. The subject may fly directly from Location A to a Location D, such that the relevant areas of real space may include Airport A, a first airplane, and Airport D. Alternatively, the subject may also have one or more layovers; e.g., flying from a Location A to Location B, Location B to a Location C, and Location C to Location D including Airports A, B, C, and D as well as a first, second, and third plane. In scenarios similar to these, the subject may be able to purchase products or select services in each airport or flight without the need of multiple single-charge transactions.

Consumers may have concerns about the inconvenience or security of such repeated transactions and commercial businesses are also incentivized to combine numerous purchases into a single transaction by the typical fee-per-transaction system established by the majority of credit card and point-of-sale providers. Alternatively, an airline passenger may desire to use a different payment method for an in-flight purchase than the payment method on record used to purchase the ticket, as typically seen with air lines. For example, perhaps a passenger is flying for business and intends to use their business credit card for their plane ticket, and later, purchases an alcoholic beverage in-flight using a personal payment method. It is inconvenient for the airline to facilitate multiple payment methods and splitting transactions and an alternative, provided by the technology disclosed, enables the passenger to make these choices autonomously. Multiple payment methods can be implemented by, for example, using a set of rules, selectable options, and/or preferences within a user account (accessible via a client application on a mobile device, a kiosk user interface, a web interface, etc.) that the user associated with the account can customize. Rules may be customized universally or within a specific boundary such as journey-specific or merchant-specific preferences. The user may pre-identify a particular payment method to always be used for a particular merchant, transactions within a particular value range (e.g., less than ten dollars, between ten and one hundred dollars, or over one hundred dollars), transactions within a particular date range (e.g., a three-day span corresponding to dates of travel), and/or additional filters or categories that will be readily apparent to a user skilled in the art. Furthermore, before the payment transaction(s) occurs, the user can be given the option to associate different purchases, transactions, etc. with a particular payment method (e.g., business credit card, personal credit card, etc.).

Various implementations of the technology disclosed can allow for "shopping carts" from each interval of the journey to be combined or split when the subject is charged for their purchases. Consider the above-described example, in which the subject above is flying from Airport A to Airport D with layovers in Airports B and C. The subject may purchase food or entertainment items at the gate while at any of the four airports or while in-flight on any of the three planes in his journey. The technology disclosed, in some implementations, may allow for purchases at any of these stages in the subject journey to be added to a single shopping cart, and at the end of the journey when a subject makes a final exit (i.e., as the subject leaves Airport D), a payment method associated with the subject's user record will be charged for the final total in one single purchase transaction. Alternative implementations allow for the subject to pay separately in each respective location but use the same payment method as previously selected for each transaction, even with different vendors (e.g., the airline and various third-party restaurants and vendors in the airport). Further alternative implementations may allow for the subject to split payments across payment methods in a way other than division by location or vendor, such as indicating a separate payment method to be used for alcoholic beverages (e.g., if the subject intends on providing their receipts to their employer for reimbursement purposes). Within implementations enabling the merging of two or more shopping carts from different merchants or vendors, a variety of approaches exist to mediate the distribution of funds as appropriate exist that will be familiar to users skilled in the art.

Other implementations involving event centers such as a concert venue or sports venues may implement the technology disclosed similarly to the above-described airport scenario. In another example, the subject may be attending a sporting event at an arena that includes a ticket scan at the entrance, fan merchandise stores or concession stands owned by the arena, external third parties in contract with the arena to provide alternative concession stands, options for purchasing drinks and snacks from salespeople moving throughout the stands, and so on. In this example, the journey may include a single event from the time that the subject scans their ticket for entry to their final exit from the event, or a series of multiple, separate events at the same arena. Patrons may set up new (or link pre-existing) user accounts with the arena, enabling a subject to use a single pass for both identification and addition of different items or services for purchase to a shopping cart associated with their user account (e.g., via a QR code or barcode linked with the user account or event ticket, a digital badge accessible within a user's mobile phone virtual wallet, a physical badge or identification card, or a biometric scan like facial identification). Analogously to the above-described airport example, various implementations of the technology disclosed can enable the subject to combine or split shopping carts and/or payment methods in different ways, as restricted by the businesses involved. These concepts can be further extended to situations such as food markets and co-ops with multiple businesses inside, shopping malls, university services (e.g., enabling students to make purchases at a dining hall, university-owned convenience store or coffee shop, bookstore, student organization fees, sporting events, etc. that will be charged to the student account or bill), and so on. Additional variations of these example implementations will be apparent to a user skilled in the art.

Further details of the process are presented with reference to flowcharts presented in FIGS. 20 and 21. In the following examples, a boarding pass scanner is an example of an information scanner (e.g., a kiosk or similar means for obtaining user input). An information scanner may receive other types of information inputs via scanning a pass, a ticket, a badge, a code or barcode, a user identifier, or a membership identifier. A subject may be able to provide a biometric input as their information scan such as a facial identification, fingerprint scan, retinal scan, or joints constellation as described herein. In implementations involving a biometric input, the technology disclosed may maintain privacy for users by leveraging methods that do not involve any sensitive personal information (e.g., a joints constellation). In addition to a boarding pass scanner at the airplane gate, this can be a check-in desk or kiosk, ticket scanner, security checkpoint, mobile app check-in functions, and so on.

FIG. 20 presents operations to match anonymously tracked subjects to their user accounts when they take items from an inventory display structure prior to boarding an airplane via a jet bridge. In this implementation of the technology disclosed, it is assumed that inventory display structures are positioned in an area between (or close to) the boarding pass scanner and the jet bridge. The subjects (or passengers) scan their boarding passes on the boarding pass scanner, move through the area containing inventory display structures and board the airplane by walking over the jet bridge. While passing through the area in which inventory display structures are positioned, the subjects can take items placed on the inventory display structures. The technology disclosed includes logic to detect takes (or puts) of items from shelves in the inventory display structures and add the inventory items to a shopping cart data structure associated with the anonymously tracked subjects. The technology disclosed can determine a user account linked to the anonymously tracked subject by using an identification of the subject on the scanned boarding pass of the subject and using the identification to match the anonymously tracked subject to their user account. The anonymously tracked subjects can be matched to their respective user accounts by using the logic implemented in the account matching engine 170 (or any other logic described herein). The payment information in the user account of the subject is used to process the payment for inventory items taken from the shelves in the inventory display structure.

The process in FIG. 20 starts at a step 2005 when images captured by sensors or cameras 114 in the area of real space are received by the subject tracking engine 110 and the subject re-identification engine 190 (operation 2005). The subject tracking engine 110 starts tracking the subjects as they enter the area of real space and assigns track_IDs (or tracking identifiers) to anonymously tracked subjects (operation 2015). The subject re-identification engine 190 detects and corrects the errors in tracking of subjects over multiple time intervals as described with reference to FIGS. 18 and 19.

Before or after operations 2005 and/or 2015, the technology disclosed receives a signal including subject identifier when a subject approaches the boarding pass scanner and scans the boarding pass (operation 2010). Note that the signals received from the boarding pass scanner are independent of the subject tracking and subject re-identification operations described with reference to operation step 2015. The technology disclosed can access other information associated with the subject whose boarding pass is scanned using the identifier of the subject determined from the boarding pass. In one implementation, the subject's name on the boarding pass can be used as an identifier. Other types of identifiers such as a loyalty membership number for the subject, a phone number, an email address, physical characteristics, etc. can also be used to access a subject's account information stored in the user database 164. Moreover, various classifications of the subject can be obtained from the user database 164 or another internal or external database, such as gender, age range, geographical information, etc. The technology disclosed includes logics to access the subject's user account record in the user database 164. Payment information associated with the subject's user account record such as credit card details, airline's loyalty points, or other types of payment methods can be retrieved from the subject's record in the database 164. Additional information from the subject's record such as an email address, a cell phone number, a mailing address or other types of contact information can also be retrieved (operation 2020). Additionally, the information associated with the subject, such as account information, can further be obtained from a combination of the images received from the cameras, the re-identification vectors and information obtained from a smart device or other item belonging to the subject that transmits information about the subject.

The technology disclosed includes logic to determine the subject's position in the area of real space when the subject swipes her boarding pass on the boarding pass scanner. As the location (in three dimensions of the area of real space) of the boarding pass scanner is known, the technology disclosed can assign the same location (or a location in proximity of the boarding pass scanner) to the subject when the subject swipes or scans the boarding pass on the boarding pass scanner. Additionally, the technology disclosed can also determine the timestamp when the boarding pass is scanned (operation 2020).

The technology disclosed includes logic to match the anonymously tracked subject who is being tracked by the subject tracking engine 110 with the account information of the subject who scanned the boarding pass on the boarding pass scanner (operation 2030). The anonymously tracked subject who is positioned adjacent to the boarding pass scanner at the same time or within a same time interval such as within 1 second, 2 seconds, or 3 seconds of timestamp of the boarding pass scan is matched to the user account of the subject who scanned the boarding pass. The technology disclosed can include additional matching logic to match the anonymously tracked subject to the subject who scanned her boarding pass at the boarding pass scanner. For example, the technology disclosed can match positions of one or more of the hand joints, neck joint, and foot joints of the anonymously tracked subject to positions of respective joints of subject who scanned the boarding pass. In some cases, subjects scan their boarding passes one by one in a queue, therefore, the technology disclosed can match the anonymously tracked subjects to their accounts one by one as they pass by the boarding pass scanner. In some cases, two or more than two subjects scan their boarding passes on boarding pass scanners that are positioned in parallel. In this case, the technology disclosed matches anonymous subjects with respective subjects that are scanning their boarding passes by matching respective joint positions. In one implementation, the technology disclosed can match the subjects by calculating the difference between respective positions of joints of the subjects detected and tracked by the subject tracking engine 110 and the subjects who scan their boarding passes. The subjects are matched when the sum of the distances between respective joints is less than a pre-defined threshold. In another implementation, the subjects with a lowest value of the sum of the distances between respective joints are matched. The technology disclosed can also apply the matching logic implemented by the matching engine 170 to match the anonymously tracked subjects with the subjects who scan their boarding passes on the boarding pass scanner during operation 2030.

After scanning their boarding passes, the subjects move towards the gate to the jet bridge leading to the aircraft. As the subjects move towards the jet bridge, they pass through the area of real space in which inventory display structures are positioned between the boarding pass scanner and the gate to the jet bridge. The subjects can take one or more inventory items from the inventory display structures or put one or more inventory items back onto the inventory display structures. The technology disclosed can use the inventory event detection logic to detect the items taken (or returned) by a subject and include (or remove) those items in a shopping cart or an inventory log data structure (2025). The technology disclosed can apply one or more techniques to detect take or put events of items as presented in U.S. patent application Ser. No. 15/907,112, entitled. "Item Put and Take Detection Using Image Recognition," filed on 27 Feb. 2018, now issued as U.S. Pat. No. 10,133,933: U.S. patent application Ser. No. 15/945,466, entitled, "Predicting Inventory Events using Semantic Diffing," filed on 4 Apr. 2018, now issued as U.S. Pat. No. 10,127,438, and U.S. patent application Ser. No. 15/945,473, entitled, "Predicting Inventory Events using Foreground/Background Processing," filed on 4 Apr. 2018, now issued as U.S. Pat. No. 10,474,988, all three of which are fully incorporated into this application by reference.

The technology disclosed enables the subjects to select their desired on-board services using one or more interactive display screens placed in the area between the boarding pass scanner and the jet bridge. For example, a list of various services can be presented on the interactive display screen for selection such as onboard Wi-Fi, hot/cold meal or drinks service, any other service upgrades available on the airplane, etc. By selecting one or more of these optional services, the subject can plan her journey according to her needs and/or preferences. The subject can also select an appropriate time for a service from the selection menu on the interactive display. For example, the subject may select to have a drink served on her seat when she boards the plane prior to the take-off. The subject may select to have a packaged meal provided to her prior to her disembarking the plane on the destination or prepared and ready at some location after disembarking the plane. Therefore, the technology disclosed enables subjects to not only take items from the inventory display structures prior to boarding the airplane but also select services from interactive display screen positioned near the inventory display structures.

The shopping cart linked with the anonymously tracked subject is then associated to the user account of the anonymously tracked subject which was identified in the operation 2030 (operation 2035). The subject can then be charged for the items in the shopping cart using a payment method in the subject's account record. A digital receipt can be generated and sent to the subject via email or an app on the mobile of the subject.

Furthermore, the same logic can continue as the subject is on the aircraft. For example, items taken or returned to designated areas and/or flight attendants can be included or removed from items in the shopping cart or the inventory log data structure associated with the subject. The subject can then be charged for the items in the shopping cart or the inventory log data structure at the conclusion of their flight. Additionally, the same logic can continue as the subject continues their journey through multiple flights to reach their destination airport or until they conclude their single flight and arrive at their destination airport. The system, based on the initial swipe signal from the kiosk, can be aware of the entire journey of the subject and can continue to compile shopping cart data or the inventory log data structure associated with the subject until the subject makes their final exit (e.g., leaves their destination airport at the conclusion of their journey).

FIG. 21 presents another implementation of the technology disclosed to track subjects in an airport terminal. In this implementation, re-identification feature vectors can be used to match anonymously tracked subjects across multiple time intervals. The operations 2005 and 2010 in the flowchart in FIG. 21 are similar to operations with same labels in the flowchart in FIG. 20. The operations 2015 and 2020 in the flowchart in FIG. 21 are similar to the operations with same labels in the flowchart in FIG. 20. The operations 2015 and 2020 in the flowchart in FIG. 21 are conducted in a first time interval. The first time interval can include a time duration during which a subject is detected and tracked by the subject tracking engine prior to the boarding pass scan on the boarding pass scanner. The re-identification engine 190 can calculate feature vectors for the subjects detected and tracked in the first time interval. If there is one subject in the area near the jet bridge in which the inventory display structures are positioned, then re-identification feature vector calculated for the subject may not be used to match the subjects in the first time interval to the subject in a second time interval (operation 2130). In this case, the shopping cart of the subject is matched to the anonymously tracked subject (operation 2035). The association of the shopping cart with the anonymously tracked subject is performed using the same logic as described in the operation step 2035 with reference to flowchart in FIG. 20. The shopping cart generation logic implemented in the operation 2025 is performed as described in the operation with the same label with reference to flowchart in FIG. 20.

If the subject tracking engine 110 detects two or more subjects in the area between the boarding pass scanner and the jet bridge, then the technology disclosed can use the logic implemented by the re-identification engine 190 to match the subjects in a second time interval to the subjects detected in the first time interval. The second time interval includes a time duration after the subject has scanned the boarding pass on the boarding pass scanner. In another implementation, both the first and the second time intervals include any two time durations such that the first time interval occurs prior to the second time interval e.g., t1 and t2. In another implementation, the first and the second time intervals are not adjacent to each other e.g., the first time interval is t1 and the second time interval is t4 while there are two time intervals t2 and t3 in between the first and the second time intervals. The technology disclosed matches the subjects from the second time interval with the subjects in the first time interval by matching the re-identification feature vectors (or any other way of the multiple ways of identifying subjects described herein) of the subjects from the second time interval with the re-identification feature vectors (or any other way of the multiple ways of identifying subjects described herein) of subjects from the first time interval. The details of the matching of the subjects using the re-identification feature vectors (or any other way of the multiple ways of identifying subjects described herein) can be implemented by the re-identification engine 190 or any other logic described herein. The process to match the subjects using re-identification feature vectors is described with reference to flowcharts in FIGS. 18, 19A and 19B. Finally, the shopping carts are associated with the anonymously tracked subjects using the logic implemented in operation 2035 as described in the operation with the same label in FIG. 20.

The technology disclosed described above with reference to flowcharts in FIGS. 20 and 21 can be implemented in other environments to match subjects to their respective user accounts. Examples of such environments (e.g., previously designated regions) include a movie theater, a sports arena or a sports stadium, a golf course, a country club, a library, a railway station, a metro station, a university or a college food court, etc. In the case of a movie theater a subject's identifier can be retrieved from a movic ticket when the subject scans her movie ticket on a ticket scanner. The subject identifier determined from the movie ticket can then be used to match the subject to a user account of the identified subject. The subject can take items from inventory display structures in an area of real space between the movie ticket scanner and a door to the movie theater. The technology disclosed can add the items taken by the subject to a shopping cart associated with the subject and charge the subject when the subject enters the movie theater by passing through the door to the movie theater. Similar logic can be applied to other venues or areas of real spaces such as a golf course or a country club, a library, a railway station, a metro station, a university or a college food court, etc. to match anonymously tracked subjects to their accounts. In the case of a golf course or a country club, a scanner can be used to scan a membership card of the subject. In the case of a college or a university food court, a student identity card can be scanned and the subject can then be matched to her student account which may have a preferred payment method or pre-loaded amount from which items taken by the subject can be charged. Furthermore, cards, tickets, etc., need not necessarily by scanned in the traditional method of the subject providing the card, ticket, etc., to a traditional scanner. Rather, the card, ticket, etc., can be scanned by a proximity event of the subject walking through an area than can identify the subject using a device on the subject's person that transmits information that identifies the subject. Security measures can be put into place to authenticate that the information that identifies the subject and the actual subject correspond to one another.

The technology disclosed can implement logic to distinguish tracks of shoppers (or customers or travelers, etc.) from tracks of employees moving in the area of real space such as previously designated regions. This separation of tracks is helpful to get useful data about employees such as related to customer support, re-stocking of shelves, customer identification when handing over age-restricted items such as alcoholic beverages, tobacco-based products, etc. The technology disclosed can implement several different techniques to distinguish between the shoppers and the store employees. In one implementation, the store employees check-in at the start of their shifts using their mobile devices. The store employees can scan their badges, or codes displayed on their cell phone devices to check-in using a check-in kiosk. The check-in can be performed using NFC (near field communication) technology or ultra-wideband technology or other such technologies. In another implementation, the check-in can be performed using one of the account matching techniques implemented by the account matching engine 170. After check-in, the actions performed by the store employees are linked to their respective tracks. In another implementation, the store employees can wear store uniforms that include store branding including colors, symbols, letters, etc. The technology disclosed can process the information captured from employees' uniforms to classify them as employees of the shopping store. The machine learning model can be trained using trained data that includes images of store uniforms. Note that the classification is anonymous and facial recognition is not performed to identify a subject. The images of the subjects can be cropped to remove the neck and head portion of the subject and remaining part of the image can be provided to a trained machine learning model to classify a subject as a store employee. In one implementation, the employees can wear nametags that are ultra-wideband enabled. The technology disclosed can scan the nametags to determine that a subject is an employee of the store. In another implementation, the technology disclosed can use the reidentification technique to match the reidentification feature vectors of the subjects with previously stored reidentification vectors of store employees. Matching reidentification feature vectors can identify a subject as a store employee. When implementing reidentification technique, the technology disclosed can use images from the same cameras in a same portion of the area of real space to calculate the reidentification vectors of subjects. Note that the reidentification technique matches the subject using anonymously and no biometric or facial recognition data is used to match the subjects. In one implementation, the employees enter the area of real space from designated entrances such as one or more doors designated for entry and exit of employees. The technology disclosed includes logic to assign the subject tracks that start from the employees designated entrances as belonging to employees. Therefore, the technology disclosed can separate the shopper tracks from employee tracks in the area of real space.

Figure 22:
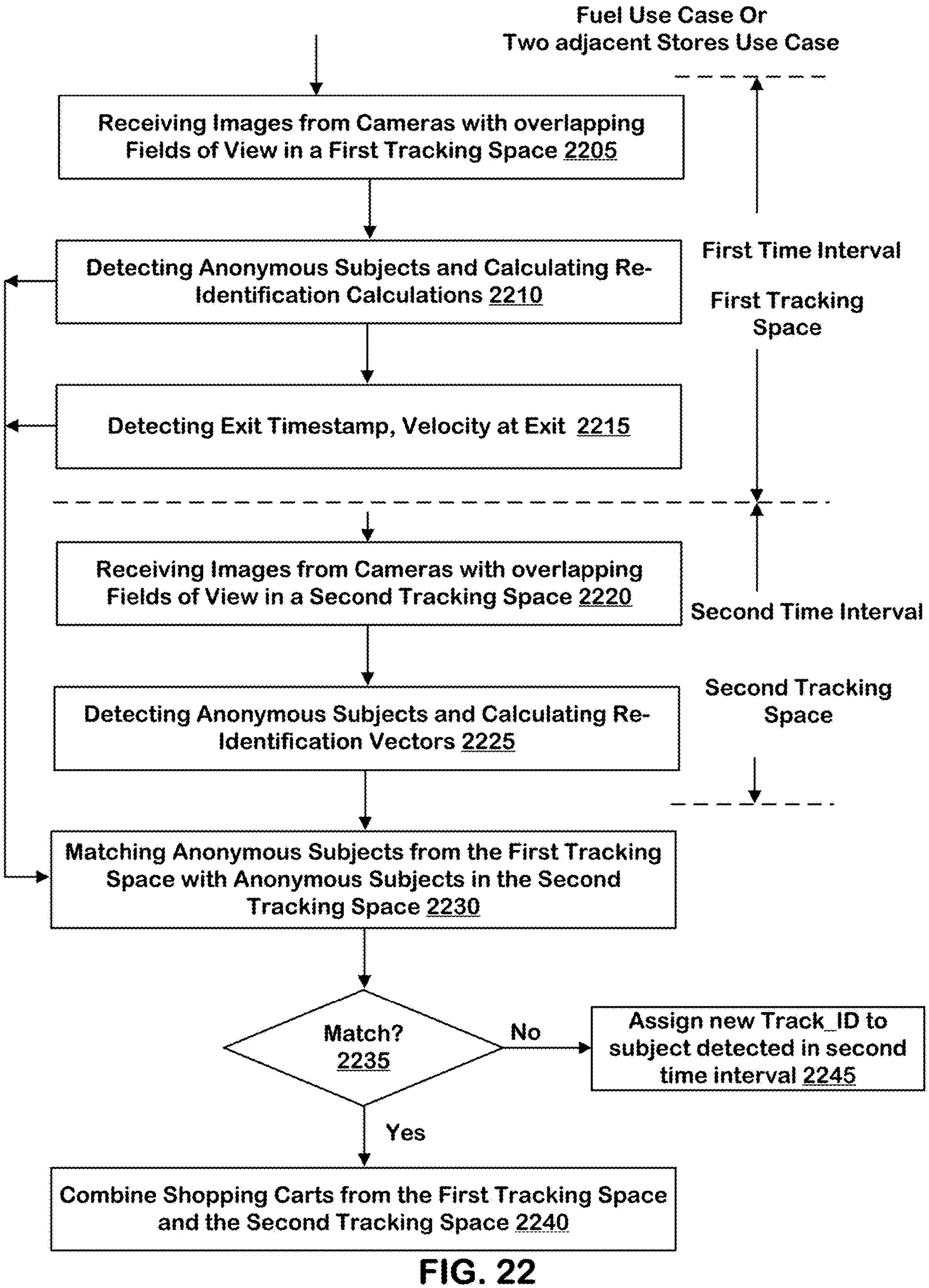
FIG. 22 is a flowchart for re-identifying a subject in a second tracking space that is close to a first tracking space in which the subject was previously being tracked.

Matching Subjects Across Two Tracking Spaces within a Previously Designated Region FIG. 22 presents a flowchart including operations to detect and track a same subject in two separate tracking spaces (or tracking subspaces) within a previously designated region. The separate tracking spaces can be adjacent to each other such as for example, a gas station and a convenience store located adjacent to the gas station, or even spaced apart from each other within the previously designated region. The two tracking spaces can also represent two shopping stores adjacent to each other or located in close proximity or separated from one another by any distance within the previously designated region. The two tracking spaces have separate sets of sensors or cameras that capture images of subjects in their respective areas of real space. The cameras or sensors in one tracking space may not overlap with cameras or sensors in the other tracking space. The technology disclosed can be used to determine the shopping behavior of a subject across multiple shopping stores. The technology disclosed can be used to track purchases of subjects from different shopping stores. The technology disclosed can be used to track continuity of subjects purchases across multiple shopping stores. Such analytic data is useful for shopping store owners and product manufacturers or distributors to arrange placement of products or even placement of shopping stores in a shopping complex or in a shopping mall to accommodate the shopping behavior or shopping preferences of subjects. Traditionally, this analytic data can be difficult to collect across physical retail locations because of separation or partitioning between shopping stores.

The technology disclosed therefore not only supports product placement planning for individual stores but also provides useful analytics and data for planning of multiple shopping stores in a shopping mall or a shopping complex. For example, in a movie theater, subjects can be tracked to see what concessions they purchase from various kiosks or shops in the movie theater, as well as a shopping complex that is within the same previously designated region. Similarly, subjects can be tracked in a fuel station to determine how many subjects visit the shopping store adjacent to the fuel station. By tracking subjects that visit the shopping store after or before filling gas (or charging electric batteries) in their cars, the technology disclosed can not only determine the shopping behavior of the subjects in the shopping store but the technology disclosed can generate a single shopping cart for subjects that take items from multiple adjacent shopping stores. For example, a single purchase transaction can be performed for the subject who purchased fuel from the fuel station and also took items from the convenience store adjacent to the fuel station. Processing combined receipts as a single transaction can reduce the transaction costs when payment methods that charge per transaction fee are used. Therefore, the technology disclosed provides convenience to both store operators and shoppers. Additionally, the technology disclosed can improve the shopping experience for the subject who receives a consolidated purchase receipt for all purchases from shopping stores in a shopping complex or a shopping mall, etc. For example, when the subject leaves the fuel station in their car, the technology disclosed can generate a combined digital receipt for the subject that includes the fuel purchase and the items taken from the convenience store. In one implementation, the technology disclosed can be used to send alerts or notifications to vendors, store managers, or other service providers for an incoming subject (such as a shopper, passenger, client, etc.). For example, based on a projected path of a subject, the technology disclosed can determine that a subject is heading towards a particular location in the area of real space. The technology disclosed can then send a notification to an employee or a manager of the destination location of an incoming subject so that the employee or the manager can be ready to provide service to the incoming subject (e.g., the subject can be running late or running early). This technology can be deployed within a shopping store in which multiple vendors (such as a coffee shop, a restaurant, a hairdresser's shop, an optometrist location, a bank, a travel agency, etc.) are located. Alerts or notifications can be sent to a particular vendor when track of a subject predicts that the subject will reach the particular vendor. In one instance, when the subject is checked-in to the shopping store, a two-way communication can be carried out between the checked-in subject and the particular vendor. For example, consider a hairdresser receives a notification that a subject is heading towards their location. Suppose the hairdresser is currently busy and cannot take a new customer for the next fifteen minutes. The hairdresser can send a notification to the subject via the subject's cell phone. The notification can indicate to the subject that the hairdresser will be available after fifteen minutes. This allows the subject to plan her time accordingly. The subject can either wait at another location for fifteen minutes or go to another vendor. The notification can be sent to the subject as a text message on the cell phone associated with the subject's account or via an app installed on the subject's cell phone. In one implementation, the technology disclosed can be deployed in a shopping mall, a movie theater, a food court and an outdoor arena where multiple shops or vendors are located to send alerts or notifications to shop managers, employees or other types of vendors for potential incoming subjects.

The process for tracking subjects across two (adjacent) tracking spaces in a previously designated region is presented in the flowchart in FIG. 22. The process is divided into two parts, the operations in a first part are conducted in a first tracking space (or a first shopping store) and the operations in a second part are conducted in a second tracking space (or a second shopping store). The process starts when images captured by cameras with overlapping fields of view installed in a first tracking space are received (operation 2205). The subject tracking engine 110 detects subjects in the area of real space of the first tracking space and assigns tracking identifiers or track_IDs to detected subjects (operation 2210). The subject re-identification engine 190 (or any other logic described herein) can generate re-identification feature vectors (or any other identification information described herein) for the subjects detected in the first tracking space (operation 2210). The technology disclosed can detect takes and puts of items by subjects in the first tracking space. The items taken by subjects are included in their respective shopping carts or item log data structures. The shopping carts can then be linked to user accounts of the anonymously tracked subjects using the logic implemented by the account matching engine 170.

The subject tracking engine 110 generates an exit timestamp for a subject (say with a track_ID X) when the subject leaves the area of real space of the first tracking space (operation 2215). In addition, the subject tracking engine 110 can generate additional data for the subject who have exited the area of real space. For example, the technology disclosed can determine an exit velocity (or exit speed, or any other criteria described herein according to which movement related information of the subject can be captured and/or analyzed) at which the subject was moving when she exited the area of real space. In addition, an orientation or direction of the subject can also be determined. Details of operations for calculation of speed and orientation of subjects are presented in the flowchart in FIG. 15. The subject re-identification engine 190 can calculate the re-identification feature vectors for the subject before she exits the area of real space. The technology disclosed can generate additional information related to the subject. For example, a pose detection technique can be used to calculate and store pose parameters of the subject such as neck height (or neck joint height), length of femur, etc. The above data related to the subject are stored in the subjects database 150.

The subject (with track_ID X) who exited the first tracking space moves towards the entrance to the second tracking space and enters the second tracking space. Existing subject tracking systems do not include the logic to link the subjects in one tracking space to subjects in another tracking space. The technology disclosed includes logic to detect whether a subject who has entered a second tracking space was being recently tracked in a first tracking space which is located close to the second tracking space. For example, suppose the second tracking space is in a convenience store located adjacent to a fuel station (first tracking space). When the subject enters the convenience store, the subject tracking engine 110 receives images that include the subject from cameras with overlapping fields of view in the second tracking space (operation 2220). The subject tracking engine 110 processes the images to detect a subject in the area of real space of the second tracking space. However, before assigning a new track_ID or the tracking identifier to the recently detected subject, the technology disclosed determines whether this subject was being tracked in the first tracking space in the first time interval. The technology disclosed can use various techniques to determine whether a newly identified subject in a current time interval is a same person who existed another tracking space where she was being anonymously tracked. For example, the technology disclosed includes logic to calculate parameters for the detected subject such as pose parameters of the subject, velocity of the subject (or the speed of the subject) at the entrance to the second tracking space, neck height (or neck joint height), length of femur of the subject, etc. Such parameters can be matched to parameters of subjects who have recently exited one or more other tracking spaces to determine if the same subject has entered this tracking space. Additionally, the technology disclosed calculates re-identification feature vectors (or other identifying information as described herein) for the detected subject using images of the subject captured by cameras or sensors in the second tracking space (operation 2225).

The technology disclosed then matches the subject detected in the second tracking space with subjects that were recently detected in the first tracking space and who have exited the first tracking space within a predefined time duration prior to the entry timestamp of the subject detected in the second tracking space (operation 2230). In one implementation, the technology disclosed can use a time interval of 5 minutes prior to entry time stamp of the detected subject for matching subjects. Other time intervals greater than or less than 5 minutes can be used such as up to 10 minutes or 15 minutes prior to the entry time stamp of the subject detected in the second tracking space. The technology disclosed accesses the subjects' records in the subjects database 150 to retrieve the records for subjects that were in the first tracking space and who exited the first tracking space within the pre-defined time duration. The logic in operation 2230 includes matching the detected subject in the second tracking space with subjects who exited from the first tracking space by matching the re-identification feature vectors of the subjects as described in the subject re-identification process with reference to flowchart in FIG. 18. In addition, the matching of subjects can be performed using other parameters such as the velocity (or speed) of the subject, neck height (or neck joint height), length of femur of the subject, etc.

To increase the likelihood of correctly matching the subject in the second tracking space with a subject in the first tracking space, the technology disclosed can use similar cameras mounted at a same height in the two tracking spaces. In some cases, the camera placement in the two tracking spaces is also similar so that subject rotation and poses of subjects are similar across the two tracking spaces which increases the likelihood of matching a same subject across the two tracking spaces. In such cases, the technology disclosed can use the images captured by cameras positioned in similar positions and with similar orientations across the two tracking spaces when performing the subject matching operation. The technology disclosed, in some cases, uses similar lighting conditions across the two tracking spaces to increase the likelihood of matching subjects across two tracking spaces. Additionally, images can be pre-processed to adjust images obtained from any area in the previously designated area to have similar lighting and orientations by adjusting orientations, brightness, contract, lighting effects, etc. The technology disclosed can define a mapping between illumination across two tracking spaces when it is not possible to have similar lighting conditions in the two tracking spaces. For example, when one tracking space is outdoors (such as a fuel station) and the other tracking space is indoors (such as a shopping or a convenience store adjacent to the fuel station). In such cases, a ratio of the light intensity between two tracking spaces can be calculated and the technology disclosed can try to maintain that ratio by monitoring and adjusting the lighting in the two tracking spaces during different periods of the day. The technology disclosed can use the light intensity in the indoor tracking space (e.g., x lumens) and the light intensity in outdoor tracking space (e.g., y lumens) to calculate the ratio "x lumens divided by y lumens". The lighting conditions in the two tracking spaces can be adjusted to maintain the ratio of the light intensity throughout the operations of the two shopping stores during a day. The light intensity of the indoor tracking space can be adjusted in relation to changes in lighting conditions of the outdoor tracking space so that the ratio of illumination between the two tracking spaces remains the same. The machine learning models implemented by the subject tracking engine 110 and the subject re-identification engine 190 (or any other logic describe herein) can be trained by using training data that includes images in different lighting conditions to accommodate variations in lighting conditions in the indoor and outdoor tracking spaces. In one implementation, the technology disclosed can use illumination invariant feature extraction methods when extracting features for creating re-identification feature vectors to accommodate variations in light conditions in indoor and outdoor tracking spaces. Examples of light invariant features include pose characteristics of subjects, signals to and from the subject's cell phone, etc., as described above and throughout this document (e.g., the "other parameters" described above). The illumination invariant feature extraction methods can use pose characteristics of the subject, signals to and from the subject's mobile computing device (or other related device) and re-identification feature vectors to match subjects. The re-identification can be subject to lighting conditions and can further use the above-describe light invariant features.

If the subject detected in the second tracking space matches a subject with tracking identifier "track_ID X" in the first tracking space (operation 2235), then the technology disclosed assigns the same tracking identifier (i.e., track_ID X) to the subject detected in the second tracking space. Therefore, the technology disclosed enables a continuity in tracking of subjects across multiple separate tracking spaces that are placed close to each other. The technology disclosed can track the subject in the second tracking space and assign takes of items to the existing shopping cart that was generated for the subject when she took items from shelves in the first tracking space or to her fuel bill when she filled the fuel in her vehicle at the fuel station. Therefore, a single shopping cart data structure can be generated for subjects who shop across multiple separate tracking spaces that are located close to each other (operation 2240).

If the subject detected in the second tracking space does not match to any subject in the first tracking space (operation 2235) then the subject tracking engine 110 can assign a new tracking identifier (e.g., track_ID Y) to the subject detected in the second tracking space (operation 2245). The technology disclosed then tracks the new subject while the subject is present in the second tracking space and creates a new shopping cart data structure for the subject when the subject takes items from shelves. The process described in the flowchart in FIG. 22 can be repeated in a third tracking space when a subject is detected in the third tracking space to match the detected subject to subjects that were tracked in the first and second tracking spaces provided the third tracking space is located in close proximity to the first and the second tracking spaces.

Automatic Generation of Camera Masks for Cameras in a Cashier-Less Shopping Environment Multiple cameras with overlapping fields of view can capture subjects and interactions of subjects as described above. The cameras or sensors can have overlapping fields of view to detect subjects and their interactions. As the area of real space increases, the number of cameras installed in the area of space also increases. The network bandwidth, computing and storage requirements also increase accordingly as more images or videos are captured by camera installed in the area of real space. Further, there are regions or sections in the area of real space that are not required for subject tracking or event detection. Examples of such regions can include peripheral regions where windows are located. Images of some regions are also captured by the cameras but are not included in the area of real space, for example, regions that are visible through windows or doors but are outside the perimeter of the area of real space. Communication bandwidth, processing and storage requirements can be reduced if portions of images corresponding to such regions are removed.

Some regions or sections of the area of real space may expose personal identification or financial information related to the subjects. For example, subjects enter their PINs (personal identification numbers) or other types of identifiers to access their bank or credit card accounts when using an ATM (automated telling machine) positioned in the area of real space. The images of the region in which the ATM is positioned can expose personal and/or financial information of the subjects.

System Overview: Automatic Generation of Camera Masks

Figure 23:
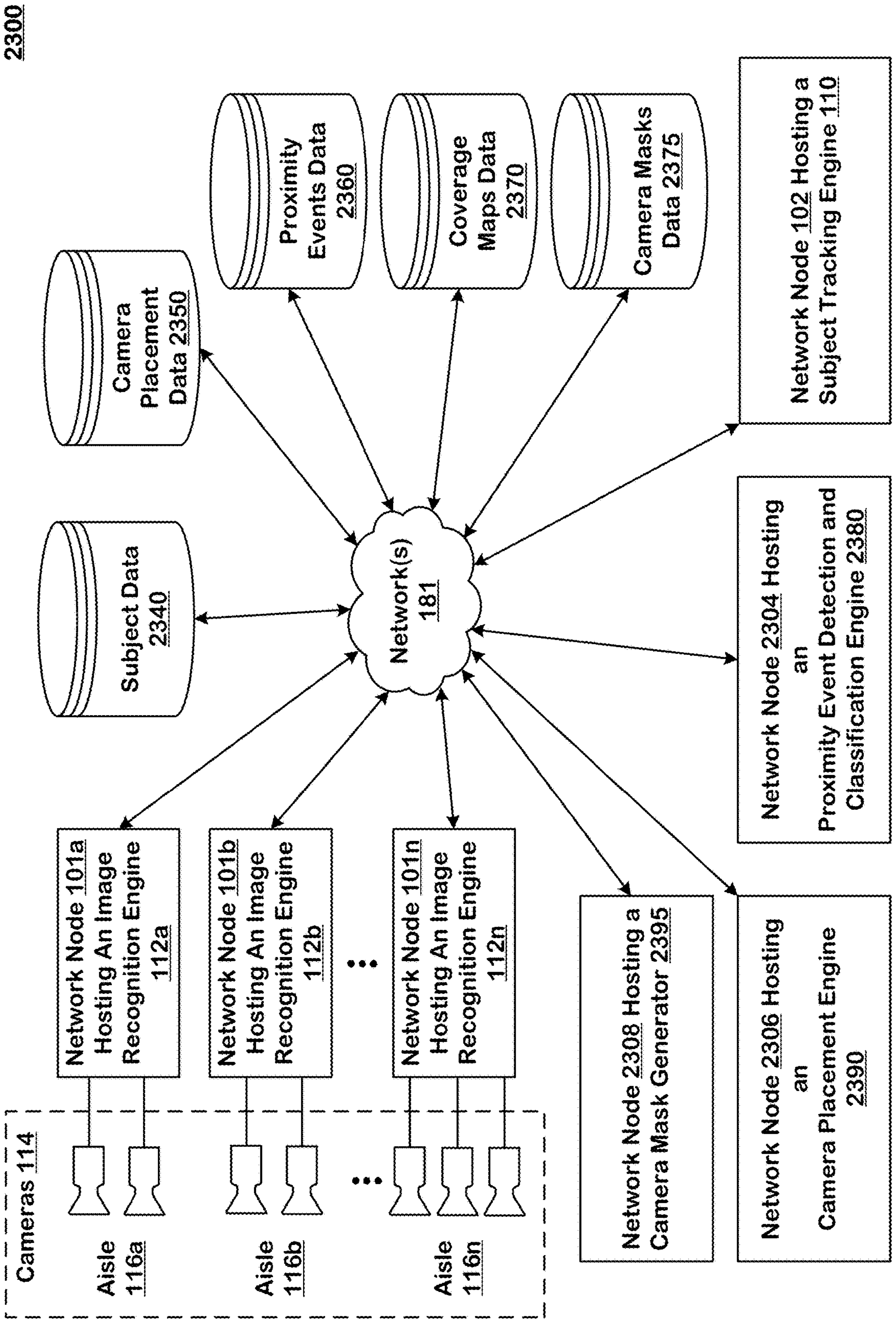
FIG. 23 illustrates an architectural level schematic of a system in which a camera mask generator determines pixels to mask in images captured per camera in an area of real space.

FIG. 23 illustrates an architectural level schematic of a system configured for tracking subjects and items in an area of real space, wherein the system is further configured to automatically generate camera masks for cameras in a cashier-less shopping environment, in accordance with one implementation of the technology disclosed. Within the description of FIG. 23 and following figures associated with system 2300, previously aforementioned methods of camera arrangement, image processing, subject tracking, and/or subject persistence may be included within certain implementations.

A system and various implementations of the cashier-less shopping store or autonomous shopping environment are described with reference to FIGS. 23-48. Certain system and processes are described with reference to FIG. 23, an architectural level schematic of a system in accordance with an implementation. Because FIG. 23 is an architectural diagram, certain details are omitted to improve the clarity of the description.

The system 2300 is similar to the system 100 and the description above for system 100 overlaps with the system 2300 and the corresponding components. Shared descriptions of overlapping components are omitted for the sake of redundancy. In contrast to system 100, system 2300 also comprises the network node 2304 hosting the proximity event detection and classification engine 2380, the network node 2306 hosting the camera placement engine 2390, the network node 2308 hosting the camera mask generator 2395, the camera placement database 2350, the proximity events database 2360, and the camera masks database 2375.

Designing an environment for an autonomous checkout system in an area of real space presents numerous technical challenges. For example, the autonomous checkout systems that use images from sensors or cameras to track subjects in the area of real space and process checkout of subjects require multiple sensors or cameras in the area of real space to generate streams or sequences of images. Reliable tracking of subjects in the area of space and detection of takes and puts of items requires placement of cameras in the area of real space such that a subject is in the field of view of more than one camera at any position in the area of real space. The cameras also need to be oriented such that they can capture front view of display structures (such as shelves). There can be additional constraints that need to be considered when determining the number of cameras, their positions and orientations in the area of real space. For example, there are certain areas where cameras cannot be positioned, e.g., lights or other fixtures on the ceiling, speakers or air conditioning vents, pipes, etc.

Designing an autonomous environment poses unique and new challenges that are not addressed in existing techniques for camera placement. For example, some of the existing techniques use two-dimensional regions when determining camera placement. Some other techniques that use three-dimensional positions of cameras when determining placement of cameras do not include constraints such as at least two cameras with overlapping fields of view to track subjects. Additionally, the existing techniques determine a camera placement for an area such that it is optimized for one objective function. The technical problem addressed by the technology disclosed addresses two separate problems: tracking subjects, and detecting puts and take of items by subjects. An autonomous checkout system needs to reliably solve both these problems for operations of a cashier-less store.

The technology disclosed provides a camera placement and coverage analysis tool that can automatically determine the number of cameras, their positions and orientation for use in a given area of real space, such that the subjects in the area of subjects are reliably tracked and items taken by the subjects are associated with them for checkout. The camera placement and coverage analysis tool can determine the number of cameras, their positions and orientations for an area of real space (such as a shopping store). After the cameras are installed in the area of real space according to the camera placement plan generated by the camera placement engine 190, a next process can be to determine which portions of the image captured by a camera are not required for subject tracking and/or event detection (such as for detection of puts and takes). Some portions of the image captured by a camera may need to be masked to protect personal and/or financial data of subjects in the area of real space such as PINs entered in an ATM machine, etc. The technology disclosed includes a camera mask generator 2395 that can generate one or more masks per camera to mask out portions of images captured by the camera. Further details of the camera mask generator 2395 are presented below.

The technology disclosed provides a computer-implemented method for determining an improved camera coverage plan including a number, a placement, and a pose of cameras that are arranged to track puts and takes of items by subjects in a three-dimensional real space. The computer-implemented method can receive an initial camera coverage plan including a three-dimensional map of a three-dimensional real space. The computer-implemented method can also receive an initial number and initial pose of a plurality of cameras and a camera model including characteristics of the cameras. The camera characteristics can be defined in extrinsic and intrinsic calibration parameters as described herein. The computer-implemented method can begin with the initial camera coverage plan received and iteratively apply a machine learning process to an objective function of number and poses of cameras subject to a set of constraints. The machine learning process can include a mixed integer programming algorithm. The machine learning process includes a gradient descent algorithm. Other types of machine learning processes can be used by the technology disclosed.

The technology disclosed can be applied to placement or positioning of mobile robots or mobile sensing devices equipped with sensors with the task of covering a three-dimensional area of real space given certain constraints. The method can compute position and orientation of robots and sensors in such implementations. With a different sensor modality, the method can be used with cameras with Pan-Title-Zoom capabilities. By adding different zoom, pan, and tilt values to the search space, the method can find optimal positions, orientations and zoom values for each camera given certain constraints. In the above example implementations, the method disclosed can handle dynamic environments where sensor re-configuration is required as the sensors would be able to re-configure themselves to cope with the new environmental physical constraints.

The computer-implemented method obtains from the initial camera coverage plan as received, an improved camera coverage plan using one or more of: (i) a changed number of cameras, and (ii) a changed number of camera poses. The improved camera coverage plan has an improved camera coverage score and concurrently uses a same or reduced number of cameras than the initial camera coverage plan or the camera coverage plan in a previous iteration. The computer-implemented method can provide the improved camera coverage plan to an installer to arrange cameras to track puts and takes of items by subjects in the three-dimensional real space. The improved coverage plans meeting or exceeding constraints can be used for tracking movement of subjects and puts, takes and touch events of subjects in the area of real space.

We now present an example environment of a cashier-less store for which the camera placement and orientation is determined. In the example of a shopping store, shoppers (also referred to as customers or subjects) move in the aisles and in open spaces. The shoppers can take items from shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf. The system can include a maps database in which locations of inventory caches on inventory display structures in the area of real space are stored. In one implementation, three-dimensional maps of inventory display structures are stored that include the width, height, and depth information of display structures along with their positions in the area of real space. In one implementation, the system can include or have access to memory storing a planogram identifying inventory locations in the area of real space and inventory items to be positioned on inventory locations. The planogram can also include information about portions of inventory locations designated for particular inventory items. The planogram can be produced based on a plan for the arrangement of inventory items on the inventory locations in the area of real space. The planogram and/or a floor plan for the area of real space can include positions in three-dimensions of other structures placed in the area of real space such as ATMs (automated teller machine), tables, chairs etc.

As the shoppers (or subjects) move in the shopping store, they can exchange items with other shoppers in the store. For example, a first shopper can hand-off an item to a second shopper in the shopping store. The second shopper who takes the item from the first shopper can then in turn put that item in her shopping basket or shopping cart, or simply keep the item in her hand. The second shopper can also put the item back on a shelf. The technology disclosed can detect a "proximity event" in which a moving inventory cache is positioned close to another inventory cache which can be moving or fixed, such that a distance between them is less than a threshold (e.g., 10 cm). Different values of the threshold can be used greater than or less than 10 cm. In one implementation, the technology disclosed uses locations of joints to locate inventory caches linked to shoppers to detect the proximity event. For example, the system can detect a proximity event when a left or a right hand joint of a shopper is positioned closer than the threshold to a left or right hand joint of another shopper or a shelf location. The system can also use positions of other joints such as elbow joints, or shoulder joints of a subject to detect proximity events. The proximity event detection and classification engine 2380 includes the logic to detect proximity events in the area of real space. The system can store the proximity events in the proximity events database 2360.

The technology disclosed can process the proximity events to detect puts and takes of inventory items. For example, when an item is handed-off from the first shopper to the second shopper, the technology disclosed can detect the proximity event. Following this, the technology disclosed can detect the type of the proximity event, e.g., a put, take or touch type event. When an item is exchanged between two shoppers, the technology disclosed detects a put type event for the source shopper (or source subject) and a take type event for the sink shopper (or sink subject). The system can then process the put and take events to determine the item exchanged in the proximity event. This information is then used by the system to update the log data structures (or shopping cart data structures) of the source and sink shoppers. For example, the item exchanged is removed from the log data structure of the source shopper and added to the log data structure of the sink shopper. The system can apply the same processing logic when shoppers take items from shelves and put items back on the shelves. In this case, the exchange of items takes place between a shopper and a shelf. The system determines the item taken from the shelf or put on the shelf in the proximity event. The system then updates the log data structures of the shopper and the shelf accordingly.

The technology disclosed includes logic to detect a same event in the area of real space using multiple parallel image processing pipelines or subsystems or procedures. These redundant event detection subsystems provide robust event detection and increase the confidence detection of puts and takes by matching events in multiple event streams. The system can then fuse events from multiple event streams using a weighted combination of items classified in event streams. In case one image processing pipeline cannot detect an event, the system can use the results from other image processing pipelines to update the log data structure of the shoppers. We refer to these events of puts and takes in the area of real space as "inventory events". An inventory event can include information about the source and sink, classification of the item, a timestamp, a frame identifier, and a location in three dimensions in the area of real space. The multiple streams of inventory events can include a stream of location based-events, a stream of region proposals-based events, and a stream of semantic diffing-based events. We provide the details of the system architecture, including the machine learning models, system components, and processing operations in the three image processing pipelines, respectively producing the three event streams. The technology disclosed also provide logic to fuse the events in a plurality of event streams.

The camera mask generator 2395 includes logic to generate masks to black out one or more portions of images captured by a camera (or a sensor) such that pixels in images corresponding to any sensitive structure or location in the area of real space are not available to image processing pipeline including the various image processing engines such as the subject tracking engine 110, the proximity event detection and classification engine 2380 and/or other image processing engines. The camera mask generator 2395 can be implemented as a tool providing a user interface with appropriate selection options to generate masks for cameras installed in the area of real space. Further details of the camera mask generation technology disclosed are presented with reference to FIGS. 24-48. A process flowchart including operations to generate masks for images captured by a camera is presented in FIG. 47.

The technology disclosed can mask out portions of images by automatically or manually detecting structures or locations in the area of real space that can potentially contain personal information or other sensitive data related to subjects. For example, the portion of the image in which an ATM is displayed can be masked out because pixels in this portion of the image can contain subjects' PIN (personal identification number) or other data related to financial transactions such as bank account numbers, debit card numbers, credit card numbers, etc. Portions of images of captured by the camera can be masked for performance improvement as well. For example, portions of the image not required for subject tracking and/or detection of inventory events (puts and takes) may be masked out. This can reduce the size of image data to be sent to a server (such as a cloud-based server) for image processing and storage.

In one implementation, at least one or more of a map of the area of real space, a planogram and a floor plan of the area including positions in three-dimensions and functions or purpose of various regions of the area of real space (or of various structures in the area of real space) can be provided as input to the camera mask generator 2395. The camera mask generator 2395 can implement a trained machine learning model to detect various regions of the area of real space and label sensitive regions for masking. A trained machine learning model can also classify different regions in the area of real space as high, medium or low sensitive areas. Different masking strategies can be applied for regions with different levels of sensitivity. For example, pixels corresponding to highly sensitive areas (such as ATMs etc.) can be permanently masked (or blacked out) so that such image data cannot be retrieved again. For regions or locations with medium or low sensitivity levels the image pixels can be masked out for downstream processing for subject tracking and event detection (such as detection of puts and takes) but the original image data without the masking may be stored for a predetermined period of time for compliance, audit and/or review processes.

In one implementation, one or more cameras in the area of real space can be selected for generating masks. In such an implementation, the image portions or pixels for a mask can be automatically determined by a trained machine learning model (or by other processing techniques) from the viewpoint of a selected one or more cameras (e.g., a master camera or cameras that have birds-eye view of large portions of the store). The masks determined for the selected one or more cameras are then propagated to other cameras in the store. This technique allows the masking to be determined for a select few of the cameras and then propagated to all other cameras in the area of real space. The result is that all of the other cameras will be configured to recognize which areas to mask out. As these other cameras have different fields of view and different perspectives from the camera for which masks are generated, therefore, the camera mask generator 2395 can use the extrinsic calibration parameters and the camera placement plan to determine how to transpose the masked out area from the field of view from the master camera to the other cameras that have different fields of view of the area of real space. Further details of the masking technology disclosed herein, are presented with reference to FIGS. 23-48.

The technology disclosed can include logic to perform the recalibration process and the subject tracking and event detection processes substantially contemporaneously, thereby enabling cameras to be calibrated without clearing subjects from the real space or interrupting tracking puts and takes of items by subjects.

Camera Calibration

The system can perform two types of calibrations: internal and external. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one implementation, one subject, such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with an overlapping field of view) that represent the projection of the same point in the 3D scene. Many point correspondences are identified for each 3D scene using the results of the image recognition engines 112*a*-112*n* for the purposes of the external calibration. The image recognition engines identify the position of a joint as (x, y) coordinates, such as row and column numbers, of pixels in the 2D image planes of the respective cameras 114. In one implementation, a joint is one of 19 different types of joints of the subject. As the subject moves through the fields of view of different cameras, the tracking engine 110 receives (x, y) coordinates of each of the 19 different types of joints of the subject per image from the cameras 114 used for the calibration.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of the left wrist. If these key joints are visible in image frames from both camera A and camera B then it is assumed that these represent corresponding points. This process is repeated for many image frames to build up a large collection of corresponding points for all pairs of cameras with overlapping fields of view. In one implementation, images are streamed off of all cameras at a rate of 30 FPS (frames per second) or more and a resolution of 1280 by 720 pixels in full RGB (red, green, and blue) color. These images are in the form of one-dimensional arrays (also referred to as flat arrays).

In some implementations, the resolution of the images is reduced before applying the images to the inference engines used to detect the joints in the images, such as by dropping every other pixel in a row, reducing the size of the data for each pixel, or otherwise, so the input images at the inference engine have smaller amounts of data, and so the inference engines can operate faster.

The large number of images collected above for a subject can be used to determine corresponding points between cameras with overlapping fields of view. Consider two cameras A and B with overlapping fields of view. The plane passing through the camera centers of cameras A and B and the joint location (also referred to as the feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the tracking engine 110 to identify the same joints in outputs (arrays of joints data structures) of different image recognition engines 112*a*-112*n*, processing images of the cameras 114 with overlapping fields of view. The results of the internal and external camera calibration are stored in the calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when the spatial relationship between the two projections is unknown. The Longuet-Higgins paper presents a technique to determine the position of each camera in the real space with respect to other cameras. Additionally, their technique allows the triangulation of a subject in the real space, identifying the value of the z-coordinate (height from the floor) using images from cameras 114 with overlapping fields of view. An arbitrary point in the real space, for example, the end of a shelf in one corner of the real space, is designated as a (0, 0, 0) point on the (x, y, z) coordinate system of the real space.

In an implementation of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [x, x, x], [x, x, x], [x, x, x]],
    distortion _coefficients: [x, x, x, x, x, x, x, x]
  },
  ......
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor from one camera to another. A fundamental matrix is a relationship between two images of the same scene that constrains where the projection of points from the scene can occur in both images. An essential matrix is also a relationship between two images of the same scene with the condition that the cameras are calibrated. The projection matrix gives a vector space projection from the 3D real space to a subspace. The rotation matrix is used to perform a rotation in Euclidean space. The translation vector "t" represents a geometric transformation that moves every point of a Fig. or a space by the same distance in a given direction. The homography_floor_coefficients are used to combine images of features of subjects on the floor viewed by cameras with overlapping fields of views. The second data structure is shown below. Similar data is stored for all pairs of cameras. As indicated previously, the x's represents numeric floating point numbers.

```
{
  1: {
    2: {
      F: [[x, x, x], [x, x, x], [x, x, x]],
      E: [[x, x, x], [x, x, x], [x, x, x]],
      P: [[x, x, x, x], [x, x, x, x], [x, x, x, x]],
      R: [x, x, x], [x, x, x], [x, x, x]],
      t: [x, x, x],
      homography_floor_coefficients: [x, x, x, x, x, x, x, x]
    }
  },
  .......
}
```

The system can also use Fiducial markers for initial calibration of cameras in the area of real space. We present examples of calibrating cameras using Fiducial markers and the process to perform recalibration of cameras in FIGS. 26-32D.

Two-Dimensional and Three-Dimensional Maps

Figure 24:
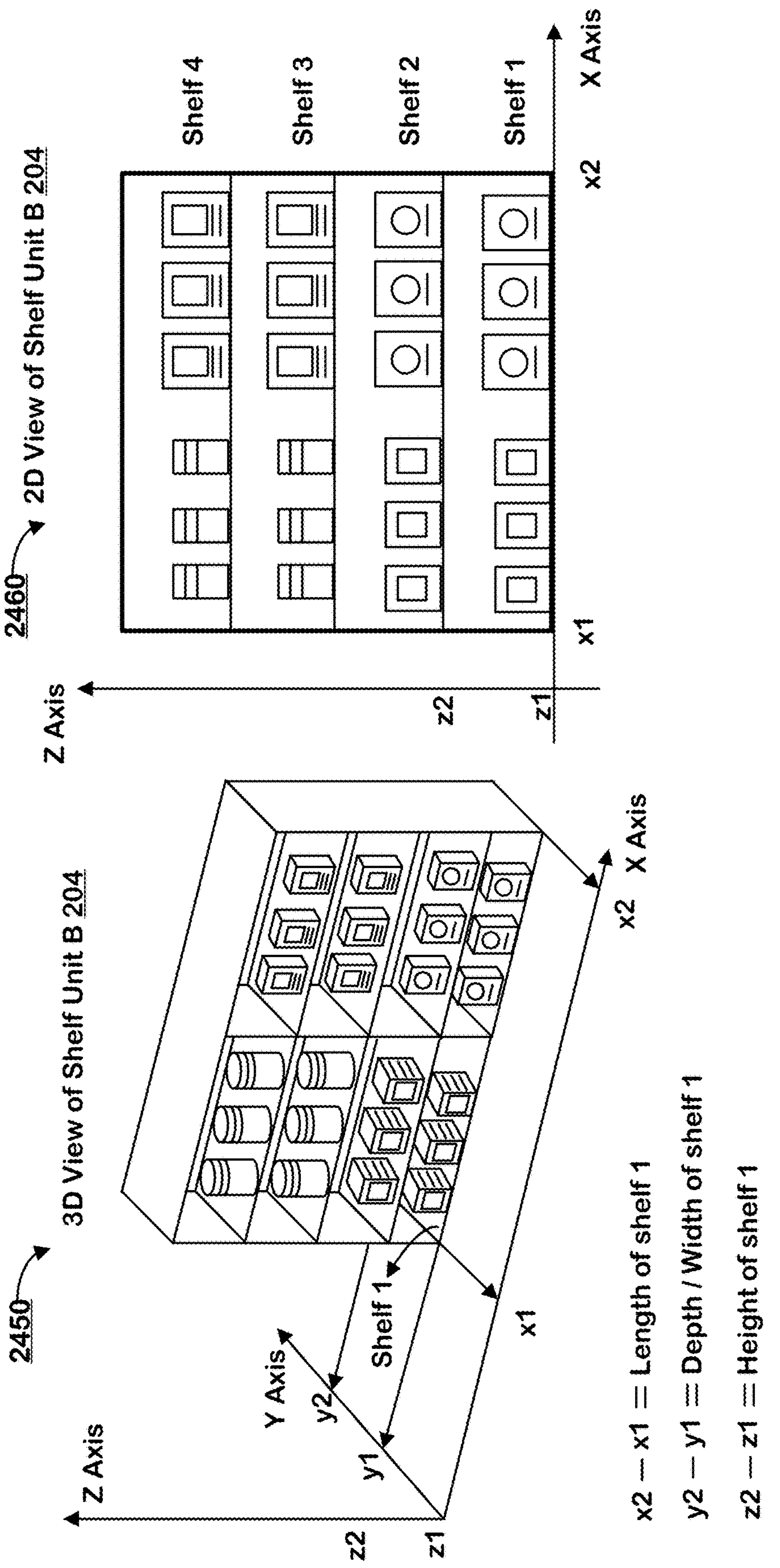
FIG. 24 illustrates a three-dimensional and a two-dimensional view of an inventory display structure (or a shelf unit).

FIG. 24 presents creation of two-dimensional (2D) and three-dimensional (3D) maps. An inventory cache, such as a location on a shelf, in a shopping store can be identified by a unique identifier in a map database (e.g., shelf_id). Similarly, a shopping store can also be identified by a unique identifier (e.g., store_id) in a map database. The two-dimensional (2D) and camera placement database 2350 identifies locations of inventory caches in the area of real space along the respective coordinates. For example, in a 2D map, the locations in the maps define two dimensional regions on the plane formed perpendicular to the floor i.e., the XZ plane as shown in illustration 2460 in FIG. 24. The map defines an area for inventory locations or shelves where inventory items are positioned. In FIG. 24, a 2D location of the shelf unit shows an area formed by four coordinate positions (x1, y1), (x1, y2), (x2, y2), and (x2, y1). These coordinate positions define a 2D region on the floor where the shelf is located. Similar 2D areas are defined for all inventory display structure locations, entrances, exits, and designated unmonitored locations in the shopping store. This information is stored in the maps database.

In a 3D map, the locations in the map define three dimensional regions in the 3D real space defined by X. Y, and Z coordinates. The map defines a volume for inventory locations where inventory items are positioned. In illustration 2450 in FIG. 24, a 3D view 2450 of shelf 1, at the bottom of shelf unit B, shows a volume formed by eight coordinate positions (x1, y1, z1), (x1, y1, 72), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the maps database. The coordinate positions along the three axes can be used to calculate length, depth and height of the inventory locations as shown in FIG. 24.

In one implementation, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations, entrances, exits and designated unmonitored locations in the shopping store.

The items in a shopping store are arranged in some implementations according to a planogram which identifies the inventory locations (such as shelves) on which a particular item is planned to be placed. For example, as shown in an illustration 2450 in FIG. 24, the left half portions of shelf 3 and shelf 4 are designated for an item (which is stocked in the form of cans). The system can include pre-defined planograms for the shopping store which include positions of items on the shelves in the store. The planograms can be stored in the maps database. In one implementation, the system can include logic to update the positions of items on shelves in real time or near real time.

Convolutional Neural Network

The image recognition engines in the processing platforms receive a continuous stream of images at a predetermined rate. In one implementation, the image recognition engines comprise convolutional neural networks (abbreviated CNN).

Figure 25:
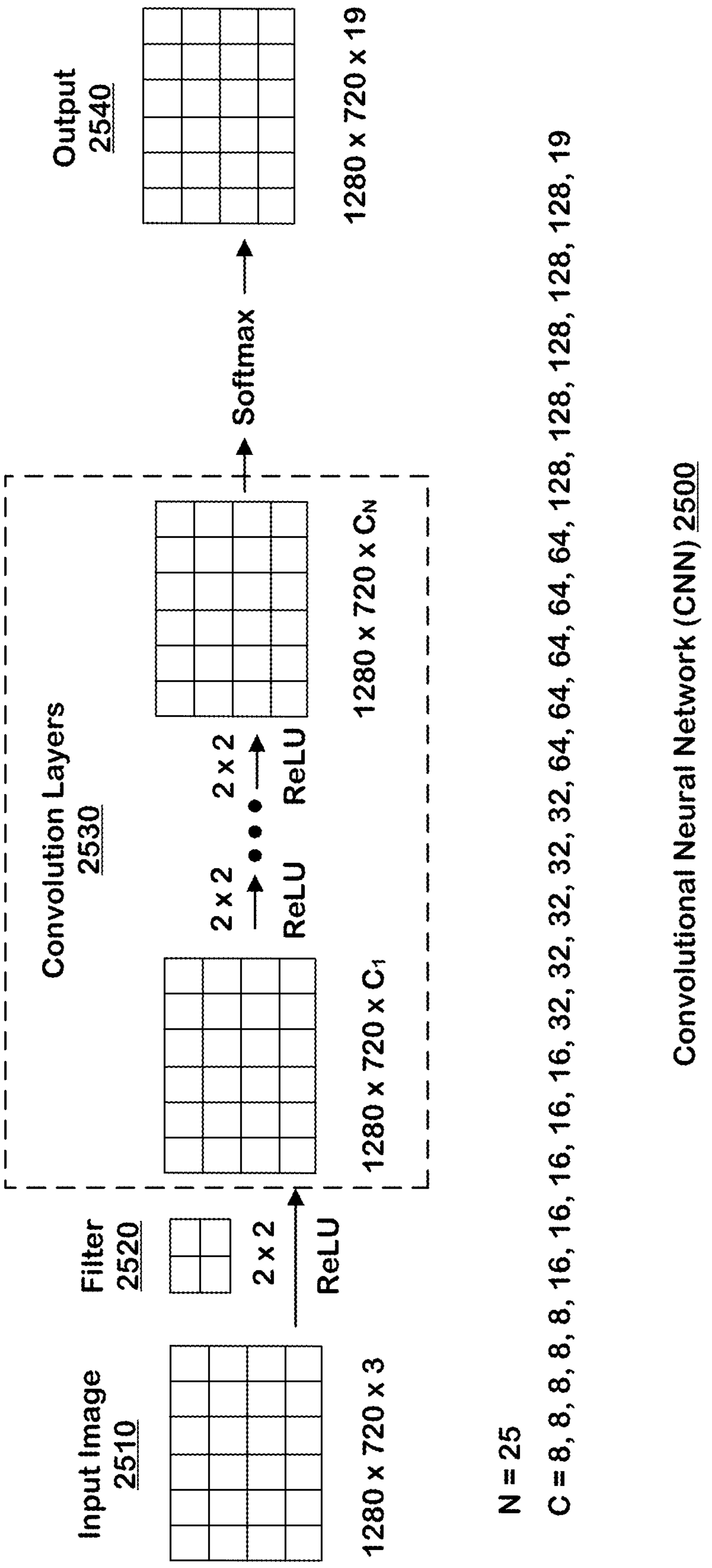
FIG. 25 illustrates input, output and convolution layers in an example convolutional neural network to classify joints of subjects in sequences of images.

FIG. 25 illustrates the processing of image frames by an example CNN referred to by a numeral 2500. The input image 2510 is a matrix consisting of image pixels arranged in rows and columns. In one implementation, the input image 2510 has a width of 1280 pixels, a height of 720 pixels and 3 channels, red, blue, and green also referred to as RGB. The channels can be imagined as three 1280×720 two-dimensional images stacked over one another. Therefore, the input image has dimensions of 1280×720×3 as shown in FIG. 25A. As mentioned above, in some implementations, the images are filtered to provide images with reduced resolution for input to the CNN.

A 2×2 filter 2520 is convolved with the input image 2510. In this implementation, no padding is applied when the filter is convolved with the input. Following this, a nonlinearity function is applied to the convolved image. In the present implementation, rectified linear unit (ReLU) activations are used. Other examples of nonlinear functions include sigmoid, hyperbolic tangent (tan h) and variations of ReLU such as leaky ReLU. A search is performed to find hyper-parameter values. The hyper-parameters are $C_1, C_2, \ldots, C_N$ where $C_N$ means the number of channels for convolution layer "N". Typical values of N and C are shown in FIG. 25. There are twenty-five (25) layers in the CNN as represented by N equals 25. The values of C are the number of channels in each convolution layer for layers 1 to 25. In other implementations, additional features are added to the CNN 400 such as residual connections, squeeze-excitation modules, and multiple resolutions.

In typical CNNs used for image classification, the size of the image (width and height dimensions) is reduced as the image is processed through convolution layers. That is helpful in feature identification as the goal is to predict a class for the input image. However, in the illustrated implementation, the size of the input image (i.e. image width and height dimensions) is not reduced, as the goal is not only to identify a joint (also referred to as a feature) in the image frame, but also to identify its location in the image so it can be mapped to coordinates in the real space. Therefore, as shown FIG. 26, the width and height dimensions of the image remain unchanged relative to the input images (with full or reduced resolution) as the processing proceeds through convolution layers of the CNN, in this example.

In one implementation, the CNN 2500 identifies one of the 19 possible joints of the subjects at each element of the image. The possible joints can be grouped in two categories: foot joints and non-foot joints. The $19^{th}$ type of joint classification is for all non-joint features of the subject (i.e. elements of the image not classified as a joint).

| |
|---|
| Foot Joints: |
| Ankle joint (left and right) |
| Non-foot Joints: |
| Neck |
| Nose |
| Eyes (left and right) |
| Ears (left and right) |
| Shoulders (left and right) |
| Elbows (left and right) |
| Wrists (left and right) |
| Hips (left and right) |
| Knees (left and right) |
| Not a joint |

An array of joints data structures (e.g., a data structure that stores an array of joint data) for a particular image classifies elements of the particular image by joint type, time of the particular image, and/or the coordinates of the elements in the particular image. The type of joints can include all of the above-mentioned types of joints, as well as any other physiological location on the subject that is identifiable. In one embodiment, the image recognition engines 112*a*-112*n* are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

As can be seen, a "joint" for the purposes of this description is a trackable feature of a subject in the real space. A joint may correspond to physiological joints on the subjects, or other features such as the eyes, or nose.

The first set of analyses on the stream of input images identifies trackable features of subjects in real space. In one implementation, this is referred to as a "joints analysis". In such an implementation, the CNN used for joints analysis is referred to as a "joints CNN". In one implementation, the joints analysis is performed thirty times per second over the thirty frames per second received from the corresponding camera. The analysis is synchronized in time i.e., at $1/30^{th}$ of a second, images from all cameras 114 are analyzed in the corresponding joints CNNs to identify joints of all subjects in the real space. The results of this analysis of the images from a single moment in time from plural cameras are stored as a "snapshot".

A snapshot can be in the form of a dictionary containing arrays of joints data structures from images of all cameras 114 at a moment in time, representing a constellation of candidate joints within the area of real space covered by the system. In one implementation, the snapshot is stored in the subject database 140.

In this example CNN, a softmax function is applied to every element of the image in the final layer of convolution layers 2530. The softmax function transforms a K-dimensional vector of arbitrary real values to a K-dimensional vector of real values in the range [0, 1] that add up to 1. In one implementation, an element of an image is a single pixel. The softmax function converts the 19-dimensional array (also referred to a 19-dimensional vector) of arbitrary real values for each pixel to a 19-dimensional confidence array of real values in the range [0, 1] that add up to 1. The 19 dimensions of a pixel in the image frame correspond to the 19 channels in the final layer of the CNN which further correspond to the 19 types of joints of the subjects.

A large number of picture elements can be classified as one of each of the 19 types of joints in one image depending on the number of subjects in the field of view of the source camera for that image.

The image recognition engines 112*a*-112*n* process images to generate confidence arrays for elements of the image. A confidence array for a particular element of an image includes confidence values for a plurality of joint types for the particular element. Each one of the image recognition engines 112*a*-112*n*, respectively, generates an output matrix of confidence arrays per image. Finally, each image recognition engine generates arrays of joints data structures corresponding to each output matrix 2540 of confidence arrays per image. The arrays of joints data structures corresponding to particular images classify elements of the particular images by joint type, time of the particular image, and coordinates of the element in the particular image. A joint type for the joints data structure of the particular elements in each image is selected based on the values of the confidence array.

Each joint of the subjects can be considered to be distributed in the output matrix 2540 as a heat map. The heat map can be resolved to show image elements having the highest values (peak) for each joint type. Ideally, for a given picture element having high values of a particular joint type, surrounding picture elements outside a range from the given picture element will have lower values for that joint type, so that a location for a particular joint having that joint type can be identified in the image space coordinates. Correspondingly, the confidence array for that image element will have the highest confidence value for that joint and lower confidence values for the remaining 18 types of joints.

In one implementation, batches of images from each camera 114 are processed by respective image recognition engines. For example, six contiguously timestamped images are processed sequentially in a batch to take advantage of cache coherence. The parameters for one layer of the CNN 2500 are loaded in memory and applied to the batch of six image frames. Then the parameters for the next layer are loaded in memory and applied to the batch of six images. This is repeated for all convolution layers 2530 in the CNN 2500. The cache coherence reduces processing time and improves the performance of the image recognition engines.

In one such implementation, referred to as three-dimensional (3D) convolution, a further improvement in performance of the CNN 2500 is achieved by sharing information across image frames in the batch. This helps in more precise identification of joints and reduces false positives. For examples, features in the image frames for which pixel values do not change across the multiple image frames in a given batch are likely static objects such as a shelf. The change of values for the same pixel across image frames in a given batch indicates that this pixel is likely a joint. Therefore, the CNN 2500 can focus more on processing that pixel to accurately identify the joint identified by that pixel.

Joints Data Structure

The output of the CNN 2500 is a matrix of confidence arrays for each image per camera. The matrix of confidence arrays is transformed into an array of joints data structures. A joints data structure 310 as shown in FIG. 3A is used to store the information of each joint. The joints data structure 310 identifies x and y positions of the element in the particular image in the 2D image space of the camera from which the image is received. A joint number identifies the type of joint identified. For example, in one implementation, the values range from 1 to 19. A value of 1 indicates that the joint is a left-ankle, a value of 2 indicates the joint is a right-ankle and so on. The type of joint is selected using the confidence array for that element in the output matrix 2540. For example, in one implementation, if the value corresponding to the left-ankle joint is highest in the confidence array for that image element, then the value of the joint number is "1".

A confidence number indicates the degree of confidence of the CNN 2500 in predicting that joint. If the value of the confidence number is high, it means the CNN is confident in its prediction. An integer-Id is assigned to the joints data structure to uniquely identify it. Following the above mapping, the output matrix 2540 of confidence arrays per image is converted into an array of joints data structures for each image.

The image recognition engines 112*a*-112*n* receive the sequences of images from the cameras 114 and process the images to generate corresponding arrays of joints data structures as described above. An array of joints data structures for a particular image classifies elements of the particular image by joint type, time of the particular image, and the coordinates of the elements in the particular image. In one implementation, the image recognition engines 112*a*-112*n* are convolutional neural networks CNN 2500, the joint type is one of the 19 types of joints of the subjects, the time of the particular image is the timestamp of the image generated by the source camera 114 for the particular image, and the coordinates (x, y) identify the position of the element on a 2D image plane.

In one implementation, the joints analysis includes performing a combination of k-nearest neighbors, mixture of Gaussians, various image morphology transformations, and joints CNN on each input image. The result comprises arrays of joints data structures which can be stored in the form of a bit mask in a ring buffer that maps image numbers to bit masks at each moment in time.

Grouping Candidate Joints

The subject tracking engine 110 receives arrays of joints data structures along two dimensions: time and space. Along the time dimension, the tracking engine receives sequentially timestamped arrays of joints data structures processed by the image recognition engines 112*a*-112*n* per camera. The joints data structures include multiple instances of the same joint of the same subject over a period of time in images from cameras having overlapping fields of view. The (x, y) coordinates of the element in the particular image will usually be different in sequentially timestamped arrays of joints data structures because of the movement of the subject to which the particular joint belongs. For example, twenty picture elements classified as left-wrist joints can appear in many sequentially timestamped images from a particular camera, each left-wrist joint having a position in real space that can be changing or unchanging from image to image. As a result, twenty left-wrist joints data structures 310 in many sequentially timestamped arrays of joints data structures can represent the same twenty joints in real space over time.

Because multiple cameras having overlapping fields of view cover each location in the real space, at any given moment in time, the same joint can appear in images of more than one of the cameras 114. The cameras 114 are synchronized in time, therefore, the tracking engine 110 receives joints data structures for a particular joint from multiple cameras having overlapping fields of view, at any given moment in time. This is the space dimension, the second of the two dimensions: time and space, along which the subject tracking engine 110 receives data in arrays of joints data structures.

The subject tracking engine 110 uses an initial set of heuristics stored in a heuristics database to identify candidate joints data structures from the arrays of joints data structures. The goal is to minimize a global metric over a period of time. A global metric calculator can calculate the global metric. The global metric is a summation of multiple values described below. Intuitively, the value of the global metric is at a minimum when the joints in arrays of joints data structures received by the subject tracking engine 110 along the time and space dimensions are correctly assigned to their respective subjects. For example, consider the implementation of the shopping store with customers moving in the aisles. If the left-wrist of a customer A is incorrectly assigned to a customer B, then the value of the global metric will increase. Therefore, minimizing the global metric for each joint for each customer is an optimization problem. One option to solve this problem is to try all possible connections of joints. However, this can become intractable as the number of customers increases.

A second approach to solve this problem is to use heuristics to reduce possible combinations of joints identified as members of a set of candidate joints for a single subject. For example, a left-wrist joint cannot belong to a subject far apart in space from other joints of the subject because of known physiological characteristics of the relative positions of joints. Similarly, a left-wrist joint having a small change in position from image to image is less likely to belong to a subject having the same joint at the same position from an image far apart in time, because the subjects are not expected to move at a very high speed. These initial heuristics are used to build boundaries in time and space for constellations of candidate joints that can be classified as a particular subject. The joints in the joints data structures within a particular time and space boundary are considered as "candidate joints" for assignment to sets of candidate joints as subjects present in the real space. These candidate joints include joints identified in arrays of joints data structures from multiple images from a same camera over a period of time (time dimension) and across different cameras with overlapping fields of view (space dimension).

Foot Joints

The joints can be divided for the purposes of a procedure for grouping the joints into constellations, into foot and non-foot joints as shown above in the list of joints. The left and right-ankle joint types in the current example are considered foot joints for the purpose of this procedure. The subject tracking engine 110 can start the identification of sets of candidate joints of particular subjects using foot joints. In the implementation of the shopping store, the feet of the customers are on the floor 220 as shown in FIG. 2A. The distance of the cameras 114 to the floor 220 is known. Therefore, when combining the joints data structures of foot joints from arrays of joints data structures corresponding to images of cameras with overlapping fields of view, the subject tracking engine 110 can assume a known depth (distance along z axis). The value depth for foot joints is zero i.e. (x, y, 0) in the (x, y, z) coordinate system of the real space. Using this information, the subject tracking engine 110 applies homographic mapping to combine joints data structures of foot joints from cameras with overlapping fields of view to identify the candidate foot joint. Using this mapping, the location of the joint in (x, y) coordinates in the image space is converted to the location in the (x, y, z) coordinates in the real space, resulting in a candidate foot joint. This process is performed separately to identify candidate left and right foot joints using respective joints data structures.

Following this, the subject tracking engine 110 can combine a candidate left foot joint and a candidate right foot joint (assign them to a set of candidate joints) to create a subject. Other joints from the galaxy of candidate joints can be linked to the subject to build a constellation of some or all of the joint types for the created subject.

If there is only one left candidate foot joint and one right candidate foot joint then it means there is only one subject in the particular space at the particular time. The tracking engine 110 creates a new subject having the left and the right candidate foot joints belonging to its set of joints. The subject is saved in the subject database 140. If there are multiple candidate left and right foot joints, then the global metric calculator attempts to combine each candidate left foot joint to each candidate right foot joint to create subjects such that the value of the global metric is minimized.

Non-Foot Joints

To identify candidate non-foot joints from arrays of joints data structures within a particular time and space boundary, the subject tracking engine 110 uses the non-linear transformation (also referred to as a fundamental matrix) from any given camera A to its neighboring camera B with overlapping fields of view. The non-linear transformations are calculated using a single multi-joint subject and stored in a calibration database as described above. For example, for two cameras A and B with overlapping fields of view, the candidate non-foot joints are identified as follows. The non-foot joints in arrays of joints data structures corresponding to elements in image frames from camera A are mapped to epipolar lines in synchronized image frames from camera B. A joint (also referred to as a feature in machine vision literature) identified by a joints data structure in an array of joints data structures of a particular image of camera A will appear on a corresponding epipolar line if it appears in the image of camera B. For example, if the joint in the joints data structure from camera A is a left-wrist joint, then a left-wrist joint on the epipolar line in the image of camera B represents the same left-wrist joint from the perspective of camera B. These two points in the images of cameras A and B are projections of the same point in the 3D scene in real space and are referred to as a "conjugate pair".

Machine vision techniques such as the technique by Longuet-Higgins published in the paper, titled, "A computer algorithm for reconstructing a scene from two projections" in Nature, Volume 293, 10 Sep. 1981, are applied to conjugate pairs of corresponding points to determine the heights of joints from the floor 220 in the real space. Application of the above method requires predetermined mapping between cameras with overlapping fields of view. That data can be stored in a calibration database as non-linear functions determined during the calibration of the cameras 114 described above.

The subject tracking engine 110 receives the arrays of joints data structures corresponding to images in sequences of images from cameras having overlapping fields of view, and translates the coordinates of the elements in the arrays of joints data structures corresponding to images in different sequences into candidate non-foot joints having coordinates in the real space. The identified candidate non-foot joints are grouped into sets of subjects having coordinates in real space using a global metric calculator. The global metric calculator can calculate the global metric value and attempt to minimize the value by checking different combinations of non-foot joints. In one implementation, the global metric is a sum of heuristics organized in four categories. The logic to identify sets of candidate joints comprises heuristic functions based on physical relationships among the joints of subjects in real space to identify sets of candidate joints as subjects. Examples of physical relationships among joints are considered in the heuristics as described below.

First Category of Heuristics

The first category of heuristics includes metrics to ascertain the similarity between two proposed subject-joint locations in the same camera view at the same or different moments in time. In one implementation, these metrics are floating point values, where higher values mean two lists of joints are likely to belong to the same subject. Consider the example implementation of the shopping store; the metrics determine the distance between a customer's same joints in one camera from one image to the next image along the time dimension. Given a customer A in the field of view of the camera, the first set of metrics determines the distance between each of person A's joints from one image from the camera to the next image from the same camera. The metrics are applied to joints data structures 310 in arrays of joints data structures per image from the cameras 114.

In one implementation, two example metrics in the first category of heuristics are listed below:

1. The inverse of the Euclidean 2D coordinate distance (using x, y coordinate values for a particular image from a particular camera) between the left ankle-joint of two subjects on the floor and the right ankle-joint of the two subjects on the floor summed together.
2. The sum of the inverse of the Euclidean 2D coordinate distance between every pair of non-foot joints of subjects in the image frame.

Second Category of Heuristics

The second category of heuristics includes metrics to the ascertain similarity between two proposed subject-joint locations from the fields of view of multiple cameras at the same moment in time. In one implementation, these metrics are floating point values, where higher values mean two lists of joints are likely to belong to the same subject. Consider the example implementation of the shopping store, the second set of metrics determines the distance between a customer's same joints in image frames from two or more cameras (with overlapping fields of view) at the same moment in time.

In one implementation, two example metrics in the second category of heuristics are listed below:

1. The inverse of the Euclidean 2D coordinate distance (using x, y coordinate values for a particular image from a particular camera) between the left ankle-joint of two subjects on the floor and the right ankle-joint of the two subjects on the floor summed together. The first subject's ankle-joint locations are projected to the camera in which the second subject is visible through homographic mapping.
2. The sum of all pairs of joints of the inverse of the Euclidean 2D coordinate distance between a line and a point, where the line is the epipolar line of a joint of an image from a first camera having a first subject in its field of view to a second camera with a second subject in its field of view and the point is the joint of the second subject in the image from the second camera.

Third Category of Heuristics

The third category of heuristics includes metrics to ascertain the similarity between all joints of a proposed subject-joint location in the same camera view at the same moment in time. Consider the example implementation of the shopping store; this category of metrics determines the distance between joints of a customer in one frame from one camera.

Fourth Category of Heuristics

The fourth category of heuristics includes metrics to ascertain the dissimilarity between proposed subject-joint locations. In one implementation, these metrics are floating point values. Higher values mean two lists of joints are more likely to not be the same subject. In one implementation, two example metrics in this category include:

1. The distance between neck joints of two proposed subjects.
2. The sum of the distance between pairs of joints between two subjects.

In one implementation, various thresholds which can be determined empirically are applied to the above listed metrics as described below:

1. Thresholds to decide when metric values are small enough to consider that a joint belongs to a known subject.
2. Thresholds to determine when there are too many potential candidate subjects that a joint can belong to with too good of a metric similarity score.
3. Thresholds to determine when collections of joints over time have high enough metric similarity to be considered a new subject, previously not present in the real space.
4. Thresholds to determine when a subject is no longer in the real space.
5. Thresholds to determine when the tracking engine 110 has made a mistake and has confused two subjects.

The subject tracking engine 110 includes logic to store the sets of joints identified as subjects. The logic to identify sets of candidate joints includes logic to determine whether a candidate joint identified in images taken at a particular time corresponds with a member of one of the sets of candidate joints identified as subjects in preceding images. In one implementation, the subject tracking engine 110 compares the current joint-locations of a subject with previously recorded joint-locations of the same subject at regular intervals. This comparison allows the tracking engine 110 to update the joint locations of subjects in the real space. Additionally, using this, the subject tracking engine 110 identifies false positives (i.e., falsely identified subjects) and removes subjects no longer present in the real space.

Consider the example of the shopping store implementation, in which the subject tracking engine 110 created a customer (subject) at an earlier moment in time, however, after some time, the subject tracking engine 110 does not have current joint-locations for that particular customer. It means that the customer was incorrectly created. The subject tracking engine 110 deletes incorrectly generated subjects from the subject database 140. In one implementation, the subject tracking engine 110 also removes positively identified subjects from the real space using the above-described process. Consider in the example of the shopping store, when a customer leaves the shopping store, the subject tracking engine 110 deletes the corresponding customer record from the subject database 140. In one such implementation, the subject tracking engine 110 updates this customer's record in the subject database 140 to indicate that "the customer has left the store".

In one implementation, the subject tracking engine 110 attempts to identify subjects by applying the foot and non-foot heuristics simultaneously. This results in "islands" of connected joints of the subjects. As the subject tracking engine 110 processes further arrays of joints data structures along the time and space dimensions, the size of the islands increases. Eventually, the islands of joints merge to other islands of joints forming subjects which are then stored in the subject database 140. In one implementation, the subject tracking engine 110 maintains a record of unassigned joints for a predetermined period of time. During this time, the tracking engine attempts to assign the unassigned joints to existing subjects or create new multi-joint entities from these unassigned joints. The tracking engine 110 discards the unassigned joints after a predetermined period of time. It is understood that, in other implementations, different heuristics than the ones listed above are used to identify and track subjects.

In one implementation, a user interface output device connected to the node 102 hosting the subject tracking engine 110 displays the position of each subject in the real spaces. In one such implementation, the display of the output device is refreshed with new locations of the subjects at regular intervals.

Detecting Proximity Events

The technology disclosed can detect proximity events when the distance between a source and a sink is below a threshold. A proximity event can be detected when the distance between a source and a sink falls below the threshold distance. Note that for a second proximity event to be detected for the same source and the same sink, the distance between the source and sink needs to increase above the threshold distance. A source and a sink can be an inventory cache linked to a subject (such as a shopper) in the area of real space or an inventory cache having a location on a shelf in an inventory display structure. Therefore, the technology disclosed can not only detect item puts and takes from shelves on inventory display structures but also item hand-offs or item exchanges between shoppers in the store.

In one implementation, the technology disclosed uses the positions of hand joints of subjects and positions of shelves to detect proximity events. For example, the system can calculate the distance of left hand and right hand joints, or joints corresponding to hands, of every subject to left hand and right hand joints of every other subject in the area of real space or to shelf locations at every time interval. The system can calculate these distances at every second or at a less than one second time interval. In one implementation, the system can calculate the distances between hand joints of subjects and shelves per aisle or per portion of the area of real space to improve computational efficiency as the subjects can hand off items to other subjects that are positioned close to each other. The system can also use other joints of subjects to detect proximity events; for example, if one or both hand joints of a subject are occluded, the system can use the left and right elbow joints of this subject when calculating the distance to hand joints of other subjects and shelves. If the elbow joints of the subject are also occluded, then the system can use the left and right shoulder joints of the subject to calculate their distance from other subjects and shelves. The system can use the positions of shelves and other static objects such as bins, etc. from the location data stored in the maps database.

The technology disclosed includes logic that can indicate the type of the proximity event. A first type of proximity event can be a "put" event in which the item is handed off from a source to a sink. For example, a subject (source) who is holding the item prior to the proximity event can give the item to another subject (sink) or place it on a shelf (sink) following the proximity event. A second type of proximity event can be a "take" event in which a subject (sink) who is not holding the item prior to the proximity event can take an item from another subject (source) or a shelf (source) following the event. A third type of proximity event is a "touch" event in which there is no exchange of items between a source and a sink. Example of touch events can include a subject holding the item on a shelf for a moment and then putting the item back on the shelf and moving away from the shelf. Another example of a touch event can occur when the hands of two subjects move closer to each other such that the distance between the hands of the two subjects is less than the threshold distance. However, there is no exchange of items from the source (the subject who is holding the item prior to the proximity event) to the sink (the subject who is not holding the item prior to the proximity event).

Multi-Camera Environment

The first operation and the prerequisite for the process of defining the optimal camera placement is a 3D geometric map of the environment. Some of the ways of creating such maps include: Photogrammetry-based approaches using images taken from multiple viewpoints, Simultaneous Localization and Mapping (SLAM) based methods by using the Lidar sensor data in the environment or just using a rendering of the space using a three-dimensional designer computer-aided design (CAD) tool. The map can be consumed as a mesh file or a point cloud file. Once the map is created, the map is used to extract the viewpoints of the cameras and the region of the maps seen by the cameras.

Figure 26A:
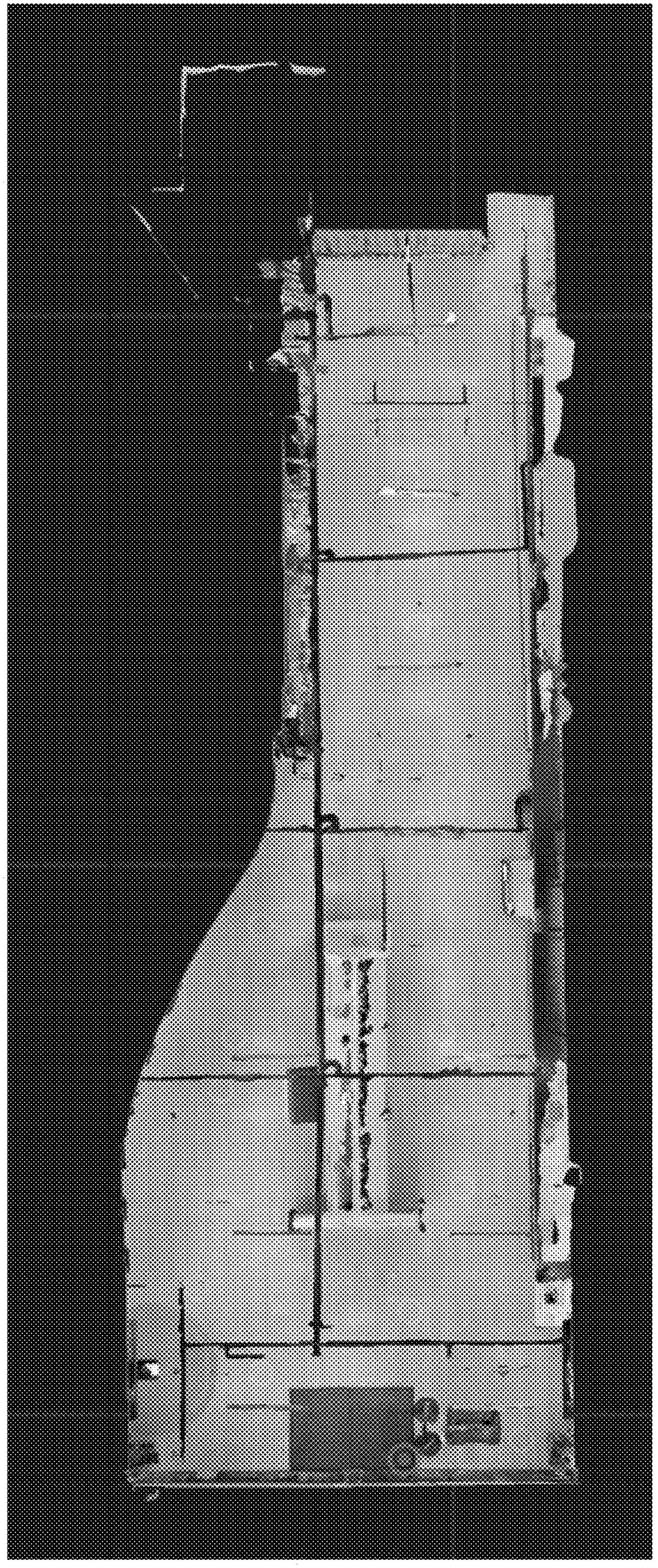
FIGS. 26A, 26B, 26C, and 26D present examples of three-dimensional map of an area of real space.
Figure 26B:
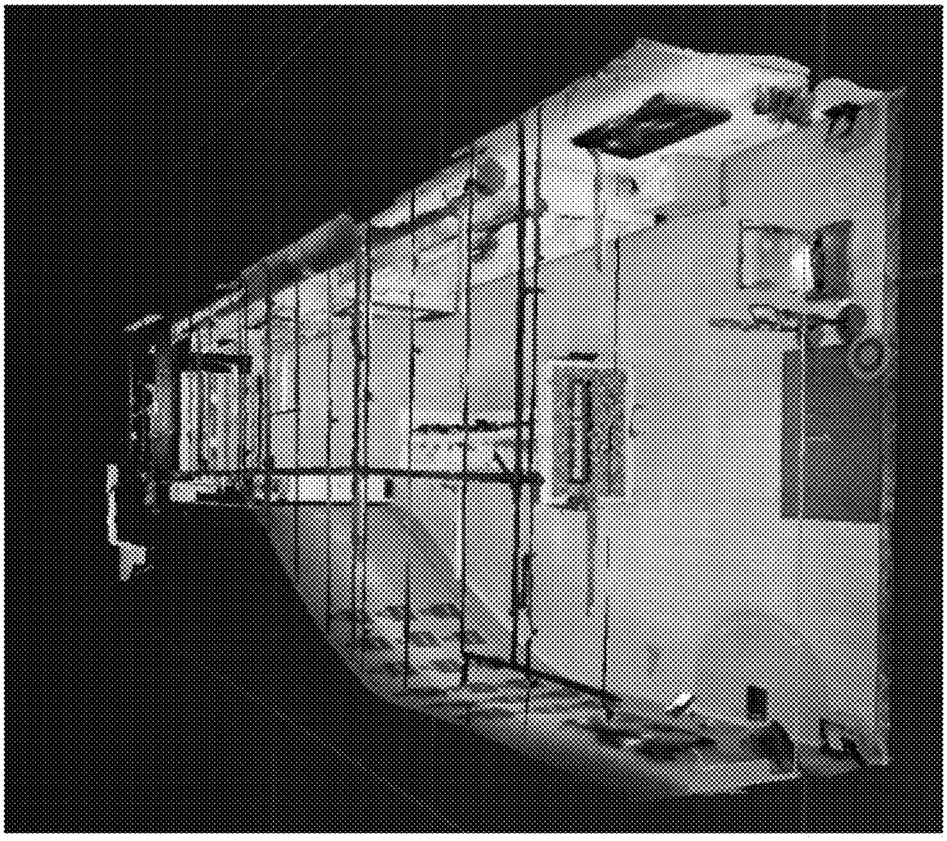
Figure 26C:
Figure 26D:
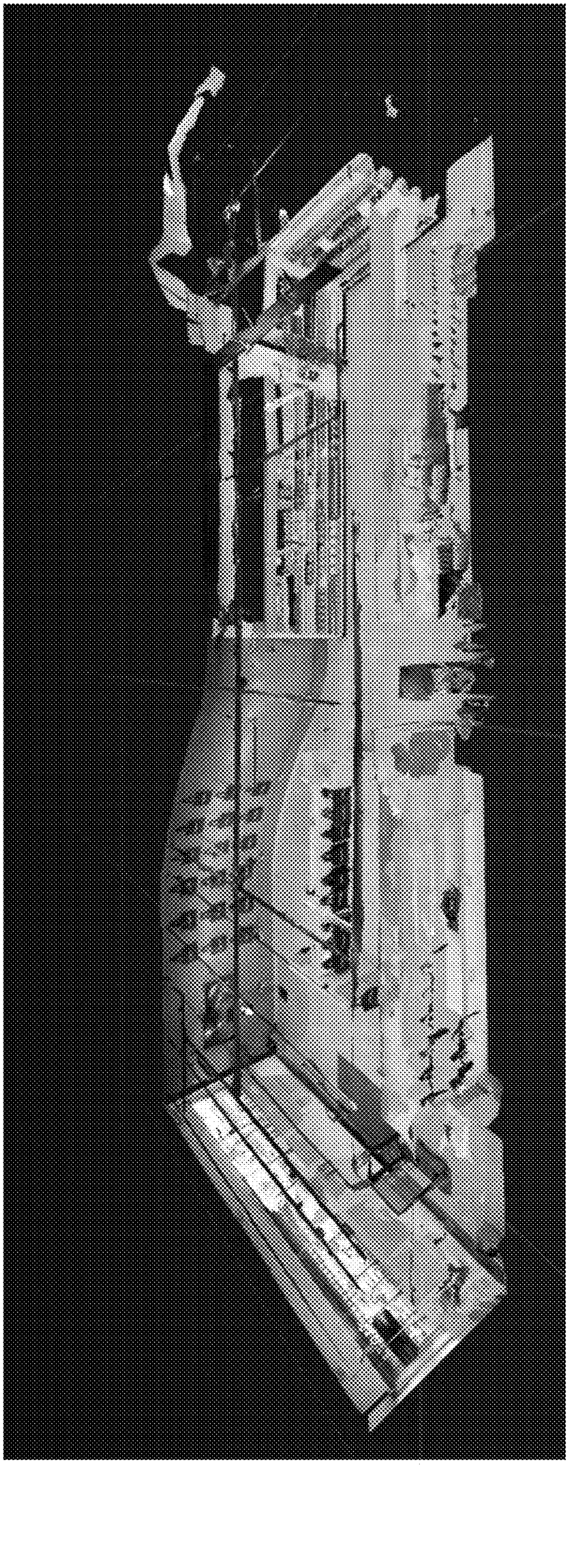

An example of such a three dimensional map of an area of real space built using a SLAM and photogrammetry-based approach is shown in FIGS. 26A, 26B, 26C, and 26D. FIG. 26A shows a top view of the area, FIGS. 26B and 26C show views of the area of real space from one end at different orientations. FIG. 26D shows a view of the area of real space from one side.

Figure 27:
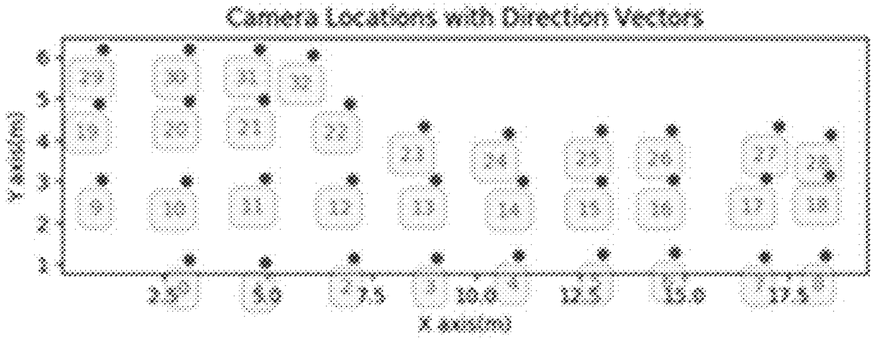
FIG. 27 presents an example placement of cameras in an area of real space.
Figure 27:
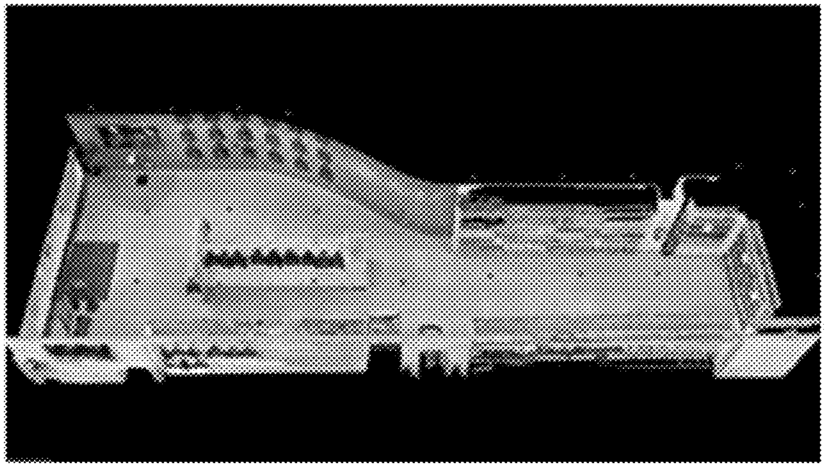

FIG. 27 presents an example placement 2711 of cameras in the area of real space. The illustration 2711 shows placement of cameras on a top view of the area of real space. Cameras can be placed on the ceiling, looking downwards at different orientations. The illustration 2711 can also include direction vectors indicating orientation of cameras. The system can also use other types of markers (such as rectangles, pointers, etc.) and overlays to indicate the positions and orientations of cameras in the area of real space. In the example illustration 2711, each camera is identified by a camera identifier in a box. The illustration 2721 shows camera placement of 2711 mapped (overlayed) to the three-dimensional map of the area of real space. The initial camera poses can be calculated in various ways. For example, a first method to determine camera poses is using human assisted approximate positions. A second method is to generate a random initialization i.e., placing cameras at random positions in the area of real space subject to constraints. Other techniques can be applied to generate an initial placement of cameras. The initial constraints for the camera placement are taken into consideration in the initialization operation. For example, if the cameras are to be placed in the ceiling, the initial positions of the cameras are placed approximately at the ceiling height. Additional constraints can also be provided as input for initial camera placement. We describe these constraints in the following sections.

Camera Model

The camera model consists of the camera intrinsic matrix and the distortion values of the lens used on the camera. These values are required to understand the camera field-of-view. The distortion parameters are used to rectify and undistort the image frames obtained from the respective camera. Further details of the intrinsic and extrinsic camera parameters are described earlier in camera calibration related discussion.

Camera Coverage Map

After the camera model and the initial camera poses are defined, the coverage for each camera can be calculated using the following high-level process operations:

1. Calculating the line of sight vectors for each pixel on the image plane.
2. Ray casting from each of these pixels in the three-dimensional (3D) geometric map and obtaining the first occupied voxel hit by the ray. A voxel represents each of an array of elements of volume in a three-dimensional space.
3. Creation of a point cloud/voxel set that are within the view of the camera.

After the camera coverage for individual cameras is calculated, the system aggregates the coverage of all these cameras to obtain the overall coverage of all the cameras within the 3D map. This can be performed using the following high-level process operations.

1. A voxel grid of a predetermined voxel size is initiated from the given 3D geometric map of the environment.
2. Each voxel within the grid is initialized with a feature vector which can contain the following fields:
   a. Occupancy of the voxel
   b. Voxel category—shelf vs wall vs exit vs other
   c. Number of cameras that have the voxel in the view
   d. List of cameras that have the voxels within view
   e. Angle of incidence from each of the cameras
   f. Distance between each of the cameras and the center of the voxel
3. All the voxels are updated with the coverage metrics to create the coverage map.

Occupancy of the voxel can indicate whether this voxel is positioned on or in a physical object such as a display structure, a table, a counter, or other types of physical objects in the area of real space etc. If the voxel is not positioned on (or in) a physical object in the area of real space then it can be classified as a non-occupied voxel representing a volume of empty space.

Figure 28A:
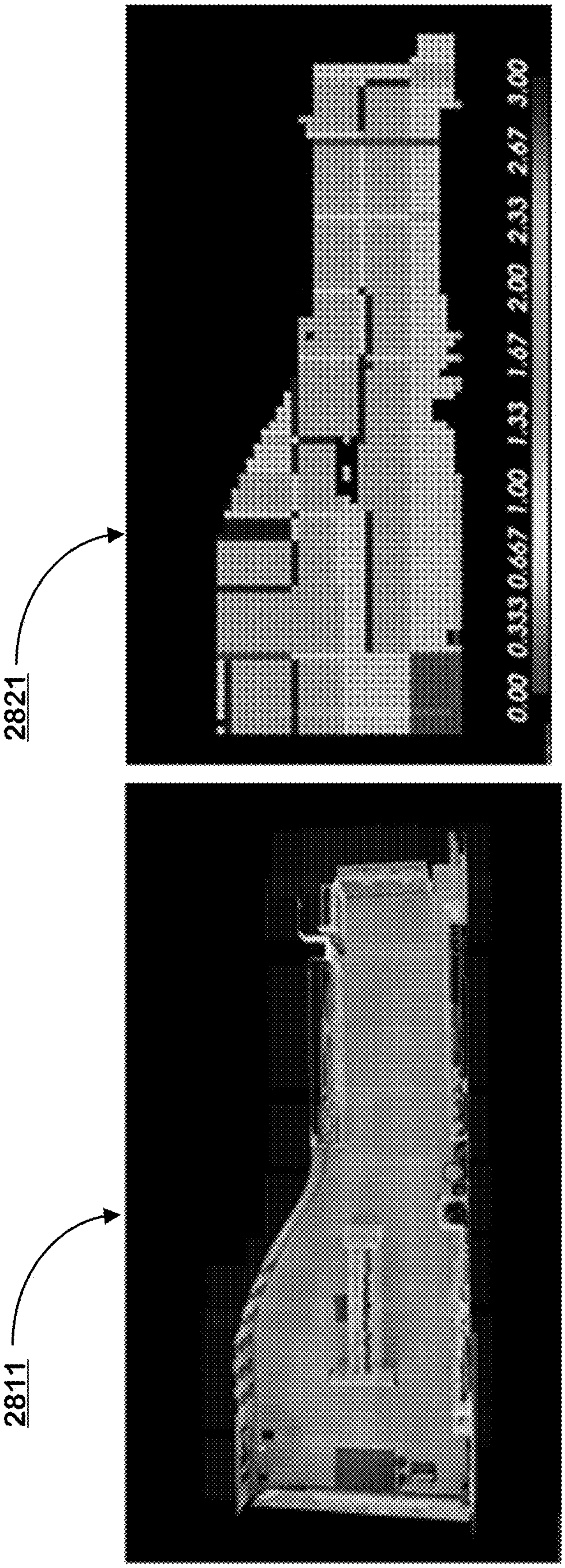
FIGS. 28A and 28B presents an example of camera coverage in an area of real space.

FIG. 28A shows a top view 2811 of a three-dimensional image of the area of real space and corresponding camera coverage map 2821. The regions in the area of real space with high camera coverage are shown in dark blue color. As the camera coverage decreases for a region, it is represented in a lighter blue color and then green color. The regions with coverage from one camera are shown in yellow color. Regions with no camera coverage are shown in red color. A legend at bottom of illustration 2821 shows mapping of different colors to respective camera coverage. The highest camera coverage is three cameras visiting a voxel (dark blue color) and a lowest coverage is zero cameras visiting a voxel (red color).

Camera Coverage Constraints and Physical Placement Constraints

The camera placement tool generates camera placement plans for the multi-camera environment subject to constraints depending on both the generic and unique features of the environment. In the following sections we present further details of these constraints.

Physical Placement Constraints

Some of the physical constraints for the camera placement include fixtures on the ceiling, presence of lighting fixtures, presence of speakers, presence of heating or air conditioning (HVAC) vents etc. These physical constraints make placing cameras at certain positions challenging. The proposed method provides capability for automatically detecting these physical constraints and determines possible locations for placement of the cameras.

Figure 28B:
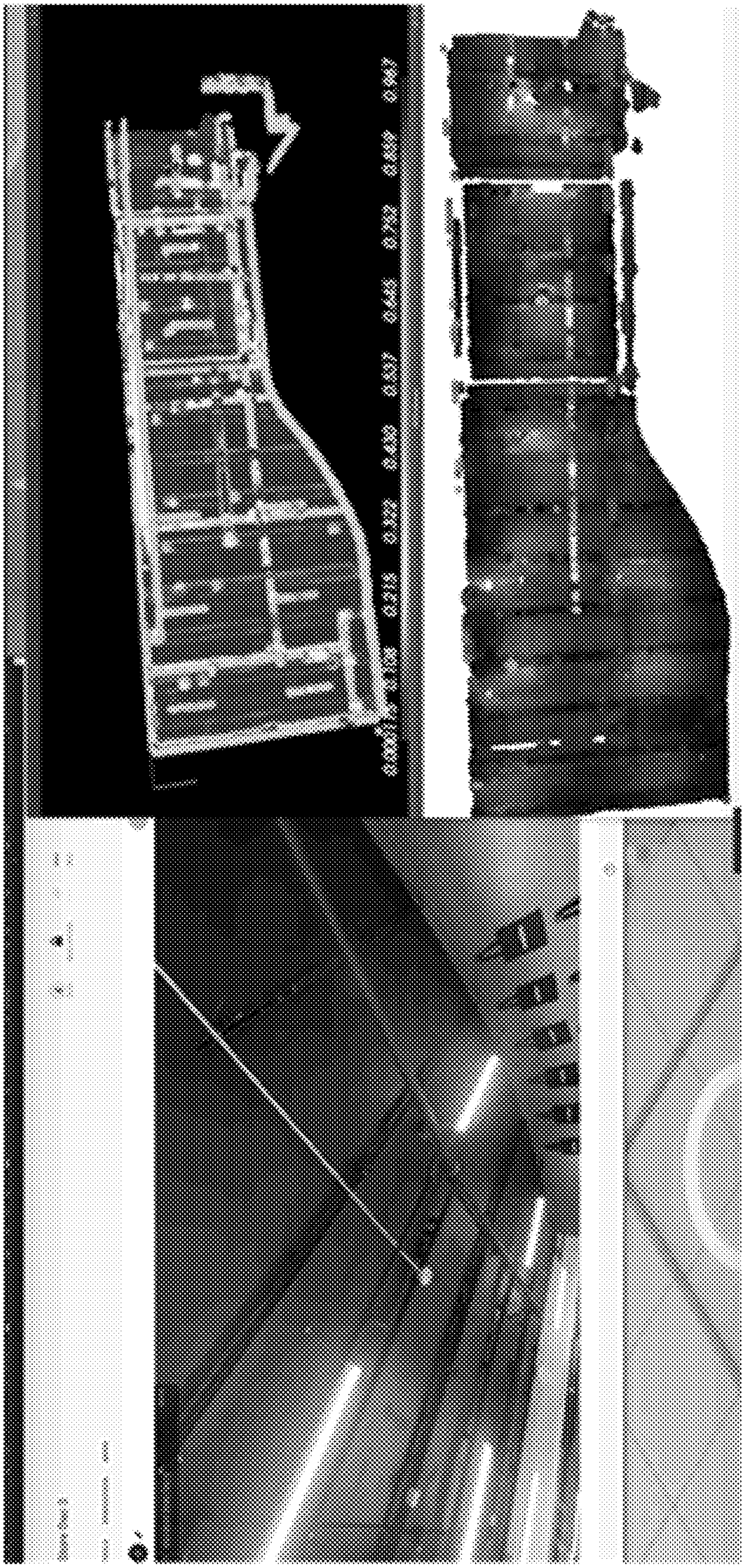

The technology disclosed can detect physical constraints using a combination of methods. To detect obstructions such as pipes and light fixtures, normal estimation can be used to differentiate these constraints from the flat ceiling surface. To detect obstructions such as air conditioning vents and speakers, etc. the system can use a learning-based method to automatically detect these and avoid placing cameras in these regions. FIG. 28B presents an image of the ceiling of an area of real space with physical constraints such as lighting, pipes, etc.

Coverage Constraints

The coverage requirements can include rules that are needed for the system to perform its operations. The coverage constraints can include a number of cameras having a voxel in a structure or display holding inventory within view, or a number of cameras having a voxel in a tracking zone of volume in which subjects are tracked within view. The coverage constrains can also include a difference in angles of incidence between cameras having a voxel within view, or an overall coverage of the three-dimensional real space, etc. For example, in order to perform triangulation for tracking, at least two cameras looking at each voxel in the tracking zone is required. Similarly, cameras looking into the shelves are required to predict the items in the shelves. It is understood that different coverage requirements can be set for different areas of real space or different deployments of the system. The technology disclosed can determine an improved camera placement plan by considering the coverage constraints set for the particular deployment in an area of real space. Following are some examples of coverage constraints that can be used by the system when determining camera placement:

1. Each voxel in the shelf is seen by at least three cameras.
2. Each voxel in the tracking zone is seen by two or more cameras with at least 60 degrees difference in angle of incidence. The tracking zone can include open spaces in which the subjects can move. Examples of tracking zones can be open spaces or aisles between inventory display structures in a shopping store.
3. The overall coverage of the store is more than 80% with simulated people walking in the store.

Using the coverage metrics indicating the camera coverage and the physical and coverage constraints, the technology disclosed can define an objective function that maximizes the coverage score while minimizing the number of cameras. Optimization of this objective function can provide the top few camera placement setups which can be verified and finalized before installation.

Other examples of constraints can include: shelves are seen at an angle of approximately 90 degrees, the neck plane (the plane at which neck joints are tracked) be observed with a camera angle of at least 45 degrees with respect to ceiling (or roof), two cameras be placed at positions at least 25 centimeters apart, etc.

In some shopping stores, large items may be placed on shelves which can block view of aisles or other display structures positioned behind the shelves containing large or tall items on top shelves. The system can include impact of such items when calculating the camera coverage. In such cases, additional cameras may be needed to provide coverage of display structures or aisle obstructed by tall or large items.

In one implementation, the system can include logic to determine an improved camera coverage for a particular camera placement plan in the area of real space by changing positions of display structures including shelves, bins and other types of containers that can contain items in the area of real space. The system can include logic to improve the camera coverage for display structures and subject tracking by rearranging or moving the display structures in the area of real space.

The system can also determine the coverage of 360-degree cameras (omnidirectional cameras). These cameras are modeled with larger fields of view in comparison to traditional rectilinear lens cameras. The camera model of these cameras can have a field of view of 360 degrees horizontal and 180 degrees vertical. As the cameras are omnidirectional the computation of orientation is not required. The orientation of 360-degree cameras is determined by the surface to which they are attached to. The positions of the cameras are added in the search space and the method disclosed can compute the optimal positions and number of cameras to fulfill the required coverage constraints. The process presented with reference to FIGS. 29A and 29B can be applied to 360-degree or omnidirectional cameras.

Camera Pose Definition

The final camera placement is defined as a set of 6D poses for the cameras with respect to the defined store origin. Each camera pose has the position (x,y,z) and the orientation (rx, ry, rz). Also, each camera position is accompanied by an expected view from the camera for ease of installation.

Process for Determining Camera Placement

The technology disclosed presents a tool to estimate the number of cameras in the area of real space to support tracking subjects and detecting item take and puts. Calculating the number of cameras required to have optimal coverage in an environment is a challenge. For a multi-camera computer vision system, having proper coverage is important for operations of the autonomous checkout system.

The technology disclosed can provide a coverage plan for an area of real space. The system can include the following features:

1. Optimize for a particular system for cashier-less checkout, or other systems, the number of cameras for maximum coverage of a space respecting the constraints of where and how cameras can be installed.
2. Automatically provide camera coverage analysis in indoor spaces suited for a particular system for cashier-less checkout, or other systems.
3. Take into account various constraints such as number of cameras to be viewing a specific point in space, angle at which the cameras should see a point, etc. for a particular system for cashier-less checkout, or other systems.
4. Determine scores on the coverage quality with simulated people walking in the space with different shopper personas for a particular system for cashier-less checkout, or other systems.

Figure 29A:
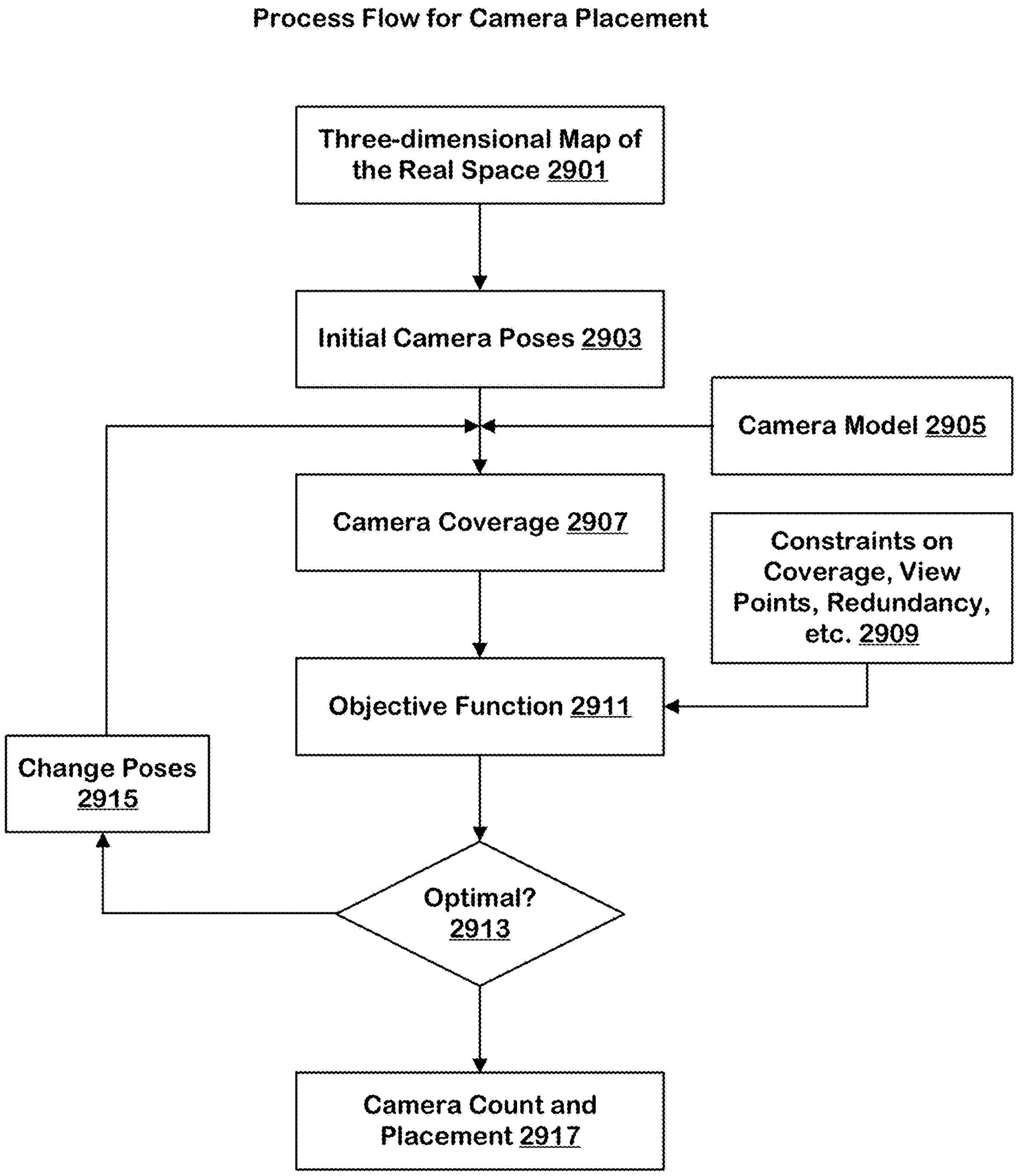
FIG. 29A is a flowchart illustrating process operations for camera placement.

FIG. 29A is a high-level process flow that indicates inputs, processing operations and outputs from the proposed tool. The process starts with creation of three-dimensional maps of the area of real space such as a shopping store (2901). Calculating the poses of these cameras before installing is important to improve the accuracy and efficiency of the camera installation. The technology disclosed can ensure that the cameras cover the entire region of interest in the environment and meet specific constraints for implementation of systems like autonomous checkout, security and surveillance, etc. The initial camera poses are determined at an operation 2903. The camera model can also be provided as an input to the camera coverage calculation process (2905). The initial camera coverage plan can be one selected from (i) a random initialized coverage plan comprising an initial number of cameras randomly distributed in the three-dimensional real space and (ii) a proto-coverage plan comprising a received input of an initial number of cameras approximately positioned in the three-dimensional real space.

At an operation 2907, camera coverage is determined. We present further details of camera coverage determination process in FIG. 29B.

The system can then use an objective function to evaluate the camera coverage (2911). The objective function can consider the constraints on camera coverage, viewpoints, redundancies and other criteria when evaluating a coverage map (2909). For example, constraints can include aspects like at least a minimum number of cameras that can see each point in space, angle of incidence for each point in space from different cameras, etc.

If the coverage map provides an improved camera coverage as compared to a previously determined camera plan (2913) or fulfills coverage requirements as described above, the system can select the camera coverage plan at an operation 2917. Otherwise, the system can change camera poses at an operation 2915 and determine a new camera coverage plan. The system can also increase or decrease the number of cameras in a camera placement plan and generate a new coverage map in a next iteration of the process. This method can also provide the 6d poses of the cameras (position in x,y,z and orientation in x,y,z) with respect to a known coordinate in the environment (2905). In one implementation, the system can generate multiple camera coverage plans that meet the coverage requirements and constraints. The system can provide these to an expert to select a best camera placement plan for placing cameras in the area of real space. The camera placement data can be stored in the camera placement database 2350.

Process for Camera Map Creation

The system can determine camera coverage maps for subjects, shelves and other objects of interest in the area of real space.

The system can include logic to determine a set of camera coverage maps per camera including one of a set of occupied voxels representing positions of simulated subjects on a plane at some height above a floor of the three-dimensional real space through which simulated subjects would move through. In one implementation, the system can track subject using neck positions or neck joints at a plane 1.5 meters above the floor. Other values of height above the floor can be used to detect subjects. Other feature types such as eyes, nose or other joints of subjects can be used to detect subjects. The system can then aggregate camera coverage maps to obtain aggregate coverage map based upon the set of occupied voxels.

The system can include logic to determine a set of camera coverage maps per camera including one of a set of occupied voxels representing positions on a shelf in field of view. The system can then aggregate camera coverage maps to obtain aggregate coverage map for the shelf based upon the set of occupied voxels. The system can combine coverage maps for subjects and shelves to create overall coverage maps for the area of real space.

Figure 29B:
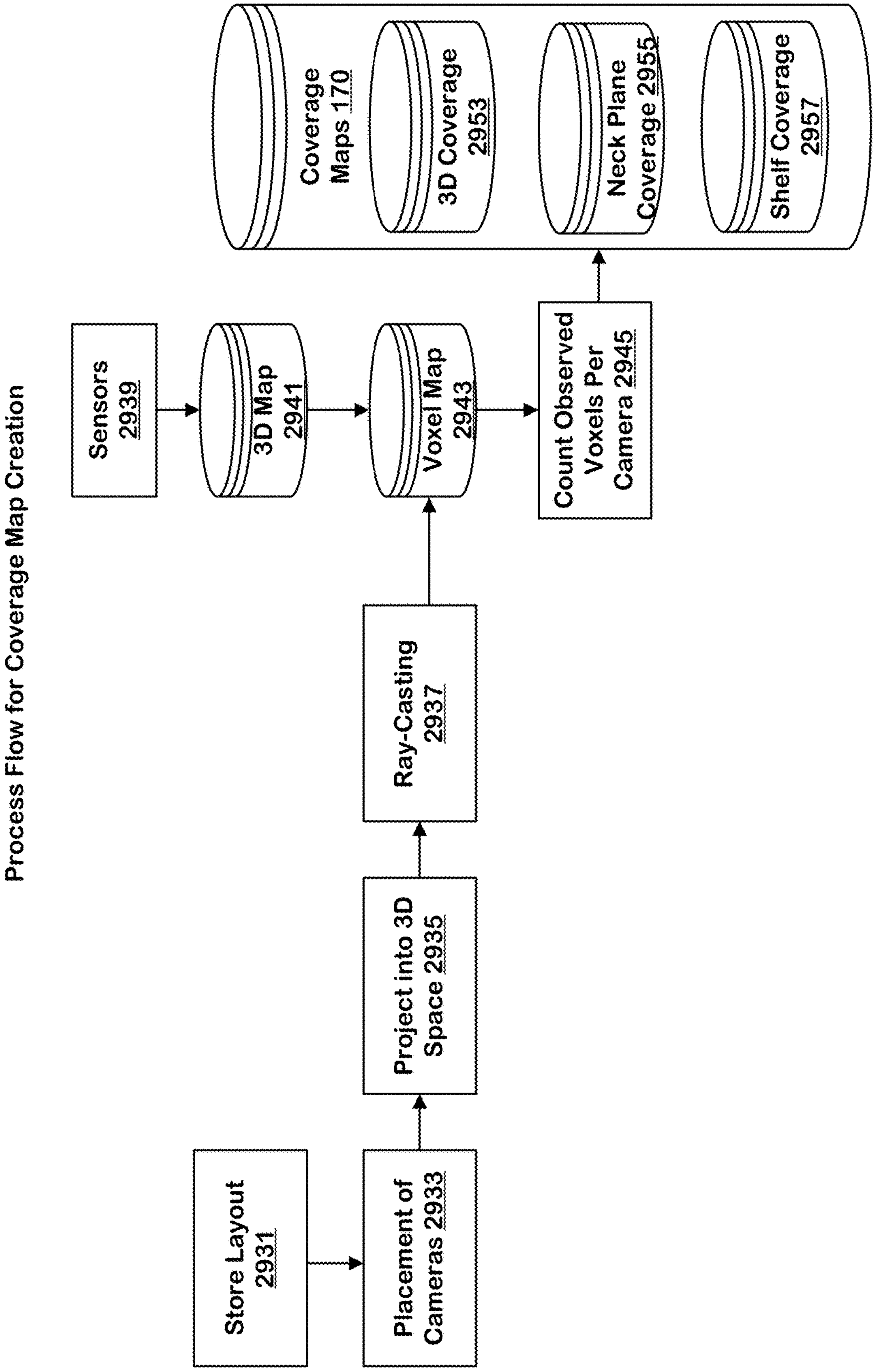
FIG. 29B is a flowchart illustrating process operations coverage map creation.

FIG. 29B presents an example process for creating coverage maps. The process starts with a layout of the area of real space such as a shopping store (2931). The system can include logic to determine placement of cameras using the process presented in FIG. 29A (2933). The system can then project the fields of view of the cameras in three dimensions by using overlapping images from cameras in the area of real space (2935). The system can then perform ray casting from each pixel in images of cameras in three-dimensional geometric map and obtain the first occupied voxel hit by the ray (2937).

The system can use sensors to determine three dimensional maps of the area of real space (2939). An example of generation of 3D maps is presented above. The three-dimensional maps can be stored in a 3D maps database 2941. The system can then determine voxels hit by ray-casting and store the identified voxels in a voxels map database 2943. The system can then count observed voxels per camera (2945). The system can determine three different types of coverage maps including 3D coverage maps (2953), neck plane coverage maps (2955), and shelf coverage maps (2957). Collectively, the coverage maps can be stored in the coverage maps database 2370.

The system can apply various threshold based on the constraints to select particular coverage maps per camera or aggregate coverage maps. For example, the system can apply coverage threshold to shelf coverage maps. The threshold can comprise at least 3 cameras visiting voxels representing positions on a shelf in field of view. Other threshold values above or below 3 cameras visiting voxels in shelves can be applied to select coverage maps.

The system can apply to the aggregate coverage map, a coverage threshold comprising a range of 80% or greater of a plane at some height above a floor of the three-dimensional real space through which simulated subjects would move through. It is understood that other values of threshold above or below 80% can be used to select coverage maps. The system can apply to aggregate coverage map, a coverage threshold comprising at least 2 cameras with at least 60 degrees angle of incidence covering select portions of a plane at some height above a floor of the three-dimensional real space through which simulated subjects would move through. Other values of threshold greater than or less than 60 degrees angle of incidence can be used to select coverage maps.

In one implementation, the technology disclosed determines a set of camera location and orientation pairs in each iteration of the process flow described here such that the physical and coverage constraints are guaranteed. The objective function can be formulated to assign scores to camera placement plans based on coverage of shelves, coverage of tracking zones in which subjects can move, etc. The technology disclosed can determine camera placement plans using various criteria. For example, using a camera minimization criterion, the system can generate camera placement plans that reduce (or minimize) the number of cameras which satisfying the coverage and physical/placement constraints. Using a coverage maximization criterion, the system can generate camera placement plans that increase (or maximize) the camera coverage while keeping the number of cameras as fixed. The objective function can assign scores to camera placement plans generated by different criteria and select a top 3 or top 5 camera placement plans. A camera placement plan from these plans can be selected to install the cameras in the area of real space.

In another implementation, the system can generate camera placement separate camera placement plans that improve coverage of either shelves or tracking subjects. In this implementation, the system can generate an improved camera placement plans in two steps. For examples, in a first step, the system iteratively generates a camera placement plan that provides improved coverage of shelves. Then this camera placement plan is provided as input to a second step in which this camera placement plan is further iteratively adjusted to provide improved coverage of subject tracking in the area of real space. Camera placement plans in both steps can be generated by using process steps presented in FIGS. 29A and 29B.

Figure 30A:
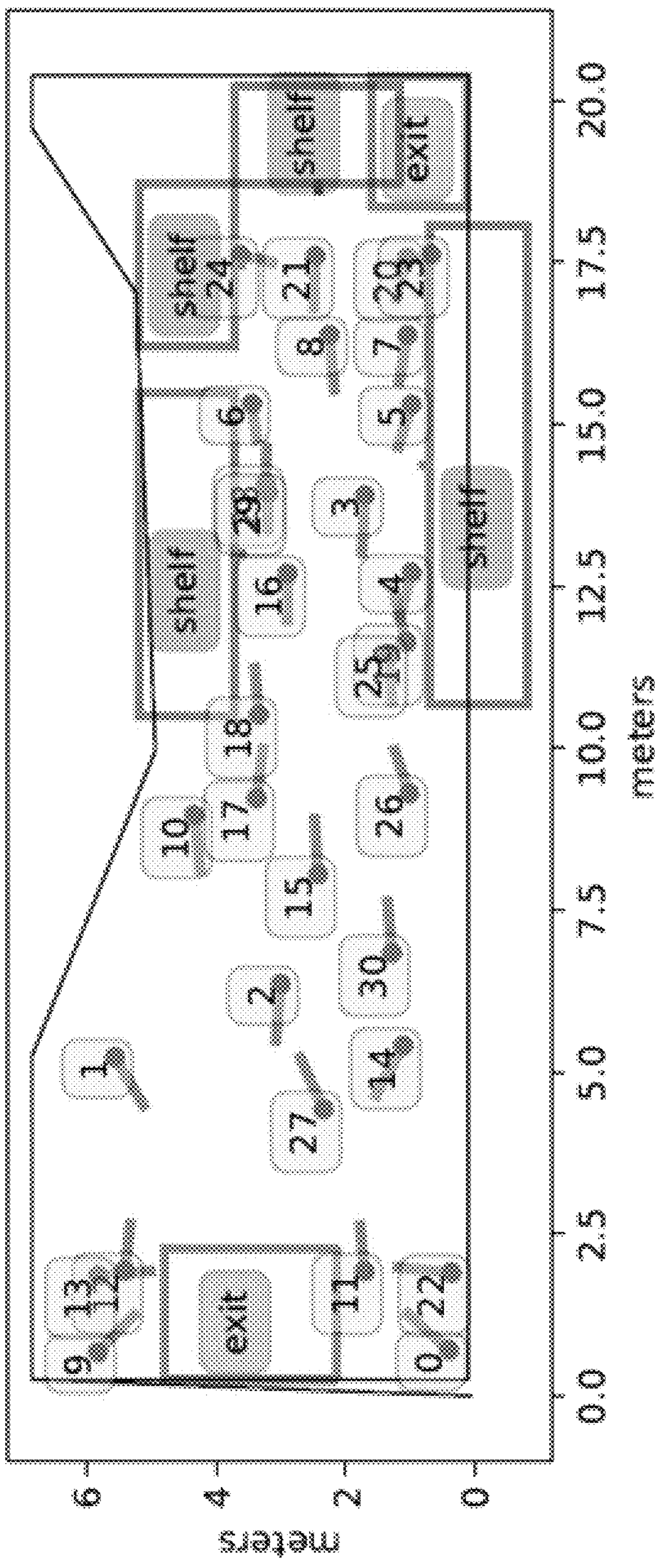
FIG. 30A presents an example top view of an area of real space with camera placement and orientations.

We present examples of various types of coverage maps in FIGS. 30C to 30K. FIG. 30A presents a top view of a layout of an area of real space such as a shopping store with cameras positioned on the ceiling. The camera centers are shown in orange circles or dots with orientations of respective cameras shown in red lines. Camera identifiers are shown inside yellow boxes. Shelf positions are shown in blue rectangles and exit areas are shown in green colors.

Figure 30B:
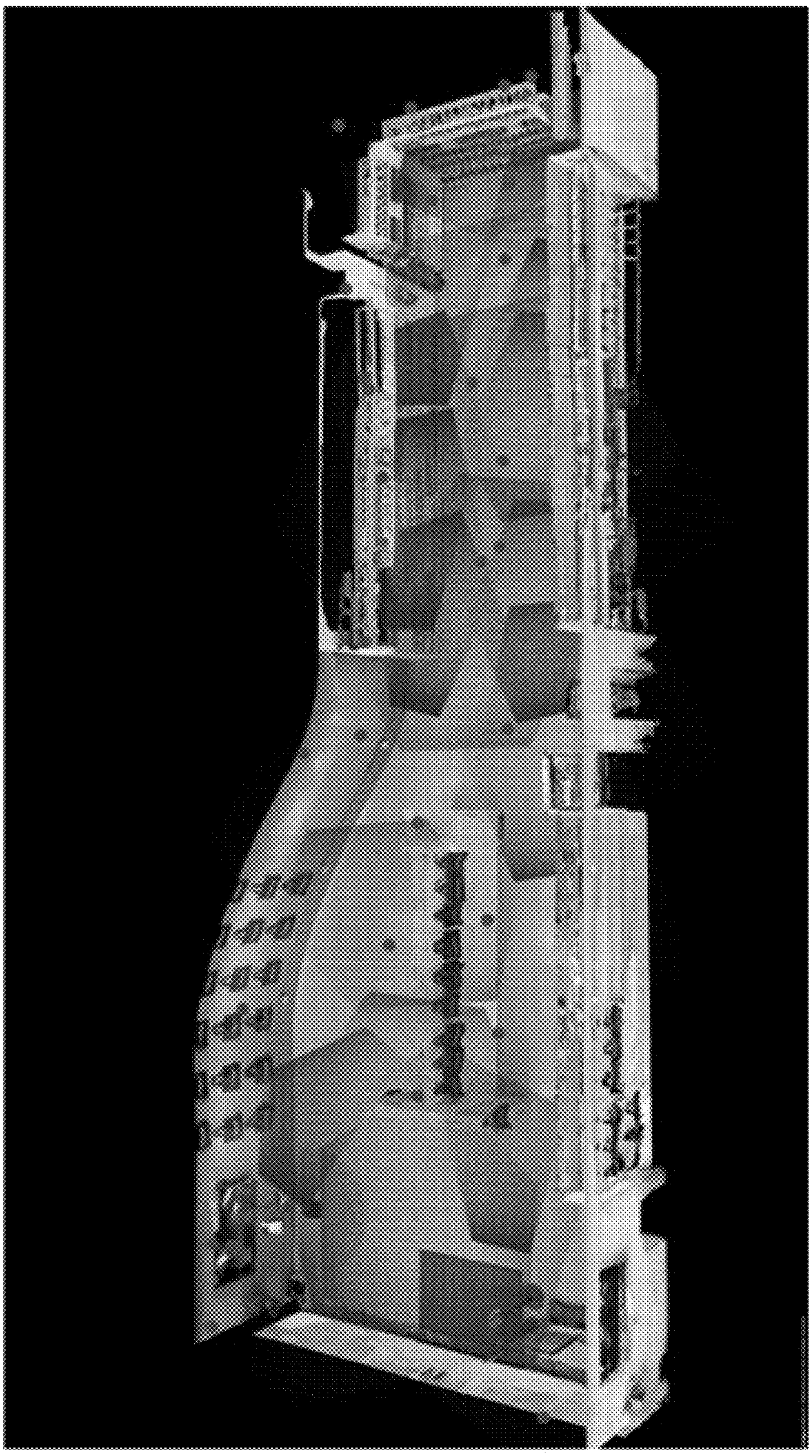
FIG. 30B present a three-dimensional view of the area of real space presented in FIG. 30A.

FIG. 30B presents a three-dimensional view of the area of real space of FIG. 30A. Red circles or dots represent the cameras in the three-dimensional space. Blue regions represent projections from respective cameras at 1.5-meter distance.

Figure 30C:
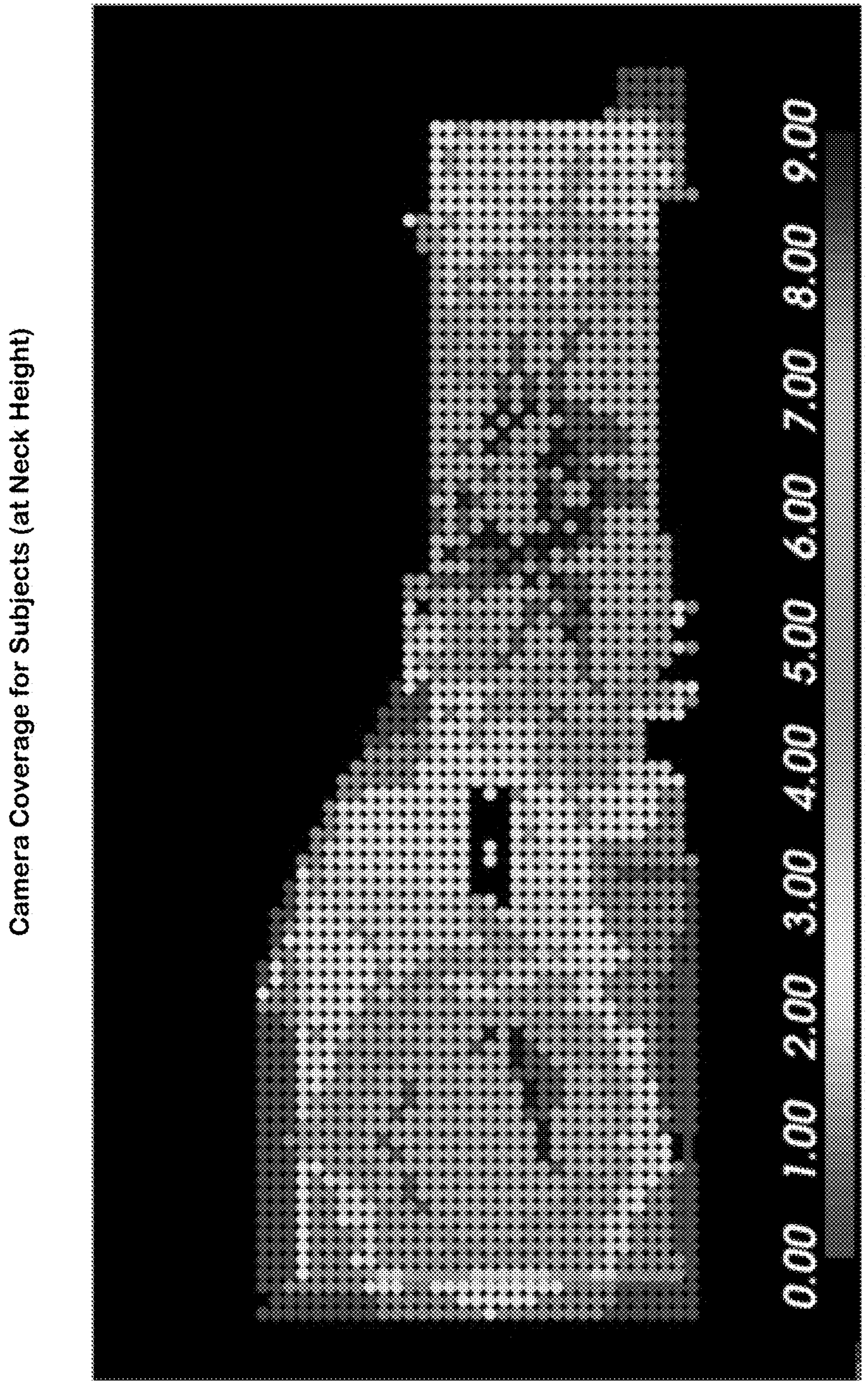
FIG. 30C presents an illustration of camera coverage for neck height detection in the area of real space.
Figure 30D:
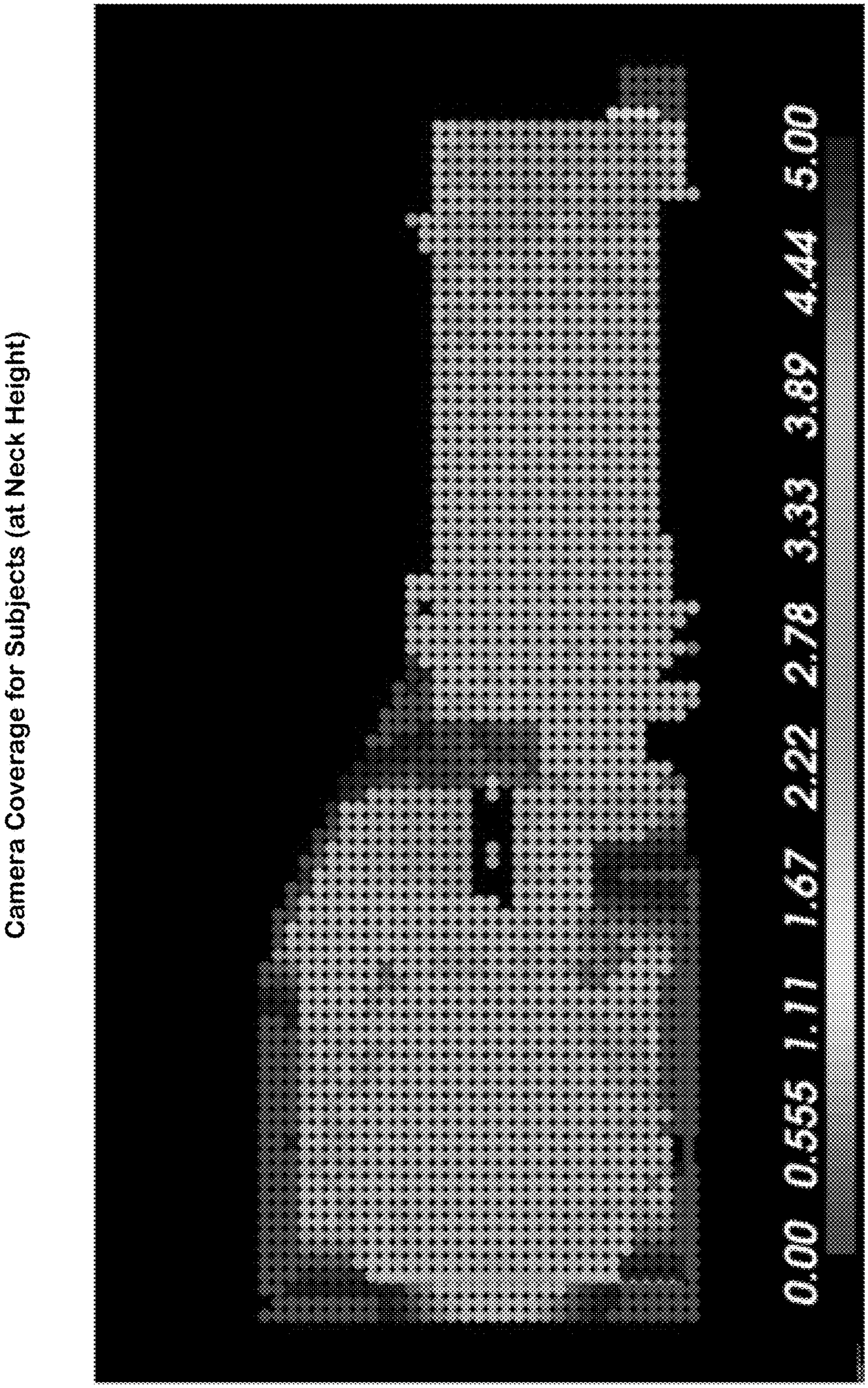
FIG. 30D presents an illustration of neck height average distance per voxel for the example in FIG. 30C.
Figure 30E:
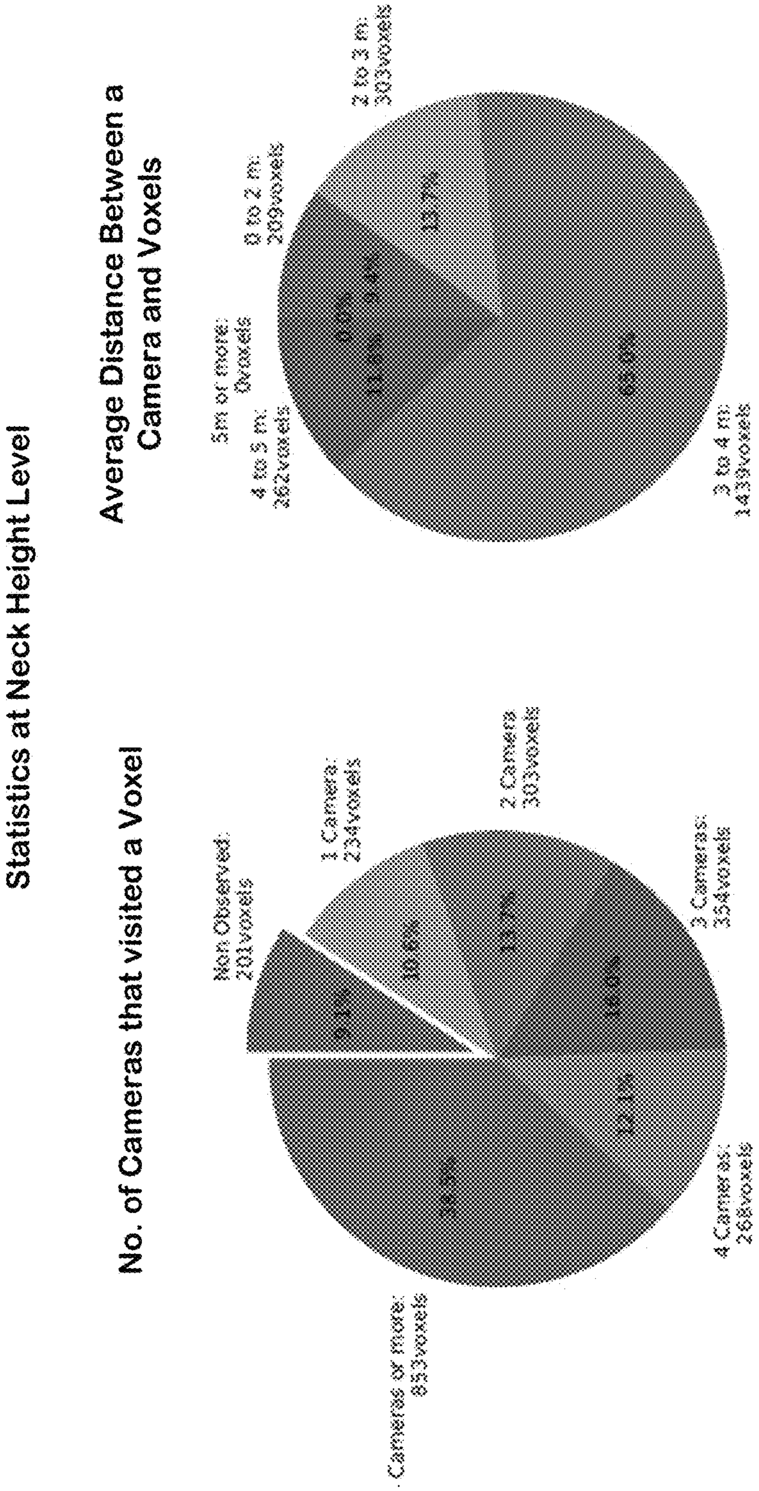
FIG. 30E presents statistics for an example camera placement in the area of real space for neck height level.

FIGS. 30C to 30E present camera coverage for of subjects in the area of real space. The subjects are tracked at neck (or neck joint) positions. The neck height is a grid made at 1.5 meter above the floor which is a reasonable height to find subjects' necks. It is understood that planes at other heights can be created to detect neck joints or other features of subjects in the area of real space. The walkable areas of the real space (such as shopping store) are considered to build the neck grid. FIG. 30C presents number of times a camera has line of sight with a voxel at neck height. Red colored circles or dots represent voxels with low coverage (fewer cameras hitting a voxel) and blue colored dots represent voxels with high coverage values (more cameras hitting a voxel). A color legend at the bottom of the illustration in FIG. 30C shows color codes indicating number of cameras hitting a voxel of a particular color. FIG. 30D presents average distance of all cameras hitting a voxel. The illustration is for neck height coverage and indicates average distance per voxel at neck height. Red voxels show distance closer to cameras (which is better) and blue voxels show distance further away from the cameras (which is not good). FIG. 30E presents various statistics for neck height coverage. The graph on the left shows number of cameras that visited a voxel. The mean distance for this example is 3.86 meters and standard deviation is 2.46. The graph on the right shows average distance between a camera and voxels. The mean distance for this example is 3.17 meters and standard deviation is 1.12.

Figure 30F:
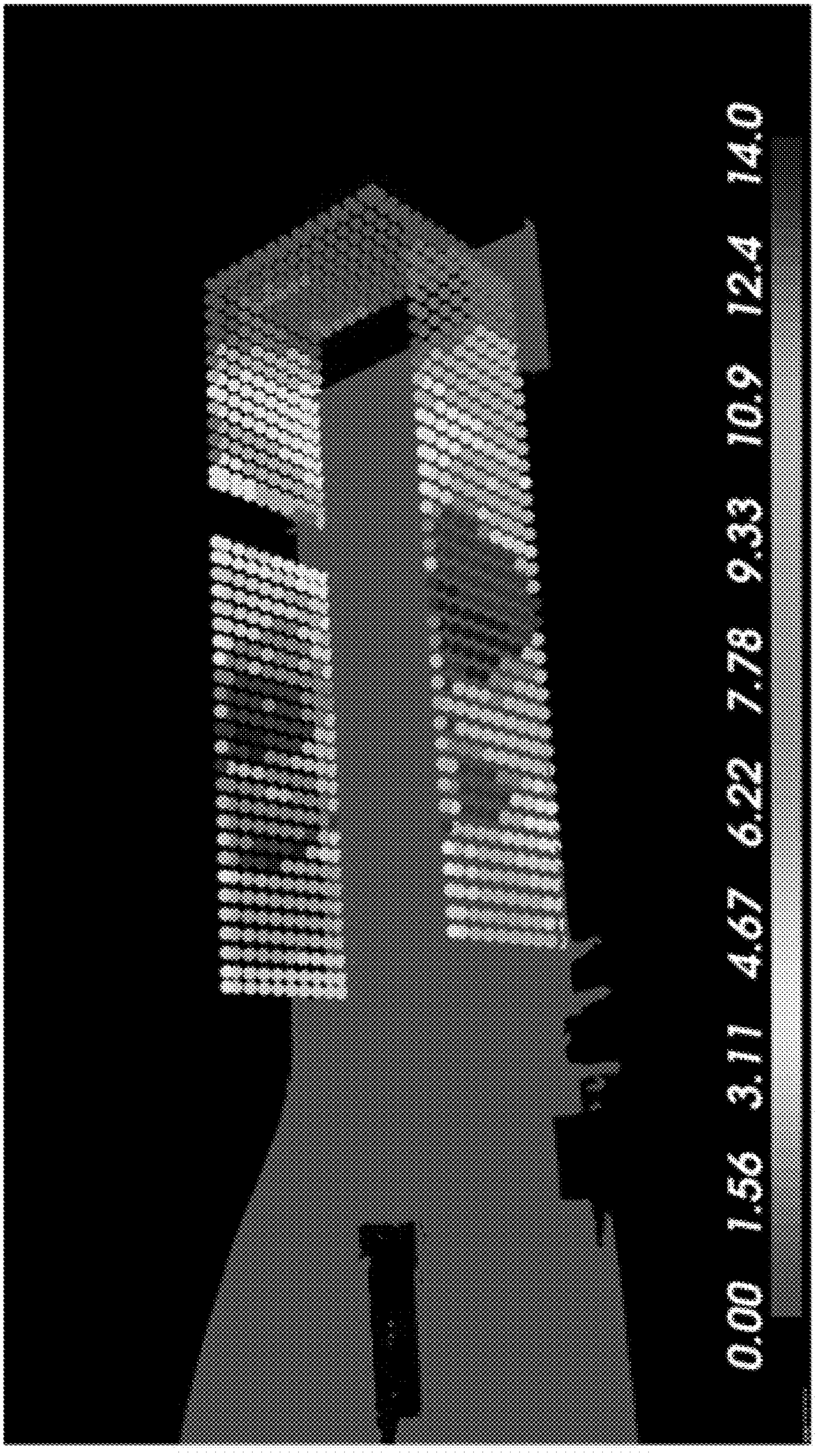
FIG. 30F presents an illustration of camera coverage for shelves in the area of real space.
Figure 30G:
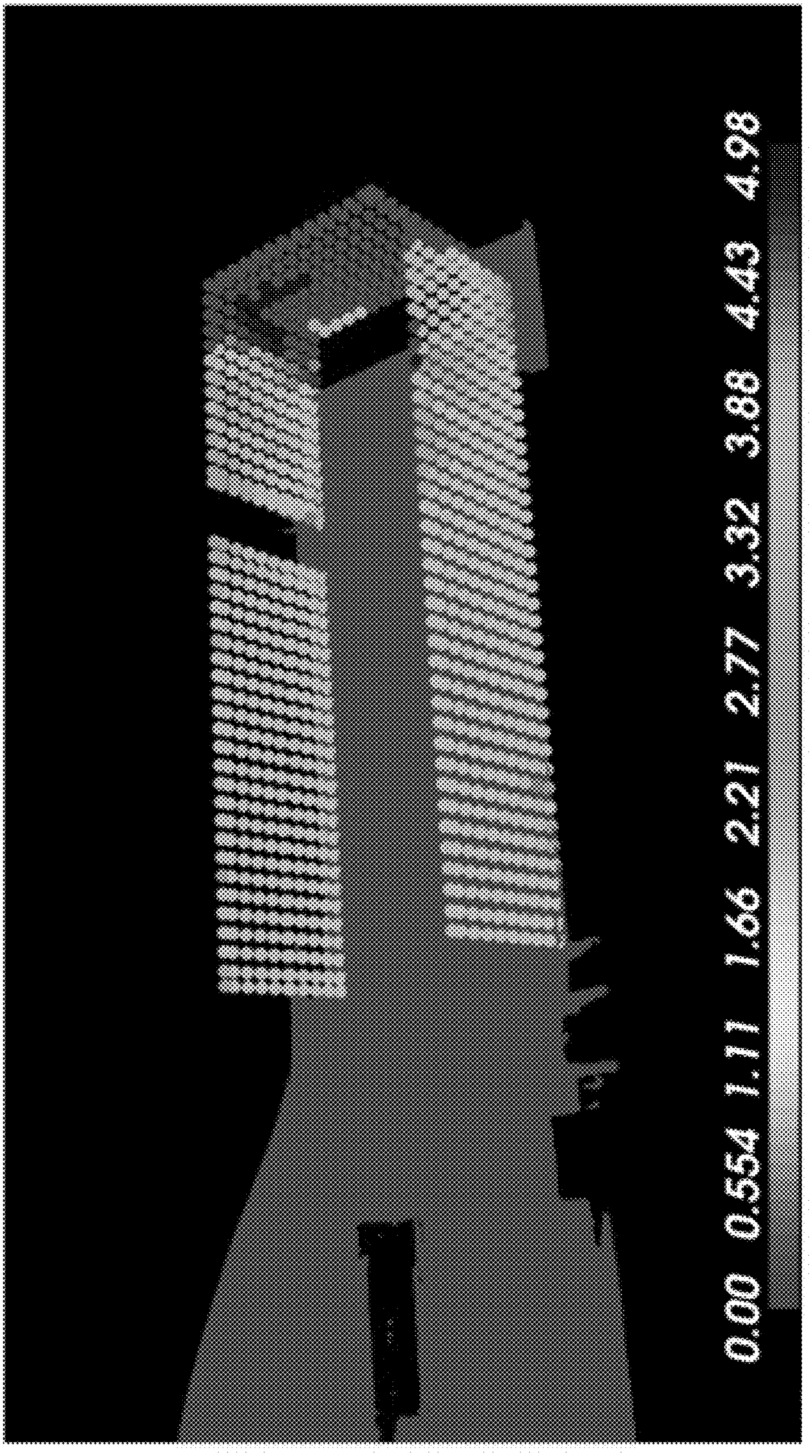
FIG. 30G presents an illustration of average distance per voxel for the example in FIG. 30F.
Figure 30H:
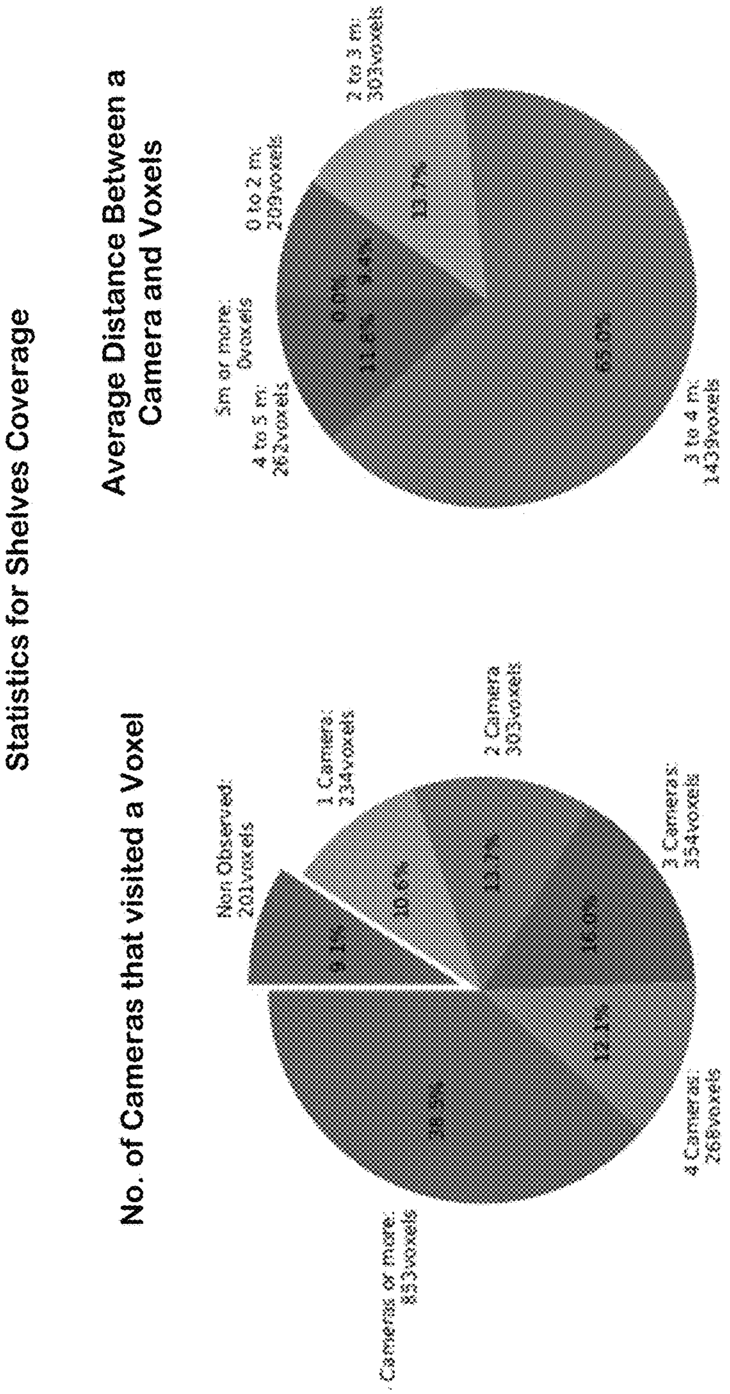
FIG. 30H presents an illustration of shelf coverage statistics in the area of real space.

FIGS. 30F to 30H present camera coverage for shelves in the area of real space. These figures show how the shelves positioned in the area of real space are detected by the cameras. FIG. 30F presents number of cameras visiting voxels in shelves. The voxels can be positioned on shelves or inside the display structures. Red colored circles or dots represent voxels that are not visited by any camera (thus low coverage). Blue colored circles or dots represent voxels visited by higher number of cameras (thus higher coverage). FIG. 30G presents average distance per voxel positioned in shelves. Red colored circles represent voxels closer to cameras or having low distance to cameras (which is better) and blue colored circles represent voxels further away from cameras (which is not good). FIG. 30H presents statistics for shelf coverage in the area shopping store. The graph on the left shows number of cameras that visited a voxel. The mean distance for this example is 5.56 meters and standard deviation is 4.66. The graph on the right shows average distance between a camera and voxels. The mean distance for this example is 2.98 meters and standard deviation is 1.34.

Figure 30I:
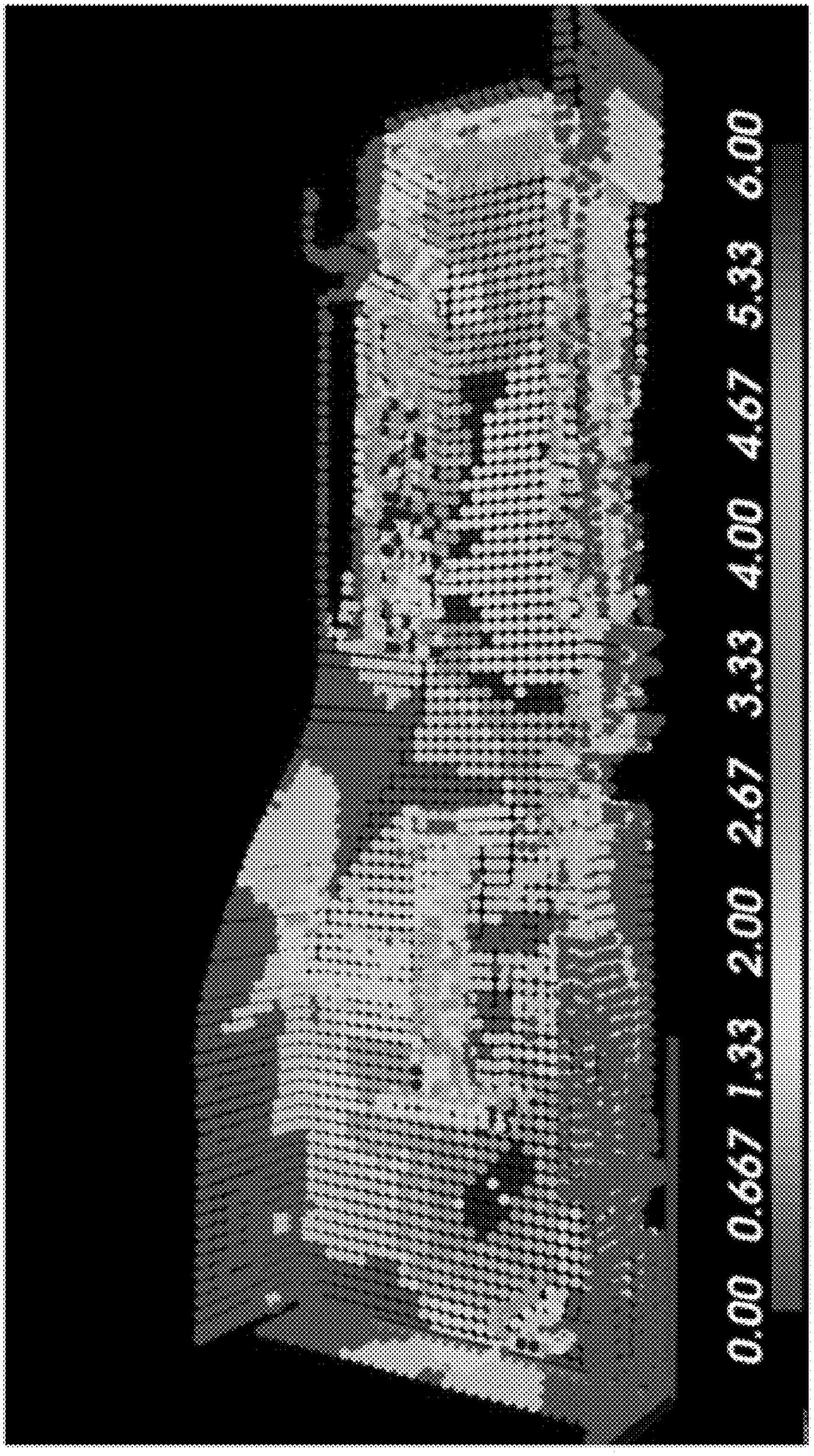
FIG. 30I presents an illustration of overall coverage of an area of real space for an example placement of cameras.
Figure 30J:
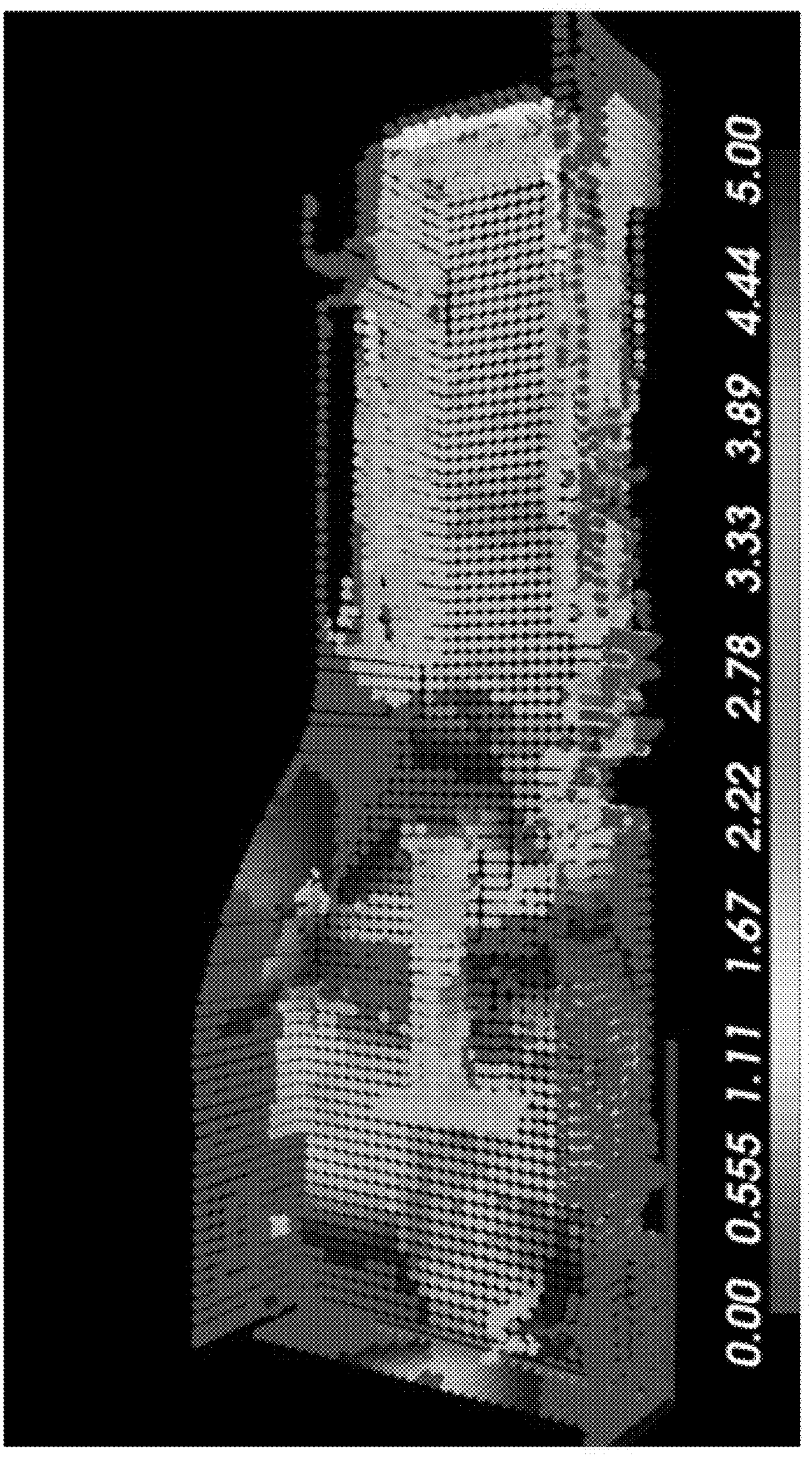
FIG. 30J presents an illustration of average distance per voxel for the camera coverage map of FIG. 30I.
Figure 30K:
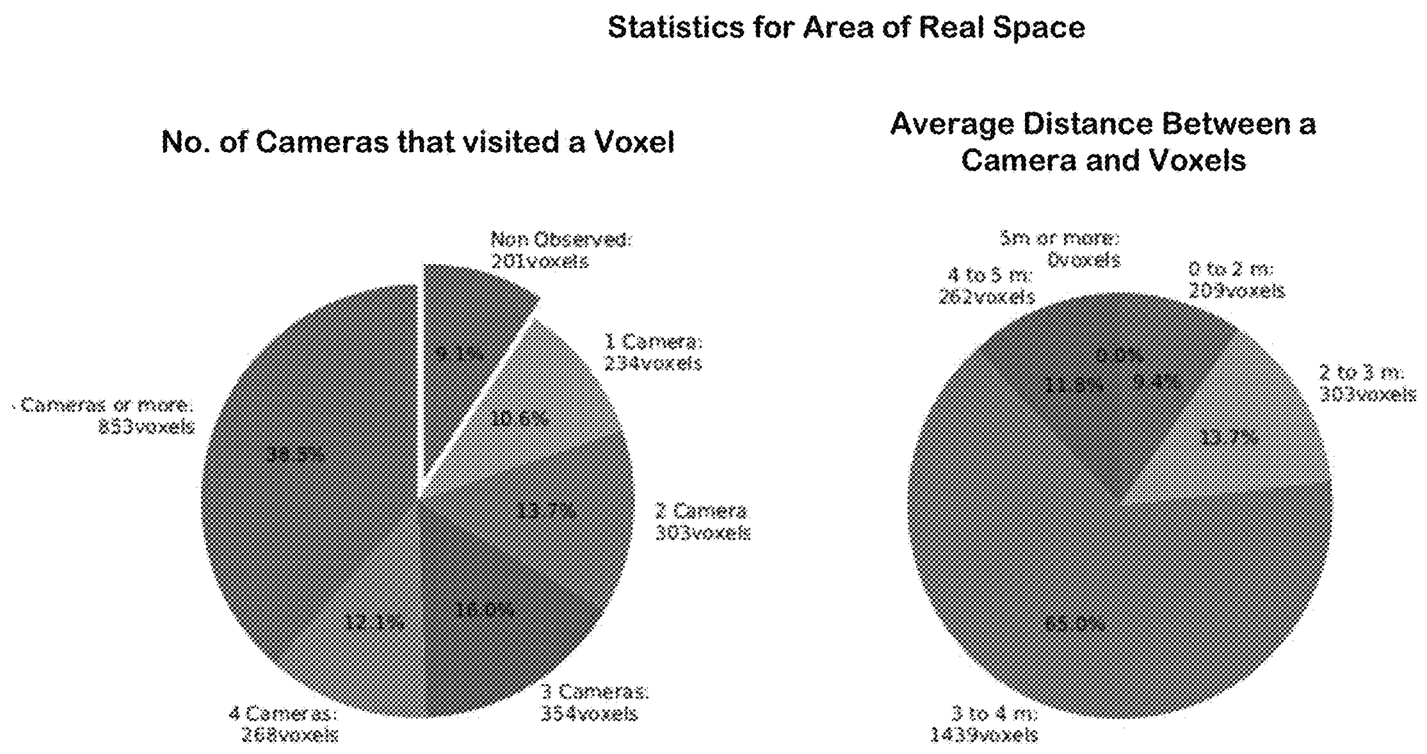
FIG. 30K presents overall camera coverage statistics in the area of real space.
Figure 30L:
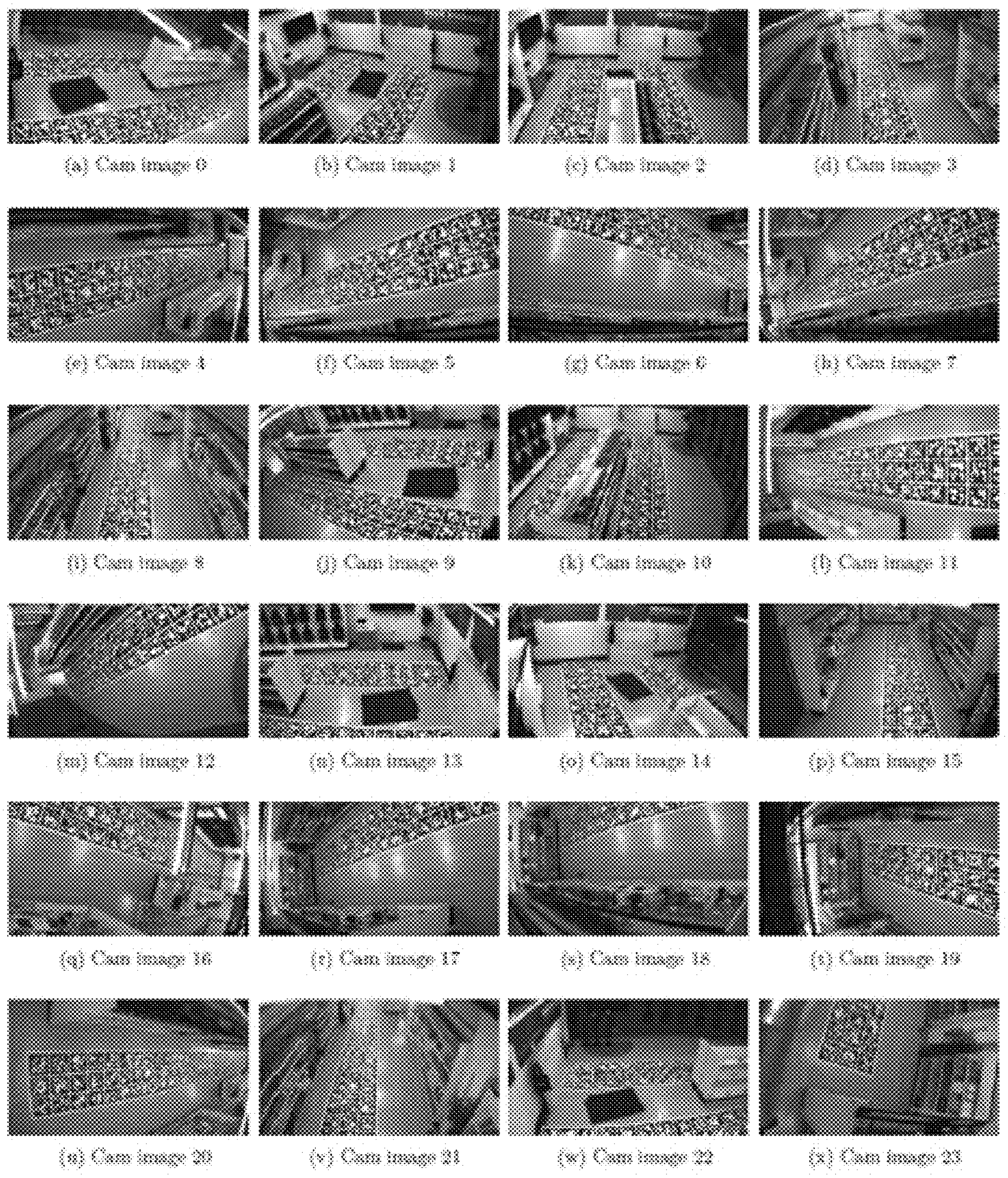
FIGS. 30L and 30M present views from cameras positioned over the area of real space.
Figure 30M:
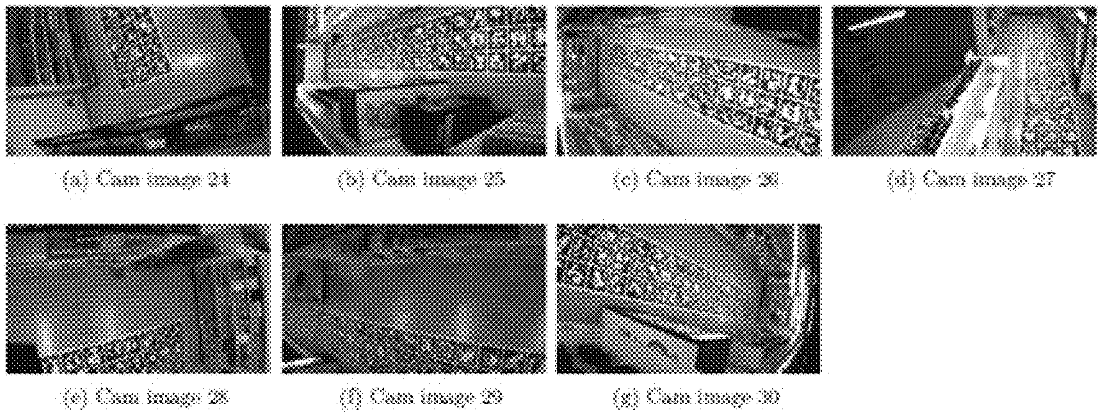

FIGS. 30I to 30K present camera coverage for three-dimensional area of real space including walking areas and shelves or display structures. FIG. 30I presents a number of times a camera has a line of sight with a voxel in the area of real space. Red circles represent voxels with low camera coverage values and blue circles represent voxels with high camera coverage values. A legend at the bottom of the figure maps different colors to number of cameras hitting a voxel. FIG. 30J presents average distance of all the cameras visiting a voxel. Red colored circles represent voxels with small distance to cameras or closer to cameras (which is better) and blue color circles represent voxels with larger distance to cameras or further away from cameras (which is not good). FIG. 30K presents statistics for coverage of three-dimensional area of real space. A graph on the left shows number of cameras that visited a voxel. The mean distance for this example is 1.58 meters and standard deviation is 1.7. A graph on the right shows average distance between camera and voxels. The mean distance for this example is 2.44 meters and standard deviation is 1.91. FIGS. 30L and 30M present images from thirty cameras positioned in an area of real space.

Figure 31:
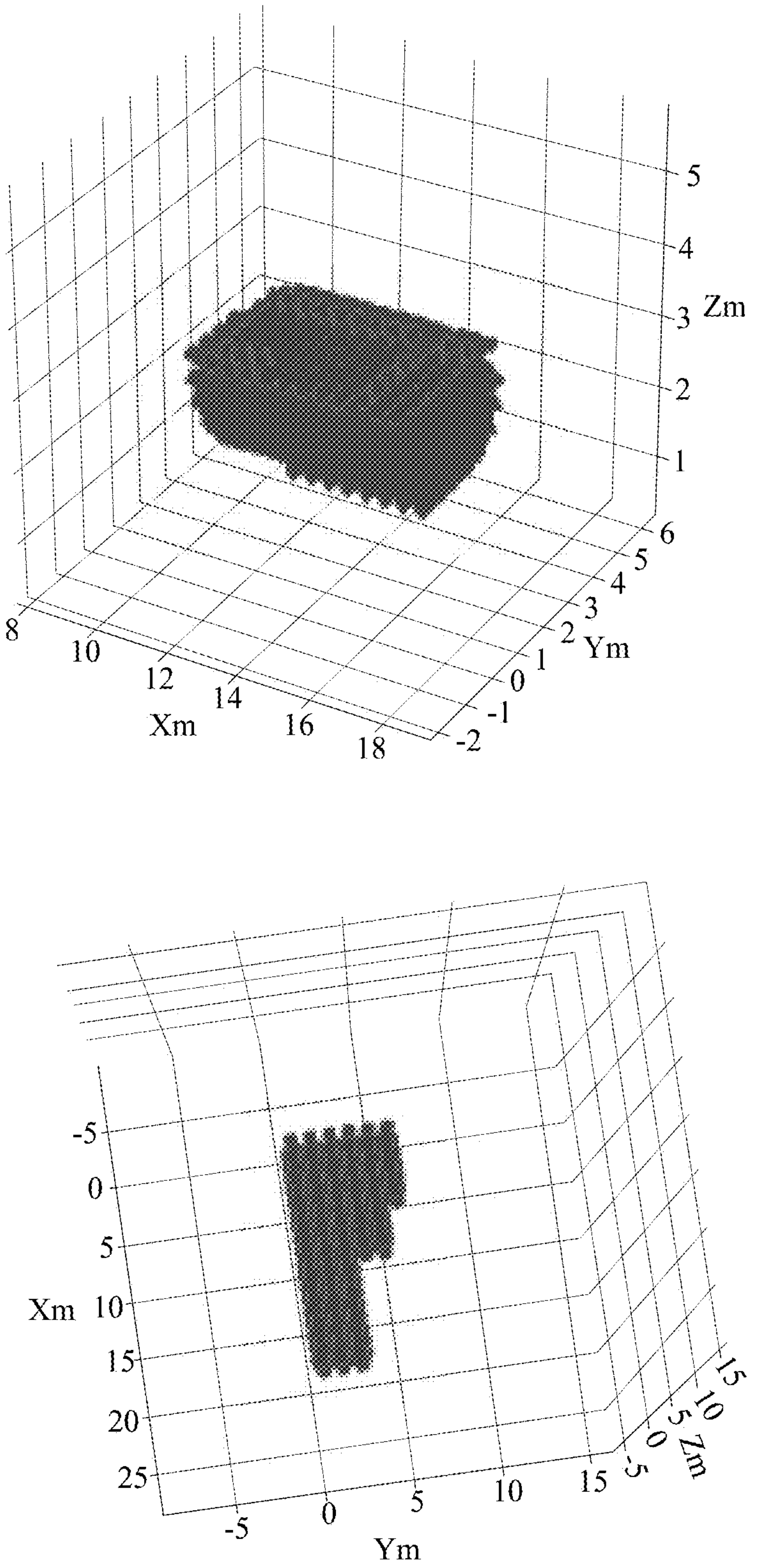
FIG. 31 presents all possible camera positions and their orientations in the area of real space.

FIG. 31 present visualizations showing all possible camera locations in an area of real space in blue color. The orientation of cameras at all possible locations in the area of real space are indicated in red color. In this example, the cameras are assumed to be positioned at or near the ceiling of the area of real space and orientation of cameras are towards the floor and shelves positioned in the area of the real space. The red colors in the illustrations represent direction vectors from cameras with respective orientations.

Figure 32A:
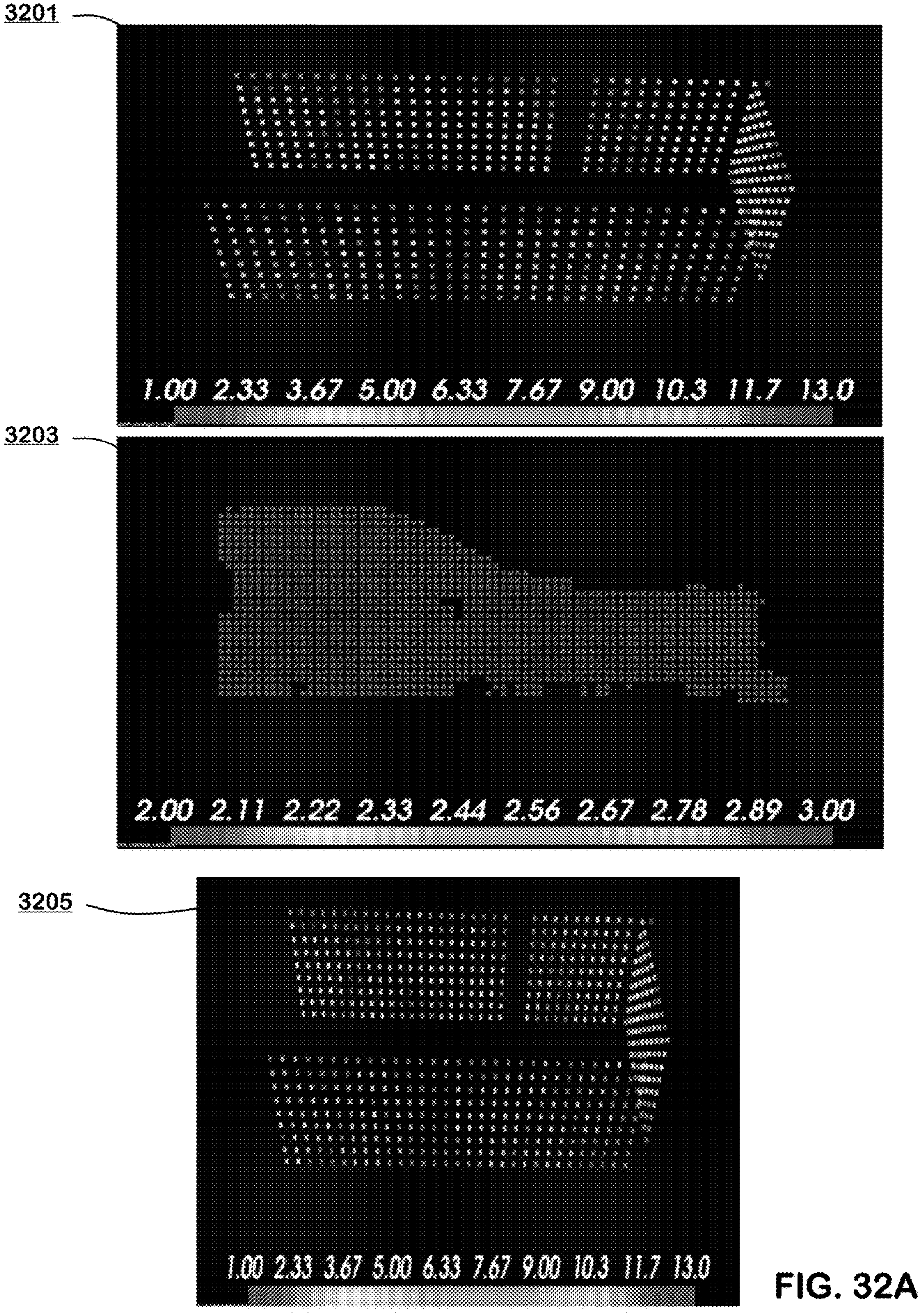
FIGS. 32A, 32B, 32C, and 32D present examples of camera coverage maps for the area of real space.
Figure 32B:
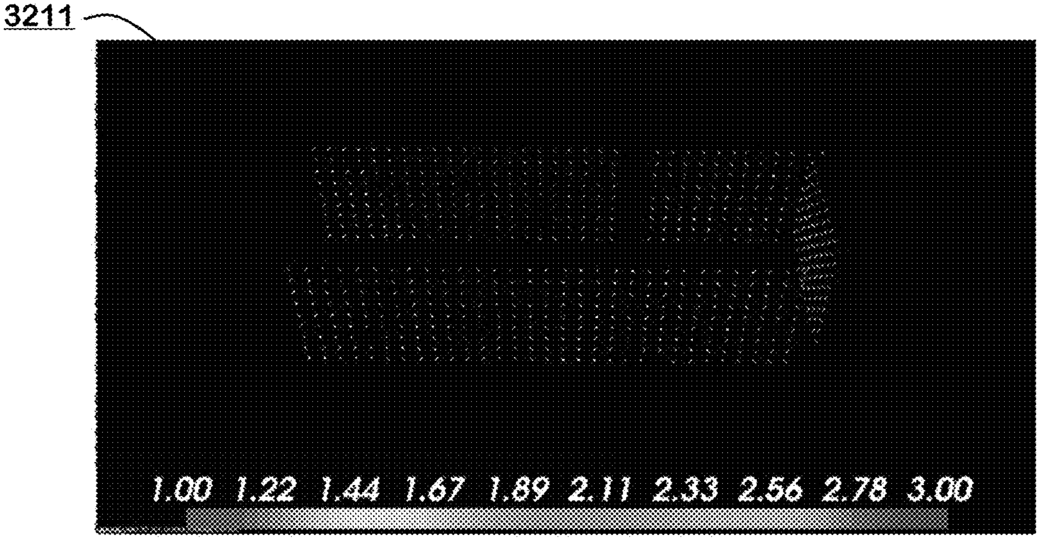
Figure 32B:
Figure 32B:
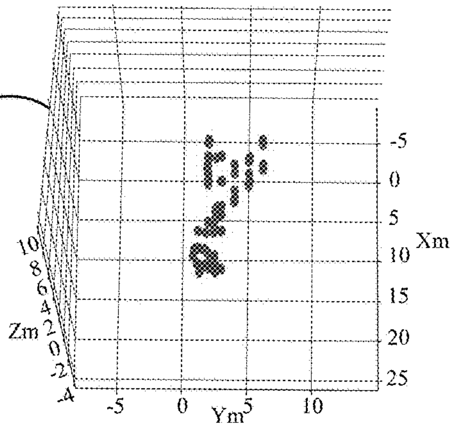
Figure 32C:
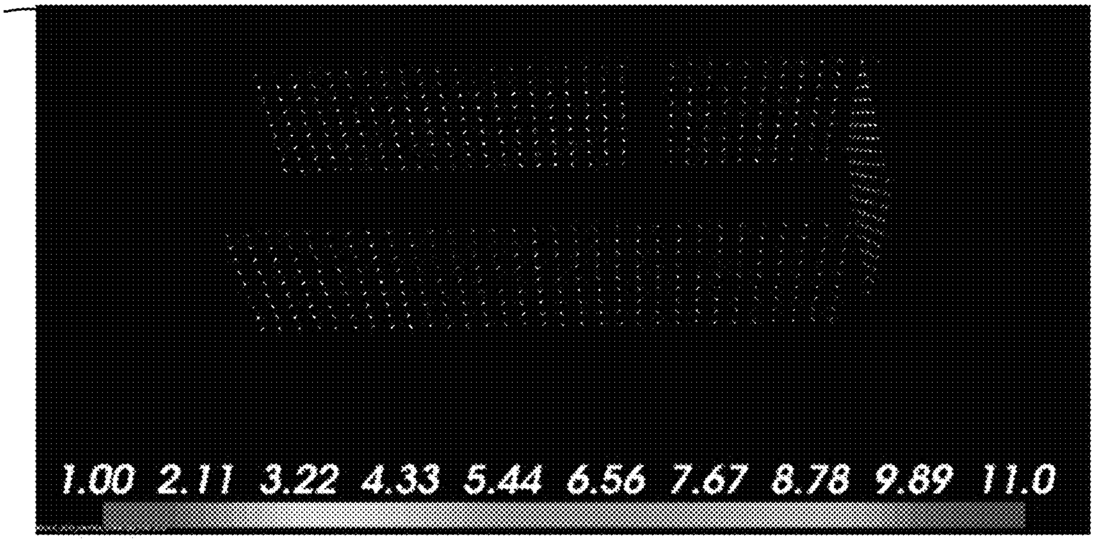
Figure 32C:
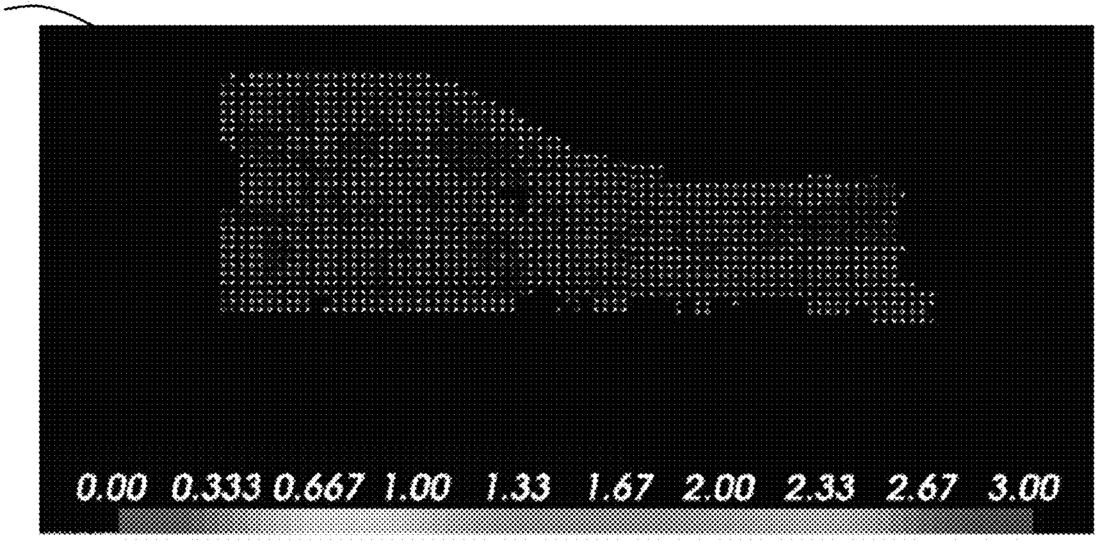
Figure 32C:
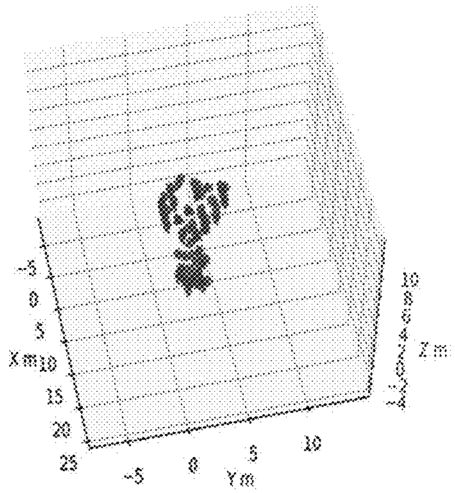
Figure 32D:
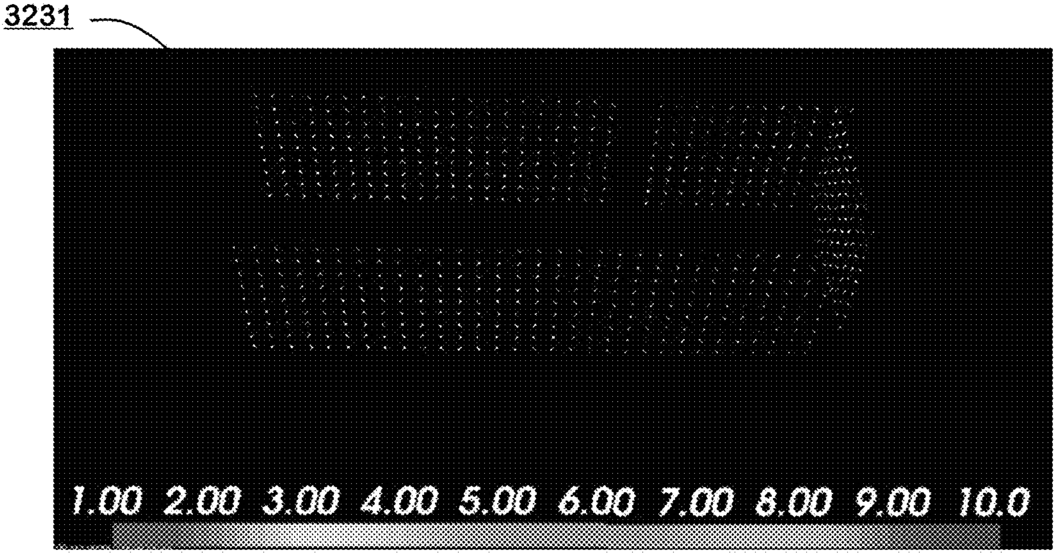
Figure 32D:
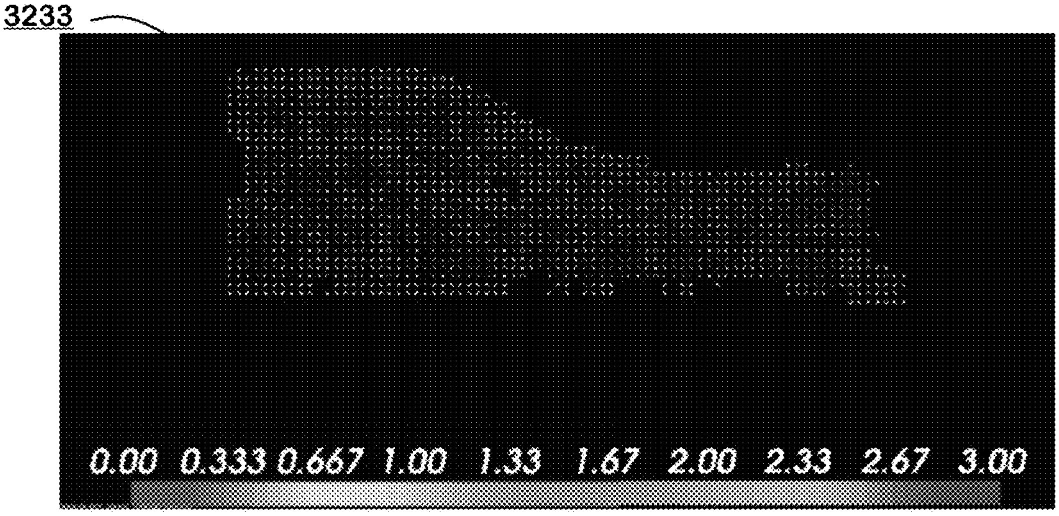
Figure 32D:
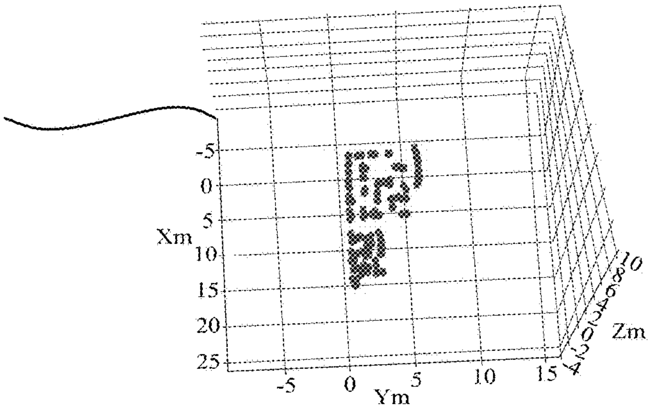

FIGS. 32A to 32D present examples of camera coverage maps for an area of real space with different number of cameras. FIG. 32A presents an example shelf coverage map 3201, an example neck height coverage map 3203, and camera positions 3205 for complete camera coverage determined using the method presented herein. FIG. 32B presents an example shelf coverage map 3211, an example neck height coverage map 3213, and camera positions 3215 with thirty cameras in the area of real space. FIG. 32C presents an example shelf coverage map 3221, an example neck height coverage map 3223, and camera positions 3225 with forty cameras in the area of real space. FIG. 32D presents an example shelf coverage map 3231, an example neck height coverage map 3233, and camera positions 3235 with fifty cameras in the area of real space.

Process Flow of Subject Tracking

A number of flowcharts illustrating subject detection and tracking logic are described herein. The logic can be implemented using processors configured as described above programmed using computer programs stored in memory accessible and executable by the processors, and in other configurations, by dedicated logic hardware, including field programmable integrated circuits, and by combinations of dedicated logic hardware and computer programs. With all flowcharts herein, it will be appreciated that many of the operations can be combined, performed in parallel, or performed in a different sequence, without affecting the functions achieved. In some cases, as the reader will appreciate, a rearrangement of operations will achieve the same results only if certain other changes are made as well. In other cases, as the reader will appreciate, a rearrangement of operations will achieve the same results only if certain conditions are satisfied. Furthermore, it will be appreciated that the flow charts herein show only operations that are pertinent to an understanding of the implementations, and it will be understood that numerous additional operations for accomplishing other functions can be performed before, after and between those shown.

Figure 33A:
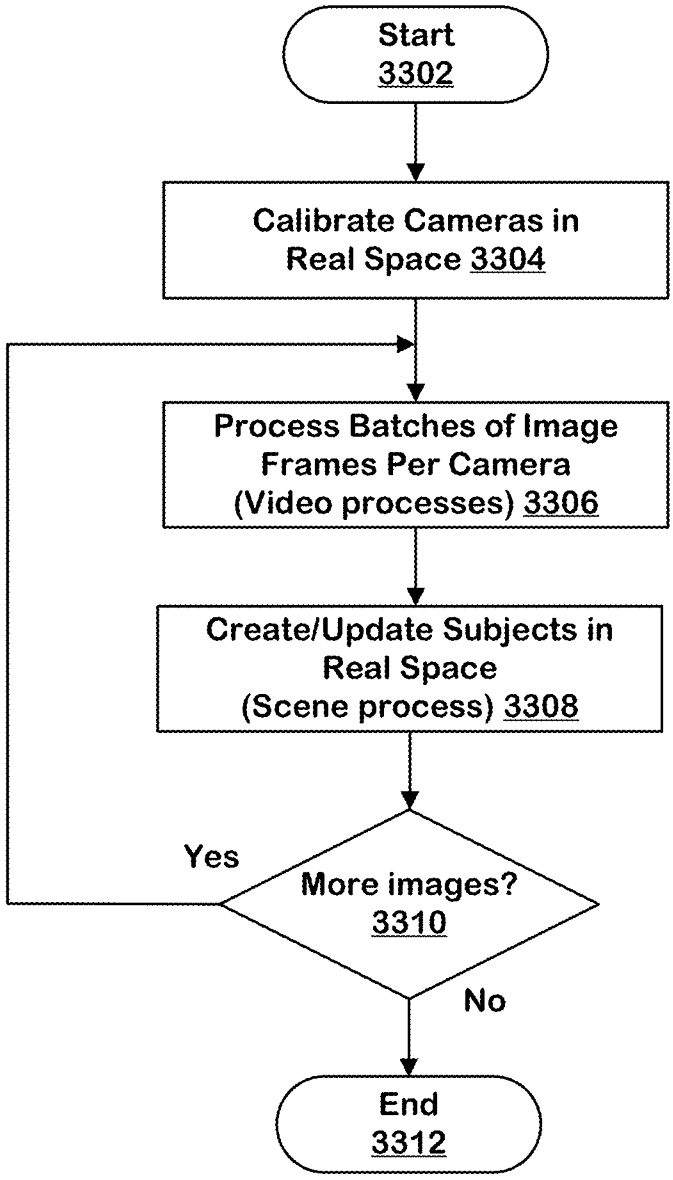
FIG. 33A is a flowchart illustrating process operations for calibrating cameras and tracking subjects by the system of FIG. 23.

FIG. 33A is a flowchart illustrating process operations for tracking subjects. The process starts at an operation 3302. The cameras 114 having fields of view in an area of the real space are calibrated in a process operation 3304. The calibration process can include identifying a (0, 0, 0) point for (x, y, z) coordinates of the real space. A first camera with the location (0, 0, 0) in its field of view is calibrated. More details of camera calibration are presented earlier in this application. Following this, a next camera with an overlapping field of view with the first camera is calibrated. The process is repeated at an operation 3304 until all cameras 114 are calibrated. In a next process operation of camera calibration, a subject is introduced in the real space to identify conjugate pairs of corresponding points between cameras with overlapping fields of view. Some details of this process are described above. The process is repeated for every pair of overlapping cameras. The calibration process ends if there are no more cameras to calibrate.

Video processes are performed at operation 3306 by image recognition engines 112$a$-112$n$. In one implementation, the video process is performed per camera to process batches of image frames received from respective cameras. The output of all or some of the video processes from respective image recognition engines 112$a$-112$n$ is given as input to a scene process performed by the tracking engine 110 at an operation 3308. The scene process identifies new subjects and updates the joint locations of existing subjects. At an operation 3310, it is checked whether there are more image frames to be processed. If there are more image frames, the process continues at operation 3406, otherwise the process ends at an operation 3312.

Figure 33B:
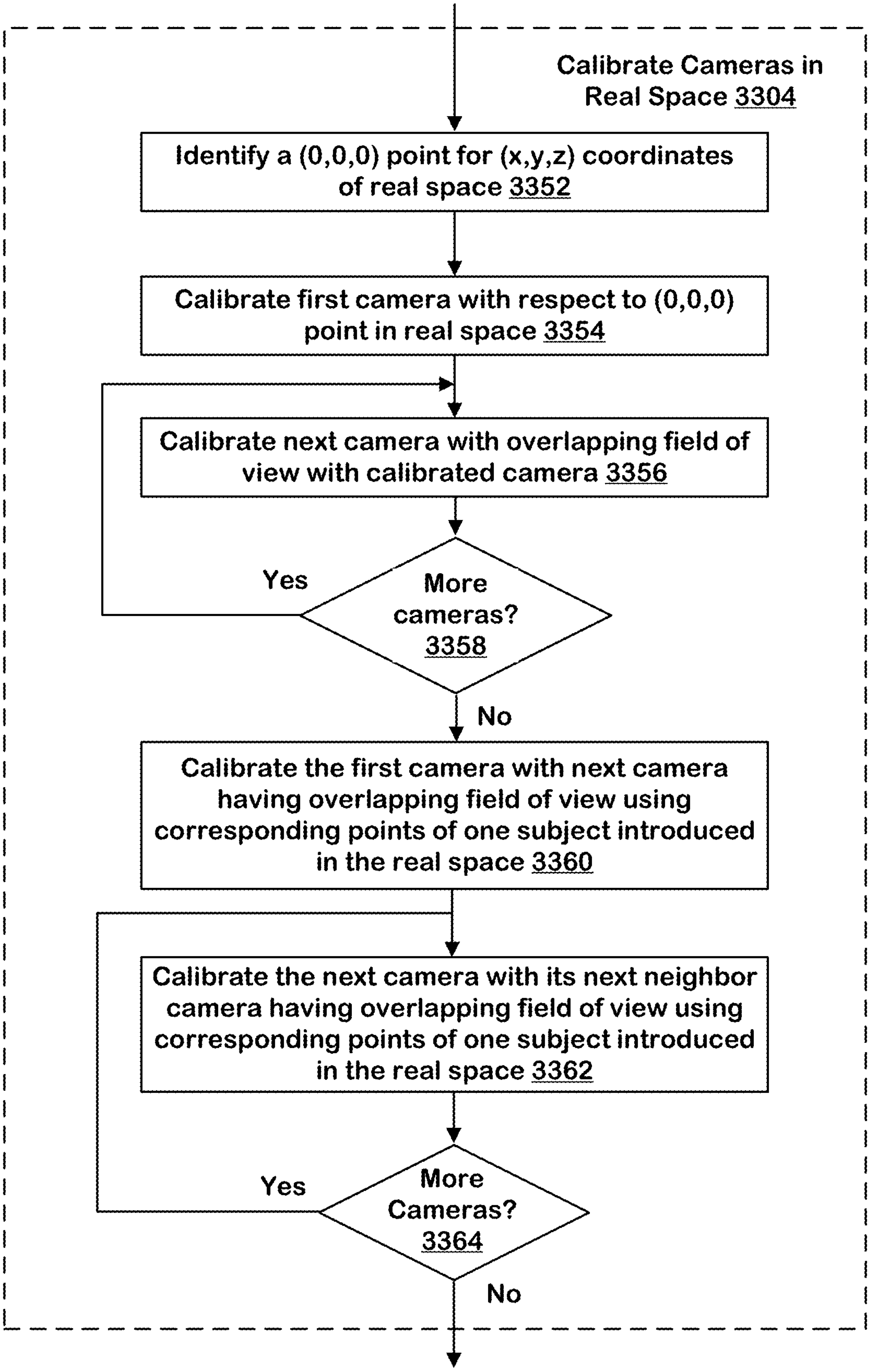
FIG. 33B is a flowchart showing more detailed process operations for a camera calibration operation of FIG. 33A.

More detailed process operations of the process operation 3304 "calibrate cameras in real space" are presented in a flowchart in FIG. 33B. The calibration process starts at an operation 3352 by identifying a (0, 0, 0) point for (x, y, z) coordinates of the real space. At an operation 3354, a first camera with the location (0, 0, 0) in its field of view is calibrated. More details of camera calibration are presented earlier in this application. At an operation 3356, a next camera with an overlapping field of view with the first camera is calibrated. At an operation 3358, it is checked whether there are more cameras to calibrate. The process is repeated at an operation 3356 until all cameras 114 are calibrated.

In a next process operation 3360, a subject is introduced in the real space to identify conjugate pairs of corresponding points between cameras with overlapping fields of view. Some details of this process are described above. The process is repeated for every pair of overlapping cameras at an operation 3362. The process ends if there are no more cameras (operation 3364).

Figure 34:
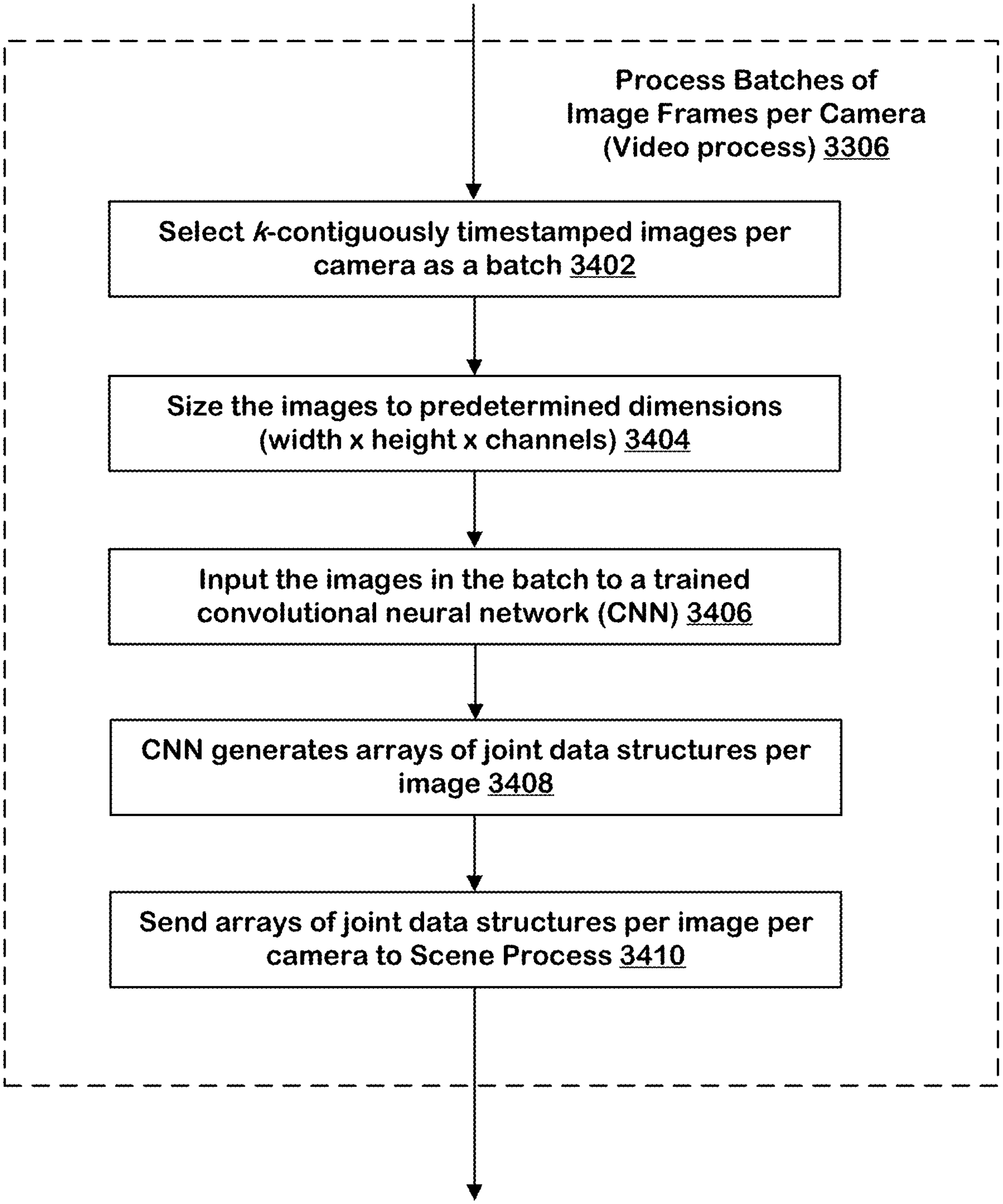
FIG. 34 is a flowchart showing more detailed process operations for a video process operation of FIG. 33A.

A flowchart in FIG. 34 shows more detailed operations of the "video process" operation 3406 in the flowchart of FIG. 34. At an operation 3402, k-contiguously timestamped images per camera are selected as a batch for further processing. In one implementation, the value of k=6 which is calculated based on available memory for the video process in the network nodes 101$a$-101$n$, respectively hosting image recognition engines 112$a$-112$n$. It is understood that the technology disclosed can process image batches of greater than or less than six images. In a next operation 3404, the size of the images is set to appropriate dimensions. In one implementation, the images have a width of 1280 pixels, a height of 720 pixels and three channels RGB (representing red, green and blue colors). At an operation 3406, a plurality of trained convolutional neural networks (CNN) process the images and generate arrays of joints data structures per image. The output of the CNNs are arrays of joints data structures per image (operation 3408). This output is sent to a scene process at an operation 3410.

Figure 35A:
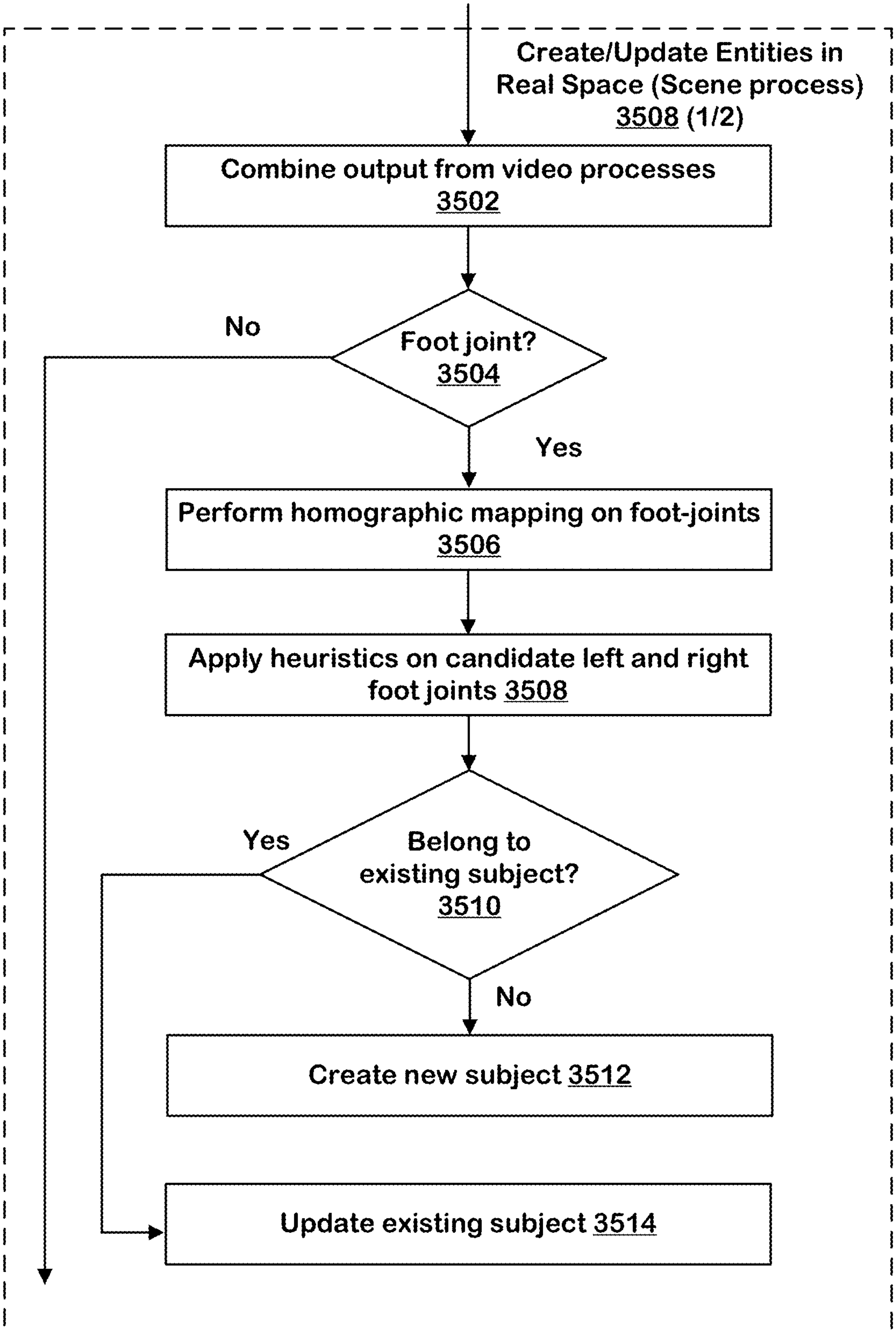
FIG. 35A is a flowchart showing a first part of more detailed process operations for the scene process of FIG. 33A.

FIG. 35A is a flowchart showing a first part of more detailed operations for the "scene process" operation 3308 in FIG. 33A. The scene process combines outputs from multiple video processes at an operation 3502. At an operation 3504, it is checked whether a joints data structure identifies a foot joint or a non-foot joint. If the joints data structure is of a foot-joint, homographic mapping is applied to combine the joints data structures corresponding to images from cameras with overlapping fields of view at an operation 3506. This process identifies candidate foot joints (left and right foot joints). At an operation 3508 heuristics are applied on candidate foot joints identified in the operation 3506 to identify sets of candidate foot joints as subjects. It is checked at an operation 3510 whether the set of candidate foot joints belongs to an existing subject. If not, a new subject is created at an operation 3512. Otherwise, the existing subject is updated at an operation 3514.

Figure 35B:
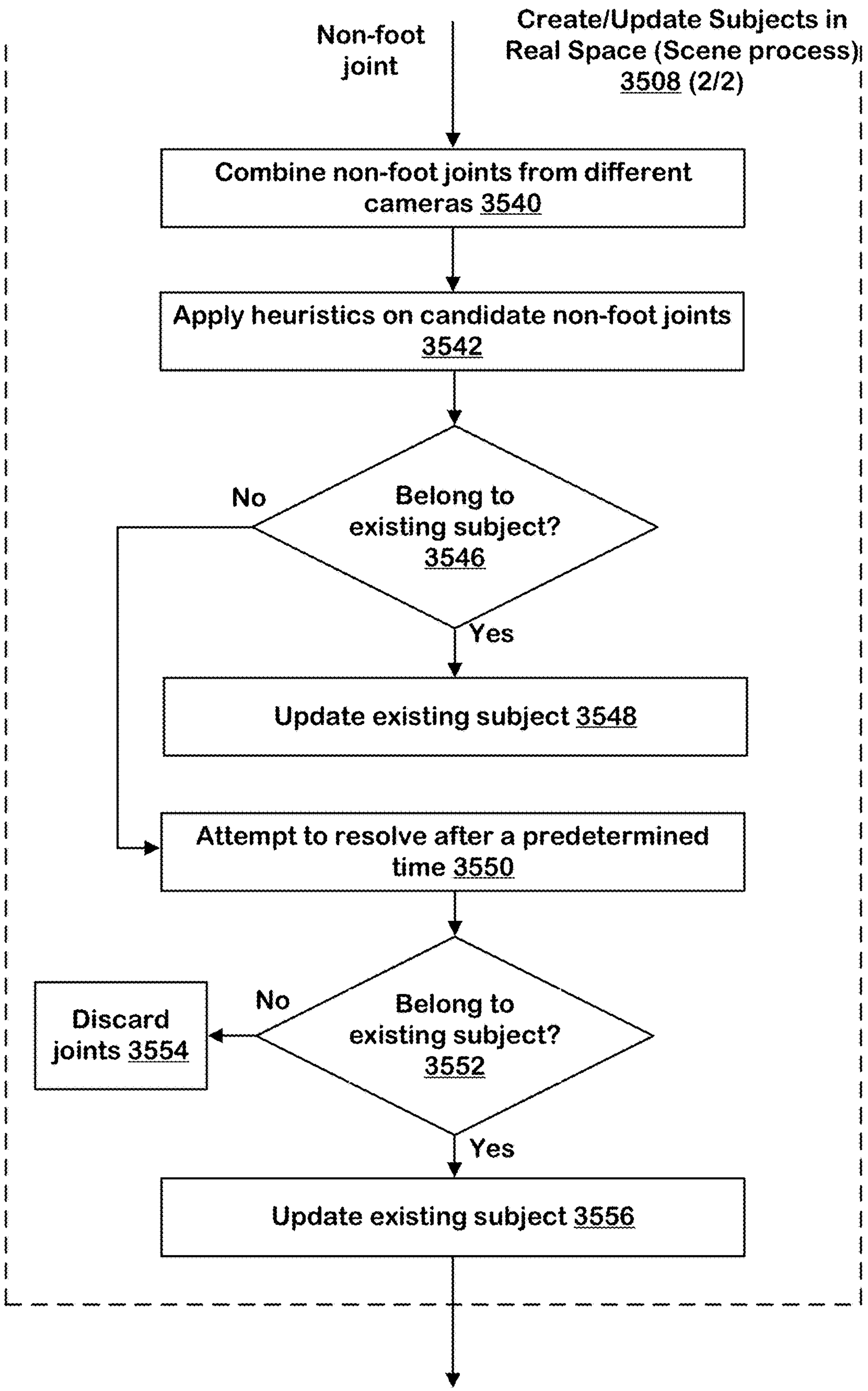
FIG. 35B is a flowchart showing a second part of more detailed process operations for the scene process of FIG. 33A.

A flowchart in FIG. 35B illustrates a second part of more detailed operations for the "scene process" operation 3308. At an operation 3540, the data structures of non-foot joints are combined from multiple arrays of joints data structures corresponding to images in the sequence of images from cameras with overlapping fields of view. This is performed by mapping corresponding points from a first image from a first camera to a second image from a second camera with overlapping fields of view. Some details of this process are described above. Heuristics are applied at an operation 3542 to candidate non-foot joints. At an operation 3546 it is determined whether a candidate non-foot joint belongs to an existing subject. If so, the existing subject is updated at an operation 3548. Otherwise, the candidate non-foot joint is processed again at an operation 3550 after a predetermined time to match it with an existing subject. At an operation 3552 it is checked whether the non-foot joint belongs to an existing subject. If true, the subject is updated at an operation 3556. Otherwise, the joint is discarded at an operation 3554.

In an example implementation, the processes to identify new subjects, track subjects and eliminate subjects (who have left the real space or were incorrectly generated) are implemented as part of an "entity cohesion algorithm" performed by the runtime system (also referred to as the inference system). An entity is a constellation of joints referred to as a subject above. The entity cohesion algorithm identifies entities in the real space and updates the locations of the joints in real space to track the movement of the entity.

Classification of Proximity Events

We now describe the technology to identify the type of a proximity event by classifying the detected proximity events. The proximity event can be a take event, a put event, a hand-off event or a touch event. The technology disclosed can further identify an item associated with the identified event. A system and various implementations for tracking exchanges of inventory items between sources and sinks in an area of real space are described with reference to FIGS. 36A and 36B. The system and processes are described with reference to FIGS. 36A and 36B, which are architectural level schematics of a system in accordance with an implementation. Because FIGS. 36A and 36B are architectural diagrams, certain details are omitted to improve the clarity of the description.

The technology disclosed comprises multiple image processors that can detect put and take events in parallel. We can also refer to these image processors as image processing pipelines that process the sequences of images from the cameras 114. The system can then fuse the outputs from two or more image processors to generate an output identifying the event type and the item associated with the event. The multiple processing pipelines for detecting put and take events increase the robustness of the system as the technology disclosed can predict a take and put of an item in an area of real space using the output of one of the image processors when the other image processors cannot generate a reliable output for that event. The first image processors 3604 use locations of subjects and locations of inventory display structures to detect "proximity events" which are further processed to detect put and take events. The second image processors 3606 use bounding boxes of hand images of subjects in the area of real space and perform time series analysis of the classification of hand images to detect region proposals-based put and take events. The third images processors 3622 can use masks to remove foreground objects (such as subjects or shoppers) from images and process background images (of shelves) to detect change events (or diff events) indicating puts and takes of items. The put and take events (or exchanges of items between sources and sinks) detected by the three image processors can be referred to as "inventory events".

The same cameras and the same sequences of images are used by the first image processors 3604 (predicting location-based inventory events), the second image processors 3606 (predicting region proposals-based inventory events) and the third image processors 3622 (predicting semantic diffing-based inventory events), in one implementation. As a result, detections of puts, takes, transfers (exchanges), or touches of inventory items are performed by multiple subsystems (or procedures) using the same input data allowing for high confidence, and high accuracy, in the resulting data.

Figure 36A:
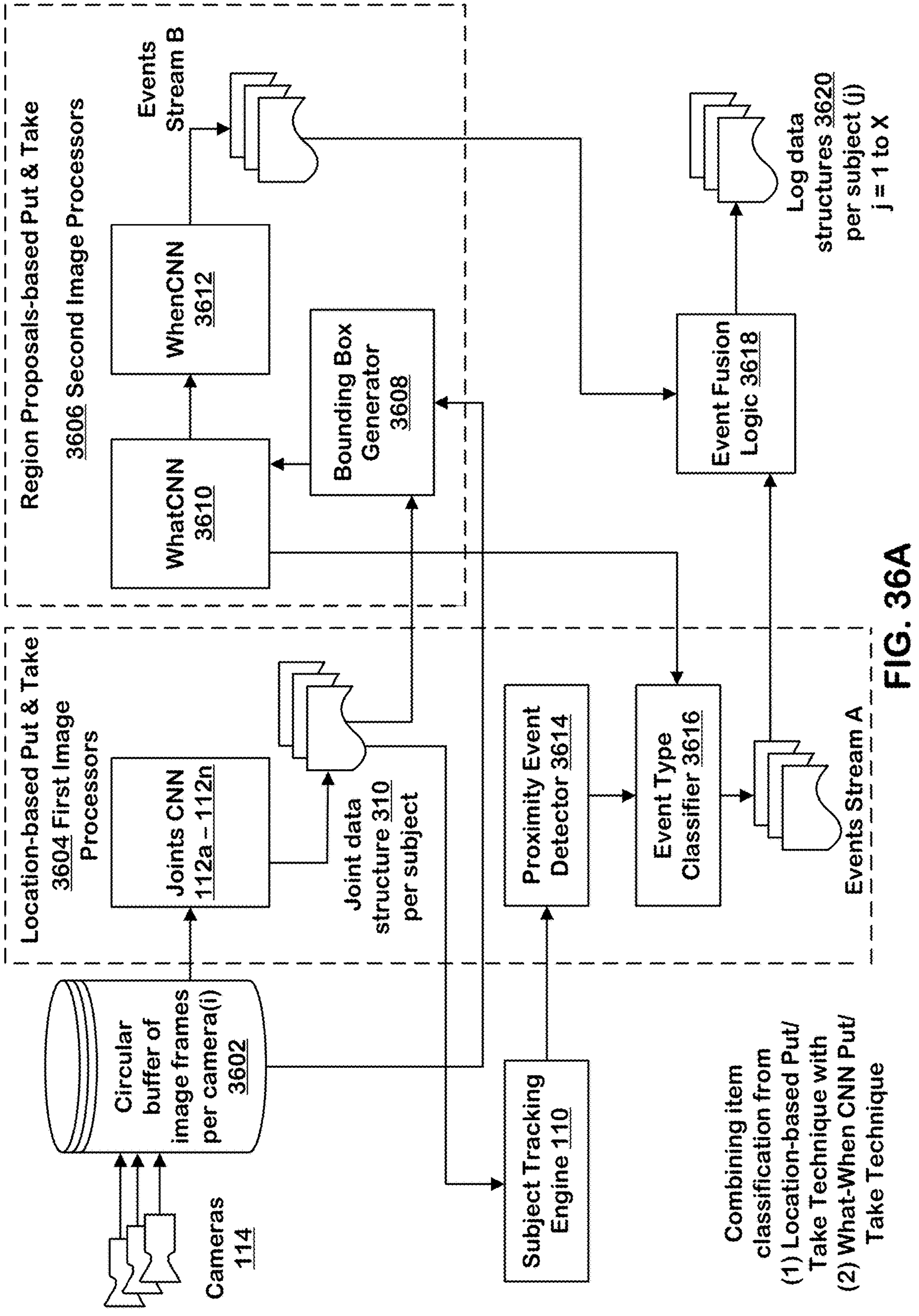
FIG. 36A is an example architecture for combining an event stream from location-based put and take detection with an event stream from region proposals-based (WhatCNN and WhenCNN) put and take detection.
Figure 36B:
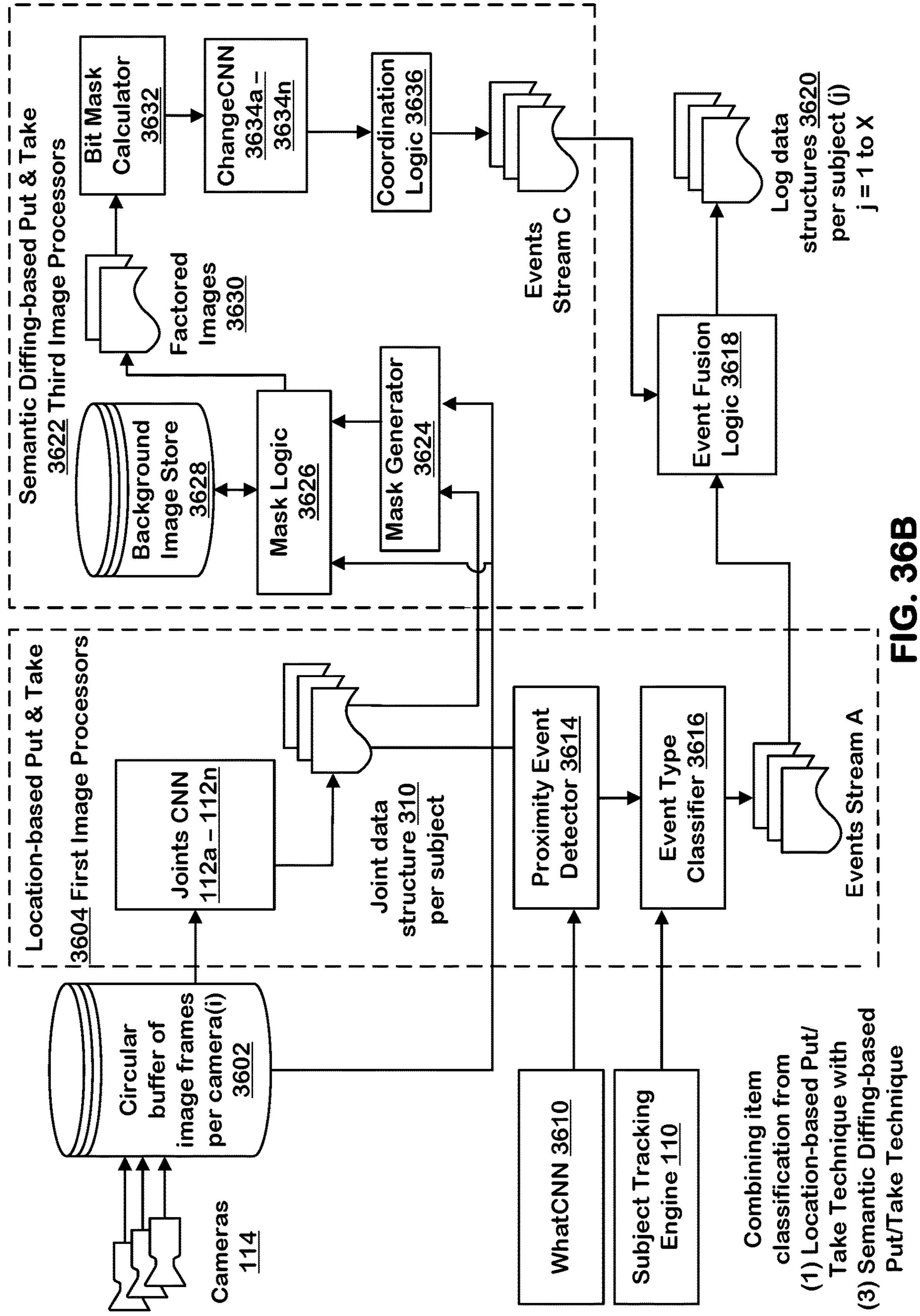
FIG. 36B is an example architecture for combining an event stream from location-based put and take detection with an event stream from semantic diffing-based put and take detection.

In FIG. 36A, we present the system architecture illustrating the first and the second image processors and fusion logic to combine their respective outputs. In FIG. 36B, we present a system architecture illustrating the first and the third image processors and fusion logic to combine their respective outputs. It should be noted that all three image processors can operate in parallel and the outputs of any combination of the two or more image processors can be combined. The system can also detect inventory events using one of the image processors.

Location-Based Events and Region Proposals-Based Events

FIG. 36A is a high-level architecture of two pipelines of neural networks processing image frames received from cameras 114 to generate shopping cart data structures for subjects in the real space. The system described here includes per-camera image recognition engines as described above for identifying and tracking multi-joint subjects. Alternative image recognition engines can be used, including examples in which only one "joint" is recognized and tracked per individual, or other features or other types of image data over space and time are utilized to recognize and track subjects in the real space being processed.

The processing pipelines run in parallel per camera, moving images from respective cameras to image recognition engines 112*a*-112*n* via circular buffers 3602 per camera. In one implementation, the first image processors subsystem 3604 includes image recognition engines 112*a*-112*n* implemented as convolutional neural networks (CNNs) and referred to as joint CNNs 112*a*-112*n*. As described in relation to FIG. 1, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space.

In one implementation, the cameras 114 are installed in a shopping store (such as a supermarket) such that sets of cameras (two or more) with overlapping fields of view are positioned over each aisle to capture images of real space in the store. There are N cameras in the real space, represented as camera(i) where the value of i ranges from 1 to N. Each camera produces a sequence of images of real space corresponding to its respective field of view.

In one implementation, the image frames corresponding to sequences of images from each camera are sent at the rate of 30 frames per second (fps) to respective image recognition engines 112*a*-112*n*. Each image frame has a timestamp, an identity of the camera (abbreviated as "camera_id"), and a frame identity (abbreviated as "frame_id") along with the image data. The image frames are stored in a circular buffer 3602 (also referred to as a ring buffer) per camera 114. Circular buffers 3602 store a set of consecutively timestamped image frames from respective cameras 114. In some implementations, an image resolution reduction process, such as down sampling or decimation, is applied to images output from the circular buffers 3602, before their input to the Joints CNN 122*a*-122*n*.

A Joints CNN processes sequences of image frames per camera and identifies the 18 different types of joints of each subject present in its respective field of view. The outputs of joints CNNs 112*a*-112*n* corresponding to cameras with overlapping fields of view are combined to map the locations of joints from the 2D image coordinates of each camera to the 3D coordinates of real space. The joints data structures 310 per subject (j) where j equals 1 to x, identify locations of joints of a subject (j) in the real space. The details of the subject data structure 320 are presented in FIG. 3B. In one example implementation, the joints data structure 310 is a two level key-value dictionary of the joints of each subject. A first key is the frame_number and the value is a second key-value dictionary with the key as the camera_id and the value as the list of joints assigned to a subject.

The data sets comprising subjects identified by the joints data structures 310 and corresponding image frames from sequences of image frames per camera are given as input to a bounding box generator 3608 in the second image processors subsystem 3606 (or the second processing pipeline). The second image processors produce a stream of region proposals-based events, shown as events stream B in FIG. 36A. The second image processors subsystem further comprises foreground image recognition engines. In one implementation, the foreground image recognition engines recognize semantically significant objects in the foreground (i.e. shoppers, their hands and inventory items) as they relate to puts and takes of inventory items, for example, over time in the images from each camera. In the example implementation shown in FIG. 36A, the foreground image recognition engines are implemented as WhatCNN 3610 and WhenCNN 3612. The bounding box generator 3608 implements the logic to process data sets to specify bounding boxes which include images of hands of identified subjects in images in the sequences of images. The bounding box generator 3608 identifies locations of hand joints in each source image frame per camera using locations of hand joints in the multi-joints data structures (also referred to as subject data structures) 320 corresponding to the respective source image frame. In one implementation, in which the coordinates of the joints in the subject data structure indicate the locations of joints in 3D real space coordinates, the bounding box generator maps the joint locations from 3D real space coordinates to 2D coordinates in the image frames of respective source images.

The bounding box generator 3608 creates bounding boxes for hand joints in image frames in a circular buffer per camera 114. In some implementations, the image frames output from the circular buffer to the bounding box generator has full resolution, without down sampling or decimation, alternatively with a resolution higher than that applied to the joints CNN. In one implementation, the bounding box is a 128 pixels (width) by 128 pixels (height) portion of the image frame with the hand joint located in the center of the bounding box. In other implementations, the size of the bounding box is 64 pixels×64 pixels or 32 pixels×32 pixels. For m subjects in an image frame from a camera, there can be a maximum of 2 m hand joints, thus 2 m bounding boxes. However, in practice fewer than 2 m hands are visible in an image frame because of occlusions due to other subjects or other objects. In one example implementation, the hand locations of subjects are inferred from locations of elbow and wrist joints. For example, the right hand location of a subject is extrapolated using the location of the right elbow (identified as p1) and the right wrist (identified as p2) as extrapolation_amount*(p2−p1)+p2 where extrapolation_amount equals 0.4. In another implementation, the image recognition engines 112*a*-112*n* are trained using left and right hand images. Therefore, in such an implementation, the image recognition engines 112*a*-112*n* directly identify locations of hand joints in image frames per camera. The hand locations per image frame are used by the bounding box generator 3608 to create a bounding box per identified hand joint.

The WhatCNN 3610 is a convolutional neural network trained to process the specified bounding boxes in the images to generate the classification of hands of the identified subjects. One trained WhatCNN 3610 processes image frames from one camera. In the example implementation of the shopping store, for each hand joint in each image frame, the WhatCNN 3610 identifies whether the hand joint is empty. The WhatCNN 3610 also identifies a SKU (stock keeping unit) number of the inventory item in the hand joint, a confidence value indicating the item in the hand joint is a non-SKU item (i.e. it does not belong to the shopping store inventory) and the context of the hand joint location in the image frame.

The outputs of WhatCNN models 3610 for all cameras 114 are processed by a single WhenCNN model 3612 for a pre-determined window of time. In the example of a shopping store, the WhenCNN 3612 performs time series analysis for both hands of subjects to identify whether each subject took a store inventory item from a shelf or put a store inventory item on a shelf. A stream of put and take events (also referred to as region proposals-based inventory events) is generated by the WhenCNN 3612 and is labeled as events stream B in FIG. 36B. The put and take events from the events stream are used to update the log data structures of subjects (also referred to as shopping cart data structures including a list of inventory items). A log data structure 3620 is created per subject to keep a record of the inventory items in a shopping cart (or basket) associated with the subject. The log data structures per shelf and per store can be generated to indicate items on shelves and in a store. The system can include an inventory database to store the log data structures of subjects, shelves and stores.

Video Processes and Scene Process to Classify Region Proposals

In one implementation of the system, data from a so called "scene process" and multiple "video processes" are given as input to the WhatCNN model 3610 to generate hand image classifications. Note that the output of each video process is given to a separate WhatCNN model. The output from the scene process is a joints dictionary. In this dictionary, keys are unique joint identifiers and values are unique subject identifiers with which each joint is associated. If no subject is associated with a joint, then it is not included in the dictionary. Each video process receives a joints dictionary from the scene process and stores it into a ring buffer that maps frame numbers to the returned dictionary. Using the returned key-value dictionary, the video processes select subsets of the image at each moment in time that are near hands associated with identified subjects. These portions of image frames around hand joints can be referred to as region proposals.

In the example of a shopping store, a "region proposal" is the frame image of a hand location from one or more cameras with the subject in their corresponding fields of view. A region proposal can be generated for sequences of images from all cameras in the system. It can include empty hands as well as hands carrying shopping store inventory items and items not belonging to shopping store inventory. Video processes select portions of image frames containing hand joints per moment in time. Similar slices of foreground masks are generated. The above (image portions of hand joints and foreground masks) are concatenated with the joints dictionary (indicating subjects to whom respective hand joints belong) to produce a multi-dimensional array. This output from video processes is given as input to the WhatCNN model.

The classification results of the WhatCNN model can be stored in the region proposal data structures. All regions for a moment in time are then given back as input to the scene process. The scene process stores the results in a key-value dictionary, where the key is a subject identifier and the value is a key-value dictionary, where the key is a camera identifier and the value is a region's logits. This aggregated data structure is then stored in a ring buffer that maps frame numbers to the aggregated structure for each moment in time.

Region proposal data structures for a period of time e.g., for one second, are given as input to the scene process. In one implementation, in which cameras are taking images at the rate of 30 frames per second, the input includes 30 time periods and corresponding region proposals. The system includes logic (also referred to as a scene process) that reduces the 30 region proposals (per hand) to a single integer representing the inventory item SKU. The output of the scene process is a key-value dictionary in which the key is a subject identifier and the value is the SKU integer.

The WhenCNN model 3612 performs a time series analysis to determine the evolution of this dictionary over time. This results in the identification of items taken from shelves and put on shelves in the shopping store. The output of the WhenCNN model is a key-value dictionary in which the key is the subject identifier and the value is logits produced by the WhenCNN. In one implementation, a set of heuristics can be used to determine the shopping cart data structure 3620 per subject. The heuristics are applied to the output of the WhenCNN, joint locations of subjects indicated by their respective joints data structures, and planograms. The heuristics can also include the planograms that are pre-computed maps of inventory items on shelves. The heuristics can determine, for each take or put, whether the inventory item is put on a shelf or taken from a shelf, whether the inventory item is put in a shopping cart (or a basket) or taken from the shopping cart (or the basket) or whether the inventory item is close to the identified subject's body.

We now refer back to FIG. 36A to present the details of the first image processors 3604 for location-based put and take detection. The first image processors can be referred to as the first image processing pipeline. It can include a proximity event detector 3614 that receives information about inventory caches linked to subjects identified by the joints data structures 310. The proximity event detector includes the logic to process positions of hand joints (left and right) of subjects, or other joints corresponding to inventory caches, to detect when a subject's position is closer to another subject than a pre-defined threshold such as 10 cm. Other values of the threshold less than or greater than 10 cm can be used. The distance between the subjects is calculated using the positions of their hands (left and right). If one or both hands of a subject are occluded, the proximity event detector can use the positions of other joints of the subjects such as an elbow joint, or shoulder joint, etc. The above positions calculation logic can be applied per hand per subject in all image frames in the sequence of image frames per camera to detect proximity events. In other implementations, the system can apply the distance calculation logic after every 3 frames, 5 frames or 10 frames in the sequence of frames. The system can use other frame intervals or time intervals to calculate the distance between subjects or the distance between subjects and shelves.

If a proximity event is detected by the proximity event detector 3614, the event type classifier 3616 processes the output from the WhatCNN 3610 to classify the event as one of a take event, a put event, a touch event, or a transfer or exchange event. The event type classifier receives the holding probability for the hand joints of subjects identified in the proximity event. The holding probability indicates a confidence score indicating whether the subject is holding an item or not. A large positive value indicates that the WhatCNN model has a high level of confidence that the subject is holding an item. A large negative value indicates that the model is confident that the subject is not holding any item. A close to zero value of the holding probability indicates that the WhatCNN model is not confident in predicting whether the subject is holding an item or not.

Referring back to FIG. 36A, the event type classifier 3616 can take the holding probability values over N frames before and after the proximity event as input to detect whether the event detected is a take event, a put event, a touch event, or a transfer or exchange event. If a take event is detected, the system can use the average item class probability from the WhatCNN over N frames after the proximity event to determine the item associated with the proximity event. The technology disclosed can include logic to detect the hand-off or exchange of an item from the source subject to the sink subject. The sink subject may also have taken the detected item from a shelf or another inventory location. This item can then be added to the log data structure of the sink subject.

The exchange or transfer of an item between two shoppers (or subjects) includes two events: a take event and a put event. For the put event, the system can take the average item class probability from the WhatCNN over N frames before the proximity event to determine the item associated with the proximity event. The item detected is handed-off from the source subject to the sink subject. The source subject may also have put the item on a shelf or another inventory location. The detected item can then be removed from the log data structure of the source subject. The system detects a take event for the sink subject and adds the item to the subject's log data structure. A touch event does not result in any changes to the log data structures of the source and sink in the proximity event.

Methods to Detect Proximity Events

We present examples of methods to detect proximity events. One example is based on heuristics using data about the locations of joints such as hand joints, and other examples use machine learning models that process data about locations of joints. Combinations of heuristics and machine learning models can used in some implementations.

Method 1: Using Heuristics to Detect Proximity Events

The system detects the positions of both hands of shoppers (or subjects) per frame per camera in the area of real space. Other joints or other inventory caches which move over time and are linked to shoppers can be used. The system calculates the distances of the left hand and right hand of each shopper to the left hands and right hands of other shoppers in the area of real space. In one implementation, the system calculates the distances between hands of shoppers per portion of the area of real space, for example in each aisle of the shopping store. The system also calculates the distances of the left hand and right hand of each shopper per frame per camera to the nearest shelf in the inventory display structure. The shelves can be represented by a plane in a 3D coordinate system or by a 3D mesh. The system analyzes the time series of hand distances over time by processing sequences of image frames per camera.

The system selects a hand (left or right) per subject per frame that has a minimum distance (of the two hands) to the hand (left or right) of another shopper or to a shelf (i.e. fixed inventory cache). The system also determines if the hand is "in the shelf". The hand is considered "in the shelf" if the (signed) distance between the hand and the shelf is below a threshold. A negative distance between the hand and shelf indicates that the hand has gone past the plane of the shelf. If the hand is in the shelf for more than a pre-defined number of frames (such as M frames), then the system detects a proximity event when the hand moves out of the shelf. The system determines that the hand has moved out of the shelf when the distance between the hand and the shelf increases above a threshold distance. The system assigns a timestamp to the proximity event which can be a midpoint between the entrance time of the hand in the shelf and the exit time of the hand from the shelf. The hand associated with the proximity event is the hand (left or right) that has the minimum distance to the shelf at the time of the proximity event. Note that the entrance time can be the timestamp of the frame in which the distance between the shelf and the hand falls below the threshold as mentioned above. The exit time can be the timestamp of the frame in which the distance between the shelf and the hand increases above the threshold.

Method 2: Applying a Decision Tree Model to Detect Proximity Events

The second method to detect proximity events uses a decision tree model that uses heuristics and/or machine learning. The heuristics-based method to detect the proximity event might not detect proximity events when one or both hands of the subjects are occluded in image frames from the sensors. This can result in missed detections of proximity events which can cause errors in updates to the log data structures of shoppers. Therefore, the system can include an additional method to detect proximity events for robust event detections. If the system cannot detect one or both hands of an identified subject in an image frame, the system can use (left or right) elbow joint positions instead. The system can apply the same logic as described above to detect the distance of the elbow joint to a shelf or a (left or right) hand of another subject to detect a proximity event, if the distance falls below a threshold distance. If the elbow of the subject is occluded as well, then the system can use a shoulder joint to detect a proximity event.

Shopping stores can use different types of shelves having different properties, e.g., depth of shelf, height of shelf, and space between shelves, etc. The distribution of occlusions of subjects (or portions of subjects) induced by shelves at different camera angles is different, and we can train one or more decision tree models using labeled data. The labeled data can include a corpus of example image data. We can train a decision tree that takes in a sequence of distances, with some missing data to simulate occlusions, of shelves to joints over a period of time. The decision tree outputs whether an event happened in the time range or not. In the case of a proximity event prediction, the decision tree also predicts the time of the proximity event (relative to the initial frame).

The inputs to the decision tree can be median distances of three-dimensional keypoints (3D keypoints) to shelves. A 3D keypoint can represent a three-dimensional position in the area of real space. The three-dimensional position can be a position of a joint in the area of real space. The outputs from the decision tree model are event classifications, i.e., event or no event.

Method 3: Applying a Random Forest Model to Detect Proximity Events

The third method for detecting proximity events uses an ensemble of decision trees. In one implementation, we can use the trained decision trees from the method 2 above to create the ensemble random forest. A random forest classifier (also referred to as a random decision forest) is an ensemble machine learning technique. Ensembled techniques or algorithms combine more than one technique of the same or different kind for classifying objects. The random forest classifier consists of multiple decision trees that operate as an ensemble. Each individual decision tree in a random forest acts as base classifier and outputs a class prediction. The class with the most votes becomes the random forest model's prediction. The fundamental concept behind random forests is that a large number of relatively uncorrelated models (decision trees) operating as a committee will outperform any of the individual constituent models.

The technology disclosed can generate separate event streams in parallel for the same inventory events. For example, as shown in FIG. 36A, the first image processors generate an event stream A of location-based put and take events. As described above, the first image processors can also detect touch events. As touch events do not result in a put or take, the system does not update the log data structures of sources and sinks when it detects a touch event. The event stream A can include location-based put and take events and can include the item identifier associated with each event. The location-based events in the event stream A can also include the subject identifiers of the source subjects or the sink subjects and the time and location of the events in the area of real space. In one implementation, a location-based event can also include the shelf identifier of the source shelf or the sink shelf.

The second image processors produce a second event stream B including put and take events based on hand-image processing of the WhatCNN and time series analysis of the output of the WhatCNN by the WhenCNN. The region proposals-based put and take events in the event stream B can include item identifiers, the subjects or shelves associated with the events, and the time and location of the events in the real space. The events in both the event stream A and event stream B can include confidence scores identifying the confidence of the classifier.

The technology disclosed includes event fusion logic 3618 to combine events from event stream A and event stream B to increase the robustness of event predictions in the area of real space. In one implementation, the event fusion logic determines, for each event in event stream A, if there is a matching event in event stream B. The events are matched if both events are of the same event type (put, take), if the event in event stream B has not been already matched to an event in event stream A, and if the event in event stream B is identified in a frame within a threshold number of frames preceding or following the image frame in which the proximity event is detected. As described above, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space Therefore, if an event is detected in a frame x in event stream A, the matching logic considers events in frame x±N, where the value of N can be set as 1, 3, 5 or more. If a matching event is found in event stream B, the technology disclosed uses a weighted combination of event predictions to generate an item put or take prediction. For example, in one implementation, the technology disclosed can assign 50 percent weight to events of stream A and 50 percent weight to matching events from stream B and use the resulting output to update the log data structures of source and sinks. In another implementation, the technology disclosed can assign more weight to events from one of the streams when combining the events to predict puts and takes of items.

If the event fusion logic cannot find a matching event in event stream B for an event in event stream A, the technology disclosed can wait for a threshold number of frames to pass. For example, if the threshold is set as 5 frames, the system can wait until five frames following the frame in which the proximity event is detected are processed by the second image processors. If a matching event is not found after the threshold number of frames, the system can use the item put or take prediction from the location-based event to update the log data structure of the source and the sink. The technology disclosed can apply the same matching logic for events in the event stream B. Thus, for an event in the event stream B, if there is no matching event in the event stream A, the system can use the item put or take detection from the region proposals-based prediction to update the log data structures 3620 of the source and sink subjects. Therefore, the technology disclosed can produce robust event detections even when one of the first or the second image processors cannot predict a put or a take event or when one technique predicts a put or a take event with low confidence.

Location-Based Events and Semantic Diffing-Based Events

We now present the third image processors 3622 (also referred to as the third image processing pipeline) and the logic to combine the item put and take predictions from this technique to item put and take predictions from the first image processors 3604. Note that item put and take predictions from third image processors can be combined with item put and take predictions from second image processors 3606 in a similar manner. FIG. 36B is a high-level architecture of pipelines of neural networks processing image frames received from the cameras 114 to generate shopping cart data structures for subjects in the real space. The system described here includes per camera image recognition engines as described above for identifying and tracking multi-joint subjects.

The processing pipelines run in parallel per camera, moving images from respective cameras to image recognition engines 112*a*-112*n* via circular buffers 3602. We have described the details of the first image processors 3604 with reference to FIG. 36A. The output from the first image processors is an events stream A. The technology disclosed includes event fusion logic 3618 to combine the events in the events stream A to matching events in an events stream C which is output from the third image processors.

A "semantic diffing" subsystem (also referred to as the third image processors 3622) includes background image recognition engines, receiving corresponding sequences of images from the plurality of cameras and recognizing semantically significant differences in the background (i.e., inventory display structures like shelves) as they relate to puts and takes of inventory items, for example, over time in the images from each camera. The third image processors receive joint data structures 310 from the joints CNNs 112*a*-112*n* and image frames from the cameras 114 as input. The third image processors mask the identified subjects in the foreground to generate masked images. The masked images are generated by replacing bounding boxes that correspond with foreground subjects with background image data. Following this, the background image recognition engines process the masked images to identify and classify background changes represented in the images in the corresponding sequences of images. In one implementation, the background image recognition engines comprise convolutional neural networks.

The third image processors process identified background changes to predict takes of inventory items by identified subjects and puts of inventory items on inventory display structures by identified subjects. The set of detections of puts and takes from the semantic diffing system are also referred to as background detections of puts and takes of inventory items. In the example of a shopping store, these detections can identify inventory items taken from the shelves or put on the shelves by customers or employees of the store. The semantic diffing subsystem includes the logic to associate identified background changes with identified subjects. We now present the details of the components of the semantic diffing subsystem or third image processors 3622 as shown inside the broken line on the right side of FIG. 36B.

The system comprises the plurality of cameras 114 producing respective sequences of images of corresponding fields of view in the real space. The field of view of each camera overlaps with the field of view of at least one other camera in the plurality of cameras as described above. In one implementation, the sequences of image frames corresponding to the images produced by the plurality of cameras 114 are stored in a circular buffer 3602 (also referred to as a ring buffer) per camera 114. Each image frame has a timestamp, an identity of the camera (abbreviated as "camera_id"), and a frame identity (abbreviated as "frame_id") along with the image data. Circular buffers 3602 store a set of consecutively timestamped image frames from respective cameras 114. In one implementation, the cameras 114 are configured to generate synchronized sequences of images.

The first image processors 3604 include the Joints CNN 112*a*-112*n*, receiving corresponding sequences of images from the plurality of cameras 114 (with or without image resolution reduction). The technology includes subject tracking engines to process images to identify subjects represented in the images in the corresponding sequences of images. In one implementation, the subject tracking engines can include convolutional neural networks (CNNs) referred to as joints CNN 112*a*-112*n*. The outputs of the joints CNNs 112*a*-112*n* corresponding to cameras with overlapping fields of view are combined to map the locations of joints from the 2D image coordinates of each camera to the 3D coordinates of real space. The joints data structures 310 per subject (j), where j equals 1 to x, identify locations of joints of a subject (j) in the real space and in 2D space for each image. Some details of the subject data structure 320 are presented in FIG. 3B.

A background image store 3628, in the semantic diffing subsystem or third image processors 3622, stores masked images (also referred to as background images in which foreground subjects have been removed by masking) for corresponding sequences of images from the cameras 114. The background image store 3628 is also referred to as a background buffer. In one implementation, the size of the masked images is the same as the size of the image frames in the circular buffer 3602. In one implementation, a masked image is stored in the background image store 3628 corresponding to each image frame in the sequences of image frames per camera.

The semantic diffing subsystem 3622 (or the second image processors) includes a mask generator 3624 producing masks of foreground subjects represented in the images in the corresponding sequences of images from a camera. In one implementation, one mask generator processes sequences of images per camera. In the example of the shopping store, the foreground subjects are customers or employees of the store in front of the background shelves containing items for sale.

In one implementation, the joint data structures 310 per subject and image frames from the circular buffer 3602 are given as input to the mask generator 3624. The joint data structures identify locations of foreground subjects in each image frame. The mask generator 3624 generates a bounding box per foreground subject identified in the image frame. In such an implementation, the mask generator 3624 uses the values of the x and y coordinates of joint locations in the 2D image frame to determine the four boundaries of the bounding box. A minimum value of x (from all x values of joints for a subject) defines the left vertical boundary of the bounding box for the subject. A minimum value of y (from all y values of joints for a subject) defines the bottom horizontal boundary of the bounding box. Likewise, the maximum values of x and y coordinates identify the right vertical and top horizontal boundaries of the bounding box. In a second implementation, the mask generator 3624 produces bounding boxes for foreground subjects using a convolutional neural network-based person detection and localization algorithm. In such an implementation, the mask generator 3624 does not use the joint data structures 310 to generate bounding boxes for foreground subjects.

The semantic diffing subsystem (or the third image processors 3622) includes a mask logic to process images in the sequences of images to replace foreground image data representing the identified subjects with background image data from the background images for the corresponding sequences of images to provide the masked images, resulting in a new background image for processing. As the circular buffer receives image frames from the cameras 114, the mask logic processes images in the sequences of images to replace foreground image data defined by the image masks with background image data. The background image data is taken from the background images for the corresponding sequences of images to generate the corresponding masked images.

Consider the example of the shopping store. Initially at time t=0, when there are no customers in the store, a background image in the background image store 3628 is the same as its corresponding image frame in the sequences of images per camera. Now consider at time t=1, a customer moves in front of a shelf to buy an item in the shelf. The mask generator 3624 creates a bounding box of the customer and sends it to a mask logic component 3626. The mask logic component 3626 replaces the pixels in the image frame at t=1 inside the bounding box with corresponding pixels in the background image frame at t=0. This results in a masked image at t=1 corresponding to the image frame at t=1 in the circular buffer 3602. The masked image does not include pixels for the foreground subject (or customer) which are now replaced by pixels from the background image frame at t=0. The masked image at t=1 is stored in the background image store 3628 and acts as a background image for the next image frame at t=2 in the sequence of images from the corresponding camera.

In one implementation, the mask logic component 3626 combines, such as by averaging or summing by pixel, sets of N masked images in the sequences of images to generate sequences of factored images for each camera. In such an implementation, the second image processors identify and classify background changes by processing the sequence of factored images. A factored image can be generated, for example, by taking an average value for pixels in the N masked images in the sequence of masked images per camera. In one implementation, the value of N is equal to the frame rate of the cameras 114, for example if the frame rate is 30 FPS (frames per second), the value of N is 30. In such an implementation, the masked images for a time period of one second are combined to generate a factored image. Taking the average pixel values minimizes the pixel fluctuations due to sensor noise and luminosity changes in the area of real space.

The third image processors identify and classify background changes by processing the sequences of factored images. A factored image in the sequences of factored images is compared with the preceding factored image for the same camera by a bit mask calculator 3632. Pairs of factored images 3630 are given as input to the bit mask calculator 3632 to generate a bit mask identifying changes in corresponding pixels of the two factored images. The bit mask has Is at the pixel locations where the difference between the corresponding pixels' (current and previous factored image) RGB (red, green and blue channels) values is greater than a "difference threshold". The value of the difference threshold is adjustable. In one implementation, the value of the difference threshold is set at 0.1.

The bit mask and the pair of factored images (current and previous) from the sequences of factored images per camera are given as input to background image recognition engines. In one implementation, the background image recognition engines comprise convolutional neural networks and are referred to as ChangeCNN 3634*a*-3634*n*. A single ChangeCNN processes sequences of factored images per camera. In another implementation, the masked images from corresponding sequences of images are not combined. The bit mask is calculated from the pairs of masked images. In this implementation, the pairs of masked images and the bit mask are then given as input to the ChangeCNN.

The input to a ChangeCNN model in this example consists of seven (7) channels including three image channels (red, green and blue) per factored image and one channel for the bit mask. The ChangeCNN comprises multiple convolutional layers and one or more fully connected (FC) layers. In one implementation, the ChangeCNN comprises the same number of convolutional and FC layers as the joints CNN 112*a*-112*n* as illustrated in FIG. 25.

The background image recognition engines (ChangeCNN 3734*a*-3734*n*) identify and classify changes in the factored images and produce change data structures for the corresponding sequences of images. The change data structures include coordinates in the masked images of identified background changes, identifiers of an inventory item subject of the identified background changes and classifications of the identified background changes. The classifications of the identified background changes in the change data structures classify whether the identified inventory item has been added or removed relative to the background image.

As multiple items can be taken or put on the shelf simultaneously by one or more subjects, the ChangeCNN generates a number "B" overlapping bounding box predictions per output location. A bounding box prediction corresponds to a change in the factored image. Consider the shopping store has a number "C" unique inventory items, each identified by a unique SKU. The ChangeCNN predicts the SKU of the inventory item subject of the change. Finally, the ChangeCNN identifies the change (or inventory event type) for every location (pixel) in the output indicating whether the item identified is taken from the shelf or put on the shelf. The above three parts of the output from the ChangeCNN are described by an expression "5*B+C+1". Each bounding box "B" prediction comprises five (5) numbers, therefore "B" is multiplied by 5. These five numbers represent the "x" and "y" coordinates of the center of the bounding box, and the width and height of the bounding box. The fifth number represents the ChangeCNN model's confidence score for the prediction of the bounding box. "B" is a hyperparameter that can be adjusted to improve the performance of the ChangeCNN model. In one implementation, the value of "B" equals 4. Consider that the width and height (in pixels) of the output from the ChangeCNN are represented by W and H, respectively. The output of the ChangeCNN is then expressed as "W*H*(5*B+C+1)". The bounding box output model is based on an object detection system proposed by Redmon and Farhadi in their paper, "YOLO9000: Better, Faster, Stronger" published on Dec. 25, 2016. The paper is available at <arxiv.org/pdf/1612.08242.pdf>.

The outputs of the ChangeCNN 3634*a*-3634*n* corresponding to sequences of images from cameras with overlapping fields of view are combined by a coordination logic component 3636. The coordination logic component processes change data structures from sets of cameras having overlapping fields of view to locate the identified background changes in the real space. The coordination logic component 3636 selects bounding boxes representing the inventory items having the same SKU and the same inventory event type (take or put) from multiple cameras with overlapping fields of view. The selected bounding boxes are then triangulated in the 3D real space using triangulation techniques described above to identify the location of the inventory item in the 3D real space. Locations of shelves in the real space are compared with the triangulated locations of the inventory items in the 3D real space. False positive predictions are discarded. For example, if the triangulated location of a bounding box does not map to a location of a shelf in the real space, the output is discarded. Triangulated locations of bounding boxes in the 3D real space that map to a shelf are considered true predictions of inventory events.

In one implementation, the classifications of identified background changes in the change data structures produced by the second image processors classify whether the identified inventory item has been added or removed relative to the background image. In another implementation, the classifications of identified background changes in the change data structures indicate whether the identified inventory item has been added or removed relative to the background image and the system includes logic to associate background changes with identified subjects. The system makes detections of takes of inventory items by the identified subjects and of puts of inventory items on inventory display structures by the identified subjects.

A log generator component can implement the logic to associate changes identified by true predictions of changes with identified subjects near the locations of the changes. In an implementation utilizing the joints identification engine to identify subjects, the log generator can determine the positions of hand joints of subjects in the 3D real space using the joint data structures 310. A subject whose hand joint location is within a threshold distance to the location of a change at the time of the change is identified. The log generator associates the change with the identified subject.

In one implementation, as described above, N masked images are combined to generate factored images which are then given as input to the ChangeCNN. Consider that N equals the frame rate (frames per second) of the cameras 114. Thus, in such an implementation, the positions of the hands of subjects during a one second time period are compared with the locations of the changes to associate the changes with identified subjects. If more than one subject's hand joint locations are within the threshold distance to a location of a change, then association of the change with a subject is deferred to the output of the first image processors or second image processors.

In one implementation, the system can store masks and unmodified images, and conditioned on an elsewhere computed region & time of interest, process the masks to determine the latest time before and earliest time after the time of interest in which the region is not occluded by a person. The system can then take the images from those two times, crop to the region of interest, and classify the background changes between those two crops. The main difference is that in this implementation, the system is not doing image processing to generate these background images, and the change detection model is only run on specific regions of interest, conditioned on times when the system determines that a shopper may have interacted with a shelf. In such an implementation, the processing can stop when a shopper is positioned in front the shelf. The processing can start when the shopper moves away and the shelf or a portion of shelf is not occluded by the shopper.

The technology disclosed can combine the events in an events stream C from the semantic diffing model with events in the events stream A from the location-based event detection model. The location-based put and take events are matched to put and take events from the semantic diffing model by the event fusion logic component 3618. As described above, the semantic diffing events (or diff events) classify items put on or taken from shelves based on background image processing. In one implementation, the diff events can be combined with existing shelf maps from the maps of shelves including item information or planograms to determine the likely items associated with pixel changes represented by diff events. The diff events may not be associated with a subject at the time of detection of the event and may not result in the update of the log data structure of any source subject or sink subject. The technology disclosed includes logic to match the diff events that may have been associated with a subject or not associated with a subject with a location-based put and take event from events stream A and a region proposals-based put and take event from events stream B.

Semantic diffing events are localized to an area in the 2D image plane in image frames from the cameras 114 and have a start time and end time associated with each of them. The event fusion logic matches the semantic diffing events from events stream C to events in events stream A and events stream B in between the start and end times of the semantic diffing events. The location-based put and take events and region proposals-based put and take events have 3D positions associated with them based on the hand joint positions in the area of real space. The technology disclosed includes logic to project the 3D positions of the location-based put and take events and region proposal-based put and take events to 2D image planes and compute the overlap with the semantic diffing-based events in the 2D image planes. The following three scenarios can result based on how many predicted events from events streams A and B overlap with a semantic diffing event (also referred to as a diff event).

(1) If no events from events streams A and B overlap with a diff event in the time range of the diff event, then in this case, the technology disclosed can associate the diff event with the closest person to the shelf in the time range of the diff event.

(2) If one event from events stream A or events stream B overlaps with the diff event in the time range of the diff event, then in this case, the system combines the matched event to the diff event by taking a weighted combination of the item predictions from the events stream (A or B) which predicted the event and the item prediction from diff event.

(3) If two or more events from events streams A or B overlap with the diff event in the time range of the diff event, the system selects one of the matched events from events streams A or B. The event that has the closest item classification probability value to the item classification probability value in the diff event can be selected. The system can then take a weighted average of the item classification from the diff event and the item classification from the selected event from events stream A or events stream B.

Figure 36C:
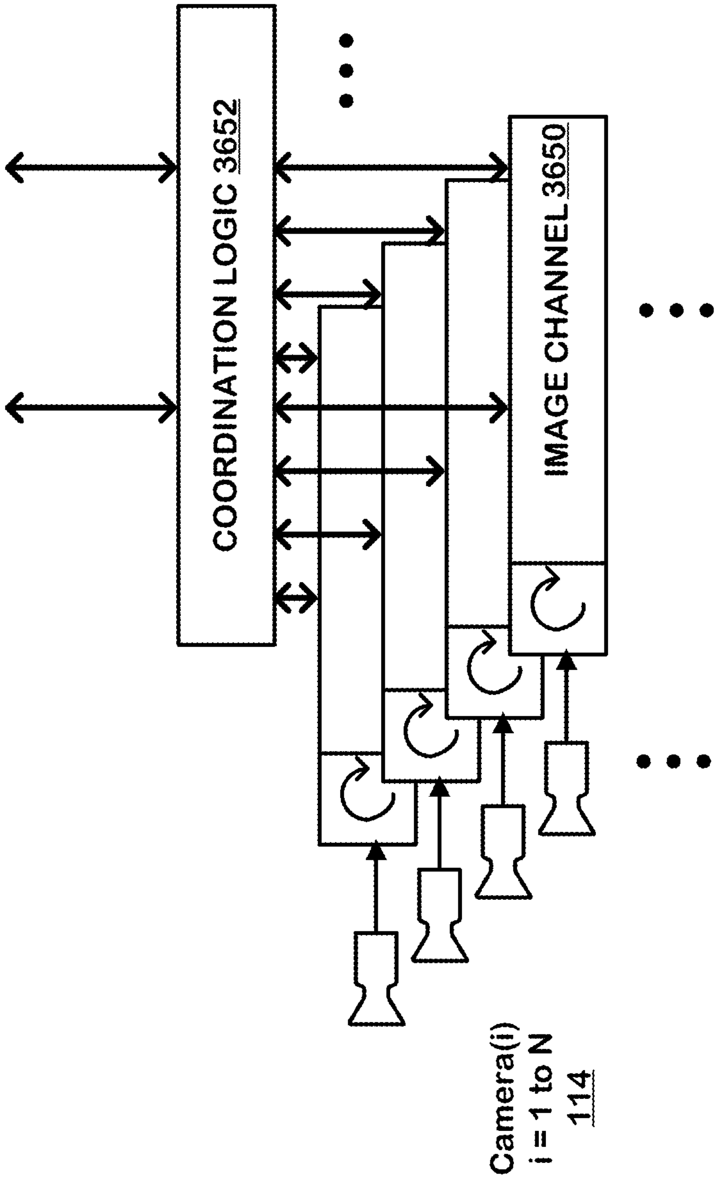
FIG. 36C shows multiple image channels from multiple cameras and coordination logic for the subjects and their respective shopping cart data structures.

FIG. 36C shows the coordination logic module 3652 combining the results of multiple WhatCNN models and giving this as input to a single WhenCNN model. As mentioned above, two or more cameras with overlapping fields of view capture images of subjects in the real space. Joints of a single subject can appear in image frames of multiple cameras in the respective image channel 3650. A separate WhatCNN model identifies SKUs of inventory items in the hands (represented by hand joints) of subjects. The coordination logic module 3652 combines the outputs of WhatCNN models into a single consolidated input for the WhenCNN model. The WhenCNN model operates on the consolidated input to generate the shopping cart of the subject.

An example inventory data structure 3720 (also referred to as a log data structure) is shown in FIG. 37. This inventory data structure stores the inventory of a subject, a shelf or a store as a key-value dictionary. The key is the unique identifier of a subject, a shelf or a store and the value is another key value-value dictionary where the key is the item identifier such as a stock keeping unit (SKU) and the value is a number identifying the quantity of the item along with the "frame_id" of the image frame that resulted in the inventory event prediction. The frame identifier ("frame_id") can be used to identify the image frame which resulted in the identification of an inventory event resulting in the association of the inventory item with the subject, the shelf, or the store. In other implementations, a "camera_id" identifying the source camera can also be stored in combination with the frame_id in the inventory data structure 3720. In one implementation, the "frame_id" is the subject identifier because the frame has the subject's hand in the bounding box. In other implementations, other types of identifiers can be used to identify subjects such as a "subject_id" which explicitly identifies a subject in the area of real space.

When a put event is detected, the item identified by the SKU in the inventory event (such as a location-based event, region proposals-based event, or semantic diffing event) is removed from the log data structure of the source subject. Similarly, when a take event is detected, the item identified by the SKU in the inventory event is added to the log data structure of the sink subject. In an item hand-off or exchange between subjects, the log data structures of both subjects in the hand-off are updated to reflect the item exchange from the source subject to the sink subject. Similar logic can be applied when subjects take items from shelves or put items on the shelves. Log data structures of shelves can also be updated to reflect the put and take of items.

The shelf inventory data structure can be consolidated with the subject's log data structure, resulting in the reduction of shelf inventory to reflect the quantity of items taken by the customer from the shelf. If the items were put on the shelf by a shopper or an employee stocking items on the shelf, the items get added to the respective inventory locations inventory data structures. Over a period of time, this processing results in updates to the shelf inventory data structures for all inventory locations in the shopping store. Inventory data structures of inventory locations in the area of real space are consolidated to update the inventory data structure of the area of real space indicating the total number of items of each SKU in the store at that moment in time. In one implementation, such updates are performed after each inventory event. In another implementation, the store inventory data structures are updated periodically.

In the following process flowcharts (FIGS. 38 to 42), we present process operations for subject identification using Joints CNN, hand recognition using WhatCNN, time series analysis using WhenCNN, detection of proximity events and proximity event types (put, take, touch), detection of an item in a proximity event, and fusion of multiple inventory events streams.

Joints CNN—Identification and Update of Subjects

Figure 38:
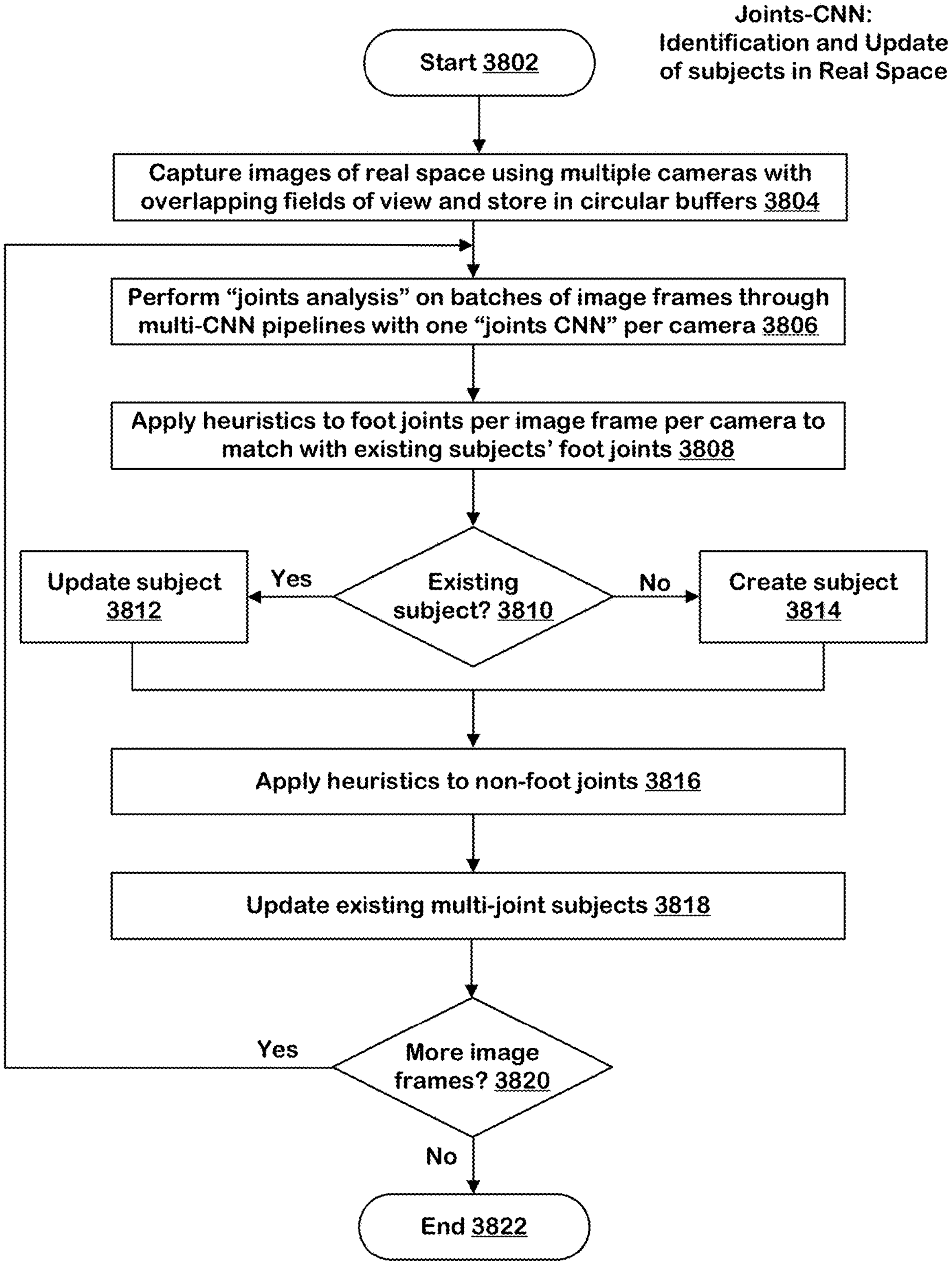
FIG. 38 is a flowchart illustrating process operations for identifying and updating subjects in the real space.

FIG. 38 is a flowchart of processing operations performed by the Joints CNN 112*a*-112*n* to identify subjects in the real space. In the example of a shopping store, the subjects are shoppers or customers moving in the store in aisles between shelves and other open spaces. The process starts at an operation 3802. Note that, as described above, the cameras are calibrated before the sequences of images from cameras are processed to identify subjects. Details of camera calibration are presented above. Cameras 114 with overlapping fields of view capture images of real space in which subjects are present (operation 3804). In one implementation, the cameras are configured to generate synchronized sequences of images. The sequences of images of each camera are stored in respective circular buffers 3602 per camera. A circular buffer (also referred to as a ring buffer) stores the sequences of images in a sliding window of time. In an implementation, a circular buffer stores 110 image frames from a corresponding camera. In another implementation, each circular buffer 3602 stores image frames for a time period of 3.5 seconds. It is understood that, in other implementations, the number of image frames (or the time period) can be greater than or less than the example values listed above.

Joints CNNs 112*a*-112*n* receive sequences of image frames from corresponding cameras 114 as output from a circular buffer, with or without resolution reduction (operation 3806). Each Joints CNN processes batches of images from a corresponding camera through multiple convolution network layers to identify joints of subjects in image frames from the corresponding camera. The architecture and processing of images by an example convolutional neural network is presented FIG. 25. As the cameras 114 have overlapping fields of view, the joints of a subject are identified by more than one joints CNN. The two-dimensional (2D) coordinates of joints data structures 310 produced by the Joints CNN are mapped to three-dimensional (3D) coordinates of the real space to identify joints locations in the real space. Details of this mapping are presented above in which the subject tracking engine 110 translates the coordinates of the elements in the arrays of joints data structures corresponding to images in different sequences of images into candidate joints having coordinates in the real space.

The joints of a subject are organized in two categories (foot joints and non-foot joints) for grouping the joints into constellations, as discussed above. The left and right-ankle joint types in the current example, are considered foot joints for the purpose of this procedure. At an operation 3808, heuristics are applied to assign a candidate left foot joint and a candidate right foot joint to a set of candidate joints to create a subject. Following this, at an operation 3810, it is determined whether the newly identified subject already exists in the real space. If not, then a new subject is created at an operation 3814, otherwise, the existing subject is updated at an operation 3812.

Other joints from the galaxy of candidate joints can be linked to the subject to build a constellation of some or all of the joint types for the created subject. At an operation 3816, heuristics are applied to non-foot joints to assign those to the identified subjects. A global metric calculator can calculate the global metric value and attempt to minimize the value by checking different combinations of non-foot joints. In one implementation, the global metric is a sum of heuristics organized in four categories as described above.

The logic to identify sets of candidate joints comprises heuristic functions based on physical relationships among the joints of subjects in the real space to identify sets of candidate joints as subjects. At an operation 3818, the existing subjects are updated using the corresponding non-foot joints. If there are more images for processing (operation 3820), operations 3806 to 3818 are repeated, otherwise the process ends at an operation 3822. The first data sets are produced at the end of the process described above. The first data sets identify subjects and the locations of the identified subjects in the real space. In one implementation, the first data sets are presented above in relation to FIGS. 36A and 36B as joints data structures 310 per subject.

WhatCNN—Classification of Hand Joints

Figure 39:
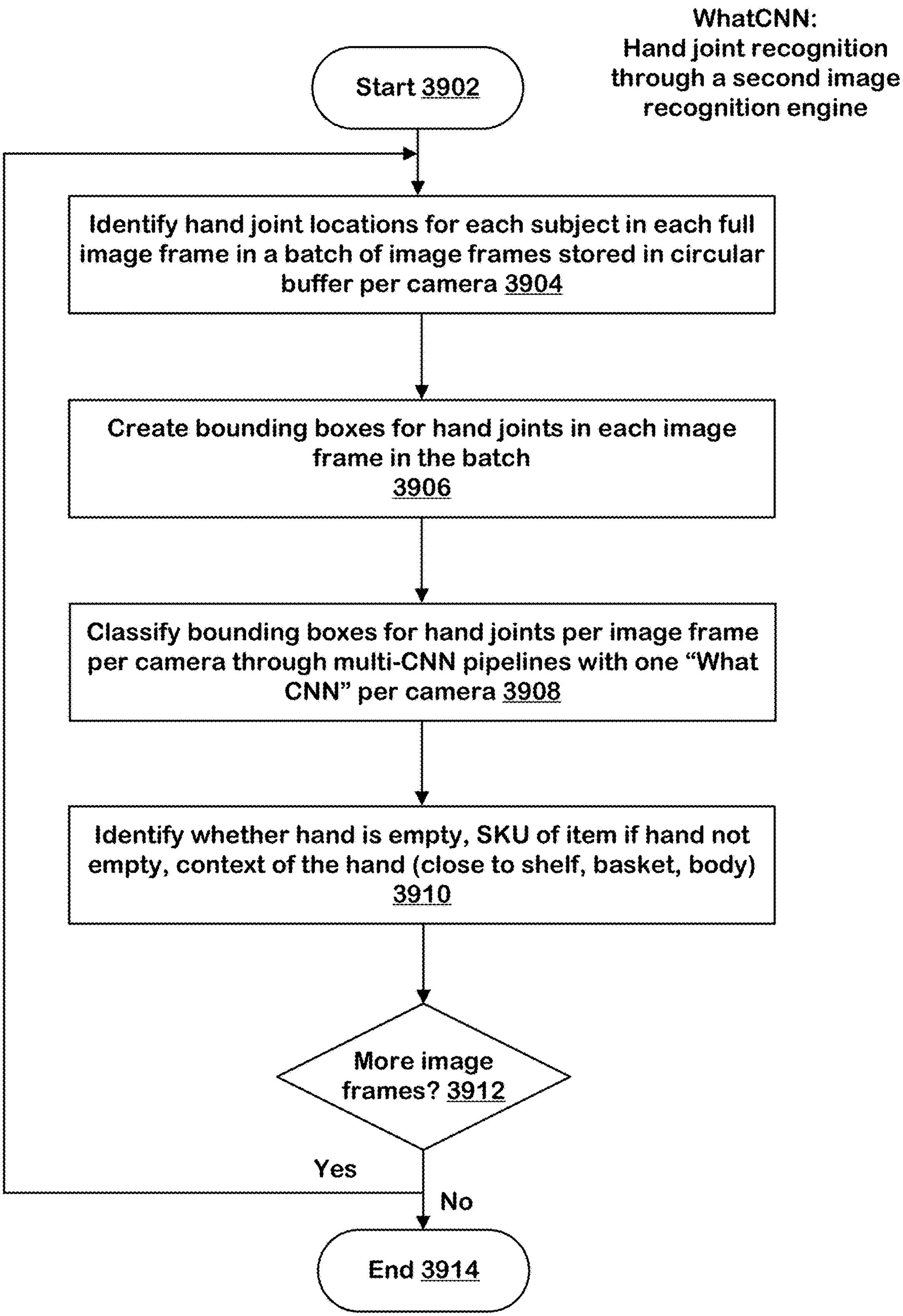
FIG. 39 is a flowchart showing process operations for processing hand joints (or moving inventory caches) of subjects to identify inventory items.

FIG. 39 is a flowchart illustrating process operations to identify inventory items in the hands of subjects (shoppers) identified in the real space. As the subjects move in aisles and opens spaces, they pick up inventory items stocked in the shelves and put items in their shopping carts or baskets. The image recognition engines identify subjects in the sets of images in the sequences of images received from the plurality of cameras. The system includes the logic to process sets of images in the sequences of images that include the identified subjects to detect takes of inventory items by identified subjects and puts of inventory items on the shelves by identified subjects.

In one implementation, the logic to process sets of images includes, for the identified subjects, generating classifications of the images of the identified subjects. The classifications can include predicting whether an identified subject is holding an inventory item. The classifications can include a first nearness classification indicating a location of a hand of the identified subject relative to a shelf. The classifications can include a second nearness classification indicating a location of a hand of the identified subject relative to the body of the identified subject. The classifications can further include a third nearness classification indicating a location of a hand of an identified subject relative to a basket associated with the identified subject. The classification can include a fourth nearness classification of the hand that identifies a location of a hand of a subject positioned close to the hand of another subject. Finally, the classifications can include an identifier of a likely inventory item.

In another implementation, the logic to process sets of images includes, for the identified subjects, identifying bounding boxes of data representing hands in images in the sets of images of the identified subjects. The data in the bounding boxes are processed to generate classifications of data within the bounding boxes for the identified subjects. In such an implementation, the classifications can include predicting whether the identified subject is holding an inventory item. The classifications can include a first nearness classification indicating a location of a hand of the identified subject relative to a shelf. The classifications can include a second nearness classification indicating a location of a hand of the identified subject relative to the body of the identified subject. The classifications can include a third nearness classification indicating a location of a hand of the identified subject relative to a basket associated with an identified subject. The classification can include a fourth nearness classification of the hand that identifies a location of a hand of a subject positioned close to the hand of another subject. Finally, the classifications can include an identifier of a likely inventory item.

The process starts at an operation 3902. At an operation 3904, locations of hands (represented by hand joints) of subjects in image frames are identified. The bounding box generator 3904 identifies hand locations of subjects per frame from each camera using joint locations identified in the first data sets generated by the Joints CNNs 112*a*-112*n*. Following this, at an operation 3906, the bounding box generator 3908 processes the first data sets to specify bounding boxes which include images of hands of identified multi-joint subjects in images in the sequences of images. Details of the bounding box generator are presented above with reference to FIG. 39A.

A second image recognition engine receives sequences of images from the plurality of cameras and processes the specified bounding boxes in the images to generate the classification of hands of the identified subjects (operation 3908). In one implementation, each of the image recognition engines used to classify the subjects based on images of hands comprises a trained convolutional neural network referred to as a WhatCNN 3610. WhatCNNs are arranged in multi-CNN pipelines as described above in relation to FIG. 36A. In one implementation, the input to a WhatCNN is a multi-dimensional array B×W×H×C (also referred to as a B×W×H×C tensor). "B" is the batch size indicating the number of image frames in a batch of images processed by the WhatCNN. "W" and "H" indicate the width and height of the bounding boxes in pixels, and "C" is the number of channels. In one implementation, there are 30 images in a batch (B=30), so the size of the bounding boxes is 32 pixels (width) by 32 pixels (height). There can be six channels representing red, green, blue, foreground mask, forearm mask and upperarm mask, respectively. The foreground mask, forearm mask and upperarm mask are additional and optional input data sources for the WhatCNN in this example, which the CNN can include in the processing to classify information in the RGB image data. The foreground mask can be generated using a mixture of Gaussian algorithms, for example. The forearm mask can be a line between the wrist and elbow providing context produced using information in the joints data structure. Likewise, the upperarm mask can be a line between the elbow and shoulder produced using information in the joints data structure. Different values of B. W. H and C parameters can be used in other implementations. For example, in another implementation, the size of the bounding boxes is larger e.g., 64 pixels (width) by 64 pixels (height) or 128 pixels (width) by 128 pixels (height).

Each WhatCNN 3610 processes batches of images to generate classifications of hands of the identified subjects. The classifications can include whether the identified subject is holding an inventory item. The classifications can further include one or more classifications indicating locations of the hands relative to the shelves and relative to the subjects, relative to a shelf or a basket, and relative to a hand or another subject, usable to detect puts and takes. In this example, a first nearness classification indicates a location of a hand of the identified subject relative to a shelf. The classifications can include a second nearness classification indicating a location a hand of the identified subject relative to the body of the identified subject. A subject may hold an inventory item during shopping close to his or her body instead of placing the item in a shopping cart or a basket. The classifications can further include a third nearness classification indicating a location of a hand of the identified subject relative to a basket associated with an identified subject. A "basket" in this context can be a bag, a basket, a cart or other object used by the subject to hold the inventory items during shopping. The classifications can include a fourth nearness classification of the hand that identifies a location of a hand of a subject positioned close to the hand of another subject. Finally, the classifications can include an identifier of a likely inventory item. The final layer of the WhatCNN 3610 produces logits which are raw values of predictions. The logits are represented as floating point values and further processed, as described below, to generate a classification result. In one implementation, the outputs of the WhatCNN model include a multi-dimensional array B×L (also referred to as a B×L tensor). "B" is the batch size, and "L=N+5" is the number of logits output per image frame. "N" is the number of SKUs representing "N" unique inventory items for sale in the shopping store.

The output "L" per image frame is a raw activation from the WhatCNN 3610. The logits "L" are processed at an operation 3910 to identify an inventory item and context. The first "N" logits represent the confidence that the subject is holding one of the "N" inventory items. The logits "L" include an additional five (5) logits which are explained below. The first logit represents the confidence that the image of the item in the hand of the subject is not one of the store SKU items (also referred to as a non-SKU item). The second logit indicates a confidence of whether the subject is holding an item or not. A large positive value indicates that the WhatCNN model has a high level of confidence that the subject is holding an item. A large negative value indicates that the model is confident that the subject is not holding any item. A close to zero value of the second logit indicates that the WhatCNN model is not confident in predicting whether the subject is holding an item or not. The value of the holding logit is provided as input to the proximity event detector for location-based put and take detection.

The next three logits represent first, second and third nearness classifications, including a first nearness classification indicating a location of a hand of the identified subject relative to a shelf, a second nearness classification indicating a location of a hand of the identified subject relative to the body of the identified subject, and a third nearness classification indicating a location of a hand of the identified subject relative to a basket associated with an identified subject. Thus, the three logits represent the context of the hand location with one logit each indicating the confidence that the context of the hand is near to a shelf, near to a basket (or a shopping cart), or near to the body of the subject. In one implementation, the output can include a fourth logit representing the context of the hand of a subject positioned close to a hand of another subject. In one implementation, the WhatCNN is trained using a training dataset containing hand images in the three contexts: near to a shelf, near to a basket (or a shopping cart), and near to the body of a subject. In another implementation, the WhatCNN is trained using a training dataset containing hand images in the four contexts: near to a shelf, near to a basket (or a shopping cart), near to the body of a subject, and near to a hand of another subject. In another implementation, a "nearness" parameter is used by the system to classify the context of the hand. In such an implementation, the system determines the distance of a hand of the identified subject to the shelf, basket (or a shopping cart), and body of the subject to classify the context.

The output of a WhatCNN is "L" logits comprised of N SKU logits, 1 Non-SKU logit, 1 holding logit, and 3 context logits as described above. The SKU logits (first N logits) and the non-SKU logit (the first logit following the N logits) are processed by a softmax function. As described above with reference to FIG. 4A, the softmax function transforms a K-dimensional vector of arbitrary real values to a K-dimensional vector of real values in the range [0, 1] that add up to 1. A softmax function calculates the probabilities distribution of the item over N+1 items. The output values are between 0 and 1, and the sum of all the probabilities equals one. The softmax function (for multi-class classification) returns the probabilities of each class. The class that has the highest probability is the predicted class (also referred to as the target class). The value of the predicted item class is averaged over N frames before and after the proximity event to determine the item associated with the proximity event.

The holding logit is processed by a sigmoid function. The sigmoid function takes a real number value as input and produces an output value in the range of 0 to 1. The output of the sigmoid function identifies whether the hand is empty or holding an item. The three context logits are processed by a softmax function to identify the context of the hand joint location. At an operation 3912, it is checked whether there are more images to process. If true, operations 3904-3910 are repeated, otherwise the process ends at an operation 3914.

WhenCNN—Time Series Analysis to Identify Puts and Takes of Items

In one implementation, the technology disclosed performs a time sequence analysis over the classifications of subjects to detect takes and puts by the identified subjects based on foreground image processing of the subjects. The time sequence analysis identifies gestures of the subjects and inventory items associated with the gestures represented in the sequences of images.

The outputs of WhatCNNs 3610 are given as inputs to the WhenCNN 3612 which processes these inputs to detect puts and takes of items by the identified subjects. The system includes logic, responsive to the detected takes and puts, to generate a log data structure including a list of inventory items for each identified subject. In the example of a shopping store, the log data structure is also referred to as a shopping cart data structure 3620 per subject.

Figure 40:
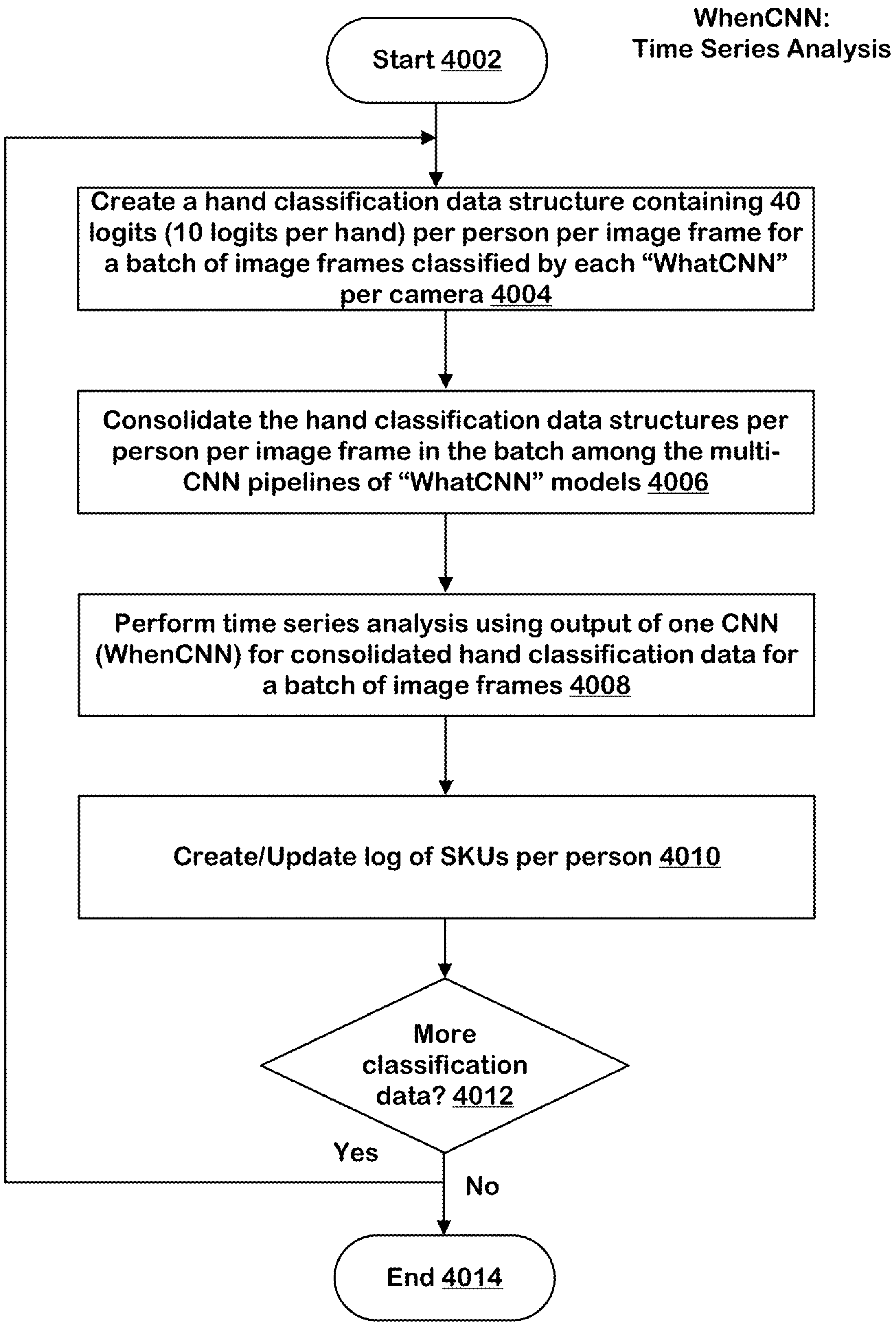
FIG. 40 is a flowchart showing process operations for a time series analysis of the inventory items per hand joint (or moving inventory cache) to create a shopping cart data structure per subject.

FIG. 40 presents a process implementing the logic to generate a shopping cart data structure per subject. The process starts at an operation 4002. The input to the WhenCNN 3612 is prepared at an operation 4004. The input to the WhenCNN is a multi-dimensional array B×C×T×Cams, where B is the batch size, C is the number of channels, T is the number of frames considered for a window of time, and Cams is the number of cameras 114. In one implementation, the batch size "B" is 64 and the value of "T" is 110 image frames or the number of image frames in 3.5 seconds of time. It is understood that other values of batch size "B" greater than or less than 64 can be used. Similarly, the value of the parameter "T" can be set greater than or less than 110 images frames or a time period greater than or less than 3.5 seconds can be used to select the number of frames for processing.

For each subject identified per image frame, per camera, a list of 10 logits per hand joint (20 logits for both hands) is produced. The holding and context logits are part of the "L" logits generated by the WhatCNN 3610 as described above.

```
[
holding,                                              # 1 logit
context,                                              # 3 logits
slice_dot(sku, log_sku),                              # 1 logit
slice_dot(sku, log_other_sku),                        # 1 logit
slice_dot(sku, roll(log_sku, -30)),                   # 1 logit
slice_dot(sku, roll(log_sku, 30)),                    # 1 logit
slice_dot(sku, roll(log_other_sku, -30)),             # 1 logit
slice_dot(sku, roll(log_other_sku, 30))               # 1 logit
]
```

The above data structure is generated for each hand in an image frame and also includes data about the other hand of the same subject. For example, if data are for the left hand joint of a subject, corresponding values for the right hand are included as "other" logits. The fifth logit (item number 3 in the list above referred to as log_sku) is the log of the SKU logit in the "L" logits described above. The sixth logit is the log of the SKU logit for the other hand. A "roll" function generates the same information before and after the current frame. For example, the seventh logit (referred to as roll (log_sku, −30)) is the log of the SKU logit, 30 frames earlier than the current frame. The eighth logit is the log of the SKU logit for the hand, 30 frames later than the current frame. The ninth and tenth data values in the list are similar data for the other hand 30 frames earlier and 30 frames later than the current frame. A similar data structure for the other hand is also generated, resulting in a total of 20 logits per subject per image frame per camera. Therefore, the number of channels in the input to the WhenCNN is 20 (i.e. C=20 in the multi-dimensional array B×C×T×Cams), whereas "Cams" represents the number of cameras in the area of real space.

For all image frames in the batch of image frames (e.g., B=64) from each camera, similar data structures of 20 hand logits per subject, identified in the image frame, are generated. A window of time (T=3.5 seconds or 110 image frames) is used to search forward and backward image frames in the sequence of image frames for the hand joints of subjects. At an operation 4006, the 20 hand logits per subject per frame are consolidated from multiple WhatCNNs. In one implementation, the batch of image frames (64) can be imagined as a smaller window of image frames placed in the middle of a larger window of the image frame 110 with additional image frames for forward and backward search on both sides. The input B×C×T×Cams to the WhenCNN 3612 is composed of 20 logits for both hands of subjects identified in batch "B" of image frames from all cameras 114 (referred to as "Cams"). The consolidated input is given to a single trained convolutional neural network referred to as the WhenCNN model 3612.

The output of the WhenCNN model comprises 3 logits, representing confidence in three possible actions of an identified subject: taking an inventory item from a shelf, putting an inventory item back on the shelf, and no action. The three output logits are processed by a softmax function to predict the action performed. The three classification logits are generated at regular intervals for each subject and the results are stored per person along with a time stamp. In one implementation, the three logits are generated every twenty frames per subject. In such an implementation, at an interval of every 20 image frames per camera, a window of 110 image frames is formed around the current image frame.

A time series analysis of these three logits per subject over a period of time is performed (operation 4008) to identify gestures corresponding to true events and their time of occurrence. A non-maximum suppression (NMS) algorithm is used for this purpose. As one event (i.e, the put or take of an item by a subject) is detected by the WhenCNN 3712 multiple times (both from the same camera and from multiple cameras), the NMS removes superfluous events for a subject. The NMS is a rescoring technique comprising two main tasks: "matching loss" that penalizes superfluous detections and "joint processing" of neighbors to know if there is a better detection close by.

The true events of takes and puts for each subject are further processed by calculating an average of the SKU logits for 30 image frames prior to the image frame with the true event. Finally, the arguments of the maxima (abbreviated arg max or argmax) are used to determine the largest value. The inventory item classified by the argmax value is used to identify the inventory item put on or taken from the shelf. The inventory item is added to a log of SKUs (also referred to as shopping cart or basket) of respective subjects in an operation 4010. The process operations 4004 to 4010 are repeated, if there are more classification data (checked at an operation 4012). Over a period of time, this processing results in updates to the shopping cart or basket of each subject. The process ends at an operation 4014.

We now present process flowcharts for location-based event detection, item detection in location-based events and fusion of a location-based events stream with a region proposals-based events stream and a semantic diffing-based events stream.

Process Flowchart for Proximity Event Detection

Figure 41:
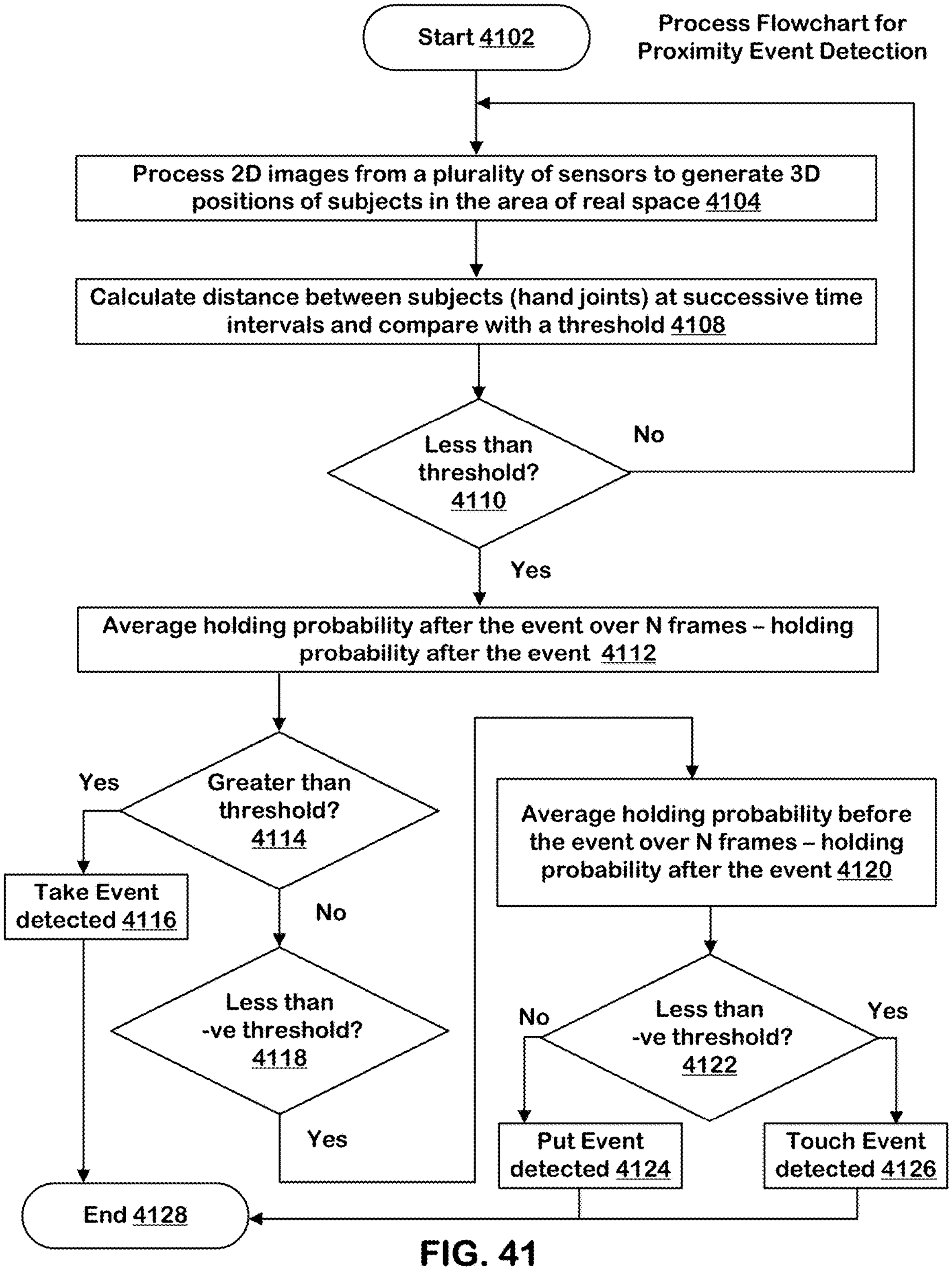
FIG. 41 is a flowchart presenting process operations for detecting proximity events.

FIG. 41 presents a flowchart of process operations for detecting location-based events in the area of real space. The process starts at an operation 4102. The system processes 2D images from a plurality of sensors to generate 3D positions of subjects in the area of real space (operation 4104). As described above, the system uses image frames from synchronized sensors with overlapping fields of views for 3D scene generation. In one implementation, the system uses joints to create and track subjects in the area of real space. The system calculates distances between hand joints (both left and right hands) (operation 4108) of subjects at regular time intervals and compares the distances with a threshold. If the distance between hand joints of two subjects is below a threshold (operation 4110), the system continues the process operations for detecting the type of the proximity event (put, take or touch). Otherwise, the system repeats operations 4104 to 4110 for detecting proximity events.

At an operation 4112, the system calculates the average holding probability over N frames after the frame in which the proximity event was detected for the subjects whose hands were positioned closer than the threshold. Note that the WhatCNN model described above outputs a holding probability per hand per subject per frame which is used in this process operation. The system calculates the difference between the average holding probability over N frames after the proximity event and the holding probability in a frame following the frame in which proximity event is detected. If the result of the difference is greater than a threshold (operation 4114), the system detects a take event (operation 4116) for the subject in the image frame. Note that when one subject hands-off an item to another subject, the location-based event can have a take event (for the subject who takes the item) and a put event (for the subject who hands-off the item). The system processes the logic described in this flowchart for each hand joint in the proximity event, thus the system is able to detect both take and put events for the subjects in the location-based events. If at the operation 4114, it is determined that the difference between the average holding probability value over N frames after the event and the holding probability value in the frame following the proximity event is not greater than the threshold (operation 4114), the system compares the difference to a negative threshold (operation 4118). If the difference is less than the negative threshold then the proximity event can be a put event, however, it can also indicate a touch event. Therefore, the system calculates the difference between the average holding probability value over N frames before the proximity event and the holding probability value after the proximity event (operation 4120). If the difference is less than a negative threshold (operation 4122), the system detects a touch event (operation 4126). Otherwise, the system detects a put event (operation 4124). The process ends at an operation 4128.

Process Flowchart for Item Detection

Figure 42:
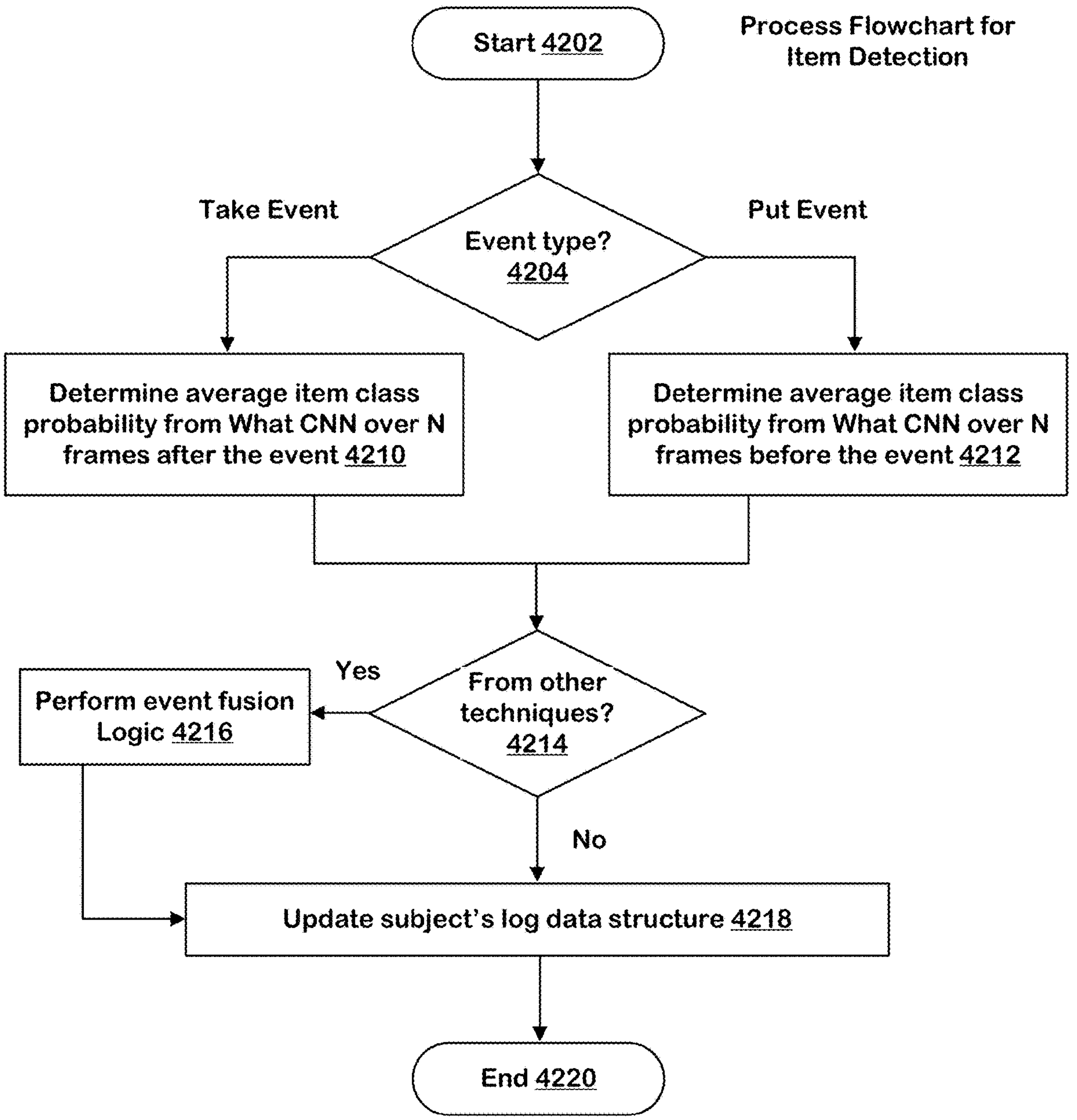
FIG. 42 is a flowchart presenting process operations for detecting an item associated with the proximity event detected in FIG. 41.

FIG. 42 presents a process flowchart for item detection in a proximity event. The process starts at an operation 4202. The event type is detected at an operation 4204. Detailed process operations for event type detection are presented above in the process flowchart in FIG. 41. If a take event is detected (operation 4204), the process continues at an operation 4210. The system determines the average item class probability by taking an average of the item class probability values from the WhatCNN over N frames after the frame in which the proximity event is detected. If a put event is detected the process continues at an operation 4212 in the process flowchart. The system determines the average item class probability by taking an average of the item class probability values from the WhatCNN over N frames before the frame in which the proximity event is detected.

At an operation 4214, the system checks if event streams from other event detection techniques have a matching event. We have presented details of two parallel event detection techniques above: a region proposals-based event detection technique (also referred to as second image processors) and a semantic diffing-based event detection technique (also referred to as third image processors). If a matching event is detected from other event detection techniques, the system combines the two events using event fusion logic in an operation 4216. As described above, the event fusion logic can include weighted combination of events from multiple event streams. If no matching event is detected from other events streams, then the system can use the item classification from the location-based event. The process continues at an operation 4218 in which the subject's log data structure is updated using the item classification and the event type. The process ends at an operation 4220.

Automatic Generation of Camera Masks

Figure 43A:
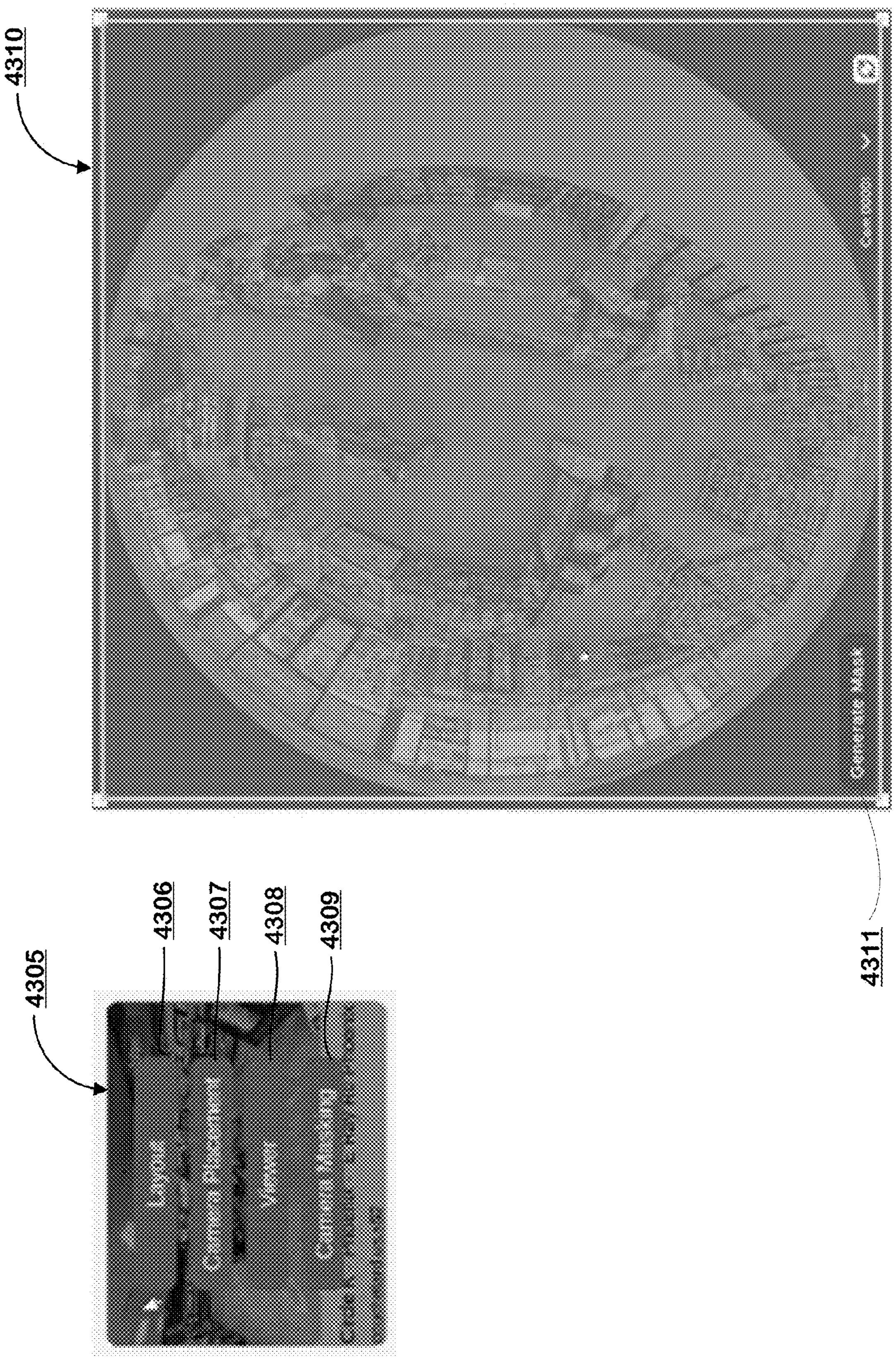
FIGS. 43A, 43B and 43C present examples of various types of masks that can be applied to and image captured by a camera.
Figure 43B:
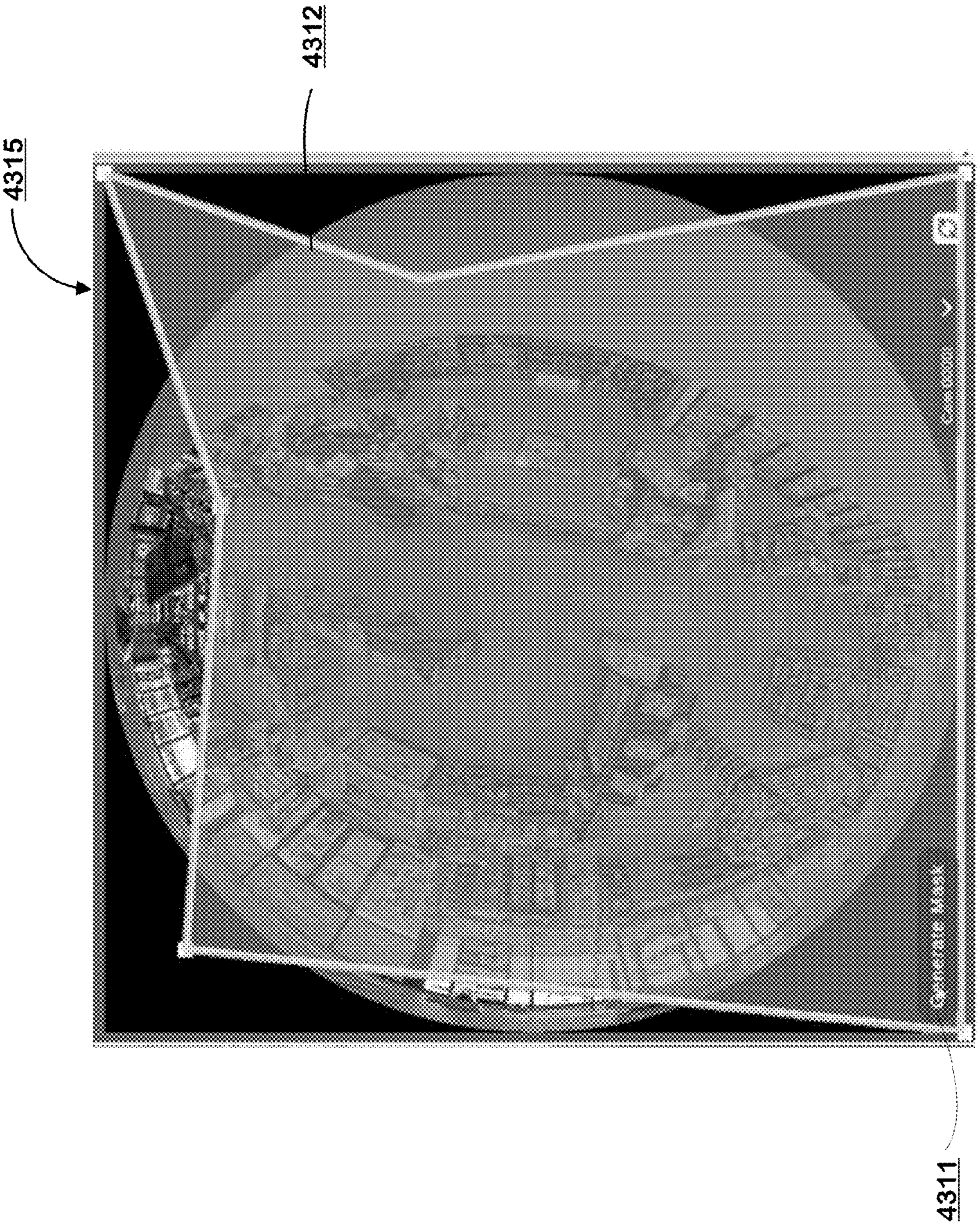
Figure 43C:

FIGS. 43A, 43B and 43C present an example user interface of a camera mask generation tool. FIG. 43A presents a user interface menu 4305 including various options for viewing and managing layout of an area of real space. An option/feature 4306 can be selected to view or generate layout of the area of real space. An option/feature 4307 can be selected to view placement of cameras in the area of real space. An option/feature 4308 can be selected for various camera views of the area of the real space. An option/feature 4309 can be selected to generate masks for portions of an image captured by a camera placed in the area of real space. A view 4310 of the area of real space can be displayed when "camera masking" option/feature 4309 is selected. The view 4310 shows a fisheye view of the area of real space from a camera positioned on the ceiling of the area of real space. Currently there is no mask on the image captured by the camera. A button 4311 can be used to generate and/or edit a mask to remove selected pixels from the image captured by the camera.

FIG. 43B shows a user interface 4315 in which a mask is generated that removes pixels from the image (e.g., pixels are removed from the left, top and right portions of the image). As previously discussed, removing pixels can mean that the pixels are "masked out" so that images from the masked out area are not observable (but the image data is still captured for later viewing if desired) and removing pixels can mean that no image data is captured from the pixels that are "masked out," such that it is impossible to obtain or view image data from the masked out pixels. As illustrated, the portion of the image outside the boundary 4312 is masked out. The image inside the boundary 4312 is provided to image processing engines in the image processing pipeline.

FIG. 43C presents another user interface 4320 in which a mask is generated that removes portions of the image on the outer periphery of the image captured by the camera. The portion of the image outside the periphery 4313 is masked out and not processed by processing engine in the image processing pipeline. These portions are not required for subject tracking and action detection. Masking out the outer periphery can reduce the bandwidth, storage and processing requirements.

Figure 44A:
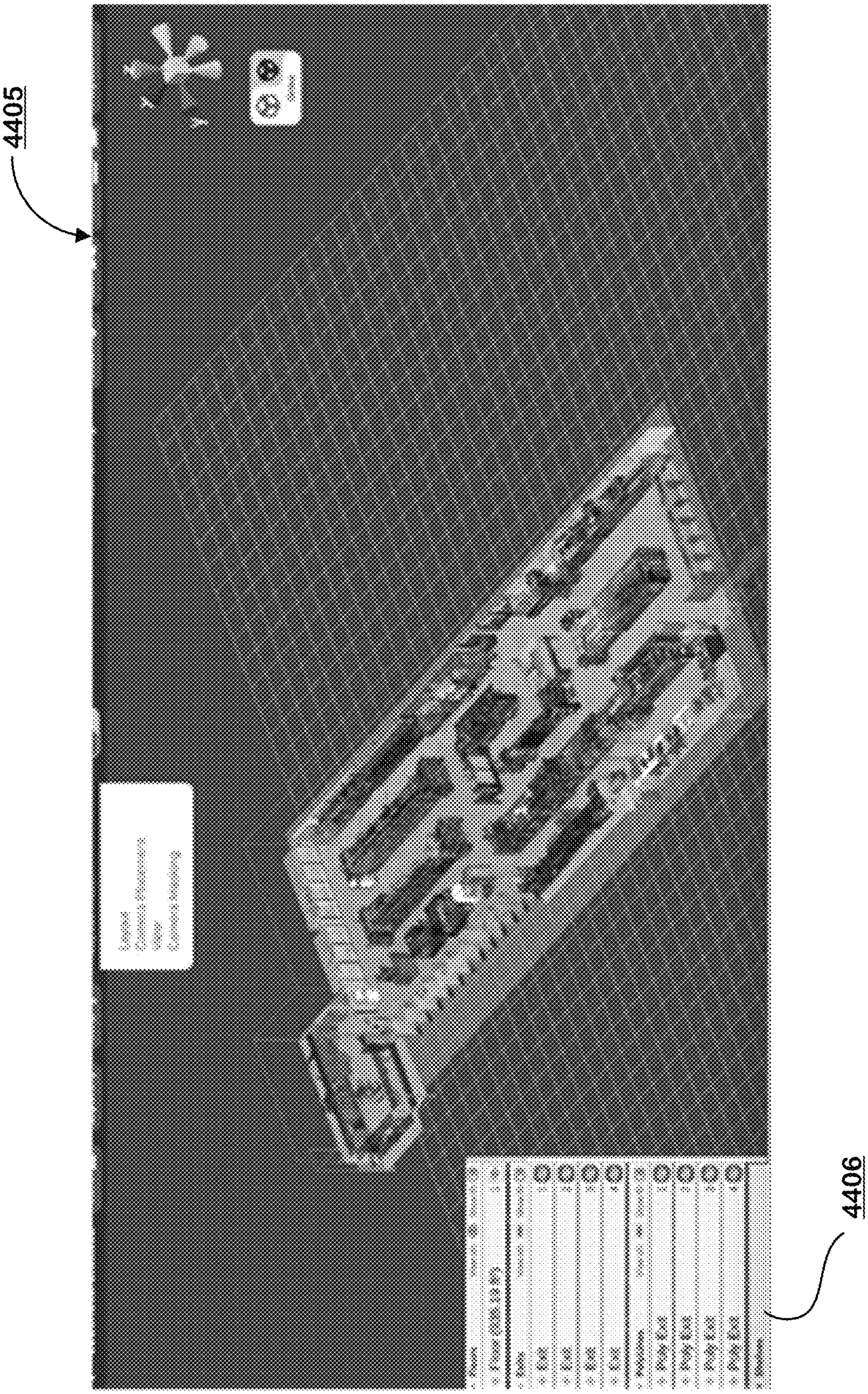
FIGS. 44A, 44B, 44C and 44D present views of shelves in an area of real space as captured by cameras installed in the area of real space.

FIGS. 44A to 44D present another feature of the masking tool in which a user can view various shelves in the area of real space as captured by selected cameras that provide best view of the shelf. FIG. 44A presents a user interface of the camera masking tool which presents a view 4405 of the area of real space with shelves and pedestrian paths in between shelves. A user can select portions of the area of real space for detailed review by using selection options presented a menu 4406. Note that the illustrations in FIGS. 44B to 47 present views from the layout editor mode of the camera masking tool. In one implementation, a layout editor tool, providing a layout editor mode, can be implemented separately from the camera masking tool. The layout editor mode allows the users to view layout of shelves and other inventory display structures in the area of real space and perform fine tuning of the camera masking input data by correcting the 3D projections of the layout data.

Figure 44B:
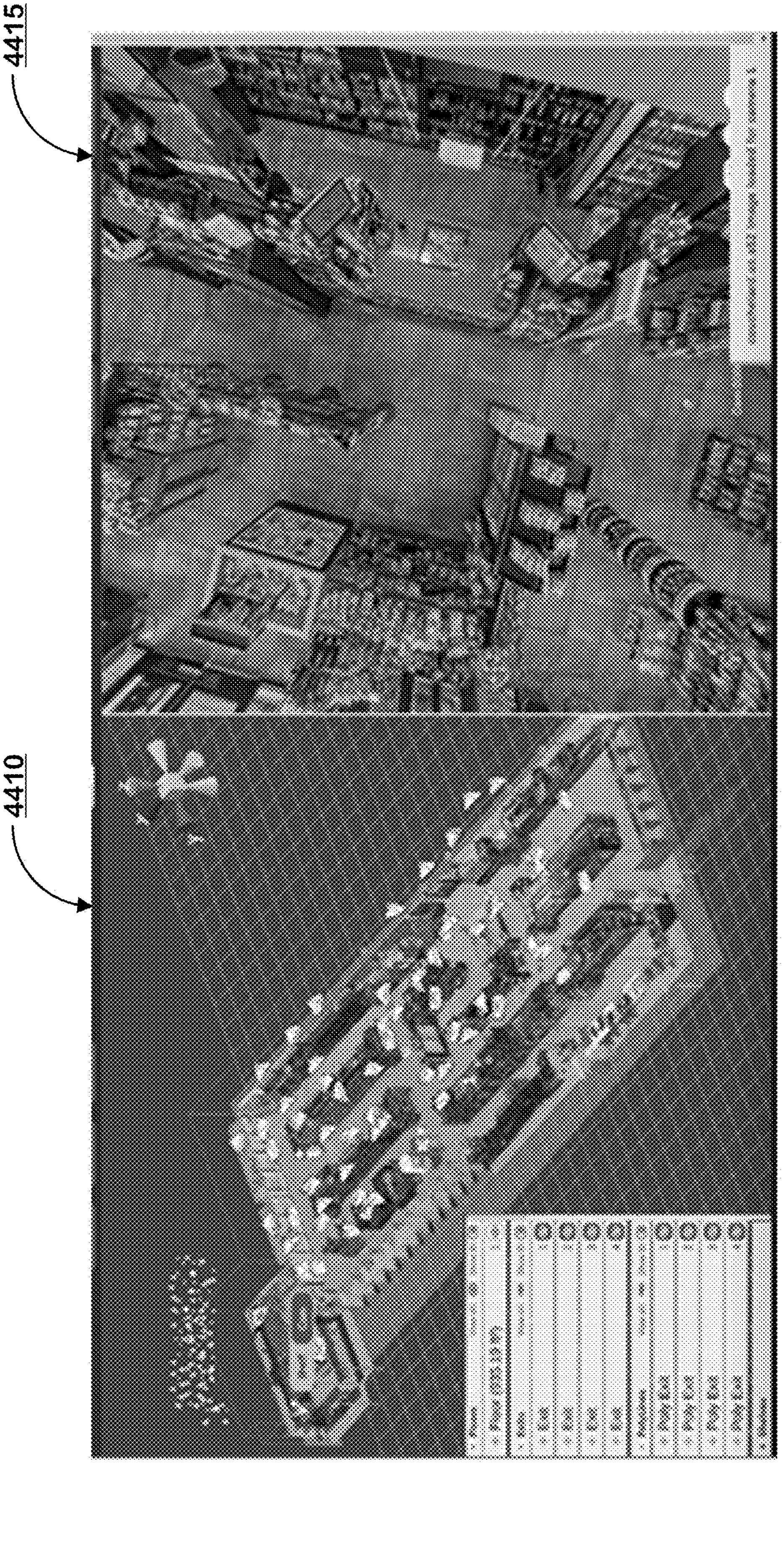

FIG. 44B presents another view of the masking tool in which two windows 4410 and 4415 present two different views of the area of real space. The window 4410 presents a view of the area of real space in which shelves and open spaces are visible. Additionally, white triangles placed on the area of real space indicate positions and orientations of the cameras (or the sensors) installed in the area of real space. The window 4415 presents a view of a portion of the area of real space in image captured by a particular camera (i.e., "camera 1"). The shelves and open spaces in between shelves are visible in the image.

Figure 44C:
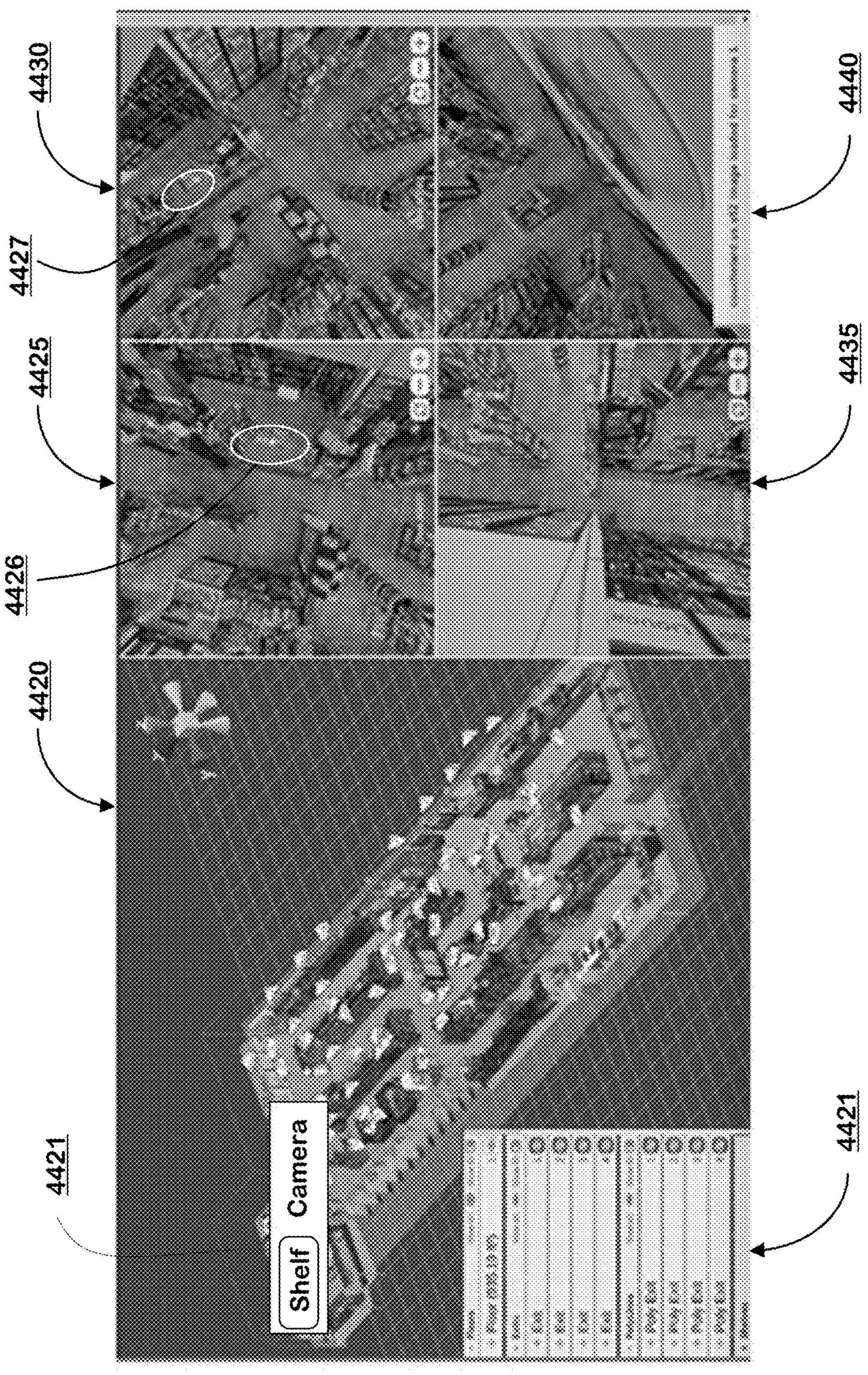

FIG. 44C presents another view of the camera masking tool in which a window 4420 presents a view of the area of real space similar to the window 4410 in FIG. 44B. The right portion of the user interface is divided into four smaller windows 4425, 4430, 4435 and 4440. These four windows show images captured by four different cameras in the area of real space. The camera masking tool provides a user interface element 4421 to select a "shelf" view or a "camera" view of the area of real space. A first option is to view a particular "shelf" and a second option is to view image (or video) as captured by a particular "camera" in the area of real space. In the example shown in FIG. 44C, the "shelf" view is selected. Therefore, the technology disclosed presents images (or videos) as captured by four cameras in the windows 4425, 4430, 4435 and 4440 that present a desired view of a shelf selected by the user. A particular shelf for viewing can be selected from a user interface element 4421. The images captured by cameras can be used to identify any issues in the placement of inventory display structures in the area of real space. For example, the top two images labeled 4425 and 4430, respectively show that a shelf has been removed from a location in the area of real space. The location from where the shelf is removed is labeled as 4426 in image 4425 as captured by a first cameras and labeled as 4427 in the image 4430 as captured by a second camera. The layout of shelves in the area of real space can be corrected to remove the shelves in the layout plan.

Figure 44D:
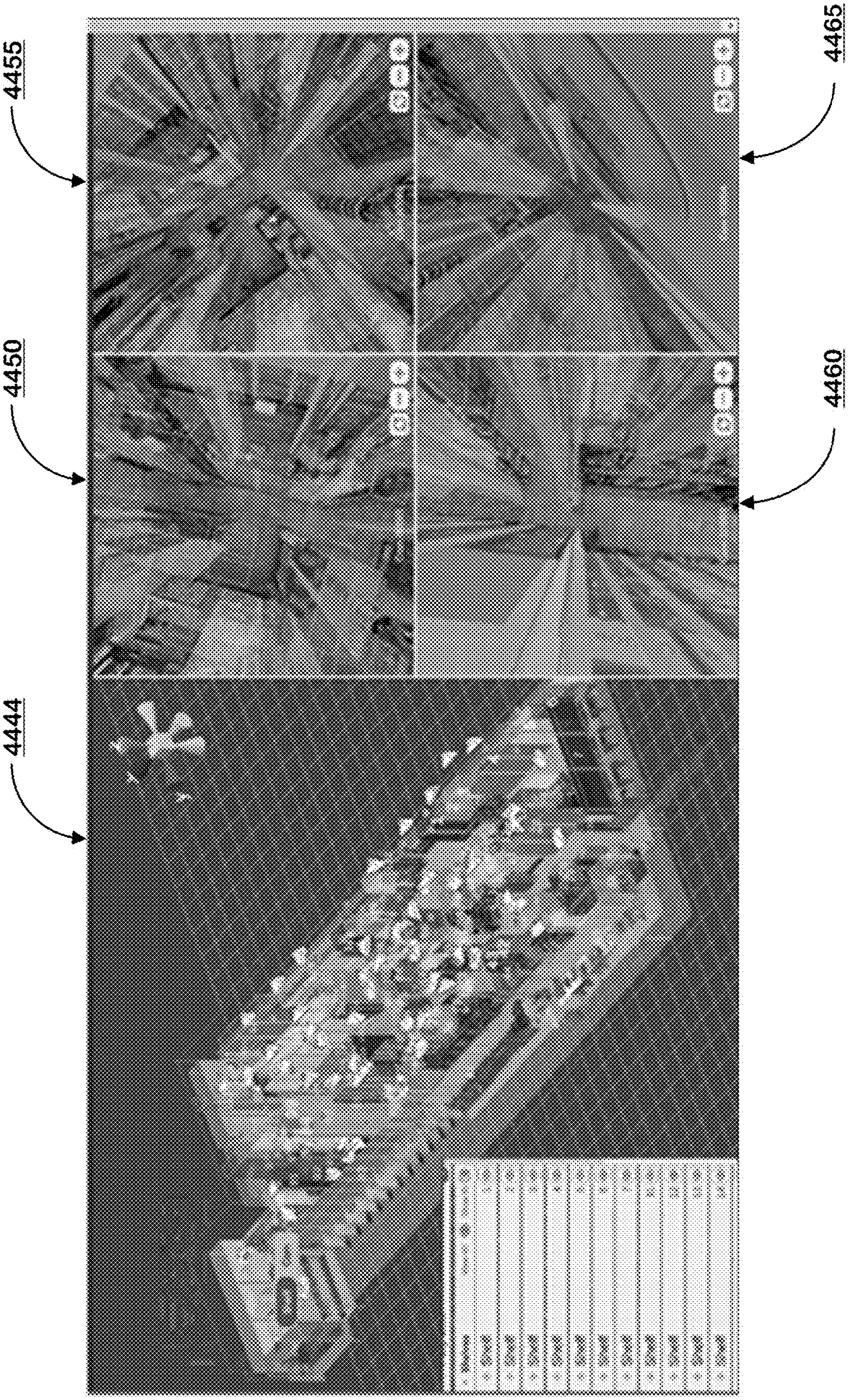

FIG. 44D presents a view of the images in FIG. 44C with overlays. The cameras are labeled in a view 4444 of the area of real space. The camera views from the four cameras are also presented with overlays indicating placement of shelves and open spaces in the area of real space. The windows 4450, 4455, 4460 and 4465, respectively show overlayed images from the four cameras that present best views of the selected shelf for viewing by a user.

Figure 45A:
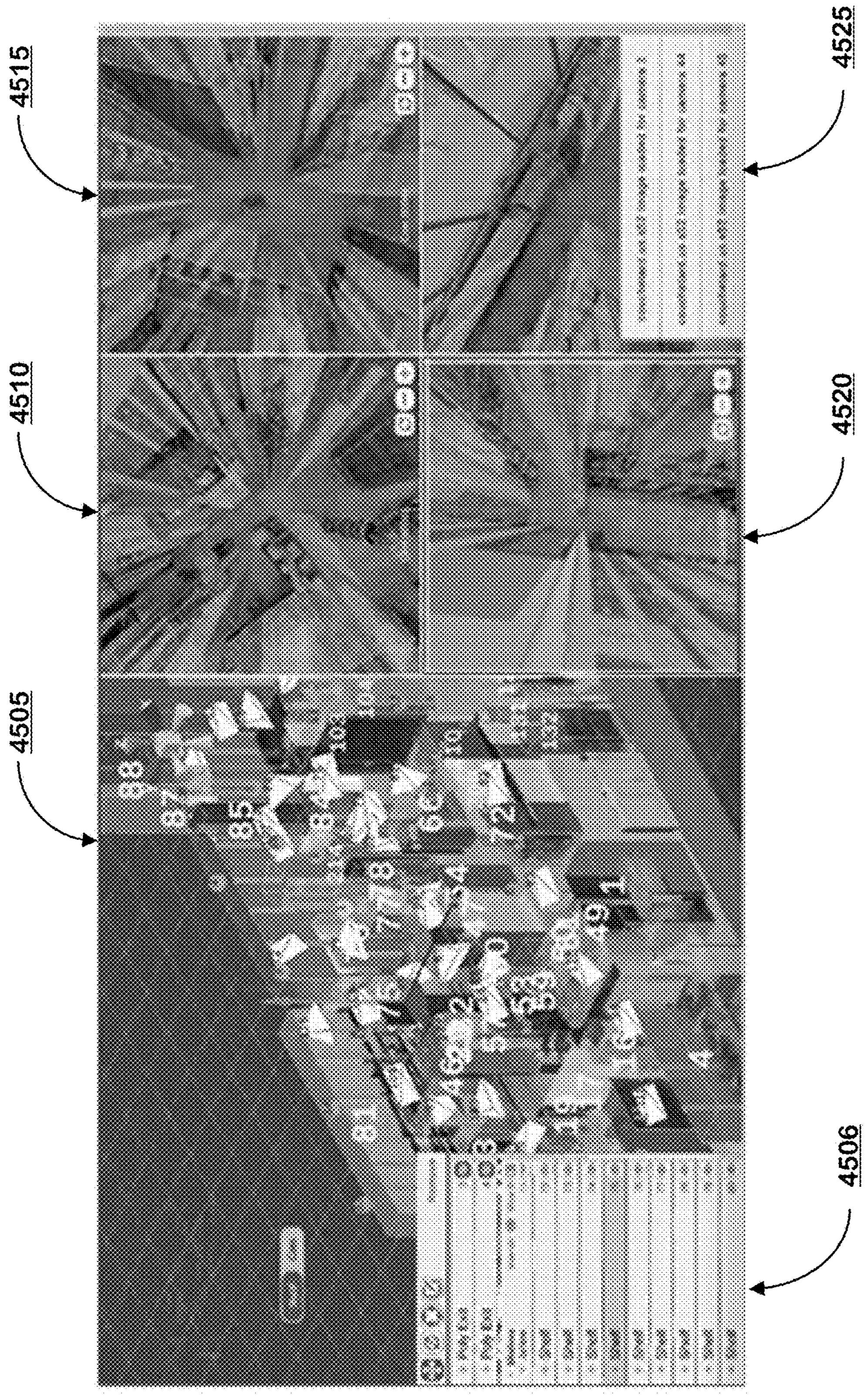
FIGS. 45A, 45B, 45C and 45D present views of shelves in an area of real space as captured by selected cameras in the area of real space.

FIGS. 45A to 45D present views of a particular region of the area of real space in which a selected shelf is placed. FIG. 45A presents a zoomed-in view of the area of real space in a window 4505. A menu 4506 presents a list of shelves in the area of real space. A user can select a shelf to view further details of the selected shelf from four cameras that capture a best view of the selected shelf. The four windows 4510, 4515, 4520 and 4525 present images captured by four cameras that present a desired view of the selected shelf in the area of real space.

Figure 45B:

FIG. 45B presents a zoomed-in view of the selected shelf in a window 4535. A user can select a particular camera's view from the four windows 4510, 4515, 4520 and 4525 (in FIG. 45A) to view the image (or video) captured by the selected camera in a larger window. For example, a user selected the window 4520 (in FIG. 45A) and the masking tool presented a larger view of the image (or video) as captured by the camera in the window 4535 in FIG. 45B.

Figure 45C:
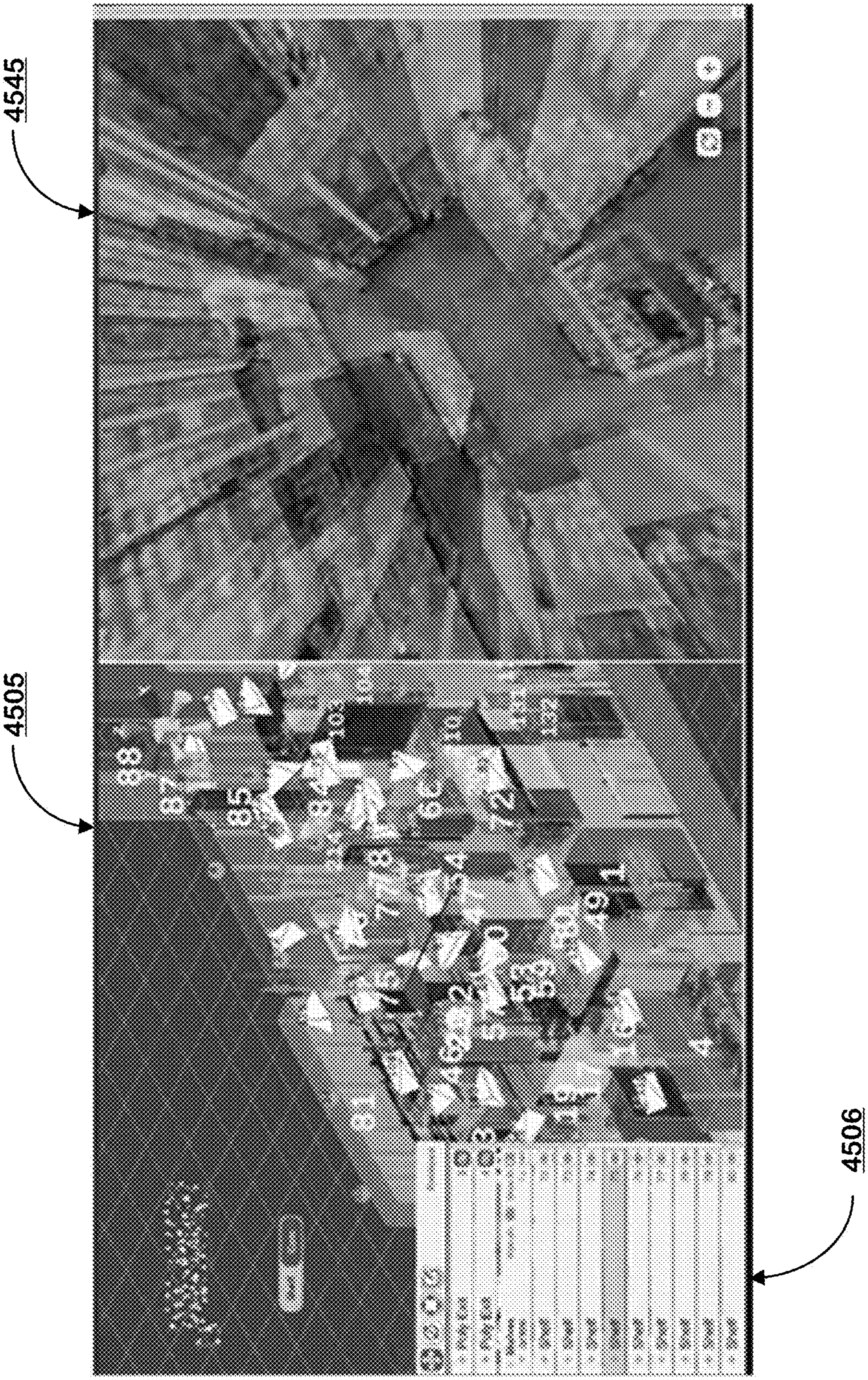
Figure 45D:
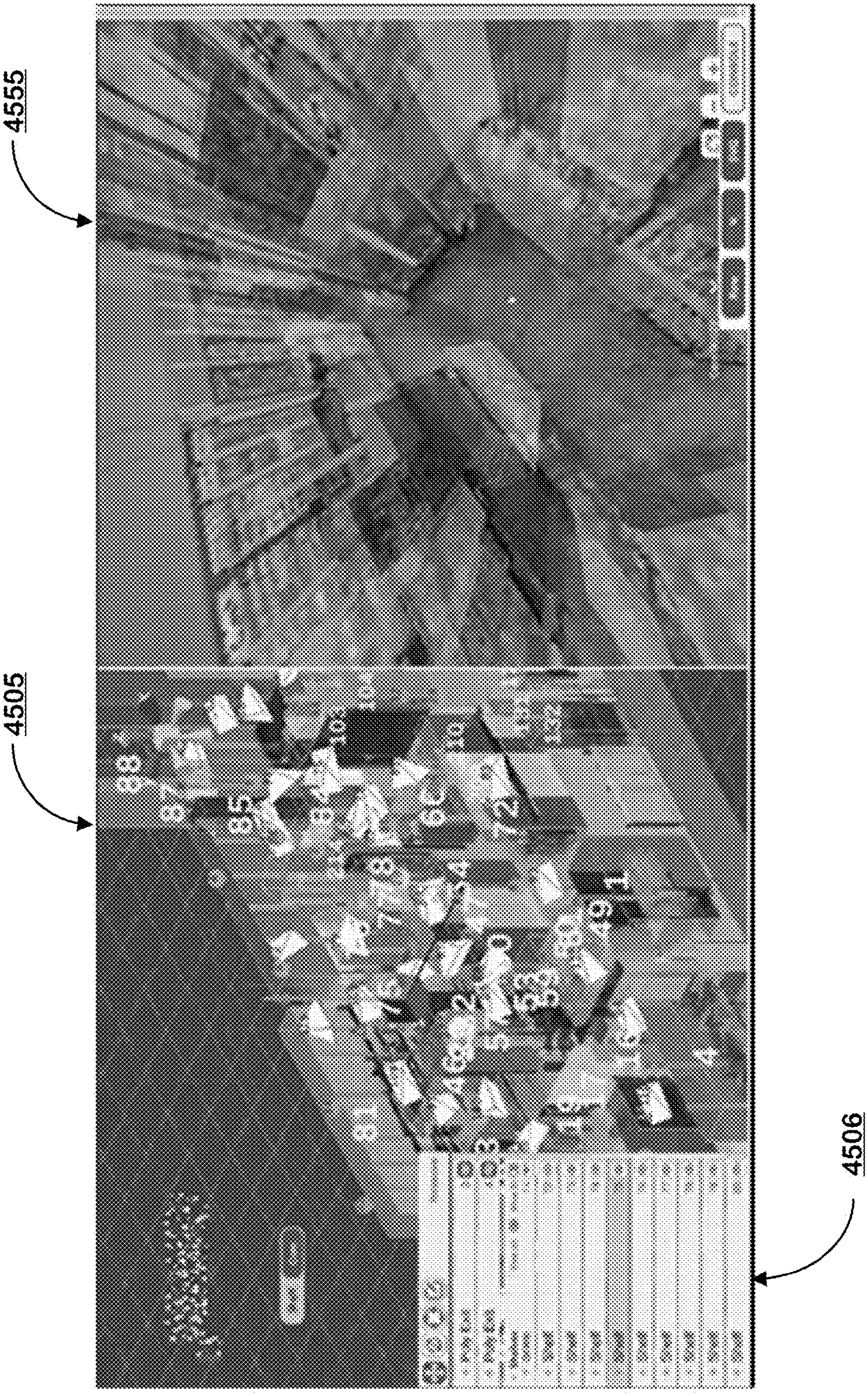

FIG. 45C presents a view from another camera a in a larger window 4545. A user selected the view from a camera in window 4515 (in FIG. 45A) to display the view in the larger window 4545. The user can rotate, zoom or pan the image in the window 4545. For example, a slightly rotated view of the area of real space is shown in a window 4555 (in FIG. 45D).

Figure 46:
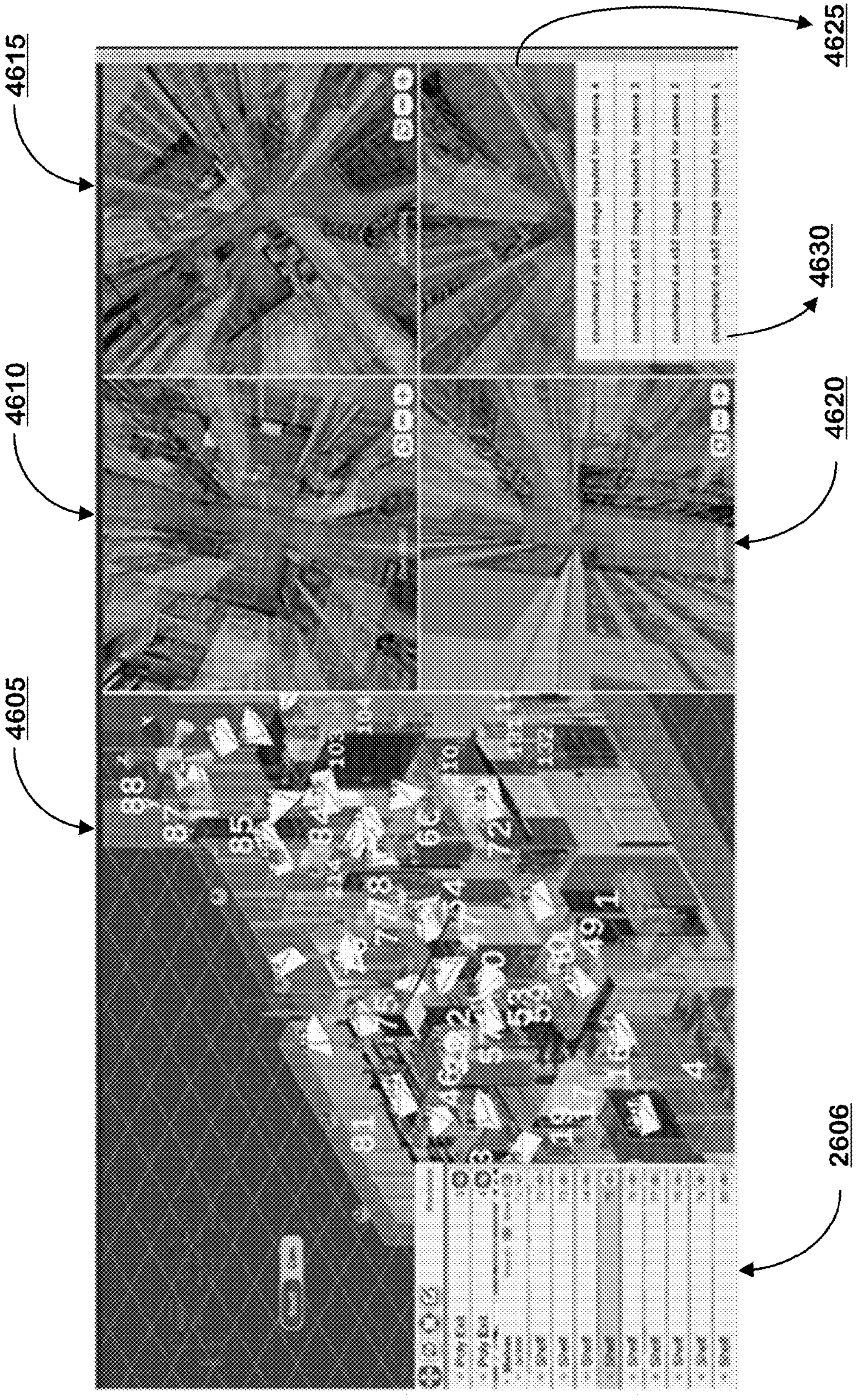
FIG. 46 presents selection of cameras for viewing shelves in an augmented reality (AR) view of the area of real space.

FIG. 46 presents another view of the camera masking tool in which a list of cameras is presented in a window 4630. The list of cameras includes the names and/or identifiers of the four cameras from which the images are displayed in the four windows 4610, 4615, 4620 and 4625, respectively. The same concept can be implemented using more than four cameras and four windows and can also be implemented using fewer than four cameras and four windows.

Process for Automatic Generation of Camera Masks

Figure 47:
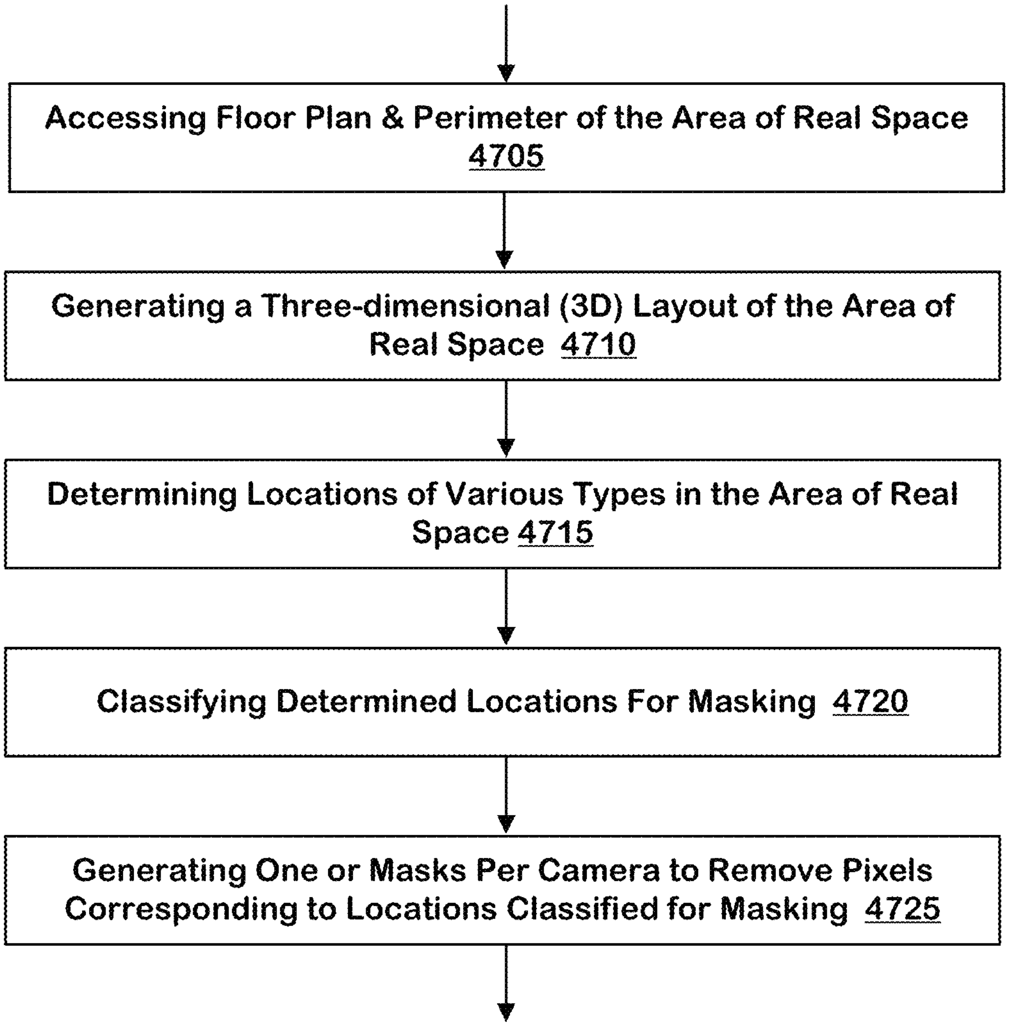
FIG. 47 presents a process flowchart presenting operations for generating one or more masks per camera in an area of real space.

FIG. 47 presents a process flowchart including operations for generating camera masks for cameras installed in the area of real space. The automatic generation of camera placement plan for an area of real space is presented in U.S. patent application Ser. No. 17/358,864, entitled, "Systems and Method for Automated Design of Camera Placement and Cameras Arrangements for Autonomous Checkout," filed on 25 Jun. 2021, now issued as U.S. Pat. No. 11,303,853 which is fully incorporated into this application by reference. After the cameras are installed in the area of real space, they can be calibrated using auto-calibration and recalibration techniques presented in U.S. patent application Ser. No. 17/357,867, entitled, "Systems and Methods for Automated Recalibration of Sensors for Autonomous Checkout." filed on 24 Jun. 2021, now issued as U.S. Pat. No. 11,361,468 which is fully incorporated into this application by reference. The technology disclosed can also use the automated camera calibration technique presented in U.S. patent application Ser. No. 17/733,680, entitled, "Systems and Methods for Extrinsic Calibration of Sensors for Autonomous Checkout," filed on 29 Apr. 2022 which is fully incorporated into this application by reference.

The process starts at an operation 4705 at which the camera mask generator 2395 accesses one or maps of the area of real space from the maps database. The input to the camera mask generator can also include additional data about the area of real space such as the perimeter of the area of real space and positions of various types of structures, shapes of the structures etc. The structures in the area of real space can include inventory display structures, exit/entrance locations, desks, chairs, bank machines (such as ATMs) etc. The input to the camera mask generator 2395 can also include locations of open spaces such as pedestrian paths and other spaces where subject can move around in the area of real space. The camera mask generator 2395 includes logic to generate a two-dimensional layout of the area of real space using the maps of the area of real space, the perimeter of the area of real space, the locations of various types of structures and open spaces in the area of real space. The layout of the area of real space indicates positions of inventory display structures and open spaces in the area of real space. A planogram of the area of real space can also be provided as input to the camera mask generator 2395. The planogram can indicate the product categories placed at various shelves in the area of real space.

The camera mask generator 2395 converts the two-dimensional layout of the area of real space into a three-dimensional layout of the area of real space using the depth or height of various types of structures in the area of space (operation 4710). In one implementation, the three-dimensional map is generated for up to a height of two meters from the floor of the area of real space. It is understood that the technology disclosed can generate three-dimensional layout of the area of real space for various depths or heights from the floor which can be greater than two meters or less than two meters. The three-dimensional layout of the area of real space includes locations of inventory display structures in three dimensions of the area of real space. The layout includes locations of structures other than the inventory display structures e.g., the layout includes locations of ATM machines positioned in the area of real space, doors, windows, tables, chairs or other types of objects or structures placed in the area of real space. In one implementation, the locations of the structures in three dimensions of the area of real space are reprojected into the area of real space using existing machine vision or image reprojection techniques to generate three-dimensional layout of the area of real space. An example three-dimensional image reprojection technique using two-dimensional images is presented above. The layout also includes boundaries of the structures in the area of real space. Additionally, operation 4710 can be performed without accessing the floor plan and/or perimeter of the area of real space by implementing the cameras to complete an initial scan of the area of real space for the purpose of generating the 3D layout.

The three-dimensional layout of the area of real space is then processed by the camera mask generator 2395 to determine various types of structures, open spaces and other types of structures in the area of real space (operation 4715). The store layout, store planogram, store map or other types of data can be provided as input to the camera mask generator 2395 to determine various types of structures placed in the area of real space. The camera mask generator 2395 can assign labels to structures or open spaces in the area of real space. In one implementation, the technology disclosed can apply trained machine learning models to automatically detect various types of structures using shapes and/or boundaries of the structures as indicated in the three-dimensional area of real space. Some or all of operation 4715 can be performed manually or automatically without user interaction.

The camera mask generator 2395 classifies the various types of structures into categories or classes of structures so that structures that are not required for subject tracking or detection of action events and/or structures that may expose personal information or sensitive subject data can be masked out (operation 4720). The technology disclosed can apply trained machine learning models to classify various types of structures or locations containing those structures in the area of real space. Based on the category of the structure or the location, the camera mask generator can apply an appropriate mask to the pixels corresponding to that structure or location in the images captured by the camera. If the category of the structure or the location indicates that the structure or the location is required for subject tracking and/or detecting takes and puts of inventory items, then no mask is applied on the pixels corresponding to that structure or the location.

The pixels corresponding to structures or locations that are sensitive (or just not necessary) are blacked out (e.g., masked out) or simply not captured in images so that these pixels are not available to image processing pipeline when images from the camera are sent to the image processing pipeline (operation 4725).

In one implementation, the technology disclosed can include a plurality of categories of structures or locations that need to be masked in captured images. The masking can be performed according to the level of sensitivity of the data associated with the structure or the location. For example, the location at which an automated teller machine (or ATM) is positioned can be considered as a highly sensitive area of the image captured by a camera. Therefore, pixels corresponding to the ATM can be blacked out permanently in images prior to storing or processing the images captured by the camera. This ensures that no sensitive personal or financial data such as personal identification numbers (PINs), bank receipts, transaction details are accessible to a third party. As another example of a location that may contain highly sensitive personal data, suppose a shopping store (or a pharmacy) allows subjects to provide their personal information via computing devices or terminals in the area of real space for getting prescription medicines. The displays of such computing devices or terminals that present personal information of subjects and/or prescription details can be classified as highly sensitive and blacked out (or simply not captured) in images captured by a camera so that subjects' personal information is not accessible to image processing pipeline and any other subsystem of the cashier-less store. Locations in the area of real space which are not very sensitive may be classified as a low sensitive area. The pixels corresponding to a low sensitive area may be blacked out from the image processing pipeline but the original pixels as captured by the camera can be retained in a storage for a predetermined period of time for audit and review purposes. Examples of such areas can include areas outside the perimeter of the shopping store but visible in the image captured by a camera through a glass window, a glass door etc. Other examples of such areas can include areas that are not helpful or necessary for determining puts/takes of inventory items by a subject. The technology disclosed can therefore implement a fine grained classification model that is trained to classify structures and locations in various categories corresponding to the particular type of shopping store or environment in which the cashier-less shopping system for autonomous checkout is deployed. As previously mentioned, the areas that are masked out can be updated/changed based on a schedule (time of day, day of the week, week of the month, etc.), such that the masked out areas can be manipulated according to any desirable schedule. The masked out areas can also be adjusted automatically (or manually) based on movement of structures in the area of real space, patterns of movement of subjects, etc.

Computer System

Figure 48:
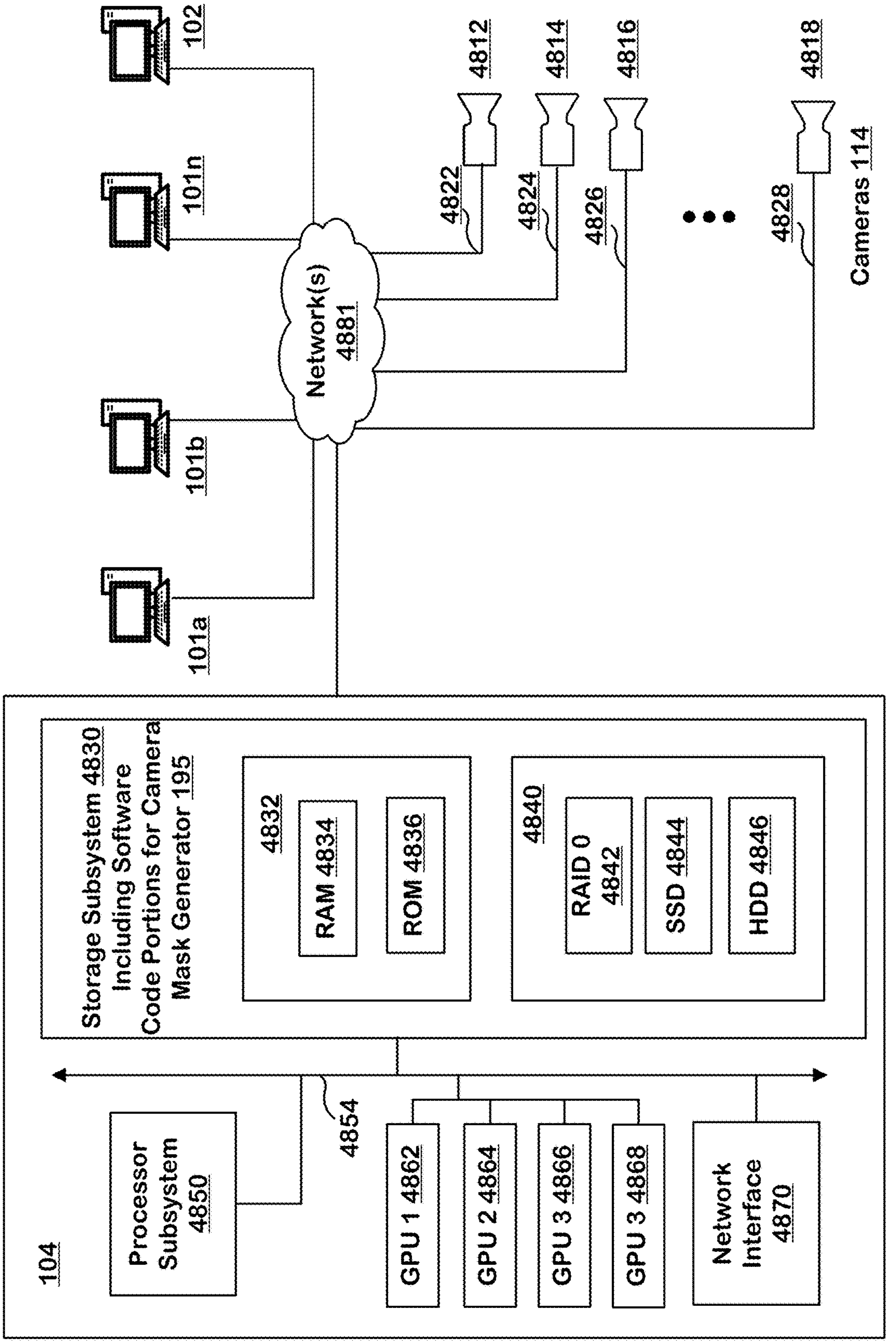
FIG. 48 is an example of a computer system architecture implementing the mask generation logic.

FIG. 48 presents an architecture of a network hosting image recognition engines. The system includes a plurality of network nodes 101*a*-101*n* in the illustrated implementation. In such an implementation, the network nodes are also referred to as processing platforms. Processing platforms 101*a*-101*n* and cameras 114*n* are connected to the network(s) 4881.

FIG. 48 shows a plurality of cameras 4812, 4814, 4816 . . . 4818 connected to the network(s). A large number of cameras can be deployed in particular systems. In one implementation, the cameras 4812 to 4818 are connected to the network(s) 4881 using Ethernet-based connectors 4822, 4824, 4826, and 4828, respectively. In such an implementation, the Ethernet-based connectors have a data transfer speed of 1 gigabit per second, also referred to as Gigabit Ethernet. It is understood that in other implementations, the cameras 114 are connected to the network using other types of network connections which can have faster or slower data transfer rates than Gigabit Ethernet. Also, in alternative implementations, a set of cameras can be connected directly to each processing platform, and the processing platforms can be coupled to a network.

The storage subsystem 4830 stores the basic programming and data constructs that provide the functionality of certain implementations of the present invention. For example, the various modules implementing the functionality of the camera mask generator 2395 may be stored in the storage subsystem 4830. The storage subsystem 4830 is an example of a computer readable memory comprising a non-transitory data storage medium, having computer instructions stored in the memory executable by a computer to perform all or any combinations of the data processing and image processing functions described herein, including logic to identify changes in the real space, to track subjects, to detect puts and takes of inventory items, to mask portions of an image captured by a camera and to detect the hand off of inventory items from one subject to another in an area of real space by processes as described herein. In other examples, the computer instructions can be stored in other types of memory, including portable memory, that comprise a non-transitory data storage medium or media, readable by a computer.

These software modules are generally executed by a processor subsystem 4850. The processor subsystem 4850 can include sequential instruction processors such as CPUs and GPUs, data flow instruction processors, such as FPGAs configured by instructions in the form of bit files, dedicated logic circuits supporting some or all of the functions of the processor subsystem, and combinations of one or more of these components. The processor subsystem may include cloud-based processors in some implementations.

A host memory subsystem 4832 typically includes a number of memories including a main random access memory (RAM) 4834 for the storage of instructions and data during program execution and a read-only memory (ROM) 4836 in which fixed instructions are stored. In one implementation, the RAM 4834 is used as a buffer for storing video streams from the cameras 114 connected to the platform 101*a*.

A file storage subsystem 4840 provides persistent storage for program and data files. In an example implementation, the storage subsystem 4840 includes four 120 Gigabyte (GB) solid state disks (SSD) in a RAID 0 4842 (redundant array of independent disks) arrangement. In the example implementation, in which a CNN is used to identify joints of subjects, the RAID 0 4842 is used to store training data. During training, the training data which is not in the RAM 4834 is read from the RAID 0 4842. Similarly, when images are being recorded for training purposes, the data which are not in the RAM 4834 are stored in the RAID 0 4842. In the example implementation, the hard disk drive (HDD) 4846 is a 10 terabyte storage. It is slower in access speed than the RAID 0 4842 storage. The solid state disk (SSD) 4844 contains the operating system and related files for the image recognition engine 112*a*.

In an example configuration, three cameras 4812, 4814, and 4816, are connected to the processing platform 101*a*. Each camera has a dedicated graphics processing unit GPU 1 2462, GPU 2 2464, and GPU 3 4866, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 4850, the storage subsystem 4830 and the GPUs 4862, 4864, and 4866 communicate using the bus subsystem 4854.

A number of peripheral devices such as a network interface 4870 subsystem, user interface output devices, and user interface input devices are also connected to the bus subsystem 4854 forming part of the processing platform 101*a*. These subsystems and devices are intentionally not shown in FIG. 48 to improve the clarity of the description. Although the bus subsystem 4854 is shown schematically as a single bus, alternative implementations of the bus subsystem may use multiple busses.

In one implementation, the cameras 4812 can be implemented using Chameleon3 1.3 MP Color USB3 Vision (Sony ICX445), having a resolution of 1288×964, a frame rate of 30 FPS, and at 1.3 MegaPixels per image, with a Varifocal Lens having a working distance (mm) of 300–∞, and a field of view with a ⅓" sensor of 98.2°–23.8°.

Particular Implementations

Some particular implementations and features for the disclosed technologies are described in the following discussion.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Many implementations of the methods disclosed for tracking subjects in an area of real space include using a plurality of sensors to produce respective sequences of frames of corresponding fields of view in the real space, identifying a plurality of subject tracks in the area of real space over a period of time using the sequences of frames produced by sensors in the plurality of sensors, a subject track in the plurality of subject tracks including a subject identifier, and locations of the subject represented by positions in three dimensions of the area of real space and a timestamp, receiving a signal from a boarding pass scanner indicating a boarding pass scan and using an identifier in the boarding pass to retrieve a user record including a payment method associated with the user, and matching the subject track in the plurality of subject tracks with the user record when a location of the subject moving on the subject track matches the location of the boarding pass scanner in a time interval that includes the timestamp at which the boarding pass is scanned on the boarding pass scanner.

Other implementations of the method disclosed for tracking subjects in a plurality of areas of real space include using a first plurality of sensors to produce respective sequences of frames of corresponding fields of view in a first area of real space of the plurality of areas of real space, detecting a first subject in a first plurality of subjects in the first area of real space and assigning a first tracking identifier to the first subject, detecting an exit of the first subject from the first area of real space and calculating a speed of the first subject at the exit from the first area of real space and calculating re-identification feature vectors (or any other data that can be used to re-identify or identify the first subject) for the first subject, using a second plurality of sensors to produce respective sequences of frames of corresponding fields of view in a second area of real space of the plurality of areas of real space, detecting a second subject in a second plurality of subjects in the second area of real space near an entrance to the second area of real space, calculating a speed of the second subject at the entrance to the second area of real space and calculating re-identification feature vectors (or any other data that can be used to re-identify or identify the second subject) for the second subject, matching the second subject with the first subject when the speed of the second subject matches with the speed of the first subject and/or when the re-identification feature vectors (or any other data that can be used to re-identify or identify the second subject) for the second subject match with re-identification feature vectors (or any other data that can be used to re-identify or identify the second subject) for the first subject, and assigning the first tracking identifier to the second subject and tracking the second subject as the first subject in the second area of real space.

Other implementations of the methods described in this section can include a tangible non-transitory computer-readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Some implementations of the method disclosed further include adding items taken by the first subject from inventory display structures in the second area of real space to a same shopping cart data structure that includes the items taken by the first subject from inventory display structures in the first area of real space.

The methods described above can also be implemented as a system including memory and one or more processors operable to execute instructions, stored in the memory, to perform any of the methods described above. As previously indicated, this system implementation of the technology disclosed can include one or more of the features described above in connection with the methods disclosed. In the interest of conciseness, the combinations of features present in the methods are not repeated with each system but are instead repeated by reference as if set forth here.

Other implementations include a method of verifying an age of a subject to be linked with a subject account, the subject account being linked with a client application executable on a mobile computing device, the method including verifying the age of the subject and verifying an identity of the subject. The age verification operations can further include receiving a verification request in dependence on an action performed by the subject, inspecting a documentation source that identifies the subject, the documentation source further comprising a validation of the age of the subject, and transmitting an age verification confirmation to be stored in association with the subject account. The identity verification operations can further include receiving an authentication factor from the subject, confirming a connection between the authentication factor and the subject, wherein the connection is a proven relationship between the authentication factor and the subject, and transmitting an identity verification confirmation to be stored in association with the subject account.

In one implementation, the age verification method further includes authorizing the subject for one or more age-restricted functions, wherein an age-restricted function is an interaction associated with the client application. In another implementation of the technology disclosed, age verification further includes binding the age verification confirmation to the authentication factor within the subject account, wherein the age verification input authorizes the subject to access the age-restricted function and the authentication factor authenticates the subject to access the age-restricted function. Other implementations may further include authorization and authentication for the subject to access an age-restricted function wherein the subject account interacts with a product or a service within a cashier-less shopping environment, and wherein the age-restricted function is an interaction between the subject account and the product or service with a pre-defined age threshold required to access the interaction. Some implementations may further include authorization and authentication for the subject to access an age-restricted function wherein the subject is associated with a subject attribute data structure storing one or more subject attributes, and wherein a subject attribute is at least one of a subject identifier or credential, the age verification confirmation, the identity verification confirmation, an authentication factor, and additional subject metadata.

Some implementations include a method of age verification wherein the age verification confirmation is an authorization status for the age-restricted function, and wherein the age verification confirmation is at least one of a biological age of the subject, a date of birth of the subject, and a binary variable indicating whether the subject exceeds the pre-defined age threshold required to access the age-restricted function, as informed by the documentation input. The documentation source can be, for example, an identification document, such as a driver's license, passport, state identification card, or birth certificate, that can be further validated by a government or regulatory agency authority.

Various implementations comprising age verification can require an authentication factor from the subject, the authentication factor is at least one of an inherence factor such as a fingerprint, a retina scan, a voice verification, a facial recognition, and a palm scan. Authentication of the subject to access the age-restricted function may further include a multi-factor authentication protocol, and the multi-factor authentication protocol can include an inherence factor.

As previously indicated, this method and other implementations of the technology disclosed can include one or more of the following features and/or features described in connection with additional methods disclosed. In the interest of conciseness, the combinations of features disclosed in this application are not individually enumerated and are not repeated with each base set of features. The age verification and/or the identity verification can be performed by a trusted source, wherein the trusted source can be, for example, at least one of an individual, an enterprise, an algorithm associated with at least one of the client application, an external age verification compliance agency, and a government agency.

Many implementations include a method of verifying an age of a subject to be linked with a subject account, the subject account being linked with a client application executable on a mobile computing device, wherein the method further includes verifying the age of the subject and verifying the identity of the subject. The age verification for the subject can further include receiving a verification request in dependence on an action performed by the subject, inspecting a documentation source that identifies the subject, the documentation source further comprising a proof of age of the subject, and transmitting an age verification confirmation to be stored in association with the subject account. The identity verification for the subject can further include receiving an identification input associated with the subject, the identification input further comprising a knowledge factor, a possession factor, or an inherence factor, transmitting an identity verification confirmation to be stored in association with the subject account, and binding the age verification confirmation and the identity verification confirmation to generate a relationship between the identification input and the age of the subject, wherein the relationship between the identification input and the age of the subject indicates that the identification input can be used to verify the age of the subject.

Various implementations further include an age verification process for a subject wherein the documentation source is at least one of a state-issued identification card, a driver's license, and an alternate proof-of-age documentation format, and wherein the documentation source is verifiable by at least one of a government entity and an alternate regulatory body bestowed an authority to confirm proof-of-age in accordance with at least one law, ordinance, or rule. The documentation source can be used to confirm the age of the subject, wherein the age verification confirmation is at least one of a date of birth of the subject, a present age of the subject, and a binary variable related to the age of the subject meeting a minimum required age, wherein the binary variable is an indicator that the present age of the subject is equivalent to or older than the minimum required age associated with an age-restricted action, or that the present age of the subject is younger than the minimum required age associated with the age-restricted action.

Many implementations of the technology disclosed may include the shopper initiating a function within their client application on their mobile device (e.g., mediated by a server). A shopper may explicitly initiate a function, such as the input of a made-to-order food item. A shopper may also implicitly initiate a function, such as the act of taking an item off the shelf and placing it into their cart or basket, thereby initiating the addition of the item into an item log data structure (i.e., a digital cart that tracks items taken by the shopper in order to facilitate autonomous checkout). Some shopper functions may require an access permission associated with an access management process.

In one implementation, the access management to a function is associated with an autonomous shopping environment. The autonomous shopping method includes tracking the subject in an area of real space such that at least two cameras with overlapping fields of view capture images of inventory locations and subjects' paths in the area of real space, accessing a master product catalog to detect items taken by the subject from inventory locations in the area of real space wherein a master product catalog contains attributes of inventory items placed on inventory display structures in the area of real space, receiving images and data of items captured by the subject, using a mobile device, in the area of real space and processing the images and the data of items received from the subject to update the master product catalog, processing images received from the cameras to detect items taken by the subject in the area of real space and updating a respective item log data structure of the subject to record items taken by the subject, detecting exit of the subject from the area of real space, and generating respective digital receipts for the subject including data of items taken by the subject in the area of real space wherein the data of items includes at least one of an item identifier, an item label, a quantity per item, a price per item. The function associated with the client application may correspond to an addition of an item to the respective item log data structure of the subject.

In certain implementations, the subject may attempt to perform an age-restricted action (e.g., purchasing of alcohol or tobacco) that is managed by an access permission. Managing of the permission associated with the age-restricted action can further include defining the minimum required age to initiate the age-restricted action, wherein a subject at the same age or an older age than the minimum required age can be provisioned the permission associated with the age-restricted action, granting the subject the permission associated with the age-restricted action, and implementing an identification check as a prerequisite to initiate the age-restricted function. The identification check can include, for example, requesting (from the subject) the identification input, processing the identification input to receive, as output, the age of the subject bound to the identity of the subject, transmitting an approval for the identification check, and allowing the subject to initiate the age-restricted function. In such implementations, the age-restricted action enables the subject to initiate the age-restricted product or service while bypassing exchange of the documentation source with an entity for manual review. In practice, this may involve the server triggering an authentication request in response to the shopper placing a bottle of wine in their shopping cart, the shopper providing a Face-ID input to their mobile computing device in order to authenticate their identity, and if authentication is successful, the server will grant permission for the shopper to purchase the wine if the shopper has been previously authorized following age verification. In various implementations, the identification input is at least one of a facial structure measurement, a fingerprint measurement, a retinal measurement, voice recognition, a physical keystore, a passcode, a password, and a personal identification number.

In many implementations, purchase of an age-restricted product or service associated with an autonomous shopping environment, such as the purchase of at least one of an alcoholic beverage, a tobacco product, an over-the-counter medication, a lottery ticket, and an alternate product or service with a minimum required age for purchase can be defined as an age-restricted action. In some implementations, an authentication and authorization protocol is used by the server to monitor subjects interacting with an age-restricted function. In other implementations, the age verification process is further monitored using a zone monitoring technique. For example, areas of the store that contain alcohol can be monitored as a tracking zone using zone monitoring in order to review and audit subject interactions with alcohol products and flag interactions that involve an alcoholic product and an identified subject that has not successfully completed age verification. In another example, the checkout counter can be monitored using zone monitoring in order to review and audit employee checkout processes involving age restricted products and flag interactions that involve an employee facilitating a checkout process without confirming the age of the subject.

In certain shopping stores, the area of the store responsible for selling age-restricted products (e.g., alcohol or tobacco) is completely isolated, both in physical space and in check out processes, from the remainder of the store. For example, certain states legally mandate that, while grocery stores and convenience stores are able to sell alcohol, the sales must be limited to a physically separate area with separate transactions from the remainder of the store in order to mitigate illegal sale of alcohol (e.g., a liquor store associated with a larger grocery store). The separate liquor store may be nearby or next door to the grocery store, or it may even be located within the same building and simply separated by one or more entry points that form a boundary from the main grocery store area. Despite the mitigation goal characterizing this separate arrangement, it is difficult for stores to enforce the prevention of shoppers under the legal age from entering the liquor store area. Some implementations of the technology disclosed provide a solution to this problem by leveraging at least one of a zone monitoring set-up, UWB communication, and/or subject tracking persistence analysis across multiple areas.

In one example, UWB communication can be used to more accurately track subject location providing additional measures to prevent entry of underage shoppers. In another example, the liquor store can be set up as a separate tracking zone with specific parameters customized to the liquor store compared to the rest of the grocery store (e.g., checks at more frequent time intervals, more stringent error detection and subject tracking, implementation of age verification without needing to perform the age verification processes in the remainder of the store) that result in more accurate and/or less expensive (computational or financial cost) for the customer. In other examples, subject persistence analysis can be used to track and re-identify the same subject as they transition from the grocery store into the liquor store and vice versa, even if the different zones are tracked discontinuously. Various combinations of features associated with age verification. UWB, multiple zone tracking, and zone monitoring can be generated to best fit the needs of the customer. Although the examples given above refer to alcohol sales and annexed liquor stores, it is to be understood that these are not limiting examples, but rather illustrative examples of the possible implementations of the disclosed technology to introduce additional security to monitoring systems in shopping stores in the form of authentication/authorization protocols, subject persistence, zone monitoring, and/or UWB communication.

Some customers that provide an autonomous (i.e., cashier-less) shopping environment to their shoppers may opt to not include an age verification technique for cashier-less purchase of age-restricted products (e.g., a lack of practicality due to low sales of said products, cost or bandwidth concerns, local legality limitations, and so on) and instead choose to provide a semi-autonomous experience wherein customers may shop autonomously if they are not purchasing restricted items, but customers must engage in some level of interaction with a store employee or CSR in order to purchase a restricted item. In some implementations, this may involve manual review of the subject's age and identity by a CSR, followed by the CSR approving the restricted item in the subject's cart and enabling the subject to continue shopping autonomously. In other implementations, this may involve executing the sales transaction for the restricted item at the checkout with facilitation from a CSR. In many implementations, zone monitoring can be implemented as a form of security review and auditing for checkout counters and/or areas of the store displaying restricted products.

A method is disclosed herein for managing subject access to a restricted function, the subject linked to a subject account and the subject account linked to a client application associated with the restricted function, including receiving, from the client application, an access request to the restricted function, determining a prerequisite associated with the restricted function, evaluating the access request to determine when the prerequisite for the restricted function is met, and granting the subject access to the restricted function. The prerequisite for the restricted function is a subject access privilege prerequisite, and the access management can include authentication, authorization, and granting the subject access to the restricted function. Authentication further includes obtaining an authentication factor associated with the subject, processing the authentication factor to verify the identity of the subject, and approving the authentication of the identity of the subject. Authorization further includes detecting an access privilege associated with the subject account, evaluating the access privilege to confirm whether the prerequisite is met, wherein the prerequisite is met when the access privilege indicates the subject account has been delegated access to the restricted function, and granting the subject access to the restricted function.

Examples mentioned above provide examples of a restricted function including the purchase of an age-restricted product. In addition to the purchase of an age-restricted product, other age-restriction functions may include entry into an age-restricted space (e.g., a bar) or access to an age-restricted digital resource (e.g., a website that requires users to be 21 or older in order to access the content). In addition to age-restricted functions, a restricted function may also be a qualification-restricted function, or a medically-restricted function. In one example, a shopper is attempting to purchase a product that is qualification-restricted, such as a hair colorant that requires a cosmetology license to purchase. In another example, the shopper is attempting to purchase a product that is medically-restricted, such as insulin needles that require a prescription from a medical provider. The function may also be quantitatively restricted, such as a product that has a minimum purchase volume (e.g., bulk foods that are sold in quantities of one pound or greater). The purchase of certain items may also be restricted if the item requires a customization input (i.e., not allowing the addition of an item to the cart until the required customization inputs have been provided by the shopper), the item is not detectable by machine vision, or the item is a high-security item (e.g., items that are frequently stolen or items above a pre-determined value threshold). Restricted functions may have a single restriction or multiple restrictions associated with the action. Functional restrictions may be specific to one or more tracking zones. A function may further be restricted if the system is unable to successfully re-identify a subject that has moved between different tracking areas.

In one implementation, the prerequisite for the restricted function is a conditional definition prerequisite. In such an implementation, the access management further includes authorizing the subject to access the restricted function, wherein the authorization further includes detecting a conditional definition associated with the restricted function wherein the conditional definition comprises at least one further descriptor associated with defining a condition of access, evaluating the conditional definition to confirm whether the prerequisite is met (wherein the prerequisite is met when the condition of access is defined), and granting the subject access to the restricted function. The conditional definition prerequisite may be an age, a professional license, or a prescription, for example.

In another implementation, the restricted function is a time-restricted function (e.g., a store that sells alcohol Monday through Saturday, but not Sunday, therefore a shopper will be prevented from adding alcohol to their carts if it is a Sunday), a supply-restricted function (e.g., a shopper attempts to purchase a coffee with a non-dairy alternative in place of milk, but the chosen alternative is out of stock, therefore the shopper will be prevented from adding the coffee as modified to their cart), or a location-restricted function (e.g., a store temporarily shuts down the ability to pre-order using a client application via shopper mobile devices due to a high volume of shoppers for a period of time, therefore, the shopper must be physically present in the store to place an order using the client application).

One implementation involving restricted functions within an autonomous shopping store includes an availability prerequisite. In such an implementation, the access management includes authorizing the subject to access the restricted function, the authorization further including detecting an availability status associated with the restricted function evaluating the availability status to confirm whether the prerequisite is met, wherein the prerequisite is met when the availability status indicates the restricted function is available, and granting the subject access to the restricted function.

In another implementation, a function associated with the shopper placing an item in their cart can be restricted if the action bypasses successful computer vision detection (e.g., the item cannot clearly be identified). Such an implementation may further include optimization of the camera map and/or the adjustment of camera masking. Some implementations may include restricted functions that require an external interaction with a CSR prior to obtaining a purchased item, such as items stored in locked cases like tobacco products, pre-ordered hot food items, or third-party mediated orders that involve a delivery courier picking up a shopping order on behalf of the shopper. Some implementations include recording the restricted function within the respective item log data structure for the subject, wherein the recording of the restricted function further comprises recording data associated with the interaction with the external authority. For example, updating the respective item log data structure of the subject can further include the external authority injecting the restricted function into the respective item log data structure, bypassing camera detection (e.g., a CSR taking an order for a made-to-order hot food item or manually overriding a system error resulting in inconsistency between the shopper's physical cart and the item log in their digital cart).

In an implementation utilizing zone monitoring, different tracking zones may implement different settings related to restricted functions. For example, a shopping store may be divided into a first tracking zone that includes a shelving display with more expensive items and a second tracking zone including low-cost items. The first tracking zone may be subject to different functional restrictions than the second tracking zone, such as the requirement of a CSR approval or a higher sensitivity requirement for computer vision identification of products such that interactions are more likely to require CSR review based on a higher threshold requirement for a confidence metric relating to the identification of a product. By implementing zone monitoring, the store saves resources via preventing unnecessary data collection, analysis, or review in areas of the store with lower importance. The shopping store may further include a third tracking zone containing a row of shelves displaying alcohol. The third tracking zone may require the subject to have previously completed age verification in order to interact with any product within the third tracking zone; otherwise, the identification of the subject will trigger a flag presented to the CSR that can prompt the CSR to intervene and/or request a form of identification. UWB-based location tracking and/or subject persistence analysis may provide further security benefits in such an implementation, as described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

One implementation of the technology disclosed includes a method for determining a masking region in an image captured by a camera in a plurality of cameras, the method including receiving a floor plan of an area of real space and a perimeter data of the area of real space, the floor plan including positions of structures in the area of real space and open space in the area of real space, receiving a camera placement plan including positions and orientations of the plurality of cameras positioned in the area of real space wherein each camera is identified by a camera identifier, generating a three-dimensional map of the area of real space including the positions of the structures and the shapes of the structures in three-dimensions in the area of real space, inputting a portion of the three-dimensional map of the area of real space captured by the camera in the plurality to cameras to a trained machine learning model wherein the portion of the three-dimensional map includes the positions of the structures and the shapes of the structures, classifying the structures in the area of real space into masking regions and non-masking regions, and automatically and/or manually generating at least one mask per masking region to (i) black out pixels in an image of the portion of the area of real space and/or (ii) intentionally not capture data corresponding to a portion of the area of real space, so as to prevent further image processing of pixels corresponding to the at least one mask by pose detection, subject tracking and/or event detection models.

Many implementations of the technology disclosed enables tracking subjects across multiple areas (e.g., multiple shopping stores, areas, etc.) within a previously designated region (e.g., a shopping mall, an airport, etc.). This allows a shopper to seamlessly make shopping transactions (e.g., puts and/or takes) across multiple stores, areas, locations, etc., within the previously designated region and allows the cashier-less system to perform a single financial transaction for the multiple shopping transactions. The technology disclosed can also enable sharing of shopping data across the multiple stores, locations, etc. Shoppers can be tracked and matched to their respective accounts in a variety of environments such as in a movie theater, a sports arena or a sports stadium, a golf course, a country club, a library, a railway station, a metro station, in a university or a college food court, etc.

Two example implementations of the technology disclosed are now presented: a first implementation includes tracking takes of inventory items by a shopper in an airport (such as in a jet bridge area), a second implementation is presented that tracks takes of inventory items by a shopper across two tracking spaces (such as a fuel station and convenience store) within a previously designated region.

In certain implementations, the technology disclosed can be applied to use cases within an airport. The system presents details of linking a subject's identification collected from scan of a boarding pass to determine their account information and use that information to complete a financial transaction that can include takes of inventory items placed in one or more shelves in an area between the jet bridge and the boarding pass scanner.

In one variation of the airport implementation, the shopper (i.e., traveler) there is one tracking space and the shopper remains in the field of view of one or more cameras while taking items from shelves.

In a second variation of the airport implementation, a re-identification technique is used when there are two or more tracking spaces separated by untracked space in a previously designated region. The technology disclosed can use the shopper's name on the boarding pass as an identifier. Other types of identifiers such as a loyalty membership number for the shopper, a phone number, an email address, physical characteristics, etc. can also be used to access a shopper's account information stored in a user database. If a user has previously completed age verification, the data obtained from the shopper's identification documentation may also be extracted and used as an identifier. Payment information associated with the shopper's user account record such as credit card details, airline's loyalty points, or other types of payment methods can be retrieved from the shopper's record in the database for completing the financial transaction.

This information can also be used to get any other service upgrades available on the airplane, such as onboard Wi-Fi, hot/cold meal or drinks service. Shopper can select these additional services either from an interactive display placed near the jet bridge or from a display on the airplane seat. The shopper may select to have a packaged meal provided to her prior to her disembarking the plane on the destination or prepared and ready at some location after disembarking the plane. Therefore, the technology disclosed can be used to track travelers as they travel from one airport to another and can provide useful features for airlines related to various services and products for passengers.

In another implementation of the technology disclosed, shoppers are tracked across multiple tracking spaces that are separated by regions where shoppers are not tracked. This implementation is presented using an example of a gas station and a convenience store located adjacent to the gas station. The gas station and the convenience store can be spaced apart from each other within the previously designated region. The two tracking spaces can also represent two shopping stores adjacent to each other or located in close proximity or separated from one another by any distance within the previously designated region. The two tracking spaces have separate sets of sensors or cameras that capture images of subjects in their respective areas of real space. Re-identification feature vectors, velocity (or speed) of the subject, neck height (or neck joint height), length of femur of the subject, etc. can be used to match shoppers across two tracking spaces.

Certain implementations can be used to determine the shopping behavior of a shopper across multiple shopping stores. Hence, the disclosed system and methods can be used to track purchases by shoppers from different shopping stores and track continuity of shoppers' purchases across multiple shopping stores. Such analytic data is useful for shopping store owners and product manufacturers or distributors to arrange placement of products or even placement of shopping stores in a shopping complex or in a shopping mall to accommodate the shopping behavior or shopping preferences of subjects.

Traditionally, this analytic data can be difficult to collect across physical retail locations because of separation or partitioning between shopping stores.

By tracking subjects that visit the shopping store after or before filling gas (or charging electric batteries) in their cars, the technology disclosed can not only determine the shopping behavior of the shoppers in the shopping store, but the technology disclosed can generate a single shopping cart for shoppers that take items from multiple adjacent shopping stores. For example, a single purchase transaction can be performed for the subject who purchased fuel from the fuel station and took items from the convenience store adjacent to the fuel station. Processing combined receipts as a single transaction can reduce the transaction costs when payment methods that charge per transaction fee are used. Therefore, the technology disclosed provides convenience to both store operators and shoppers.

In one implementation, the technology disclosed can be used to send alerts or notifications to vendors, store managers, or other service providers for an incoming subject (such as a shopper, passenger, client, etc.). For example, based on a projected path of a subject, the technology disclosed can determine that a subject is heading towards a particular location in the area of real space. The technology disclosed can then send a notification to an employee or a manager of the destination location of an incoming subject so that the employee or the manager can be ready to provide service to the incoming subject (e.g., the subject can be running late or running early). This approach can further rely on UWB communication for more precise tracking in another implementation.

Another implementation includes a system including one or more processors coupled to memory, the memory loaded with computer instructions, the instructions, when executed on the processors, implement the actions of any one of the methods described above.

A processor, as referenced herein, is a hardware component configured to run computer program code. Specifically, the term "processor" is synonymous with terms like controller and computer and should be understood to encompass not only computers having different architectures such as single/multi-processor architectures and sequential (e.g., Von Neumann)/parallel architectures but also specialized circuits such as field-programmable gate arrays (FGPAs), signal processing devices and other processing circuitry.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method for tracking subjects in an area of real space, the method including:

using a plurality of sensors to produce respective sequences of frames of corresponding fields of view in an area of real space;

identifying a plurality of subject tracks in the area of real space over a period of time using the sequences of frames produced by at least one sensor of the plurality of sensors, wherein a subject track, of the plurality of subject tracks, includes (i) a subject identifier of a particular subject, and (ii) one or more locations of the particular subject represented by positions in three dimensions of the area of real space, and timestamps, and wherein the subject track corresponds to a journey of the particular subject across discontinuous tracking zones from a beginning of the journey until an end of the journey;

receiving, from an information scanner at the beginning of the journey, a signal indicating an information scan;

using an identifier obtained from the received signal in response to the information scan to retrieve a user record including a payment method associated with the user record; and associating the subject track, of the plurality of subject tracks, with the user record when a location of the particular subject matches the location of the information scanner in a time interval that includes a timestamp at which the information scan is scanned.

2. The method of claim 1, further including, for one or more events in the journey of the particular subject occurring between the beginning of the journey and the end of the journey:

detecting, using the sequences of frames produced by the at least one sensor, take actions and put actions performed by the particular subject, wherein a take action includes the particular subject taking an item placed on an inventory display structure and a put action includes the particular subject putting an item back onto the inventory display structure, updating a shopping cart data structure associated with the user record for the particular subject by at least one of (i) adding the item to the shopping cart data structure in response to the take action and (ii) removing the item from the shopping cart data structure in response to the put action; and executing, in response to the particular subject reaching the end of the journey, a purchase transaction for all items included in the shopping cart data structure, wherein the executing of the purchase transaction further includes determining a transaction amount based on the shopping cart data structure and processing a payment for the transaction amount using the payment method associated with the user record.

3. The method of claim 2, further including:

receiving, from a user device associated with the user record, a selection of one or more available services; and updating the shopping cart data structure to include the selected one or more services.

4. The method of claim 1, wherein the associating of the subject track further includes identifying locations of a mobile device, which is carried by the particular subject and is executing a client application in the area of real space.

5. The method of claim 1, further including retrieving, in response to the received signal, metadata associated with the user record, the metadata including at least one of: membership data, contact information, physical descriptors, demographic data, account history, data associated with the sequences of frames produced by the at least one sensor, data associated with the subject track, and data obtained from a user device associated with the user record and that transmits information associated with the user record.

6. The method of claim 1, further including, for one or more events in the journey of the particular subject occurring between the beginning of the journey starting at the information scan and the end of the journey, being at a location that is different than the beginning of the journey:

detecting an action including at least one of: (i) a take action, by the particular subject, of an item and (ii) an in-journey selection of a service; and updating a shopping cart data structure associated with the user record to identify the detected action, wherein a user account of the particular subject is charged using the payment method and in dependence upon contents of the shopping cart data structure, but not until after the end of the journey.

7. The method of claim 1, wherein the information scanner is a kiosk that can receive, from a user, a check-in input from at least one of a near field communication signal, an ultra-wideband communication signal, and a barcode, and wherein the information scan involves at least one of a ticket, a badge, a keystore, an authentication factor, a user identifier, and a membership identifier.

8. A system configured to track subjects, the system comprising a processor, memory coupled to the processor and program instructions that, when executed on the processor, cause the processor to perform operations including:

using a plurality of sensors to produce respective sequences of frames of corresponding fields of view in an area of real space;

identifying a plurality of subject tracks in the area of real space over a period of time using the sequences of frames produced by at least one sensor of the plurality of sensors, wherein a subject track, of the plurality of subject tracks, includes (i) a subject identifier of a particular subject, and (ii) one or more locations of the particular subject represented by positions in three dimensions of the area of real space, and timestamps, and wherein the subject track corresponds to a journey of the particular subject across discontinuous tracking zones from a beginning of the journey until an end of the journey;

receiving, from an information scanner at the beginning of the journey, a signal indicating an information scan;

using an identifier obtained from the received signal in response to the information scan to retrieve a user record including a payment method associated with the user record; and associating the subject track, of the plurality of subject tracks, with the user record when a location of the particular subject matches the location of the information scanner in a time interval that includes a timestamp at which the information scan is scanned.

9. A non-transitory computer readable storage medium impressed with computer program instructions to track subjects, the instructions, when executed on a processor, causing the processor to perform operations including:

using a plurality of sensors to produce respective sequences of frames of corresponding fields of view in an area of real space;

identifying a plurality of subject tracks in the area of real space over a period of time using the sequences of frames produced by at least one sensor of the plurality of sensors, wherein a subject track, of the plurality of subject tracks, includes (i) a subject identifier of a particular subject, and (ii) one or more locations of the particular subject represented by positions in three dimensions of the area of real space, and timestamps, and wherein the subject track corresponds to a journey of the particular subject across discontinuous tracking zones from a beginning of the journey until an end of the journey;

receiving, from an information scanner at the beginning of the journey, a signal indicating an information scan;

using an identifier obtained from the received signal in response to the information scan to retrieve a user record including a payment method associated with the user record; and associating the subject track, of the plurality of subject tracks, with the user record when a location of the particular subject matches the location of the information scanner in a time interval that includes a timestamp at which the information scan is scanned.

10. The method of claim 1, wherein the subject track identifying the journey of the particular subject across the discontinuous tracking zones includes (i) a first subject track in a first time interval and (ii) a second subject track in a second time interval, wherein the first subject track and the second subject track are associated with the particular subject, and wherein the first time interval and the second time interval are nonconsecutive time intervals.

11. The method of claim 2, wherein the subject track identifying the journey of the particular subject across the discontinuous tracking zones includes (i) a first shopping cart data structure and (ii) a second shopping cart data structure that is distinct from the first shopping cart data structure, wherein the first shopping cart data structure and the second shopping cart data structure are associated with the user record of the particular subject, and wherein the executing of the purchase transaction at the end of the journey further includes determining a cumulative transaction amount based on the first shopping cart data structure and the second shopping cart data structure, and processing a payment for the cumulative transaction amount.

12. The method of claim 1, wherein the subject track identifying the journey of the particular subject across the discontinuous tracking zones includes (i) a first set of one or more events and (ii) a second set of one or more events that is at least partially nonoverlapping with the first set of one or more events, and wherein the first set of one or more events and the second set of one or more events are associated with the particular subject.

13. The method of claim 1, wherein the subject track identifying the journey of the particular subject across the discontinuous tracking zones includes (i) a first subject track in a first tracking zone and (ii) a second subject track in a second tracking zone that is at least partially nonoverlapping with the first tracking zone, and wherein the first subject track and the second subject track are associated with the particular subject.

14. The system of claim 8, wherein the subject track identifying the journey of the particular subject across the discontinuous tracking zones includes (i) a first subject track in a first time interval and (ii) a second subject track in a second time interval, wherein the first subject track and the second subject track are associated with the particular subject, and wherein the first time interval and the second time interval are nonconsecutive time intervals.

15. The system of claim 8, wherein the subject track identifying the journey of the particular subject across the discontinuous tracking zones includes (i) a first shopping cart data structure and (ii) a second shopping cart data structure that is distinct from the first shopping cart data structure, wherein the first shopping cart data structure and the second shopping cart data structure are associated with the user record of the particular subject, and wherein an execution of a purchase transaction at the end of the journey includes determining a cumulative transaction amount based on the first shopping cart data structure and the second shopping cart data structure, and processing a payment for the cumulative transaction amount.

16. The system of claim 8, wherein the subject track identifying the journey of the particular subject across the discontinuous tracking zones includes (i) a first subject track in a first tracking zone and (ii) a second subject track in a second tracking zone that is at least partially nonoverlapping with the first tracking zone, and wherein the first subject track and the second subject track are associated with the particular subject.

17. The non-transitory computer readable storage medium of claim 9, wherein the subject track identifying the journey of the particular subject across the discontinuous tracking zones includes (i) a first subject track in a first time interval and (ii) a second subject track in a second time interval, wherein the first subject track and the second subject track are associated with the particular subject, and wherein the first time interval and the second time interval are nonconsecutive time intervals.

18. The non-transitory computer readable storage medium of claim 9, wherein the subject track identifying the journey of the particular subject across the discontinuous tracking zones includes (i) a first subject track in a first tracking zone and (ii) a second subject track in a second tracking zone that is at least partially nonoverlapping with the first tracking zone, and wherein the first subject track and the second subject track are associated with the particular subject.

19. The non-transitory computer readable storage medium of claim 9, the operations further including, for one or more events in the journey of the particular subject occurring between the beginning of the journey and the end of the journey:

detecting, using the sequences of frames produced by the at least one sensor, take actions and put actions performed by the particular subject, wherein a take action includes the particular subject taking an item placed on an inventory display structure and a put action includes the particular subject putting an item back onto the inventory display structure, updating a shopping cart data structure associated with the user record for the particular subject by at least one of (i) adding the item to the shopping cart data structure in response to the take action and (ii) removing the item from the shopping cart data structure in response to the put action; and executing, in response to the particular subject reaching the end of the journey, a purchase transaction for all items included in the shopping cart data structure, wherein the executing of the purchase transaction further includes determining a transaction amount based on the shopping cart data structure and processing a payment for the transaction amount using the payment method associated with the user record.

* * * * *